US011675391B2

(12) United States Patent
Kwak et al.

(10) Patent No.: US 11,675,391 B2
(45) Date of Patent: Jun. 13, 2023

(54) USER TERMINAL DEVICE FOR DISPLAYING CONTENTS AND METHODS THEREOF

(71) Applicant: SAMSUNG ELECTRONICS CO., LTD., Suwon-si (KR)

(72) Inventors: Ji-yeon Kwak, Seoul (KR); Yun-kyung Kim, Suwon-si (KR); Yong-yeon Lee, Suwon-si (KR); Hyun-jin Kim, Seoul (KR); Yeo-jun Yoon, Suwon-si (KR); Nipun Kumar, Suwon-si (KR); Joon-kyu Seo, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/860,259

(22) Filed: Jul. 8, 2022

(65) Prior Publication Data
US 2022/0342444 A1 Oct. 27, 2022

Related U.S. Application Data

(63) Continuation of application No. 16/862,082, filed on Apr. 29, 2020, now Pat. No. 11,409,327, which is a
(Continued)

(30) Foreign Application Priority Data

Nov. 22, 2013 (KR) .................. 10-2013-0143298

(51) Int. Cl.
G06F 1/16 (2006.01)
G06F 1/3234 (2019.01)
(Continued)

(52) U.S. Cl.
CPC .......... G06F 1/1626 (2013.01); G06F 1/1637 (2013.01); G06F 1/1643 (2013.01);
(Continued)

(58) Field of Classification Search
CPC ............................................. G06F 2203/04108
See application file for complete search history.

(56) References Cited

U.S. PATENT DOCUMENTS 5,841,431 A 11/1998 Simmers
6,125,286 A 9/2000 Jahagirdar et al.
(Continued)

FOREIGN PATENT DOCUMENTS

CN 1202079 A 12/1998
CN 1246194 A 3/2000
(Continued)

OTHER PUBLICATIONS

Communication dated Jun. 13, 2022 issued by the European Patent Office in EP Application No. 19210090.7.
(Continued)

Primary Examiner — Gustavo Polo
(74) Attorney, Agent, or Firm — Sughrue Mion, PLLC

(57) ABSTRACT

A content display method of a user terminal device including a bended touch screen divided into a main area and a sub area, includes displaying, on the main area, a first main content provided by a first application, and displaying, on the sub area, a first sub content associated with the first main content, receiving a user gesture input on the main area, and in response to receiving the user gesture, displaying, on the main area, a second main content provided by a second application, and displaying, on the sub area, a second sub content associated with the second main content.

10 Claims, 105 Drawing Sheets

Related U.S. Application Data continuation of application No. 16/397,830, filed on Apr. 29, 2019, now Pat. No. 10,691,313, which is a continuation of application No. 14/329,179, filed on Jul. 11, 2014, now Pat. No. 10,318,120.

(60) Provisional application No. 61/845,023, filed on Jul. 11, 2013, provisional application No. 61/845,036, filed on Jul. 11, 2013.

(51) Int. Cl.
  *G06F 3/0488* (2022.01)
  *G06F 3/0485* (2022.01)
  *G06F 3/01* (2006.01)
  *G06F 3/041* (2006.01)
  *G06F 3/04883* (2022.01)
  *G06F 3/04886* (2022.01)
  *G06F 3/0346* (2013.01)
  *G06F 3/0482* (2013.01)
  *G06F 3/04842* (2022.01)
  *G06F 3/04845* (2022.01)
  *G06F 3/04847* (2022.01)
  *G06F 3/0484* (2022.01)
  *G06F 3/0486* (2013.01)
  *G09G 5/00* (2006.01)

(52) U.S. Cl.
  CPC .......... *G06F 1/1652* (2013.01); *G06F 1/3265* (2013.01); *G06F 3/013* (2013.01); *G06F 3/017* (2013.01); *G06F 3/0346* (2013.01); *G06F 3/041* (2013.01); *G06F 3/0412* (2013.01); *G06F 3/0482* (2013.01); *G06F 3/0484* (2013.01); *G06F 3/0485* (2013.01); *G06F 3/0486* (2013.01); *G06F 3/0488* (2013.01); *G06F 3/04842* (2013.01); *G06F 3/04845* (2013.01); *G06F 3/04847* (2013.01); *G06F 3/04883* (2013.01); *G06F 3/04886* (2013.01); *G09G 5/00* (2013.01); *G06F 2203/04102* (2013.01); *G06F 2203/04103* (2013.01); *G06F 2203/04106* (2013.01); *G06F 2203/04108* (2013.01); *G06F 2203/04803* (2013.01); *G06F 2203/04808* (2013.01); *G09G 2330/022* (2013.01); *Y02D 10/00* (2018.01); *Y02D 30/50* (2020.08)

(56) References Cited

U.S. PATENT DOCUMENTS

| | | |
|---|---|---|
| 6,304,763 B1 | 10/2001 | Jahagirdar et al. |
| 6,726,106 B1 | 4/2004 | Han et al. |
| 6,763,249 B2 | 7/2004 | Shirai |
| 7,071,915 B2 | 7/2006 | Liang et al. |
| 7,912,508 B2 | 3/2011 | Lee et al. |
| 8,195,254 B2 | 6/2012 | Oksman et al. |
| 8,225,229 B2 | 7/2012 | Thorn et al. |
| 8,249,664 B1 | 8/2012 | Bauer et al. |
| 8,260,363 B2 | 9/2012 | Roberts et al. |
| 8,264,456 B2 | 9/2012 | Ito et al. |
| 8,369,890 B2 | 2/2013 | Nicolas |
| 8,416,148 B1 | 4/2013 | Park |
| 8,421,825 B2 | 4/2013 | Taniguchi et al. |
| 8,437,806 B2 | 5/2013 | Kim |
| 8,502,788 B2 | 8/2013 | Cho |
| 8,564,618 B2 | 10/2013 | Ryu et al. |
| 8,610,155 B2 | 12/2013 | Hatano et al. |
| 8,830,216 B2 | 9/2014 | Araki |
| 9,008,731 B2 | 4/2015 | Yoo |
| 9,035,918 B2 | 5/2015 | Harris et al. |
| 9,052,769 B2 | 6/2015 | Choi et al. |
| 9,104,301 B2 | 8/2015 | Kim et al. |
| 9,119,293 B2 | 8/2015 | Mycroft |
| 9,124,713 B2 | 9/2015 | Park et al. |
| 9,300,772 B2 | 3/2016 | Kim |
| 9,411,503 B2 | 8/2016 | Ikeda et al. |
| 9,430,139 B2 | 8/2016 | Homma et al. |
| 9,489,078 B2 | 11/2016 | Seo et al. |
| 9,489,079 B2 | 11/2016 | Seo et al. |
| 9,489,080 B2 | 11/2016 | Seo et al. |
| 9,686,873 B2 | 6/2017 | Mycroft |
| 9,983,664 B2 | 5/2018 | Kim et al. |
| 10,318,120 B2 | 6/2019 | Kwak et al. |
| 10,459,625 B2 | 10/2019 | Seo |
| 10,534,531 B2 | 1/2020 | Seo |
| 10,642,485 B1 | 5/2020 | Seo et al. |
| 10,845,989 B2 | 11/2020 | Seo et al. |
| 10,852,942 B2 | 12/2020 | Seo et al. |
| 11,093,132 B2 | 8/2021 | Seo et al. |
| 11,237,723 B2 | 2/2022 | Seo et al. |
| 2001/0016502 A1 | 8/2001 | Shirai |
| 2005/0012760 A1 | 1/2005 | Yamamoto |
| 2005/0049006 A1 | 3/2005 | Lee |
| 2006/0197753 A1 | 9/2006 | Hotelling |
| 2006/0238517 A1 | 10/2006 | King et al. |
| 2007/0013719 A1 | 1/2007 | Yamamoto |
| 2008/0001770 A1 | 1/2008 | Ito et al. |
| 2008/0074442 A1 | 3/2008 | Taniguchi et al. |
| 2008/0088602 A1 | 4/2008 | Hotelling |
| 2008/0111833 A1 | 5/2008 | Thorn et al. |
| 2008/0129647 A1 | 6/2008 | Canova |
| 2008/0146285 A1 | 6/2008 | Lee et al. |
| 2008/0161060 A1 | 7/2008 | Yoshida et al. |
| 2009/0109187 A1 | 4/2009 | Noma |
| 2009/0138736 A1 | 5/2009 | Chin |
| 2009/0228820 A1 | 9/2009 | Kim et al. |
| 2009/0262078 A1 | 10/2009 | Pizzi |
| 2009/0312063 A1 | 12/2009 | Soto Nicolas |
| 2009/0318184 A1 | 12/2009 | Azami et al. |
| 2010/0013780 A1 | 1/2010 | Ikeda et al. |
| 2010/0048194 A1 | 2/2010 | Park et al. |
| 2010/0060548 A1 | 3/2010 | Choi et al. |
| 2010/0066643 A1 | 3/2010 | King et al. |
| 2010/0066698 A1 | 3/2010 | Seo |
| 2010/0066751 A1 | 3/2010 | Ryu et al. |
| 2010/0117975 A1 | 5/2010 | Cho |
| 2010/0123160 A1 | 5/2010 | Hatano et al. |
| 2010/0171753 A1 | 7/2010 | Kwon |
| 2010/0181988 A1 | 7/2010 | Hong et al. |
| 2010/0216514 A1 | 8/2010 | Smoyer et al. |
| 2010/0227651 A1 | 9/2010 | Kim |
| 2010/0298033 A1 | 11/2010 | Lee |
| 2010/0299599 A1 | 11/2010 | Shin et al. |
| 2010/0331054 A1 | 12/2010 | Roberts et al. |
| 2011/0065479 A1 | 3/2011 | Nader |
| 2011/0086680 A1 | 4/2011 | Kim et al. |
| 2011/0128241 A1 | 6/2011 | Kang et al. |
| 2011/0143815 A1 | 6/2011 | Inami |
| 2011/0151935 A1 | 6/2011 | Oksman et al. |
| 2011/0209100 A1 | 8/2011 | Hinckley et al. |
| 2011/0242592 A1 | 10/2011 | Tamura |
| 2011/0261002 A1 | 10/2011 | Verthein |
| 2011/0268218 A1 | 11/2011 | Kang et al. |
| 2011/0273414 A1 | 11/2011 | Araki |
| 2011/0321143 A1 | 12/2011 | Angaluri et al. |
| 2012/0013557 A1 | 1/2012 | Lee et al. |
| 2012/0023439 A1 | 1/2012 | Crim |
| 2012/0066591 A1 | 3/2012 | Hackwell |
| 2012/0071207 A1 | 3/2012 | Yoo |
| 2012/0084647 A1 | 4/2012 | Homma et al. |
| 2012/0098639 A1 | 4/2012 | Ijas |
| 2012/0170177 A1 | 7/2012 | Pertuit et al. |
| 2012/0176322 A1 | 7/2012 | Karmi et al. |
| 2012/0210349 A1 | 8/2012 | Campana et al. |
| 2012/0212502 A1 | 8/2012 | Lin et al. |
| 2012/0229407 A1 | 9/2012 | Harris et al. |
| 2012/0235900 A1 | 9/2012 | Border |
| 2012/0242599 A1 | 9/2012 | Seo et al. |
| 2012/0272179 A1 | 10/2012 | Stafford |
| 2012/0274575 A1 | 11/2012 | Solomon et al. |
| 2012/0290960 A1 | 11/2012 | Kim Yeung |

(56) References Cited

U.S. PATENT DOCUMENTS

| | | |
|---|---|---|
| 2012/0299813 A1 | 11/2012 | Kang et al. |
| 2012/0299845 A1 | 11/2012 | Seo et al. |
| 2012/0299980 A1 | 11/2012 | Fujikawa |
| 2012/0306782 A1 | 12/2012 | Seo et al. |
| 2013/0033434 A1 | 2/2013 | Richardson et al. |
| 2013/0076649 A1 | 3/2013 | Myers et al. |
| 2013/0086522 A1 | 4/2013 | Shimazu et al. |
| 2013/0107433 A1 | 5/2013 | Mycroft |
| 2013/0120295 A1 | 5/2013 | Kim et al. |
| 2013/0127748 A1 | 5/2013 | Vertegaal et al. |
| 2013/0145311 A1 | 6/2013 | Joo |
| 2013/0176248 A1 | 7/2013 | Shin et al. |
| 2013/0300697 A1 | 11/2013 | Kim et al. |
| 2013/0314331 A1* | 11/2013 | Rydenhag ........... G06F 3/04883 345/173 |
| 2013/0321340 A1 | 12/2013 | Seo et al. |
| 2013/0342483 A1 | 12/2013 | Seo et al. |
| 2014/0055345 A1 | 2/2014 | Seo et al. |
| 2014/0055375 A1 | 2/2014 | Kim et al. |
| 2014/0098028 A1 | 4/2014 | Kwak et al. |
| 2014/0099999 A1 | 4/2014 | Hatano et al. |
| 2014/0101560 A1 | 4/2014 | Kwak et al. |
| 2014/0101576 A1 | 4/2014 | Kwak et al. |
| 2014/0101578 A1 | 4/2014 | Kwak et al. |
| 2014/0101579 A1 | 4/2014 | Kim et al. |
| 2014/0152576 A1 | 4/2014 | Kim et al. |
| 2014/0181700 A1 | 6/2014 | Kim et al. |
| 2014/0184471 A1 | 7/2014 | Martynov et al. |
| 2015/0015511 A1 | 1/2015 | Kim et al. |
| 2015/0015512 A1 | 1/2015 | Kwak et al. |
| 2015/0017956 A1 | 1/2015 | Jeong |
| 2015/0103014 A1 | 1/2015 | Kwak et al. |
| 2015/0116269 A1 | 4/2015 | Kim et al. |
| 2015/0153895 A1 | 6/2015 | Hotelling |
| 2015/0286358 A1 | 10/2015 | Kim et al. |
| 2015/0296635 A1 | 10/2015 | Mycroft |
| 2015/0309691 A1 | 10/2015 | Seo et al. |
| 2015/0319282 A1 | 11/2015 | Park et al. |
| 2015/0378503 A1 | 12/2015 | Seo et al. |
| 2016/0070399 A1 | 3/2016 | Hotelling |
| 2016/0269622 A1 | 9/2016 | Melnyk et al. |
| 2017/0012090 A1 | 1/2017 | Hatano et al. |
| 2017/0012091 A1 | 1/2017 | Hatano et al. |
| 2017/0052698 A1 | 2/2017 | Seo et al. |
| 2019/0272091 A1 | 9/2019 | Seo |
| 2020/0225846 A1 | 7/2020 | Seo et al. |
| 2020/0249834 A1 | 8/2020 | Seo et al. |
| 2021/0109652 A1 | 4/2021 | Seo et al. |
| 2021/0149559 A1 | 5/2021 | Seo et al. |
| 2022/0147241 A1 | 5/2022 | Seo et al. |

FOREIGN PATENT DOCUMENTS

| | | |
|---|---|---|
| CN | 1310541 A | 8/2001 |
| CN | 1741542 A | 3/2006 |
| CN | 1761314 A | 4/2006 |
| CN | 101055495 A | 10/2007 |
| CN | 101150610 A | 3/2008 |
| CN | 101188824 A | 5/2008 |
| CN | 101308440 A | 11/2008 |
| CN | 101424990 A | 5/2009 |
| CN | 101432677 A | 5/2009 |
| CN | 101473634 A | 7/2009 |
| CN | 101493723 A | 7/2009 |
| CN | 101527745 A | 9/2009 |
| CN | 101536077 A | 9/2009 |
| CN | 101610298 A | 12/2009 |
| CN | 101630228 A | 1/2010 |
| CN | 101644991 A | 2/2010 |
| CN | 201409149 Y | 2/2010 |
| CN | 101674361 A | 3/2010 |
| CN | 101674410 A | 3/2010 |
| CN | 101676853 A | 3/2010 |
| CN | 101710917 A | 5/2010 |
| CN | 101739171 A | 6/2010 |
| CN | 101763190 A | 6/2010 |
| CN | 101771734 A | 7/2010 |
| CN | 101816027 A | 8/2010 |
| CN | 101827169 A | 9/2010 |
| CN | 101952787 A | 1/2011 |
| CN | 101957653 A | 1/2011 |
| CN | 101980136 A | 2/2011 |
| CN | 201867778 U | 6/2011 |
| CN | 102215334 A | 10/2011 |
| CN | 102292966 A | 12/2011 |
| CN | 102446066 A | 5/2012 |
| CN | 102597928 A | 7/2012 |
| CN | 102598109 A | 7/2012 |
| CN | 202394146 U | 8/2012 |
| CN | 102668522 A | 9/2012 |
| CN | 102789364 A | 11/2012 |
| CN | 102882997 A | 1/2013 |
| CN | 103116438 A | 5/2013 |
| CN | 103197879 A | 7/2013 |
| DE | 202012011107 U1 | 12/2012 |
| EP | 1 220 515 A2 | 7/2002 |
| EP | 1302745 A1 | 4/2003 |
| EP | 2065783 A1 | 6/2009 |
| EP | 2187443 A2 | 5/2010 |
| EP | 2 202 619 A1 | 6/2010 |
| EP | 2 530 510 A2 | 12/2012 |
| EP | 2 568 373 A2 | 3/2013 |
| EP | 2631754 A1 | 8/2013 |
| JP | 2-195425 A | 8/1990 |
| JP | 9-62478 A | 3/1997 |
| JP | 11-17579 A | 1/1999 |
| JP | 1174953 A | 3/1999 |
| JP | 2001-86205 A | 3/2001 |
| JP | 2001-519585 A | 10/2001 |
| JP | 2003-298703 A | 10/2003 |
| JP | 2003-338768 A | 11/2003 |
| JP | 2005-38263 A | 2/2005 |
| JP | 2008-35429 A | 2/2008 |
| JP | 2010-86081 A | 4/2010 |
| JP | 2010-153813 A | 7/2010 |
| JP | 2010-183532 A | 8/2010 |
| JP | 2010-193494 A | 9/2010 |
| KR | 10-2008-0035709 A | 4/2008 |
| KR | 10-2010-0027502 A | 3/2010 |
| KR | 10-2010-0052227 A | 5/2010 |
| KR | 10-2011-0112943 A | 10/2011 |
| KR | 10-2012-0092036 A | 8/2012 |
| KR | 1020120092035 A | 8/2012 |
| KR | 1020120092037 A | 8/2012 |
| KR | 10-2012-0101508 A | 9/2012 |
| KR | 10-2013-0000392 A | 1/2013 |
| KR | 10-2013-0054073 A | 5/2013 |
| WO | 9918590 A1 | 4/1999 |
| WO | 2009/075035 A1 | 6/2009 |
| WO | 2011076980 A1 | 6/2011 |
| WO | 2011/114190 A1 | 9/2011 |
| WO | 2012078079 A2 | 6/2012 |
| WO | 2013103278 A1 | 7/2013 |

OTHER PUBLICATIONS

Communication dated Mar. 4, 2022 by the State Intellectual Property Office of the People's Republic of China for Chinese Patent Application No. 201910152145.6.

Communication dated Dec. 9, 2021 by the State Intellectual Property Office of P.R. China in counterpart Chinese Patent Application No. 201910152145.6.

Communication dated Jan. 17, 2022 by the State Intellectual Property Office of P.R. China in counterpart Chinese Patent Application No. 201910151318.2.

Communication dated Sep. 9, 2021 issued by the State Intellectual Property Office of P.R. China in counterpart Chinese Application No. 201910152145.6.

Communication dated Jun. 23, 2021, issued by the United States Patent and Trademark Office in U.S. Appl. No. 16/272,520.

(56) References Cited

OTHER PUBLICATIONS

Communication dated Jul. 2, 2021, issued by the State Intellectual Property Office of P.R. China in counterpart Chinese Application No. 202010171924.3.
Communication dated Jul. 9, 2021, issued by the State Intellectual Property Office of P.R. China in counterpart Chinese Application No. 201910151318.2.
Communication dated Apr. 14, 2021 issued by the State Intellectual Property Office of the P.R. China in application No. 202010171924.3.
Decision of Reexamination dated Jun. 17, 2021 issued by the State Intellectual Property Office of the P.R. China in application No. 201610628473.5.
Communication dated Jan. 14, 2021 by the China National Intellectual Property Administration in corresponding Chinese Application No. 201910152145.6.
Communication dated Feb. 10, 2021 by the China National Intellectual Property Administration in corresponding Chinese Application No. 202010418225.4.
Communication dated Feb. 23, 2021 by the European Patent Office in corresponding European Patent Application No. 19 210 090.7.
Communication dated Mar. 2, 2021 by the China National Intellectual Property Administration in corresponding Chinese Application No. 201510783372.0.
Communication dated Mar. 19, 2021 by the China National Intellectual Property Administration in corresponding Chinese Application No. 201610628473.5.
Communication dated Apr. 20, 2020, from the State Intellectual Property Office of People's Republic of China in counterpart Application No. 201480003845.4.
Communication dated Oct. 29, 2020, issued by the Indian Patent Office in Indian Patent Application No. 201628040317.
Communication dated Nov. 13, 2020, issued by the State Intellectual Property Office of P.R. China in Chinese Application No. 201510783372.0.
Communication dated Nov. 25, 2020, issued by the European Patent Office in European Application No. 20171090.2.
Communication dated Dec. 23, 2020, issued by the State Intellectual Property Office of P.R. China in Chinese Application No. 201510783629.2.
Communication dated Jan. 11, 2021, issued by the European Patent Office in European Application No. 20196463.2.
Communication dated Jul. 29, 2020 issued by the Korean Patent Office in Application No. 10-2019-0138947.
Communication dated Jul. 28, 2020 issued by the State Intellectual Property Office of P.R. China in Application No. 201910151318.2.
Communication dated May 28, 2020, from the European Patent Office in counterpart European Application No. 19161259.7.
Communication dated Jun. 8, 2020, from the State Intellectual Property Office of People's Republic of China in counterpart Application No. 201510670159.9.
Communication dated May 15, 2020, from the State Intellectual Property Office of People's Republic of China in counterpart Application No. 201510671103.5.
Communication dated Jun. 3, 2020, from the State Intellectual Property Office of People's Republic of China in counterpart Application No. 201510783629.2.
Communication dated Apr. 10, 2020, from the State Intellectual Property Office of People's Republic of China in counterpart Application No. 201610280519.9.
Communication dated May 28, 2020, issued by the Korean Intellectual Property Office in corresponding Korean Application No. 10-2020-0037113.
Search Report dated Nov. 5, 2014 issued in International Application No. PCT/KR2014/006214 (PCT/ISA/210).
Written Opinion dated Nov. 5, 2014 issued in International Application No. PCT/KR2014/006214 (PCT/ISA/237).
Communication dated Jan. 23, 2015 issued by the Korean Intellectual Property Office in counterpart Application No. 10-2014-0017331.
Communication dated Apr. 17, 2015 issued by the Korean Intellectual Property Office in counterpart Korean Patent Application No. 10-2013-0143298.
Communication dated Apr. 17, 2015 issued by the Korean Intellectual Property Office in counterpart Korean Patent Application No. 10-2015-0012195.
Communication dated Apr. 17, 2015 issued by the Korean Intellectual Property Office in counterpart Korean Patent Application No. 10-2015-0143301.
Flexible display 'YOUM' at CES; Youtube Video; Published Jan. 11, 2013; 20 pgs.
Communication dated Jul. 8, 2015 issued by the United States Patent and Trademark Office in counterpart U.S. Appl. No. 14/329,310.
International Search Report dated Nov. 12, 2014, issued in International Application No. PCT/KR2014/006273 (PCT/ISA/210).
Communication dated May 22, 2015 issued by the State Intellectual Property Office of the People's Republic of China in counterpart Chinese Patent Application No. 201380013096.9.
Communication dated Jun. 18, 2015 issued by the European Patent Office in counterpart European Patent Application No. 13733652.5.
International Search Report dated Nov. 6, 2014, issued in International Application No. PCT/KR2014/006273 (PCT/ISA/210).
Communication dated Apr. 17, 2015 issued by the Korean Intellectual Property Office in counterpart Korean Application No. 10-2015-0012130.
Communication dated Nov. 12, 2014, issued by the U.S. Patent and Trademark Office in U.S. Appl. No. 13/735,484.
Communication dated Aug. 7, 2015, issued by the U.S. Patent and Trademark Office in U.S. Appl. No. 13/735,484.
Communication dated Nov. 10, 2015, issued by the U.S. Patent and Trademark Office in U.S. Appl. No. 14/860,351.
Communication dated Jun. 23, 2015, issued by the U.S. Patent and Trademark Office in U.S. Appl. No. 14/709,926.
Communication dated Aug. 25, 2015, issued by the Korean Intellectual Property Office in Korean Application No. 10-2014-0017331.
Written Opinion dated Nov. 6, 2014, issued in International Application No. PCT/KR2014/006275 (PCT/ISA/237).
Written Opinion dated Nov. 12, 2014, issued in International Application No. PCT/KR2014/006273 (PCT/ISA/237).
International Search Report dated Apr. 30, 2013, issued in International Application No. PCT/KR2013/000102 (PCT/ISA/210).
Communication dated Nov. 18, 2015, issued by the United States Patent and Trademark Office in counterpart U.S. Appl. No. 14/860,383.
Communication dated Nov. 20, 2015, issued by the United States Patent and Trademark Office in counterpart U.S. Appl. No. 14/821,523.
Communication dated Dec. 3, 2015, issued by the United States Patent and Trademark Office in counterpart U.S. Appl. No. 14/329,310.
Communication dated Jan. 4, 2016, issued by the United States Patent and Trademark Office in counterpart U.S. Appl. No. 14/860,436.
Communication dated Jan. 26, 2016, issued by the State Intellectual Property Office of the People's Republic of China in counterpart Chinese Application No. 201380013096.9.
Communication dated Feb. 22, 2016, issued by the United States Patent and Trademark Office in counterpart U.S. Appl. No. 13/735,484.
Communication dated Feb. 26, 2016, issued by the United States Patent and Trademark Office in counterpart U.S. Appl. No. 14/329,310.
Communication dated Mar. 3, 2016, issued by the European Patent Office in counterpart European Application No. 13733652.5.
Communication dated Mar. 15, 2016, issued by the United States Patent and Trademark Office in counterpart U.S. Appl. No. 14/821,509.
Communication dated Apr. 1, 2016, issued by the United States Patent and Trademark Office in counterpart U.S. Appl. No. 14/860,351.
Communication dated Apr. 4, 2016, issued by the European Patent Office in counterpart European Application No. 16155833.3.
Communication dated Apr. 5, 2016, issued by the European Patent Office in counterpart European Application No. 16155952.1.
Communication dated Jun. 15, 2016 issued by the European Patent Office in counterpart European Patent Application No. 16167682.0.
Communication dated Jun. 30, 2016 issued by Chinese Intellectual Property Office in counterpart Chinese Application No. 201510670163.5.

(56) References Cited

OTHER PUBLICATIONS

Communication dated Aug. 31, 2016 issued by Korean Intellectual Property Office in counterpart Korean Application No. 10-2015-0099693.
Communication dated Aug. 11, 2016 issued by United States Patent and Trademark Office in counterpart U.S. Appl. No. 15/185,808.
Communication dated Aug. 29, 2016 issued by United States patent and Trademark Office in counterpart U.S. Appl. No. 14/329,310.
Communication dated Aug. 30, 2016, issued by the State Intellectual Property Office of P.R. China in counterpart Chinese Application No. 201380013096.9.
Communication dated on Sep. 7, 2016, issued by the United States Patent and Trademark Office in counterpart U.S. Appl. No. 15/185,716.
Communication dated Sep. 19, 2016, issued by the European Patent Office in counterpart European Application No. 16164994.2.
Communication dated Sep. 21, 2016, issued by the European Patent Office in counterpart European Application No. 14823080.8.
Communication dated Oct. 18, 2016, issued by the European Patent Office in counterpart European Application No. 13733652.5.
Communication dated Oct. 19, 2016, issued by the Australian Patent Office in counterpart Australian Application No. 2014287943.
Communication dated Oct. 20, 2016, issued by the European Patent Office in counterpart European Application No. 16155833.3.
Communication dated Oct. 28, 2016, issued by the State Intellectual Property Office of P.R. China in counterpart Chinese Application No. 201510670163.5.
Communication dated Oct. 31, 2016, issued by the United States Patent and Trademark Office in counterpart U.S. Appl. No. 15/251,843.
Communication dated Dec. 8, 2016 issued by United States Patent and Trademark Office in counterpart U.S. Appl. No. 14/328,333.
Communication dated Dec. 13, 2016 issued by Japanese Intellectual Property Office in counterpart Japanese Application No. 2014-551195.
Communication dated Dec. 21, 2016 issued by United States Patent and Trademark Office in counterpart U.S. Appl. No. 15/185,808.
Communication dated Jan. 22, 2017 issued by The State Intellectual Property Office of the P.R. of China in counterpart Chinese Application No. 201610020779.2.
Communication dated Feb. 14, 2017, issued by the Australian Patent Office in counterpart Australian Application No. 2014287943.
Communication dated Feb. 4, 2017 issued by The State Intellectual Property Office of P.R. China in counterpart Chinese Patent Application No. 201610020950.X.
Communication dated Feb. 6, 2017 issued by United States Patent and Trademark Office in counterpart U.S. Appl. No. 14/329,310.
Communication dated Feb. 22, 2017 issued by European Patent Office in counterpart European Patent Application No. 14822315.9.
Communication dated Feb. 20, 2017, issued by the State Intellectual Property Office of P.R. China in counterpart Chinese Application No. 201480003845.4.
Communication dated Apr. 10, 2017, issued by the State Intellectual Property Office of P.R. China in counterpart Chinese Application No. 201380013096.9.
Communication dated Mar. 6, 2017, issued by the European Patent Office in counterpart European Application No. 14823060.0.
Communication dated Mar. 29, 2017, issued by the Korean Intellectual Property Office in counterpart Korean Application No. 10-2016-0007712.
Communication dated Mar. 7, 2017, issued by the United States Patent and Trademark Office in counterpart U.S. Appl. No. 15/185,716.
Communication dated Apr. 6, 2017, issued by the United States Patent and Trademark Office in counterpart U.S. Appl. No. 15/251,843.
Communication dated Apr. 12, 2017, issued by the United States Patent and Trademark Office in counterpart U.S. Appl. No. 15/185,808.
Communication dated Apr. 24, 2017, issued by the State Intellectual Property Office of P.R. China in counterpart Chinese application No. 201510670163.5.
Communication dated May 4, 2017, issued by the State Intellectual Property Office of P.R. China in counterpart Chinese application No. 201610020779.2.
Communication dated May 4, 2017, issued by the State Intellectual Property Office of P.R. China in counterpart Chinese application No. 201610280519.9.
Communication dated May 22, 2017, issued by the European Patent Office in counterpart European application No. 16164994.2.
Communication dated Jun. 28, 2017, issued by the Korean Intellectual Property Office in counterpart Korean application No. 10-2016-0107825.
Communication dated Jul. 4, 2017, issued by the State Intellectual Property Office of P.R. China in counterpart Chinese application No. 201610020948.2.
Communication dated Jul. 19, 2017, issued by the Korean Intellectual Property Office in counterpart Korean application No. 10-2017-0052301.
Communication dated Jul. 20, 2017, issued by the European Patent Office in counterpart European application No. 17171078.3.
Notice of Allowance dated Jul. 12, 2017 by the United States Patent and Trademark Office in related U.S. Appl. No. 14/329,310.
NTT DOCOMO, "REGZA Phone T-01C Instruction Manual", Oct. 2011, 3.1 Ed. p. 28, [online], [retrieved on Aug. 18, 2017], Internet <https://www.nttdocomo.co.jp/binary/pdf/support/trouble/manual/download/T-01C_1_All.pdf>, (7 pages total).
Communication dated Jul. 19, 2017 by the European Patent Office in counterpart European Patent Application No. 16155952.1.
Communication dated Jul. 31, 2017 by the European Patent Office in counterpart European Patent Application No. 17171083.3.
Communication dated Aug. 29, 2017 by the Japanese Patent Office in counterpart Japanese Patent Application No. 2014-551195.
Communication dated Sep. 25, 2017 by the State Intellectual Property Office of P.R. China in counterpart Chinese Patent Application No. 201510474027.9.
Communication dated Sep. 4, 2017 by the State Intellectual Property Office of P.R. China in counterpart Chinese Patent Application No. 201610280519.9.
Communication dated Aug. 7, 2017 by the European Patent Office in counterpart European Patent Application No. 17171077.5.
Communication dated Aug. 10, 2017 by the State Intellectual Property Office of P.R. China in counterpart Chinese Patent Application No. 201610020950.X.
Communication dated Sep. 15, 2017 by the U.S. Patent and Trademark Office in counterpart U.S. Appl. No. 15/185,808.
Communication dated Aug. 1, 2017 by the U.S. Patent and Trademark Office in counterpart U.S. Appl. No. 15/185,716.
Communication dated Oct. 19, 2017, issued by the State Intellectual Property Office of the People's Republic of China in counterpart Chinese Patent Application No. 201510783629.2.
Communication dated Nov. 1, 2017, issued by the State Intellectual Property Office of the People's Republic of China in counterpart Chinese Patent Application No. 201510670159.9.
Communication dated Nov. 6, 2017, issued by the Chinese Patent Office in counterpart Chinese Application No. 201480003845.4.
Communication dated Nov. 16, 2017, issued by the State Intellectual Property Office of the People's Republic of China in counterpart Chinese Patent Application No. 201610020779.2.
Communication dated Dec. 4, 2017, issued by the State Intellectual Property Office of the People's Republic of China in counterpart Chinese Patent Application No. 201610020948.2.
Communication dated Dec. 20, 2017, issued by the European Patent Office in counterpart European Patent Application No. 16164994.2.
Communication dated Nov. 7, 2017, issued by the United States Patent and Trademark Office in counterpart U.S. Appl. No. 15/251,843.
Communication issued by the State Intellectual Property Office of P.R. China dated Jan. 10, 2018 in counterpart Chinese Patent Application No. 201610020950.X.
Communication issued by the State Intellectual Property Office of P.R. China dated Feb. 2, 2018 in counterpart Chinese Patent Application No. 201480049835.4.
Communication issued by the State Intellectual Property Office of P.R. China dated Feb. 8, 2018 in counterpart Chinese Patent Application No. 201380013096.9.
Communication issued by the State Intellectual Property Office of P.R. China dated Mar. 5, 2018 in counterpart 201510474026.4.

(56) References Cited

OTHER PUBLICATIONS

Communication issued by the State Intellectual Property Office of P.R. China dated Mar. 20, 2018 in counterpart Chinese Patent Application No. 201510671103.5.
Communication issued by the State Intellectual Property Office of P.R. China dated Mar. 20, 2018 in counterpart Chinese Patent Application No. 201480030229.8.
Communication issued by the State Intellectual Property Office of P.R. China dated Apr. 2, 2018 in counterpart Chinese Patent Application No. 201510783372.0.
Communication issued by the United States Patent and Trademark Office dated Feb. 14, 2018 in counterpart U.S. Appl. No. 15/185,808.
Communication dated Apr. 23, 2018, issued by the State Intellectual Property Office of P.R. China in counterpart Chinese application No. 201480003845.4.
Communication dated Apr. 27, 2018, issued by the State Intellectual Property Office of P.R. China in counterpart Chinese application No. 201510783629.2.
Communication dated May 4, 2018, issued by the State Intellectual Property Office of P.R. China in counterpart Chinese application No. 201610020948.2.
Communication dated May 22, 2018, issued by the Japanese Patent Office in counterpart Japanese application No. 2014-551195.
Communication dated May 31, 2018, issued by the State Intellectual Property Office of P.R. China in counterpart Chinese application No. 201610280519.9.
Communication dated Jun. 11, 2018, issued by the European Patent Office in counterpart European application No. 16 164 994.2.
Communication dated Jun. 11, 2018, issued by the European Patent Office in counterpart European application No. 14 823 080.8.
Office Action dated May 4, 2018 by the United States Patent and Trademark Office in U.S. Appl. No. 15/251,843.
Communication dated Jul. 12, 2018 by the European Patent Office in counterpart European patent Application No. 16164994.2.
Communication dated Jul. 26, 2018 by the State Intellectual Property Office of P.R. China in counterpart Chinese Patent Application No. 201380013096.9.
Communication dated Jul. 30, 2018 by the European Patent Office in counterpart European Patent Application No. 16167682.0.
Communication dated Aug. 24, 2018 by the State Intellectual Property Office of P.R. China in counterpart Chinese Patent Application No. 201510670159.9.
Communication dated Sep. 21, 2018 by the State Intellectual Property Office of P.R. China in counterpart Chinese Patent Application No. 201480030229.8.
Communication dated Sep. 4, 2018, issued by the Chinese Patent Office in counterpart Chinese Application No. 201510474026.4.
Communication dated Sep. 17, 2018, issued by the Chinese Patent Office in counterpart Chinese Application No. 201510783629.2.
Communication dated Sep. 26, 2018, issued by the Chinese Patent Office in counterpart Chinese Application No. 201610020950.X.
Communication dated Nov. 6, 2018, issued by the Chinese Patent Office in counterpart Chinese Application No. 201480003845.4.
Communication dated Nov. 12, 2018, issued by the Chinese Patent Office in counterpart Chinese Application No. 201510670163.5.
Communication dated Nov. 12, 2018, issued by the European Patent Office in counterpart European Application No. 14822315.9.
Communication dated Oct. 31, 2018, issued by the State Intellectual Property Office of P.R. China in counterpart Chinese Application No. 201610628473.5.
Communication dated Nov. 21, 2018, issued by the State Intellectual Property Office of P.R. China in counterpart Chinese Application No. 201610482143.X.
Communication dated Nov. 21, 2018, issued by the State Intellectual Property Office of P.R. China in counterpart Chinese Application No. 201480049835.4.
Communication dated Nov. 26, 2018, issued by the State Intellectual Property Office of P.R. China in counterpart Chinese Application No. 201610480507.0.
Communication dated Nov. 30, 2018, issued by the State Intellectual Property Office of P.R. China in counterpart Chinese Application No. 201380013096.9.
Communication dated Nov. 30, 2018, issued by the State Intellectual Property Office of P.R. China in counterpart Chinese Application No. 201510474027.9.
Communication dated Dec. 4, 2018, issued by the State Intellectual Property Office of P.R. China in counterpart Chinese Application No. 201610020948.2.
Communication dated Dec. 4, 2018, issued by the State Intellectual Property Office of P.R. China in counterpart Chinese Application No. 201510670159.9.
Communication dated Dec. 5, 2018, issued by the State Intellectual Property Office of P.R. China in counterpart Chinese Application No. 201510783372.0.
Communication dated Dec. 5, 2018, issued by the State Intellectual Property Office of P.R. China in counterpart Chinese Application No. 201510671103.5.
Communication dated Dec. 13, 2018, issued by the Korean Intellectual Property Office in counterpart Korean Application No. 10-2018-0122820.
Communication dated Dec. 20, 2018, issued by the State Intellectual Property Office of P.R. China in counterpart Chinese Application No. 201610020950.X.
Communication dated Dec. 28, 2018, issued by the Korean Intellectual Property Office in counterpart Korean Application No. 10-2015-0050879.
Communication dated Dec. 28, 2018, issued by the Korean Intellectual Property Office in counterpart Korean Application No. 10-2015-0050944.
Communication dated Jan. 10, 2019, issued by the State Intellectual Property Office of P.R. China in counterpart Chinese Application No. 201610020779.2.
Communication dated Jan. 11, 2019, issued by the State Intellectual Property Office of P.R. China in counterpart Chinese Application No. 201510474026.4.
Communication dated Jan. 11, 2019, issued by the State Intellectual Property Office of P.R. China in counterpart Chinese Application No. 201610280519.9.
Communication dated Feb. 11, 2019 issued by the State Intellectual Property Office of P.R. China in counterpart Chinese Application No. 201510783629.2.
Communication dated Mar. 20, 2019, issued by the European Patent Office in counterpart European Application No. 14823080.8.
Communication dated Mar. 21, 2019, issued by the State Intellectual Property Office of P.R. China in counterpart Chinese Application No. 201480030229.8.
Communication dated Mar. 28, 2019, issued by the European Patent Office in counterpart European Application No. 16182538.5.
European Patent Office, Communication from the European Patent Office dated Apr. 30, 2019 in copending European Application No. 19161259.7.
Communication dated Apr. 28, 2019, issued by the State Intellectual Property Office of P.R. China in counterpart Chinese Application No. 201510671103.5.
Communication dated May 7, 2019, issued by the State Intellectual Property Office of P.R. China in counterpart Chinese Application No. 201510783372.0.
Communication dated May 13, 2019, issued by the State Intellectual Property Office of P.R. China in counterpart Chinese Application No. 201610628473.5.
Communication dated Jul. 2, 2019 issued by the Japanese Patent Office in counterpart Japanese Application No. 2018-118264.
Communication dated Jul. 16, 2019, issued by the State Intellectual Property Office of P.R. China in counterpart Chinese Application No. 201510474026.4.
Communication dated Jul. 19, 2019, issued by the State Intellectual Property Office of P.R. China in counterpart Chinese Application No. 201610482143.X.
Communication dated Jul. 30, 2019, issued by the Korean Intellectual Property Office in counterpart Korean Patent Application No. 10-2015-0050944.

(56) References Cited

OTHER PUBLICATIONS

Communication dated Aug. 22, 2019, issued by the State Intellectual Property Office of P.R. China in counterpart Chinese Application No. 201610628473.5.
Communication dated Aug. 23, 2019, issued by the European Patent Office in counterpart European Application No. 14823080.8.
Communication dated Sep. 12, 2019, issued by the State Intellectual Property Office of P.R. China in counterpart Chinese Application No. 201610480507.0.
Communication dated Sep. 27, 2019, issued by the European Patent Office in counterpart European Application No. 14823080.8.
Communication dated Oct. 11, 2019, issued by the Chinese Patent Office in counterpart Chinese Application No. 201510671103.5.
Communication dated Oct. 25, 2019, issued by the Chinese Patent Office in counterpart Chinese Application No. 201480003845.4.
Communication dated Nov. 13, 2019, issued by the Chinese Patent Office in counterpart Chinese Application No. 201510474026.4.
Communication dated Dec. 19, 2019, issued by the Chinese Patent Office in counterpart Chinese Application No. 201610020948.2.
Communication dated Dec. 18, 2019, issued by the United States Patent and Trademark Office in counterpart U.S. Appl. No. 16/272,520.
Communication dated Jan. 2, 2020, issued by the State Intellectual Property Office of P.R. China in counterpart Chinese Application No. 201510670159.9.
Communication dated Jan. 7, 2020, issued by the State Intellectual Property Office of P.R. China in counterpart Chinese Application No. 201510474027.9.
Communication dated Jan. 8, 2020, issued by the Korean Intellectual Property Office in counterpart Korean Application No. 10-2019-0138947.
Communication dated Jan. 14, 2020, issued by the Indian Patent Office in counterpart Indian Application No. 201627001575.
Communication dated Jan. 30, 2020, issued by the Indian Patent Office in counterpart Indian Application No. 2729/MUMNP/2015.
Communication dated Feb. 17, 2020, issued by the Indian Patent Office in counterpart Indian Application No. 201627003720.
Communication dated Feb. 27, 2020, issued by the State Intellectual Property Office of P.R. China in counterpart Chinese Application No. 201510474026.4.
Office Action dated Mar. 26, 2020, issued by the United States Patent and Trademark Office in counterpart U.S. Appl. No. 16/272,520.
Communication dated Mar. 16, 2020 by the State Intellectual Property Office of P.R. China in counterpart Chinese Patent Application No. 201510474027.9.
Communication dated Mar. 24, 2020 by the State Intellectual Property Office of P.R. China in counterpart Chinese Patent Application No. 201610020948.2.
Communication dated Apr. 9, 2020 by the European Patent Office in counterpart European Patent Application No. 19210090.7.
Communication dated Sep. 12, 2022 issued by the Intellectual Property India patent office in Indian application No. 202228003419.
Communication dated Sep. 28, 2022 issued by the European Patent Office in European Patent Office in European application No. 20171090.2.
Communication dated Sep. 30, 2022, issued by the State Intellectual Property Office of P.R. China in Chinese Application No. 201910152145.6.
Communication dated Dec. 20, 2022 issued by the European Patent Office in counterpart European Patent Application No. 20196463.2.
Communication dated Feb. 13, 2023 issued by the European Patent Office in counterpart European Patent Application No. 20171090.2.
Communication dated Feb. 28, 2023 issued by the European Patent Office in counterpart European Patent Application No. 19210090.7.

* cited by examiner

2110

2120

2210

2220

2610

2620　　2621　　　　　　　　1020
TOTAL PRICE 10,000₩　DISCOUNT 2,000₩

Unlock ↓

USER TERMINAL DEVICE FOR DISPLAYING CONTENTS AND METHODS THEREOF

CROSS-REFERENCE TO RELATED APPLICATIONS

This application is a Continuation of U.S. application Ser. No. 16/862,082, filed Apr. 29, 2020, which is a Continuation Application of U.S. application Ser. No. 16/397,830, filed on Apr. 29, 2019, now U.S. Pat. No. 10,691,313, issued on Jun. 23, 2020, which is a Continuation of U.S. application Ser. No. 14/329,179, filed on Jul. 11, 2014, now U.S. Pat. No. 10,318,120, issued on Jun. 11, 2019, which claims the benefit of U.S. Provisional Patent Application No. 61/845,023, filed on Jul. 11, 2013, and U.S. Provisional Patent Application No. 61/845,036, filed on Jul. 11, 2013, in the United States Patent and Trademark Office, and claims priority from Korean Patent Application No. 10-2013-0143298, filed on Nov. 22, 2013, in the Korean Intellectual Property Office, the disclosures of which are herein incorporated by reference in their entireties.

BACKGROUND

1. Field

Apparatuses and methods consistent with exemplary embodiments relate to a user terminal device for displaying contents and methods thereof, and more specifically, to a user terminal device configured to display contents by using a bended touch screen which is divided into main area and one or more sub areas and methods thereof.

2. Description of the Related Art

Various types of user terminal devices are being developed and provided with the advancement of the electronic technologies. Recently, as the sizes of user terminal devices have become minimized and the functions thereof more diversified, user demand for user terminal devices has increased.

A user terminal device may provide a variety of contents such as multimedia contents or application screens according to a request of a user. A user may select a function that they desire by using buttons or a touch screen provided on the user terminal device. The user terminal device may display executing results by selectively executing programs according to a user interaction.

However, as user terminal devices become more diversified, there is a growing need for improved content display methods or user interaction methods that can be provided from the user terminal devices. More specifically, as the types and functions of contents increase, interaction methods of the related art, such as simply selecting buttons or touching a touch screen of a user terminal device, are not sufficient.

Therefore, new user interaction technologies which enable a user to use a user terminal device by more convenient methods are required.

SUMMARY

Exemplary embodiments address at least the above problems and/or disadvantages and other disadvantages not described above. However, exemplary embodiments are not required to overcome the disadvantages described above, and an exemplary embodiment may not overcome any of the problems described above.

One of more exemplary embodiments provide a user terminal device capable of displaying a variety of contents using a bended touch screen divided into a main area and one or more sub areas, and methods thereof.

According to an aspect of an exemplary embodiment, there is provided a content display method of a user terminal device including a bended touch screen divided into a main area and a sub area, wherein the main area and the sub area are defined by a bending line, and a surface including the main area and a surface including the sub area form an obtuse angle therebetween, the content display method including: displaying, on the main area, a first main content provided by a first application, and displaying, on the sub area, a first sub content associated with the first main content, receiving a first user gesture input on the main area, and in response receiving to the first user gesture, displaying, on the main area, a second main content provided by a second application, and displaying, on the sub area, a second sub content associated with the second main content.

The first and second applications may be different applications.

The first sub content may include an object that represents a side of the first main content such that the first main content is represented three-dimensionally.

The content display method may additionally include receiving a second user gesture selecting the first main content, and in response to the second user gesture, marking the first main content and the first sub content associated with the first main content.

The displaying, on the main area, the first main content provided by the first application, and the displaying, on the sub area, the first sub content associated with the first main content may additionally include: displaying, on the main area, a third main content provided by a third application, and displaying, on the sub area, a third sub content associated with the third main content. The third sub content may be displayed in a same area of the sub area as the first sub content.

The first sub content may be an object displayed in a form of a film container, and the first main content may be displayed within an object displayed in a form of film extracted out of the film container.

The first main content may be a content that is included in a first page of a plurality of pages, and in response to the first main content being selected, the content display method may additionally include displaying, on the main area, moving the selected first main content to a second page of the plurality of pages.

The sub area may include a plurality of sub areas, and wherein the displaying may include displaying, on a first sub area among the plurality of sub areas, the first sub content associated with the first main content, and displaying, on a second sub area among the plurality of sub areas, an object that corresponds to one of a page and a layer comprising the first main content therein.

The content display method may additionally include displaying, on the main area, a shortcut icon that corresponds to a third application installed on the user terminal device.

The first main content may include a content provided by a first widget of the first application, and the second main content comprises a content provided by a second widget of the second application.

The first widget may include a plurality of contents, and the displaying may include displaying, on the sub area, sub contents of the plurality of contents.

According to an aspect of another exemplary embodiment, there is provided a user terminal device including: a bended touch screen divided into a main area and a sub area, wherein the sub area is smaller than the main area, the main area and the sub area are defined by a bending line, and a surface including the main area and a surface including the sub area form an obtuse angle therebetween; a memory configured to store a first application and a second application; and a controller configured to control the bended touch screen to display, on the main area, a first main content provided by the first application, and display, on the sub area, a first sub content associated with the first main content, and in response to a first user gesture being input on the main area to control the bended touch screen to display, on the main area, a second main content provided by the second application, and display, on the sub area, a second sub content associated with the second main content.

The first and second applications may be different applications.

The first sub content may include an object that represents a side of the first main content such that the first main content may be represented three-dimensionally.

In response to the controller receiving a second user gesture selecting the first main content, the controller may be further configured to control the bended touch screen to mark the first main content and the first sub content associated with the first main content.

The controller may be further configured to control the bended touch screen to display, on the main area, a third main content provided by a third application, and display, in a same area of the sub area where the first sub content is displayed, a third sub content associated with the third main content.

The first sub content may be an object displayed in a form of a film container, and the first main content may be displayed within an object displayed in a form of film extracted out of the film container.

The first main content may be a content that is included in a first page of a plurality of pages, and in response to the first main content being selected, the controller may be further configured to control the bended touch screen to display, on the main area, moving the selected first main content to a second page of the plurality of pages.

The sub area may include a plurality of sub areas, and wherein the controller may be further configured to control the bended touch screen to display, on a first sub area among the plurality of sub areas, the first sub content associated with the first main content, and display, on a second sub area among the plurality of sub areas, an object that corresponds to one of a page and a layer comprising the first main content therein.

The controller may be further configured to control the bended touch screen to display, on the main area, a shortcut icon that corresponds to a third application installed on the user terminal device.

The first main content may include a content provided by a first widget of the first application, and the second main content may include a content provided by a second widget of the second application.

The first widget may include a plurality of contents, and wherein the controller may be further configured to control the bended touch screen to display, on the sub area, sub contents of the plurality of contents.

According to an aspect of another exemplary embodiment, there is provided a user terminal device including: a touchscreen including a flat front surface portion and a curved side surface portion; and a controller configured to control the touchscreen to display, on the flat front surface portion, a first main content provided by a first application, and display, on the curved side surface portion, a first sub content associated with the first main content, and in response to a user gesture being input on the flat front surface portion, to control the touchscreen to display, on the flat front surface portion, a second main content provided by the second application, and display, on the curved side surface portion, a second sub content associated with the second main content.

The touchscreen may include a first touchscreen including the flat front surface portion and a second touchscreen including the curved side surface portion.

According to an aspect of another exemplary embodiment, there is provided a user terminal device including: a front surface that is a touchscreen; a rear surface; a side surface that is a touchscreen; and a controller configured to control the touchscreen to display, on the front surface, a first main content provided by a first application, and display, on the side surface, a first sub content associated with the first main content, and in response to a user gesture being input on the front surface, to control the front surface to display a second main content provided by the second application, and control the side surface to display a second sub content associated with the second main content.

The front surface and the side surface may form a same touchscreen.

According to an aspect of another exemplary embodiment, there is provided a user terminal device including: a touchscreen including a planar main area and a deformed sub area; and a controller configured to control the touchscreen to display, on the planar main area, a first main content provided by a first application, and display, on the deformed sub area, a first sub content associated with the first main content, and in response to a user gesture being input on the planar main area, to control the touchscreen to display, on the planar main area, a second main content provided by the second application, and display, on the deformed sub area, a second sub content associated with the second main content, and wherein the planar main area and the deformed sub area are respectively disposed on adjacent sides of the user terminal device.

According to an aspect of another exemplary embodiment, there is provided a user terminal device including: a front surface that is a flat touchscreen; a rear surface; a side surface connecting the front surface to the rear surface and including a convex touchscreen; and a controller configured to control the flat touchscreen to display a first main content provided by a first application, and control the convex touchscreen to display a first sub content associated with the first main content, and in response to a user gesture being input on the flat touchscreen, to control the flat touchscreen to display a second main content provided by the second application, and control the convex touchscreen to display a second sub content associated with the second main content.

The side surface may further include a support portion connecting the convex touchscreen to the rear surface.

According to the various exemplary embodiments above, a user may display various applications by using the bended touch screen. Therefore, user convenience or user satisfaction is enhanced.

BRIEF DESCRIPTION OF THE DRAWINGS

The above and/or other aspects of the will become more apparent by describing certain exemplary embodiments with reference to the accompanying drawings, in which.

DETAILED DESCRIPTION OF EXEMPLARY EMBODIMENTS

Figure 1:
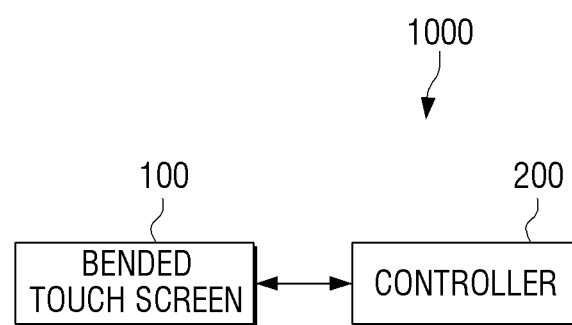
FIG. 1 is a block diagram of a user terminal device according to an exemplary embodiment.

Certain exemplary embodiments will now be described in greater detail with reference to the accompanying drawings.

In the following description, same drawing reference numerals are used for the same elements, even in different drawings. The matters defined in the description, such as detailed construction and elements, are provided to assist in a comprehensive understanding of the exemplary embodiments. Accordingly, it is apparent that the exemplary embodiments can be carried out without those specifically defined matters. Also, well-known functions or constructions are not described in detail because they would obscure the exemplary embodiments with unnecessary detail.

FIG. 1 is a block diagram of an example of a basic constitution of a user terminal device in order to explain various exemplary embodiments. The user terminal device 1000 of FIG. 1 may be implemented as various types of devices such as a television (TV), a personal computer (PC), a laptop PC, a cellular phone, a tablet PC, a personal digital assistant (PDA), an MP3 player, a kiosk, an electronic frame, or a table display. When the user terminal device 1000 is implemented as a type of device that can be carried by a user, such as a cellular phone, a tablet PC, a PDA, an MP3 player, or a laptop PC, it may be referred to as a mobile device. However, exemplary embodiments will be explained below by referring to such a mobile device as a 'user terminal device'.

Referring to FIG. 1, the user terminal device 1000 includes a bended touch screen 100 and a controller 200.

The bended touch screen 100 is divided into a main area and one or more sub areas. The dimensional size of the sub areas may be smaller than the dimensional size of the main area. Further, one or more sub areas may form different surfaces from that of the main area. For example, when the main area is arranged on the front surface of the user terminal device 1000, one or more sub areas may be arranged on different surfaces such as a right side surface, a left side surface, and a back surface among the surfaces constituting the exterior body of the user terminal device 1000. The surface including the main area (which may be a planar or curved surface) and the surface including one or more sub areas (which may be planar or curved surfaces) may be fixed in place to form an obtuse angle with respect to the exterior surfaces of the user terminal device 1000. Put another way, the bended touch screen 100 is divided into a main surface and one or more side surfaces. The format (i.e., form or shape), position, or number of the sub areas may be implemented variously according to exemplary embodiments. The above will be explained in greater detail below with reference to the drawings.

The controller 200 may separately control the main area and one or more sub areas of the bended touch screen 100. For example, contents which are different from each other may be respectively displayed on the main area and the one or more sub areas. The type, display method, and layout of contents displayed on the main area and one or more sub areas may be modified variously according to exemplary embodiments. The above will be explained in greater detail below.

Figure 2:
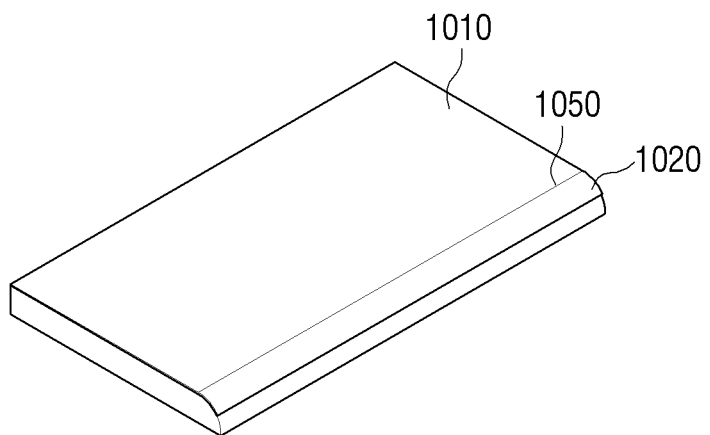
FIGS. 2 to 10 illustrate various examples regarding the constitution of a bended touch screen.

FIG. 2 illustrates an example of a constitution of the exterior body of the user terminal device 1000 including the bended touch screen 100 which is divided into one sub area and main area.

Referring to FIG. 2, the bended touch screen 100 may be divided into main area 1010 arranged on the front surface of the user terminal device 1000 and sub area 1020 arranged on the right side surface of the user terminal device 1000. In FIG. 2, the main area 1010 and the sub area 1020 may be divided based on boundary area 1050. Considering that the bended touch screen 100 is bent, the boundary area 1050 may be differently referred to as a bending line.

Figure 3:
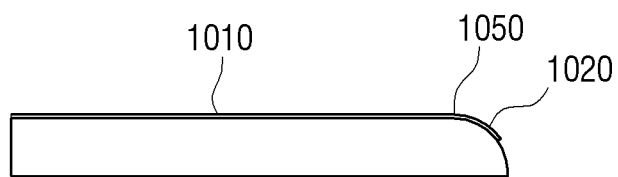

FIG. 3 illustrates an example of a surface constitution of the user terminal device 1000 of FIG. 2. Referring to FIG. 3, the main area 1010 and the sub area 1020 of the bended touch screen 100 are respectively arranged on the front surface and the right side surface of the user terminal device 1000.

Figure 4:
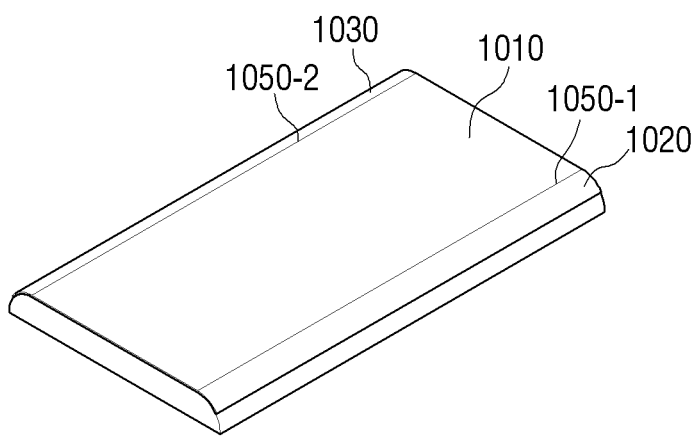
Figure 5:
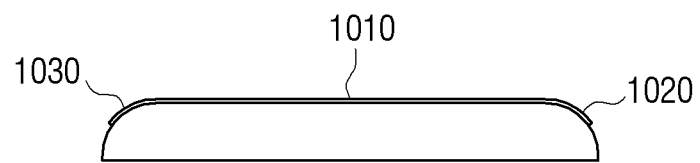

FIGS. 4 and 5 illustrate examples of a constitution of the exterior body of the user terminal device 1000 including the bended touch screen 100 which is divided into two sub areas and one main area and examples of a constitution of their respective surfaces.

Referring to FIG. 4, the main area 1010 is arranged on the front surface, and the sub areas 1020, 1030 are respectively arranged on the right side surface and the left side surface of the user terminal device 1000. The main area 1010 and the sub areas 1020, 1030 are divided by boundary areas 1050-1, 1050-2, respectively.

FIG. 5 illustrates a surface constitution of the user terminal device 1000 in FIG. 4. Referring to FIG. 5, each of the sub areas 1020, 1030 may be arranged to form obtuse angle with the main area 1010 such that the sub areas may be viewed from the front surface direction.

Figure 6:
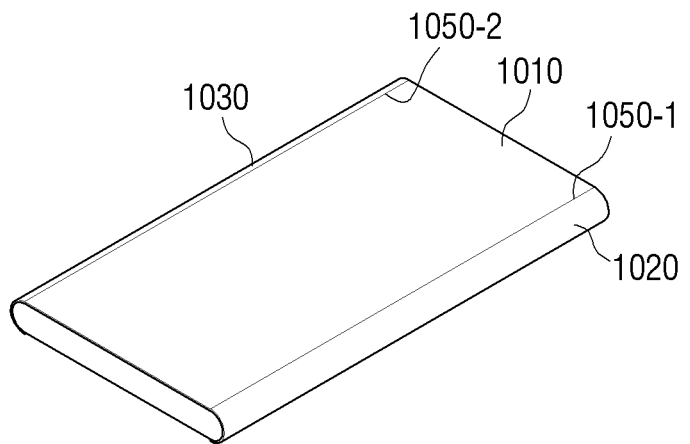
Figure 7:
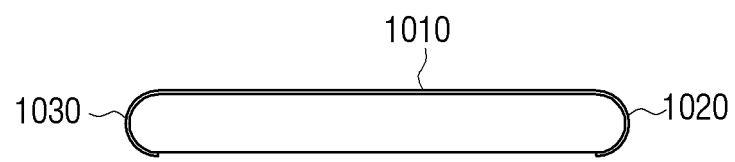

FIGS. 6 and 7 illustrate other examples of the user terminal device 1000 including the bended touch screen 100 which is divided into two sub areas and one main area. Referring to FIG. 6, the two sub areas 1020, 1030 may be respectively arranged on both side surfaces of the main area 1010 and fixed in place to form an angle in order to be viewed from the right side and left side directions. Thus, referring to FIG. 7, each of the sub areas 1020, 1030 may be bent by an angle closer to 90° from the surface including the main area 1010.

According to another exemplary embodiment, the one or more sub areas may be arranged on the surface opposite to that of the main area 1010.

Figure 8:
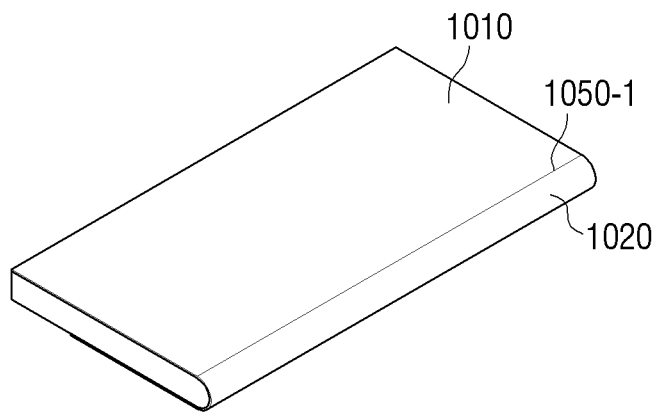
Figure 9:
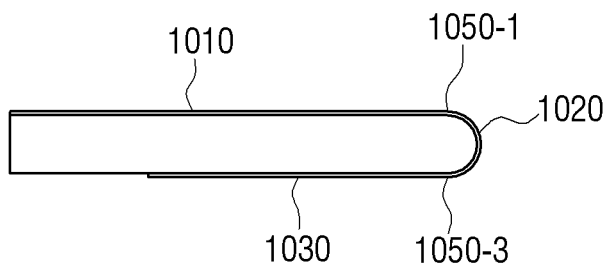

FIGS. 8 and 9 illustrate other examples of the user terminal device 1000 including the bended touch screen which is divided into two sub areas and one main area. Referring to FIGS. 8 and 9, the bended touch screen 100 is divided into the main area 1010, the first sub area 1020 arranged on the side surface, and the second sub area 1030 arranged on the back surface of the user terminal device 1000. In FIG. 9, the second sub area 1030 may be arranged on a part of the back surface without covering all of the back surface. The controller 200 may divide the main area 1010, the first sub area 1020, and the second sub area 1030 based on the first boundary area 1050-1 and the third boundary area 1050-3, respectively, and display different contents in each area.

Meanwhile, although FIGS. 3 to 9 illustrate that the sub areas 1020, 1030 are bent in a round format, the sub areas 1020, 1030, may also be constituted in a planer format. In this case, the planar surface including the main area 1010 and the planer surface including the sub areas 1020, 1030 may be bent according to the boundary lines. Thus, the boundary areas 1050-1, 1050-2, 1050-3 may be in a line format.

Meanwhile, the surface constitution of user terminal device 1000 may include a triangular format (not illustrated). In this case, the surface including the main area 1010 and the surface including the sub area 1020 are connected and constituted to form obtuse angle θ on the boundary area 1050. Further, the surface constitution may be constituted in various other forms such as a trapezoid or pentagonal shape, but is not limited thereto.

Further, the above illustrates that the bended touch screen 100 is bent toward a horizontal direction based on the front surface of the user terminal device; however, it is not limited thereto. Thus, the bended touch screen 100 may also be bent toward a vertical direction based on the front surface of the user terminal device 1000.

Figure 10:
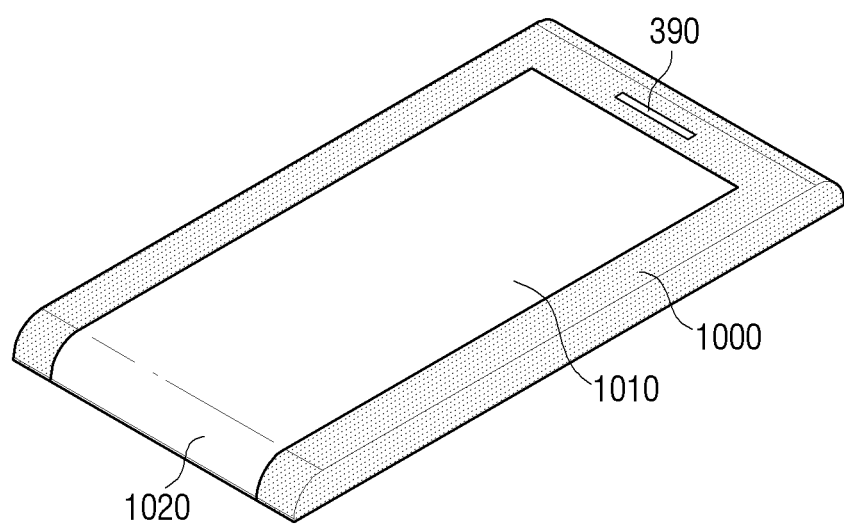

FIG. 10 illustrates that the bended touch screen 100 is bent toward a vertical direction. Specifically, the bended touch screen 100 may be divided into the main area 1010 arranged on the front surface of the user terminal device 1000 and the sub area 1020 arranged on the lower surface. A speaker 390 may be arranged on the upper side of the main area 1010.

Meanwhile, although FIG. 1 illustrates the constitution of the user terminal device 1000 including the bended touch screen 100 and the controller 200, the user terminal device 1000 may further include various other elements according to exemplary embodiments. For example, the user terminal device 1000 may further include a storage (i.e., a memory) storing various applications. The controller 200 may display contents provided from the application on the main area and the sub areas by executing an application stored in the storage according to user gestures. In this specification, the contents displayed on the main area are referred to as main contents, and the contents displayed on the sub areas as referred to as sub contents. Further, for convenient explanation, the main contents provided from a first application are referred to as first main contents, the sub contents provided from the first application are referred to as first sub contents, the main contents provided from a second application are referred to as second main contents, and the sub contents provided from the second application are referred to as second sub contents.

The controller 200 may display the main contents and the sub contents in different layouts with respect to each other. When an application is modified, the controller 200 may respectively display the main contents and the sub contents according to the modified application on the main area and the sub areas.

Figure 11:
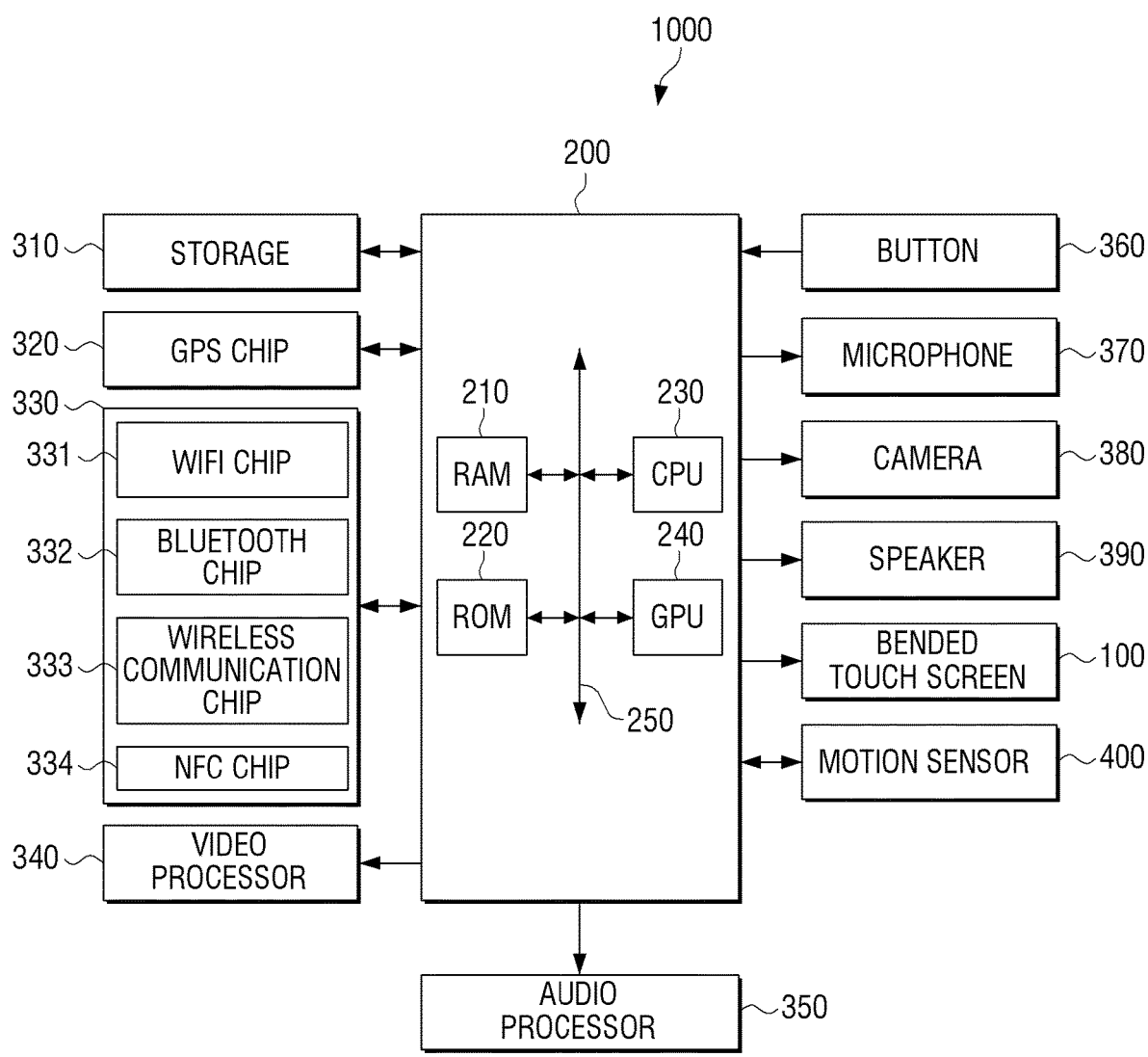
FIG. 11 is a block diagram of the user terminal device according to various exemplary embodiments.

FIG. 11 is a block diagram of an example of a detailed constitution of the user terminal device 1000 which is implemented as cellular phone. Referring to FIG. 11, the user terminal device 1000 includes the bended touch screen 100, the controller 200, a storage 310, GPS chip 320, a communicator 330, a video processor 340, an audio processor 350, a button 360, a microphone 370, a camera 380, the speaker 390, and a motion sensor 400.

The bended touch screen 100 may be divided into the main area and one or more sub areas as described above. The bended touch screen 100 may be implemented as various types of displays such as an LCD (liquid crystal display), an OLED (organic light emitting diodes) display, and a PDP (plasma display panel). The bended touch screen 100 may include driving circuits that can be implemented as, for example, a-si TFT, LTPS (low temperature polysilicon) TFT, and OTFT (organic TFT), and backlight units. Further, the bended touch screen 100 may be implemented as a flexible display. The bended touch screen 100 may be also implemented as normal display that is not flexible. When the bended touch screen 100 is implemented as normal display, a plurality of displays may be connected to constitute the bended touch screen 100.

Meanwhile, the bended touch screen 100 may include a touch sensor to sense touch gestures of a user. The touch sensor may be implemented as various types of sensors such as a capacitive type, a resistive type, or a piezoelectric type. The capacitive type calculates touch coordinate values by sensing micro-electricity, excited by the user's body, with coated conductive materials on the surface of the touch screen when a part of the user's body (e.g., the user's finger) touches the surface of the touch screen. According to the resistive type, the touch screen includes two electrode plates and calculates touch coordinate values by sensing electric current that flows upon contacting of the upper and the lower plates on the touched point when a user touches the screen. Furthermore, when the user terminal device 1000 supports a pen inputting function, the bended touch screen 100 may sense user gestures to use inputting means such as pen in addition to the user finger. When the inputting means is a stylus pen including coils, the user terminal device 1000 may include a magnetic sensor (not illustrated) to sense magnetic fields which change according to the proximity of the coils within the stylus pen to the magnetic sensor. Thereby, in addition to sensing touch gestures, the user terminal device 1000 may also sense approaching gestures, i.e., hovering of the stylus pen above the user terminal device 1000.

The storage 310 may store various programs and data necessary for operation of the user terminal device 1000. For example, the storage 310 may store programs and data to constitute various screens to be displayed on the main area and the sub areas.

The controller 200 displays contents on the main area and the sub area of the bended touch screen 100 by using the stored programs and data in the storage 310. Further, the controller 200 may perform a controlling operation corresponding to a user touch performed on the main area, the sub area, or the boundary area corresponding to the boundary between the main area and the sub area.

The controller 200 includes RAM 210, ROM 220, CPU 230, GPU (graphic processing unit) 240, and a bus 250. The RAM 210, the ROM 220, the CPU 230, and the GPU 240 may be connected with each other through the bus 250.

The CPU 230 accesses the storage 310 and performs booting using the operating system (OS) stored in the storage 310. Further, the CPU 230 performs various operations by using the various programs, contents, and data stored in the storage 310.

The ROM 220 stores command sets for system booting. When a turn-on command is inputted and electrical power is provided, the CPU 230 copies the OS stored in the storage 310 to the RAM 210 according to the command sets stored in ROM 220, and boots the system by executing the OS. When booting completes, the CPU 230 copies the various programs stored in the storage 310 to the RAM 210, and performs various operations by executing the copied programs in the RAM 210. When booting of the user terminal device 1000 completes, the GPU 240 displays a user interface (UI) screen on an activated area among the main area and the sub area. Specifically, the GPU 240 may generate a screen including various objects such as icons, images, and texts by using a calculator (not illustrated) and a renderer (not illustrated). The calculator calculates feature values such as coordinate values, formats, sizes, and colors in which objects are respectively marked according to the layout of the screen. The renderer generates various layouts of screens including the objects based on the calculated feature values in the calculator. The screens generated in the renderer are provided to the bended touch screen 100, and respectively displayed on the main area and the sub areas.

GPS chip 320 is unit which receives GPS signals from a GPS (global positioning system) satellite, and calculates current position of the user terminal device 1000. The controller 200 may calculate the user's position by using GPS chip 320 when the navigation program is used or when current position of a user is requested.

The communicator 330 is unit which performs communication with various types of external devices according to various types of communication methods. The communicator 330 includes WiFi chip 331, Bluetooth chip 332, wireless communication chip 333, and NFC chip 334. The controller 200 performs communication with various external devices by using the communicator 330.

The WiFi chip 331 and the Bluetooth chip 332 respectively perform communication according to a WiFi method and a Bluetooth method. When the WiFi chip 331 or the Bluetooth chip 332 is used, various connecting information such as a service set identifier (SSID) and a session key may be first trans-received, communication may be connected by using the connecting information, and various information may be trans-received. The wireless communication chip 333 is a chip which performs communication according to various communication standards such as IEEE, Zigbee, 3G ($3^{rd}$ generation), 3GPP ($3^{rd}$ generation partnership project), and LTE (long term evolution). The NFC chip 334 is a chip which operates according to a NFC (near field communication) method using 13.56 MHz bandwidth among various RF-ID frequency bandwidths such as 135 kHz, 13.56 MHz, 433 MHz, 860~960 MHz, and 2.45 GHz.

The video processor 340 is unit which processes video data included in the contents received through the communicator 330 or the contents stored in the storage 310. The video processor 340 may perform various image processing such as decoding, scaling, noise filtering, frame rate converting, and resolution converting regarding video data.

The audio processor 350 is unit which processes audio data included in the contents received through the communicator 330 or the contents stored in the storage 310. The audio processor 350 may perform various processing such as decoding, amplifying, and noise filtering regarding audio data.

The controller 200 may reproduce corresponding contents by driving the video processor 340 and the audio processor 350 when the reproducing program is executed for multimedia contents.

The bended touch screen 100 may display the image frames generated in the video processor 340 on one or more of the main area and the sub areas.

Further, the speaker 390 outputs the audio data generated in the audio processor 350.

The button 360 may be various types of buttons such as a mechanical button, or a touch pad, or touch wheel which is formed on some area like the front surface, the side surface, or the back surface of the main exterior body of the user terminal device 1000.

The microphone 370 is unit which receives user voices or other sounds and converts them into audio data. The controller 200 may use the inputted user voices through the microphone 370 during the calling process, or convert them into the audio data and store in the storage 310.

The camera 380 is unit which captures still images or video images according to controlling of a user. The camera 380 may be implemented as plural units such as front surface camera and back surface camera. As described below, the camera 380 may be used as means to obtain user images in the exemplary embodiment of tracking the gaze of a user.

When the camera 380 and the microphone 370 are provided, the controller 200 may perform controlling operations according to user voices inputted through the microphone 370 or user motion recognized by the camera 380. Thus, the user terminal device 1000 may operate in a motion controlling mode or a voice controlling mode. When operating in the motion controlling mode, the controller 200 photographs a user by activating the camera 380, tracks changes in the user's motion, and performs a corresponding operation. When operating in the voice controlling mode, the controller 200 may operate in voice recognizing mode to analyze user voices inputted through the microphone 370 and perform a controlling operation according to the analyzed user voices.

In the user terminal device 1000 supporting the motion controlling mode or the voice controlling mode, voice recognizing technologies or motion recognizing technologies may be used in the above various exemplary embodiments. For example, when a user performs a motion like selecting an object marked on a home screen, or speaks a voice command corresponding to an object, it may be determined that the corresponding object is selected, and the controlling operation matched with the object may be performed.

The motion sensor 400 is unit which senses movement of the main body of the user terminal device 1000. The user terminal device 1000 may rotate or tilt in various directions. The motion sensor 400 may sense movement features such as rotating direction, angle, and gradient by using one or more of various sensors such as a geomagnetic sensor, a gyro sensor, and an acceleration sensor.

Further, although not illustrated in FIG. 11, the user terminal device 1000 may also include a USB port that can be connected with a USB connector, various external inputting ports so as to connect various external components like a headset, a mouse, a LAN, and a DMB chip to receive and process DMB (digital multimedia broadcasting) signals, and various other sensors according to exemplary embodiments.

Figure 12:
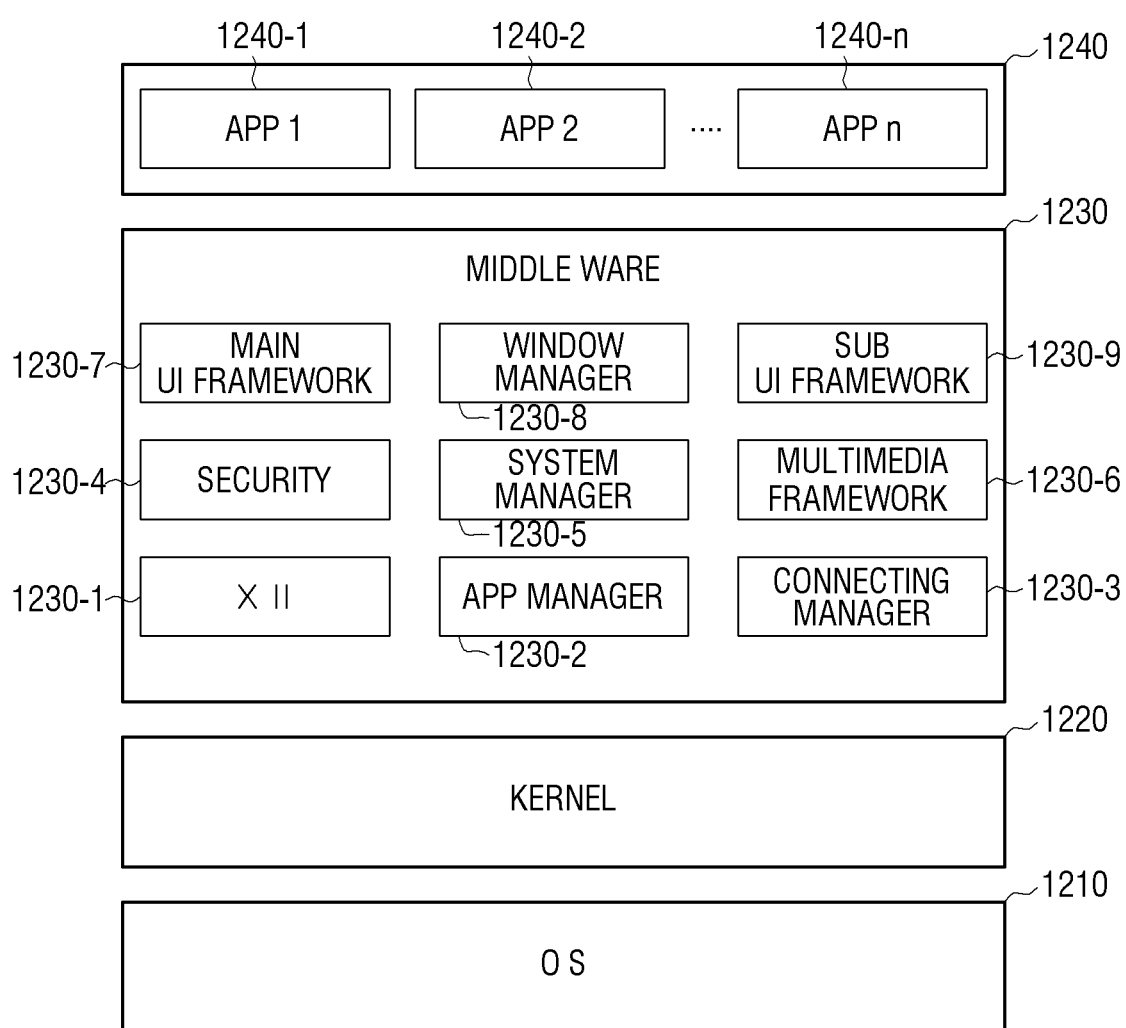
FIG. 12 illustrates an example of a software structure of the user terminal device.

As described above, the storage 310 may store various programs. FIG. 12 is a diagram provided to explain a software structure stored in the user terminal device 1000. Referring to FIG. 12, the storage 310 may store software including OS 1210, kernel 1220, middleware 1230 and application 1240.

The operating system (OS) 1210 performs functions of controlling and managing general operations of the hardware. Thus, the OS 1210 performs basic functions such as hardware management, memory, and security.

The kernel 1220 plays a pathway role which delivers various signals including touch signals sensed in the bended touch screen 100 to the middleware 1230.

The middleware 1230 includes various software modules to control operation of the user terminal device 1000. Referring to FIG. 12, the middleware 1230 includes X11 module 1230-1, APP manager 1230-2, connecting manager 1230-3, security module 1230-4, system manager 1230-5, multimedia framework 1230-6, main UI framework 1230-7, window manager 1230-8, and sub UI framework module 1230-9.

The X11 module 1230-1 is module which receives various event signals from various hardware provided in the user terminal device 1000. Herein, events may be variously established and may include, for example, an event in which user gestures are sensed, an event in which a system alarm occurs, and an event in which specific program executes or completes.

The APP manager 1230-2 is module which manages executing situation of various applications 1240 installed in the storage 310. The APP manager 1230-2 calls and executes an application corresponding to an event when the event to execute the application is sensed by the X11 module 1230-1.

The connecting manager 1230-3 is module which supports wire or wireless network connections. The connecting manager 1230-3 may include various detailed modules such as a DNET module and a UPnP module.

The security module 1230-4 is module which supports certification, request permission, and secure storage regarding the hardware.

The system manager 1230-5 monitors the situation of each unit within the user terminal device 1000 and provides the monitoring results to the other modules. For example, if a battery has a low charge, an error occurs, or a communication connection is cut, the system manager 1230-5 may output informing messages or alarm sounds by providing the monitoring results to the main UI framework 1230-7 or the sub UI framework 1230-9.

The multimedia framework 1230-6 is module which reproduces multimedia contents stored in the user terminal device 1000 or provided from external sources. The multimedia framework 1230-6 may include a player module, a camcorder module, and a sound processing module. Thereby, it may perform reproducing of various multimedia contents, and generating and reproducing screens and sounds.

The main UI framework 1230-7 is module which provides various UIs to be displayed on the main area of the bended touch screen 100, and the sub UI framework 1230-9 is module which provides various UIs to be displayed on the sub areas of the bended touch screen 100. The main UI framework 1230-7 and the sub UI framework 1230-9 may include an image compositor module comprising various objects, a coordinate compositor to calculate coordinate values with which objects will be marked, a rendering module to render the constituted object on the calculated coordinate value, and two-dimensional/three-dimensional (2D/3D) UI toolkit to provide tools which constitutes a 2D or 3D format of UI.

The window manager 1230-8 may sense a touch event from the user's body, the pen, or other inputting events. The window manager 1230-8 may deliver event signals to the main UI framework 1230-7 or the sub UI framework 1230-9 when such event is sensed, and perform the operation corresponding to the event.

Furthermore, various other program modules may be stored in the storage 310. For example, a writing module to draw lines according to dragging tracks when a user touches or drags the screen, and an angle calculating module to calculate pitch angle, roll angle, and yaw angle based on the values sensed by the motion sensor 400, may be stored in the storage 310.

The application module 1240 includes applications 1240-1~1240-n to support various functions. For example, it may include program modules such as a navigation program module, a game module, an electronic book module, a calendar module, and an alarm managing module, to provide various services. Such applications may be established by default, or voluntarily established and used by a user. When an object is selected, the CPU 230 may execute an application corresponding to the selected object by using the application module 1240.

The software structure illustrated in FIG. 12 is merely an exemplary embodiment and is not limited thereto. Thus, units may be deleted or modified, or new units may be added. For example, various programs may be additionally provided. For example, a sensing module to analyze signals sensed by various sensors, a messaging module such as messenger program, an SMS (short message service) & MMS (multimedia message service) program, an e-mail program, a call info aggregator program module, a VoIP module, and a web browser module, may be additionally provided.

Meanwhile, as described above, the user terminal device 1000 may be implemented as various types of devices such as a cellular phone, a tablet PC, a laptop PC, a PDA, an MP3 player, an electronic frame device, a TV, a PC, and a kiosk. Thus, the constitutions described in FIGS. 11 and 12 may be variously modified according to the type of the user terminal device 1000.

As described above, the user terminal device 1000 may be implemented as various formats and constitutions. The controller 200 of the user terminal device 1000 may support various user interactions according to exemplary embodiments.

The following will explain a user interaction method according to various exemplary embodiments.

According to an exemplary embodiment, the controller 200 may receive signals requesting execution of an application installed in the user terminal device 1000. For example, when data is received from an external device, when a user requests execution of an application by using the button 360 or the bended touch screen 100 provided on the main body of the user terminal device 1000, or when an application has been set to automatically execute at a certain previously determined time, the controller 200 may receive signals requesting execution of the application.

The controller 200 may selectively display an application in one of a first layout or a second layout in response to receiving the signals requested execution of the application. In this process, the first layout refers to a display layout of the sub area on the bended touch screen 100, and the second layout refers to a display layout of the main area on the bended touch screen 100. When current status of the user terminal device 1000 is displaying the first layout, the controller 200 may display an application in the first layout on the sub area of the bended touch screen 100. An application may be displayed on the whole of the sub area or a part of the sub area. Further, an application may be displayed on both of the main area and the sub area, or a part of the executing application may be displayed only on the sub area.

Figure 13:
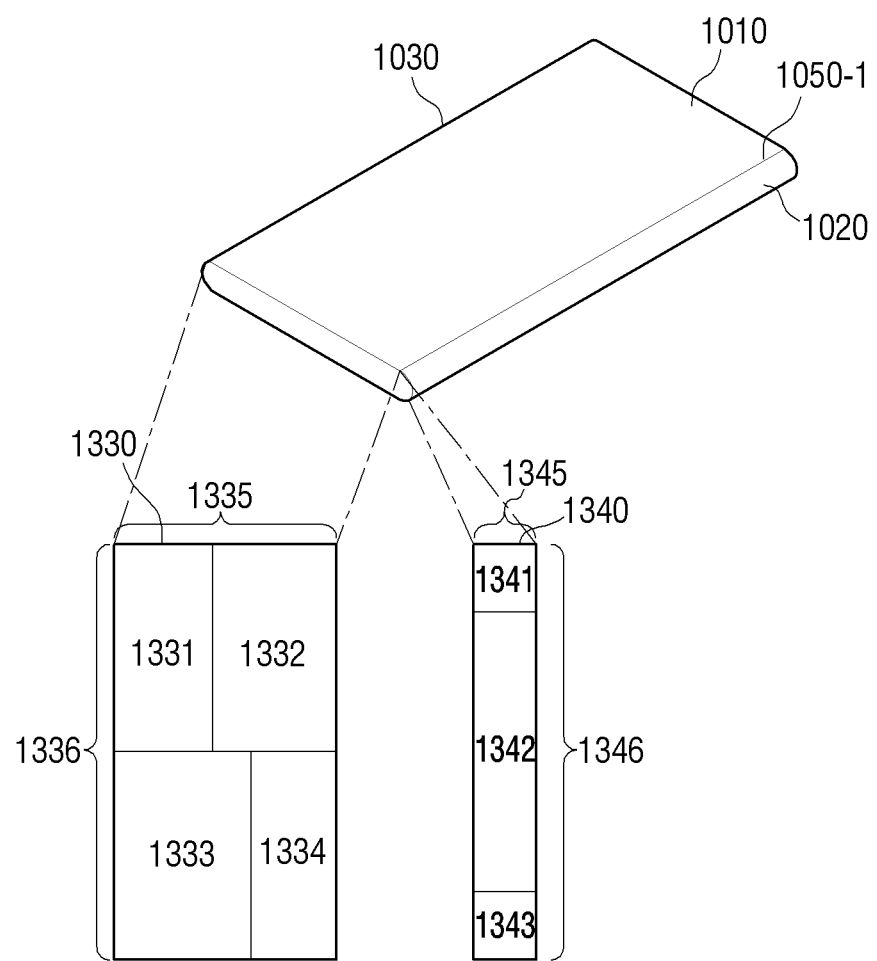
FIGS. 13 and 14 illustrate various examples of layouts of a main area and sub areas.
Figure 14:
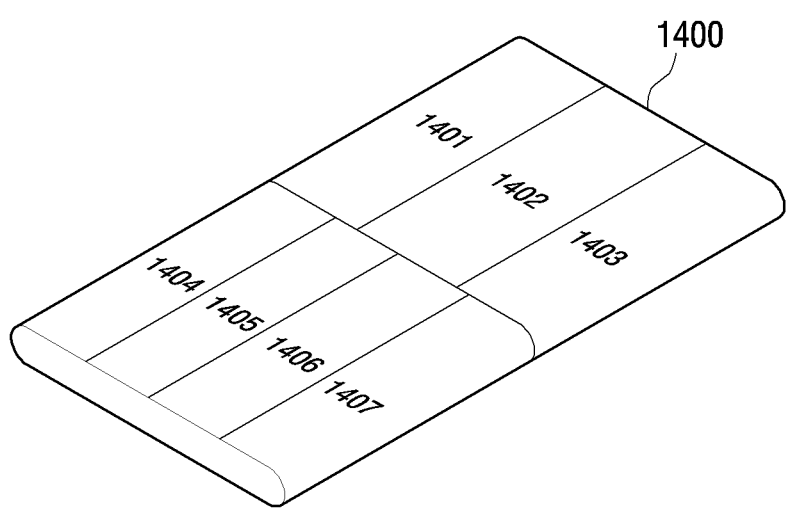

FIGS. 13 and 14 illustrate examples of various layouts. Although FIGS. 13 and 14 illustrate the user terminal device 1000 in which the bended touch screen 100 is divided into one main area 1010 and one sub area 1020, and the sub area 1020 is curved, the bended touch screen 100 may be implemented as various formats as explained in FIGS. 2 to 10. FIGS. 13 and 14 may be uniformly applied to various formats of the user terminal device 1000. Further, for convenient explanation, the following various exemplary embodiments use drawing reference numeral 1010 for the main area, and drawing reference numerals 1020 and 1030 for the sub areas.

Referring to FIG. 13, the sub area 1020 of the bended touch screen 100 displays a screen in the first layout 1340, and the main area 1010 displays a screen in the second layout 1330. Herein, layout refers to information to establish size, shape, arrangement position, and arrangement order regarding areas to display various other information.

Referring to FIG. 13, the first layout 1340 is divided into a plurality of areas 1341, 1342, 1343. Further, the second layout 1330 is divided into a plurality of areas 1331, 1332, 1333, 1334. For example, one or more of information among icons, buttons, menus, virtual keyboards, objects, or contents may be included in each of the areas 1341, 1342, 1343, 1331, 1332, 1333, 1334.

Further, the screen size of the first layout 1340 may be smaller than the screen size of the second layout 1330. The horizontal length 1345 of the screen in the first layout 1340 may be smaller than the horizontal length 1335 of the screen in the second layout 1330, and the vertical length 1346 of the screen in the first layout 1340 may be uniform or similar to the vertical length 1336 of the screen in the second layout 1330. Further, the ratio between the horizontal length 1345 and the vertical length 1346 of the screen in the first layout 1340 is smaller than the ratio between the horizontal length 1335 and the vertical length 1336 of the screen in the second layout 1330.

FIG. 14 illustrates an example of a third layout. As described above, the third layout refers to a layout corresponding to all of the main area 1010 and the sub area 1020.

Referring to FIG. 14, the third layout 1400 on the bended touch screen 100 may correspond to the whole display area including the main area 1010 and the sub area 1020; however, it is not limited thereto. Thus, the third layout 1400 may correspond to the display area including a part of the main area 1010 and a part of the sub area 1020. The third layout 1400 may include a plurality of areas 1401~1407. Some areas 1403, 1407 may be displayed across both the main area 1010 and the sub area 1020. Further, size of the third layout 1400 may be greater than size of the first layout 1340 and size of the second layout 1330.

The controller 200 may display information by selectively applying layouts based on various conditions such as a situation or action of a user or surrounding circumstances. Further, the displayed information may be differently determined according to such conditions. When signals requesting displaying of an application installed in the user terminal device 1000 are received, the controller 200 may selectively display the application in the first layout or the second layout in response to the signal. For example, when an application should be displayed on the main area, the controller 200 displays the application in the second layout on the main area. When an application should be displayed on the sub area, the controller 200 displays the application in the first layout on the sub area.

Further, when an application should be displayed by using the whole area of the main area and the sub area in terms of the application features, or when the third layout corresponding to all of the main area and the sub area on the bended touch screen 100 is selected, the controller 200 displays the application according to the third layout on all of the main area and the sub area.

According to an exemplary embodiment, the controller 200 may display various information on the sub area by considering a current location of a user, a current surrounding environment of a user, and a current time. When the user terminal device 1000 includes the constitution of FIG. 11, the controller 200 may confirm the current location from the GPS chip 320, and determine the surrounding environment of the user terminal device 1000 by comparing the current location with prestored map information. For example, when the user terminal device 1000 is located at a shopping center or a department store, the controller 200 may determine that a user is shopping. Similarly, when the user terminal device 1000 is located at an amusement park or a movie theater, the controller 200 may determine that a user is going to ride an amusement ride or watch a movie. According to the determining results, the controller 200 may provide valuable information to the user.

For example, when a user is shopping, the controller 200 may provide alarm information related with the shopping through the sub area in real time. The alarm information related with the shopping may include messages such as "Time limited sale begins in 5 minutes."

As another example, when a user is playing at an amusement park, the controller 200 may provide alarm information related with the amusement park through the sub area in real time. The alarm information related with the amusement park may include messages such as "You have 5 minutes until loading of the reserved roller coaster."

As another example, when a user is watching a movie, alarm information related with the movie may be provided on the sub area at real time. The information related with the movie may include messages such as "You have a reserved ticket; AAAA movie, 13 hall, 24:30."

In order to provide various alarm information, as in the above examples, the controller 200 may perform communication with a server managed by a corresponding location or building. For example, when a user carrying the user terminal device 1000 enters a shopping center, the controller 200 accesses the server corresponding to the shopping center through the communicator 330. Thereby, various information related with the shopping may be received from the server. The controller 200 may output some of the received information in the message format as described above. Further, when a user carrying the user terminal device stands at an amusement park or within a movie theater like, as the above examples, the controller 200 may receive various information which is valuable to a user by performing communication with a server corresponding to the location, and provide the information through the sub area.

Meanwhile, as another example, when the user terminal device 1000 transmits or receives data by connecting with surrounded devices, the controller 200 may display various information related with the corresponding communication through the sub area. For example, one or more of connecting information, a connecting situation, transmitting results or receiving results may be displayed on the sub area.

The connecting information may include a list of surrounded devices that can be connected with the user terminal device 1000. The connecting situation may be displayed in animation format. For example, the sub area may display an animation indicating that the user terminal device 1000 is connecting with the surrounded devices or animation that an object is moving from a device transmitting data to a device receiving data. Further, when transmitting successfully completes or fails, or when receiving successfully completes or fails, the controller 200 may display the result message on the sub area.

According to another exemplary embodiment, the controller 200 may display various information on the sub area by considering a current user action.

For example, when a user taps on the table or speaks specific sounds while the user terminal device 1000 is placed on the table, the controller 200 may execute a previously determined application and display the execution screen on the sub area.

As another example, when a user opens a purse that the user terminal device 1000 is being carried in, the controller 200 may activate the sub area so that the user terminal device 1000 or other items within the purse can be easily seen, and messages, images, screens, or previously determined applications may be displayed. As another example, when a user is exercising, the controller 200 may display exercising results (e.g., exercising time, exercising distance, and consumed calories) or information regarding the exercising on the sub area.

Further, when there is an application already being executed on the main area, the controller 200 may determine that a user is currently working on the main area and display another application which additionally executed according to the first layout on the sub area.

Therefore, a user may receive feedback regarding their actions more simply and conveniently by using the sub area. Further, alarm information of several random push services can be displayed in a lump on the sub area. Thus, a user may keep working on the main area while receiving information (e.g., the alarm information) on the sub area.

The controller 200 may determine current situation of the user terminal device 1000 or user actions by using one or more sensors (not illustrated) included in the user terminal device 1000, the motion sensor 400, the microphone 370, or the camera 380 of FIG. 11.

For example, in the above exemplary embodiments, the controller 200 may determine whether a user taps on the table or speaks specific sounds by using the microphone 370 of FIG. 11.

Further, if the brightness of an image captured by the camera 380 is less than a preset brightness value, or if a separately provided illumination sensor (not illustrated) senses that illumination less than a preset value, it may be determined that a purse carrying the user terminal device 1000 is being opened when preset features of audio signals, such as those generated by the opening of a zipper or button on the purse, are inputted through the microphone 370. Further, when the motion sensor 400 senses that the user terminal device 1000 moves in a specific pattern, the controller 200 may determine that a user is exercising, and calculate exercising results or information regarding the exercising by using the exercising time and distance.

Furthermore, the controller 200 may determine whether a user's gaze is directed toward the main area or the sub area based on the sensing results of the motion sensor 400, the camera 380, and the touch sensor (not illustrated). For example, when an acceleration sensor included in the motion sensor 400 senses that the sub area of the user terminal device 1000 tilts toward a user, the camera 380 captures an image in which the user's gaze is directed toward the sub area, and when the user's grip of the user terminal device 1000, determined based on the touch position sensed on the bended touch screen 100, matches with the grip of a user viewing the sub area, the controller 200 may determine that the user is viewing the sub area.

Further, the controller 200 may determine whether at least part of the main area is covered by a cover of the user terminal device 1000 or other objects by using the illumination sensor or the distance sensor. Further, the controller 200 may determine whether a user is standing in public place by using the GPS chip 320, the illumination sensor (not illustrated), or the camera 380. The controller 200 may also determine whether there is necessity to reduce electrical power consumption of the user terminal device 1000 by using a measuring sensor (not illustrated) for determining the amount of charge left in the battery of the user terminal device 1000. The following will explain various examples of determining a current situation of the user terminal device 1000 in exemplary embodiments to be described below.

The controller 200 may display the application being executed on the sub area or the main area of the bended touch screen 100 by considering a current situation of the user terminal device 1000. When the current situation of the user terminal device 1000 is displaying the first layout, the controller 200 may display an application on the sub area of the bended touch screen 100. When current situation of the user terminal device 1000 is displaying the second layout, the controller 200 may display an application on the main area of the bended touch screen 100 in the second layout. When current situation of the user terminal device 1000 is displaying the third layout, the controller 200 may display an application on all of the main area and the sub area of the bended touch screen 100 in the third layout.

The controller 200 may selectively determine the first to the third layouts according to various conditions such as a preset setting of a user, features of applications, a current using environment of the user terminal device 1000, and actions of the user.

FIGS. 15 to 19 are diagrams explaining exemplary embodiments for displaying information based on a user's gaze.

In FIGS. 15 to 19, the controller 200 may analyze whether a user's gaze is directed toward the main area 1010, the sub area 1020, or both of the main area and the sub area of the bended touch screen 100 by using one or more sensors included in the user terminal device 1000 or the camera 380. The controller 200 may display applications on the main user gaze area according to analyzing results of the user's gaze.

For example, when a user is tilting the user terminal device 1000 horizontally or vertically, the controller 200 may determine a tilting angle of the user terminal device 1000 by using the acceleration sensor (not illustrated), and whether the user's gaze is directed toward the main area or the sub area.

Further, the controller 200 may sense the user's face, some area of the user's face (e.g., T area between both eyes and the nose), or the eye position of the user by using the camera 380, and determine whether the user's gaze is directed toward the main area or the sub area.

Further, the controller 200 may measure a size of an area touched by a finger of the user or measure pressure changes on the main area or the sub area in order to determine the user's grip of the user terminal device 1000, and determine whether the user's gaze is directed toward the main area or the sub area according to the measuring results. The normal grip of a user when viewing the main area is different from the normal grip of a user when viewing the sub area. Therefore, information regarding a touched position, a touched size, and a touched pressure measured in each of the gripping positions of the user terminal device 1000 is matched with a grip of a user when viewing each of the different area of the bended touch screen and stored in the storage 310. The controller 200 may analyze whether a current grip of a user matches with the information stored in the storage 310, and determine whether the user's gaze is directed toward the main area or the sub area. Methods of determining a user's gaze may be implemented using various exemplary embodiments within a technical scope of the exemplary embodiments for those skilled in the art.

Figure 15:
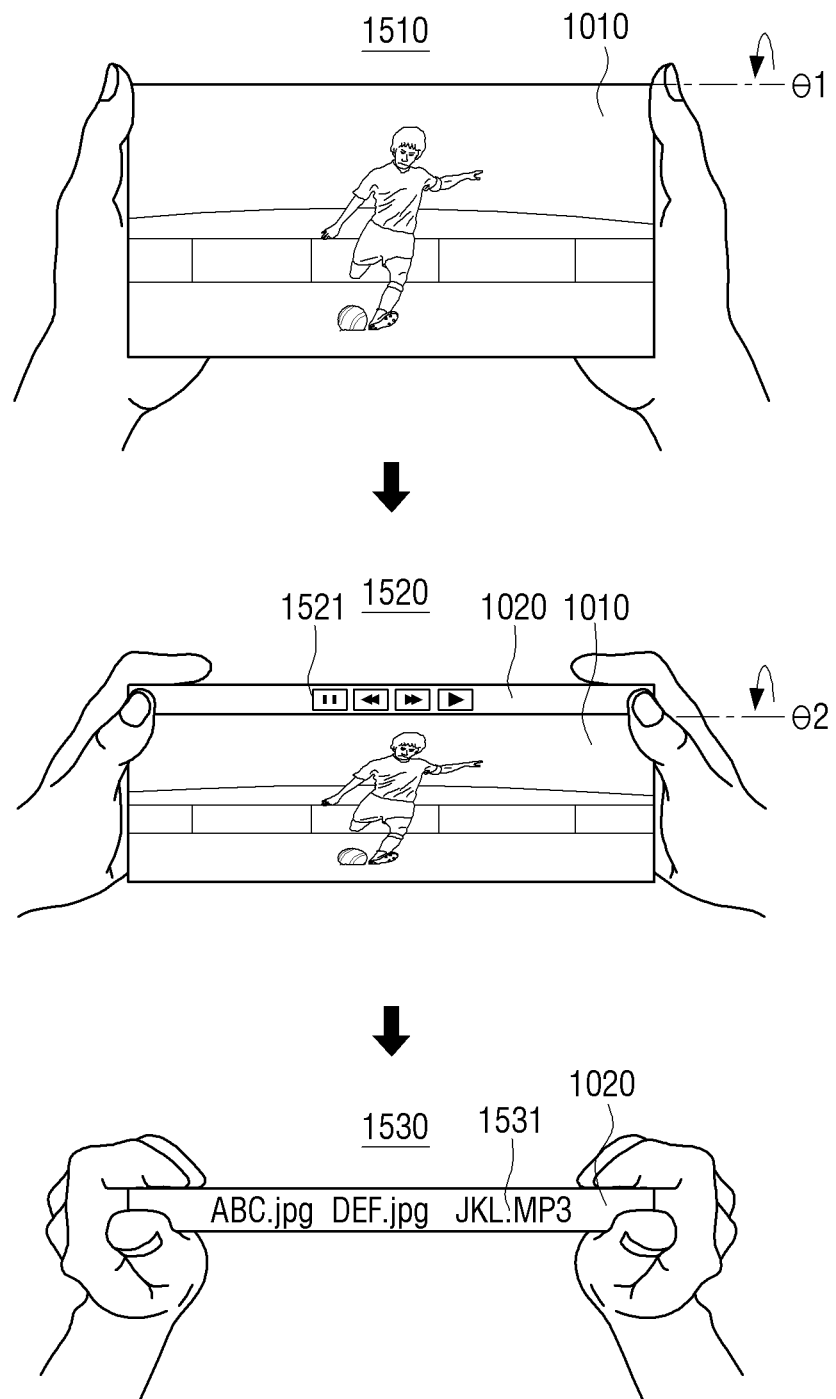
FIGS. 15 to 100 illustrate examples of interaction screens which are displayed on the user terminal device according to various exemplary embodiments.

Referring to 1510 of FIG. 15, contents (e.g., video contents) may be reproduced on the main area of the bended touch screen 100. In 1510 of FIG. 15, a user may tilt the user terminal device 1000 by a certain angle (θ1) toward the user. For example, θ1 may be 0°~30°. According to the user action, as in in 1520 of FIG. 15, the user's gaze may be directed toward all of the main area 1010 and the sub area 1020. While contents are displayed on the main area 1010, the controller 200 may display an application 1521 to control corresponding contents on the sub area 1020. The application 1521 may provide a menu to control the contents displayed on the main area 1010. For example, the user may perform functions of stop, pause, skip, quick play, and slow play regarding the contents displayed on the main area 1010 by using the menu.

Meanwhile, a user may tilt the user terminal device 1000 by a certain angle (θ2) toward the user. For example, θ2 may be 80°~100°. 1530 of FIG. 15 illustrates that the user terminal device 1000 tilts by θ2.

According to the user action, the gaze of the user may be directed toward the sub area in 1530 of FIG. 15. Thereby, when the gaze of the user is directed toward the sub area 1020, the controller 200 may display an application 1531 to provide a list of contents, that can be reproduced on the main area 1010, on the sub area 1020. The user may select one contents from the contents list, and convert the currently reproduced contents on the main area 1020 into the selected contents.

Figure 16:
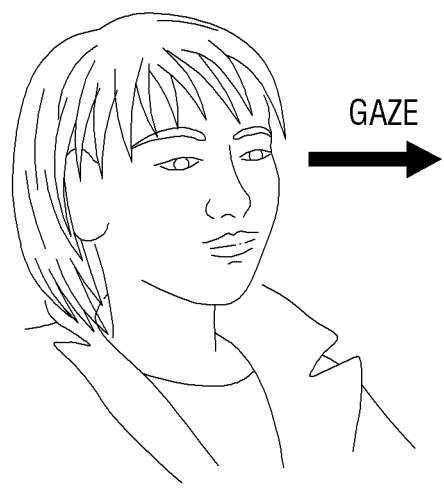
Figure 16:
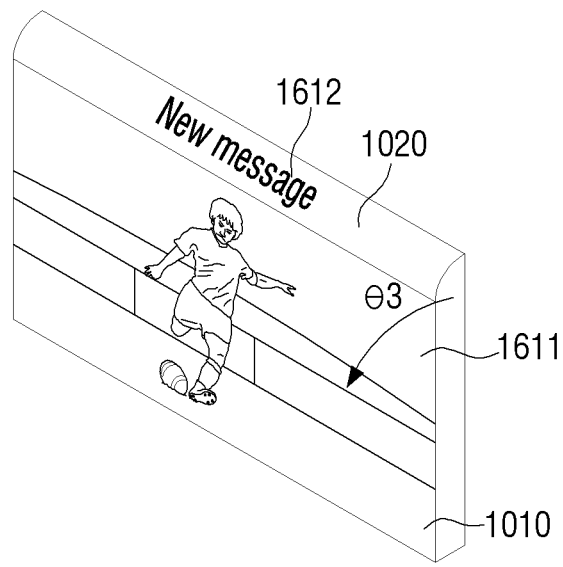
Figure 16:
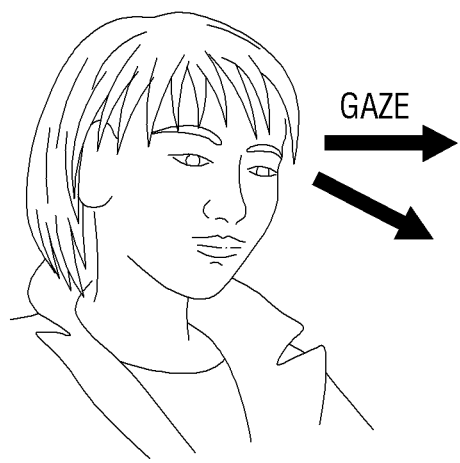
Figure 16:
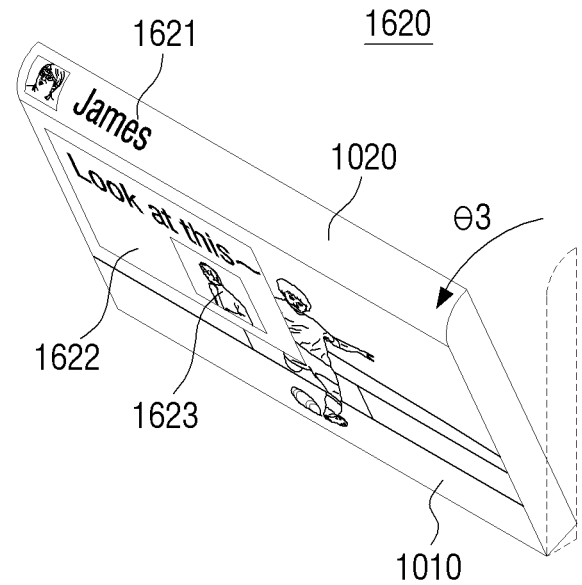

Meanwhile, according to another exemplary embodiment, the controller 200 may differently determine information marking a position of the user's gaze. FIG. 16 is a diagram provided to explain such an exemplary embodiment.

Referring to 1610 of FIG. 16, contents 1611 (e.g., video contents) may be reproduced on the main area 1010 of the bended touch screen 100. Like the situation in 1510 of FIG. 15, the user's gaze is directed toward the main area 1010. In this situation, when new messages arrive or program updating event occurs, the controller 200 may display alarm information on the sub area 1020 to inform the user of the events. 1610 of FIG. 16 illustrates that the alarm information 1612 indicating that a new message has arrived is displayed on the sub area 1020.

As illustrated in FIG. 16, when the main area 1010 and the sub area 1020 are connected with each other while forming an obtuse angle, a user may easily recognize alarm information displayed on the sub area 1020, even when they are viewing the main area 1010. the user may recognize the alarm information 1612 and tilt the user terminal device 1000 by a certain angle (θ3) toward the user. For example, θ3 may be various angles such as 0°~30°.

When the user terminal device 1000 tilts toward the front, the user's gaze may be directed toward all of the main area and the sub area, as illustrated in 1620 of FIG. 16. Thereafter, the controller 200 may display detailed information 1621, 1622 of the alarm information 1612 on some area in the sub area 1020 and the main area 1010.

In 1620 of FIG. 16, the information 1621 regarding a third party sending a message may be displayed on the sub area 1020, the message descriptions 1622 received from the third party and the information regarding the third party 1623 may be displayed on some of the main area 1010. When a user further tilts the user terminal device 1000 toward the front, or maintains the tilting position, the detailed information 1621, 1622 may be expanded gradually and displayed toward the lower part of the main area 1010.

Although FIG. 16 illustrates that the main area 1010 and the sub area 1020 meets by forming an obtuse angle, the operation according to such exemplary embodiment may be uniformly performed in the user terminal device 1000 including the bended touch screen 100 in which the main area and the sub area meets by forming the right angle.

Figure 17:
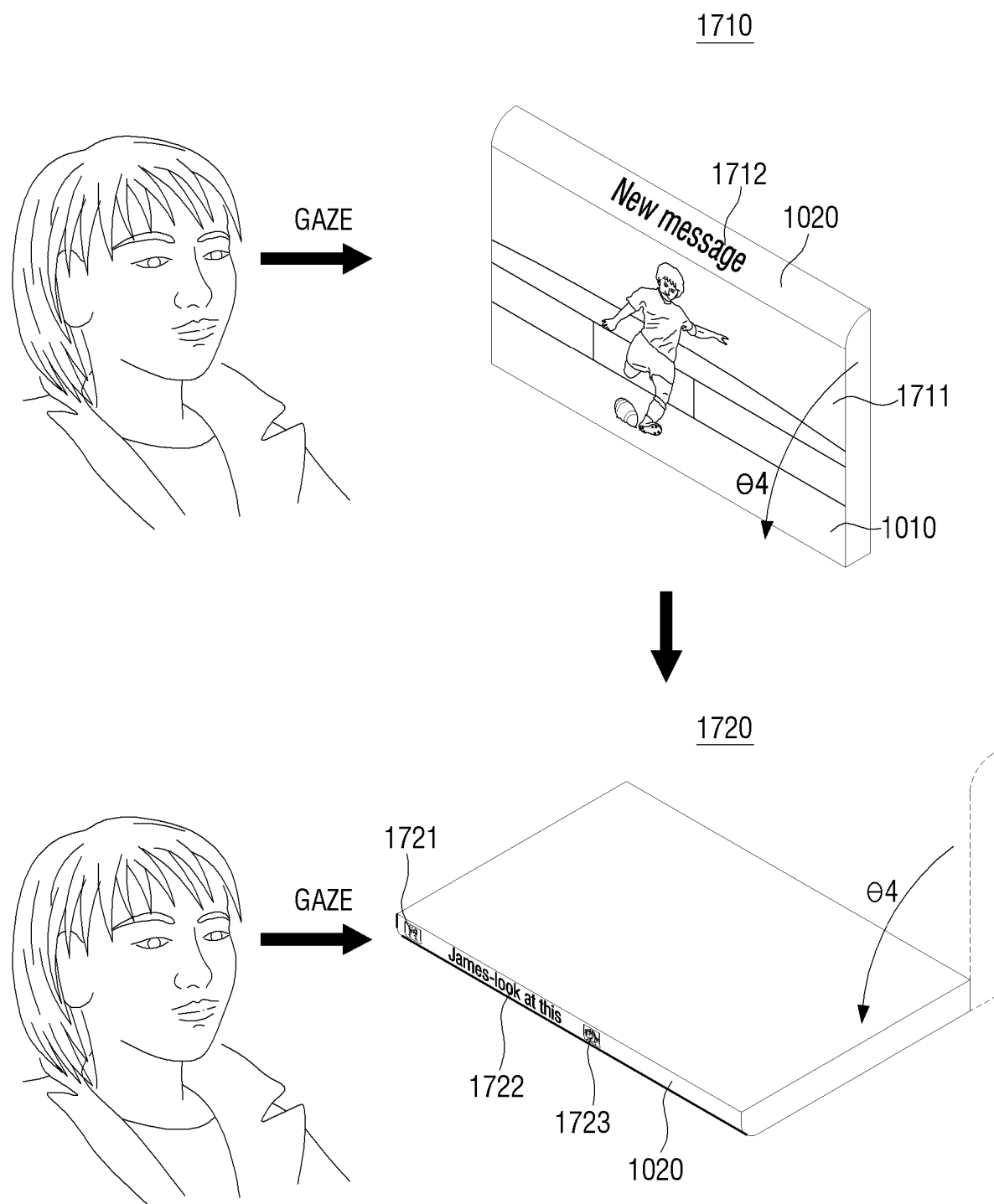

FIG. 17 illustrates a situation when the user terminal device 1000 is tilted by an angle more than that of FIG. 16 (i.e., θ3). Referring to 1710 of FIG. 17, reproduced contents 1711 may be displayed on the main area 1010 of the bended touch screen 100. When a message arrives from an external device, alarm information 1712 indicating that a new message has arrived may be displayed on the sub area 1020 of the bended touch screen 100. A user may recognize the alarm information 1712 and tilt the user terminal device 1000 by a certain angle (θ4). For example, θ4 may be 80°~100°. In 1720 of FIG. 17, the user's gaze may be directed toward the sub area 1020 according to the user action. Thereafter, the controller 200 may display detailed information 1721, 1722, 1723 of the alarm information 1712 on the sub area 1020. For example, one or more of information regarding a sender 1721, the message descriptions 1722, and the contents 1723 added to the message may be displayed in ticker format on the sub area 1020.

As set forth above, a user may grip the user terminal device 1000 with various grips and tilt the user terminal device 1000 in various directions. The user terminal device 1000 may display screens on one or more of the main area and the sub area by considering the grip of the user, and a tilting direction and tilting degree of the user terminal device 1000. Further, in addition to displaying the screens, resolution, brightness, contrast, and color regarding each of the main area and the sub area may also be modified.

Figure 18:
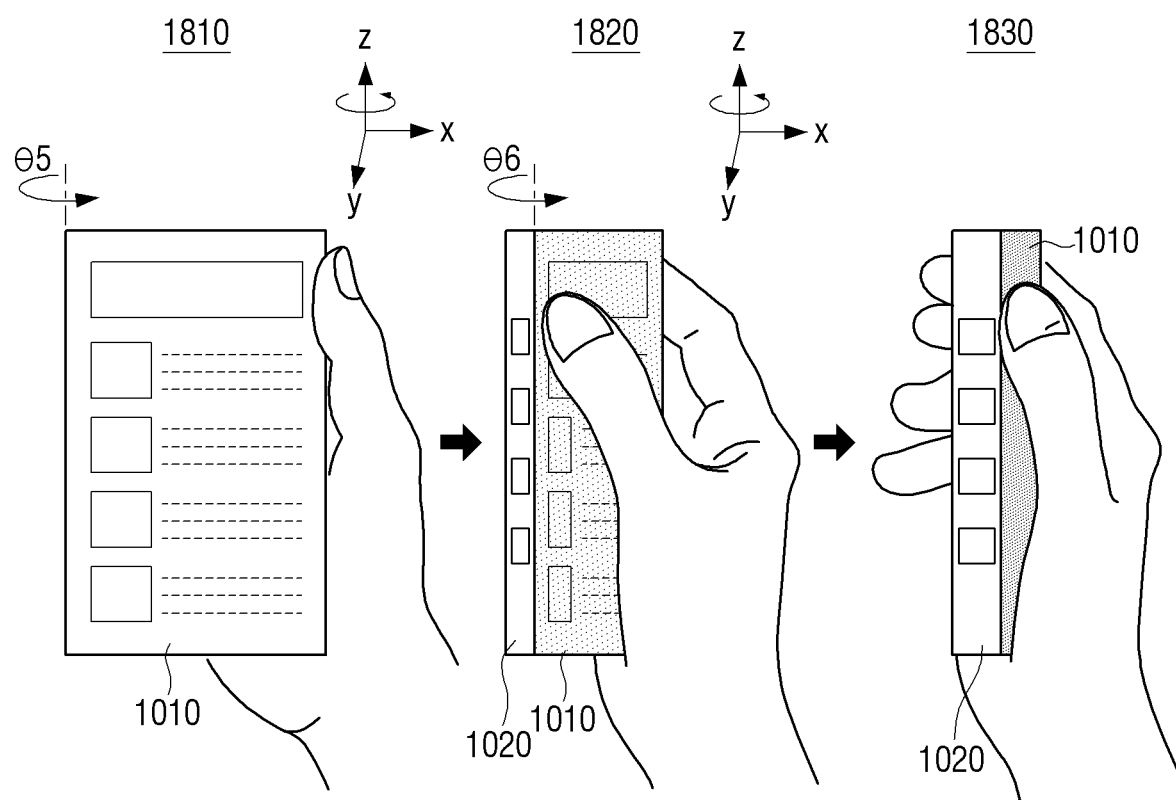

Referring to 1810 of FIG. 18, a first application and a second application may be respectively displayed on the main area and the sub area of the bended touch screen 100. 1810 of FIG. 18 illustrates that a user grips the user terminal device 1000 with the right hand, and views the main area 1010. In this situation, as illustrated in 1810 of FIG. 18, a user may rotate the user terminal device 1000 by θ5 with respect to the Z axis. For example, θ5 may be 0°~50°.

As illustrated in 1820 of FIG. 18, when the user terminal device 1000 rotates, the user's gaze may be directed toward all of the main area 1010 and the sub area 1020. In this case, the controller 200 may determine that the user's gaze moves from the main area 1010 to the sub area 1020, and modify display features of the main area 1010. For example, the controller 200 may adjust the brightness of screen on the main area to be darkened or the resolution of the screen to be lower.

The user may further rotate the user terminal device 1000 by θ6 in the above situation. For example, θ6 may be 50°~100°. 1830 of FIG. 18 illustrates that the user terminal device 1000 rotates further by θ6. The user's gaze may then be directed primarily toward the sub area 1020, as in 1830 of FIG. 18. In this case, the controller 200 may determine that the user's gaze is directed toward the sub area and continue adjusting the brightness of the screen on the main area 1010. For example, the controller 200 may further darken brightness of the screen on the main area 1010 or convert the screen on the main area 1010 into off status.

According to another exemplary embodiment, the sub area and the main area may be interlocked with each other according to rotating of the user terminal device 1000. For example, referring to 1910 of FIG. 19, a first application may be displayed on the main area 1010 of the bended touch screen 100. In 1920 of FIG. 19, when the user terminal device 1000 receives a message, the controller 200 may display alarm information 1921 on the sub area 1020 of the bended touch screen 100 indicating that a new message has arrived. A user may recognize receiving the alarm information 1921 and rotate the user terminal device 1000 by a certain angle (θ7) with respect to the Z axis. For example, θ7 may be 0°~30°.

Figure 19:
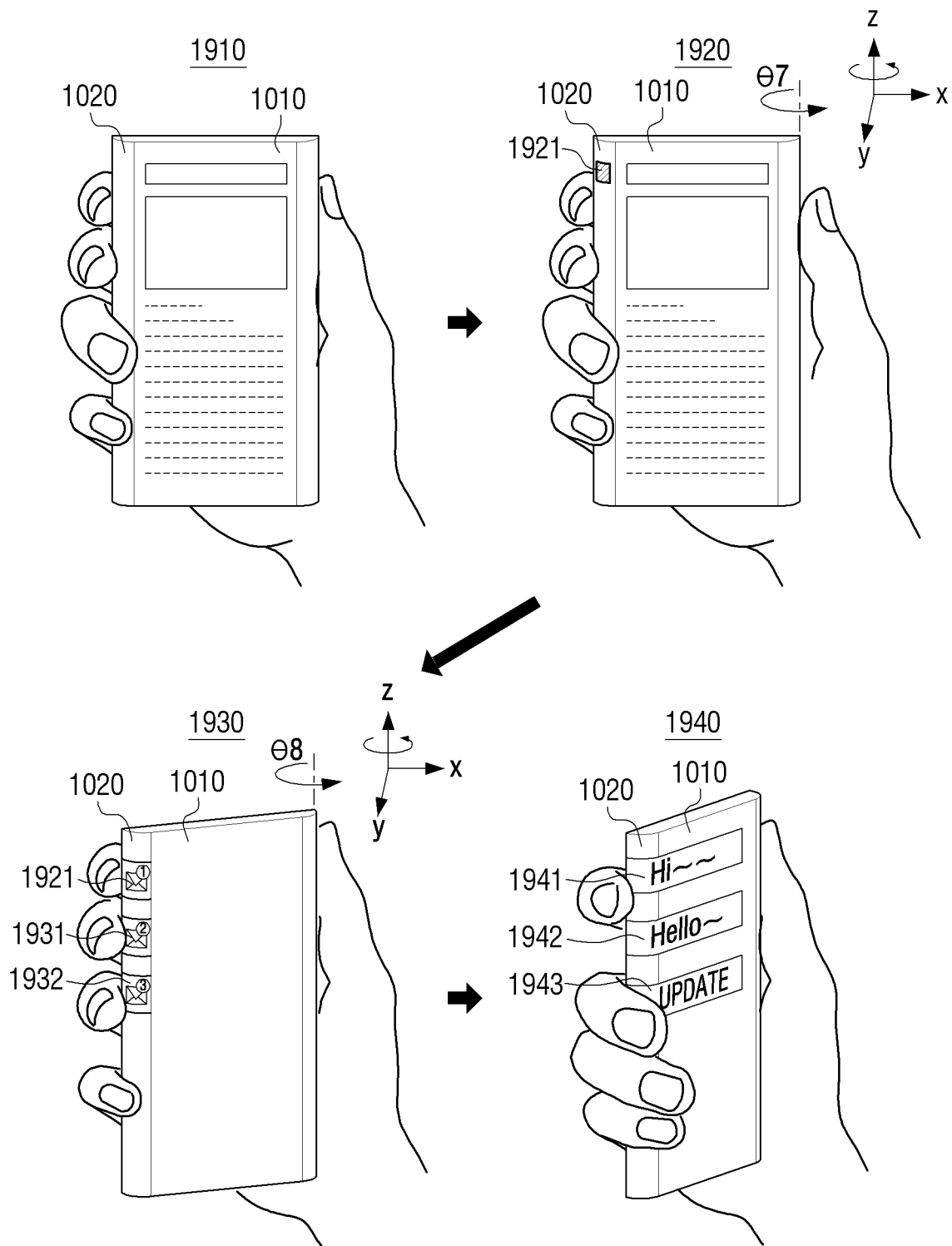

According to the user rotating action, the controller 200 may further provide the alarm information 1921 and additional alarm information 1931, 1932, as illustrated in 1930 of FIG. 19. Each of the alarm information 1921, 1931, 1932 may be visually distinguished and displayed according to features of the alarm information or receivers.

The user may further rotate the user terminal device 1000 by a certain angle (θ8). For example, θ8 may be 80°~100°. When being rotated like this, the controller 200 may expand and display detailed information 1941, 1942, 1943 of the alarm information 1921, 1931, 1932 on the main area 1010 as illustrated in 1940 of FIG. 19. For example, when the alarm information 1921, 1931, 1932 include some descriptions of the messages, the detailed information 1941, 1942, 1943 may include whole descriptions of the messages. The detailed information 1941, 1942, 1943 may be visually distinguished and displayed in different colors from each other. Meanwhile, as a rotating angle of the user terminal device 1000 increases, descriptions of the detailed information 1941, 1942, 1943 displayed on the main area 1010 may increase.

Figure 20:
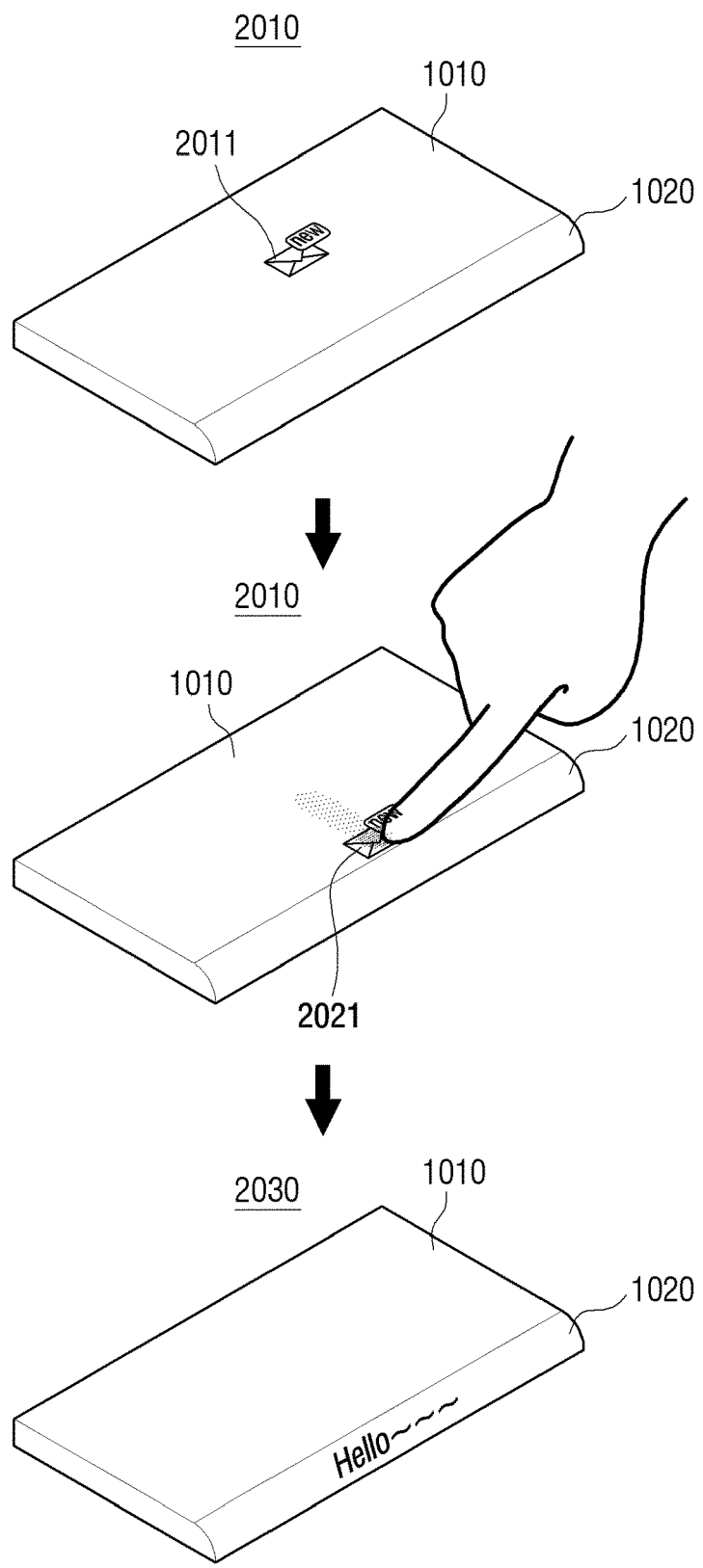

The user terminal device 1000 may display an application on the main area and the sub area according to various other exemplary embodiments. FIG. 20 is a diagram which an application is displayed on the sub area by considering user gestures in the user terminal device 1000 according to another exemplary embodiment.

Referring to 2010 of FIG. 20, alarm information 2011 (e.g., a message) may be displayed on the main area 1010 of the bended touch screen 100. In 2020 of FIG. 20, a user may perform gesture (e.g., dragging gestures or flicking gestures) 2021 and move the alarm information 2011 displayed on the main area 1010 to the sub area 1020. In 2030 of FIG. 20, the controller 200 may display an application related with the alarm information 2011 on the sub area in response to the user gesture 2021. The controller 200 may perform a function related with the alarm information 2011 by using the application displayed on the sub area 1020. For example, the controller 200 may display detailed descriptions of the alarm information 2011 by using the application displayed on the sub area 1020, store the alarm information 2011, or retransmit the alarm information 2011.

Figure 21:
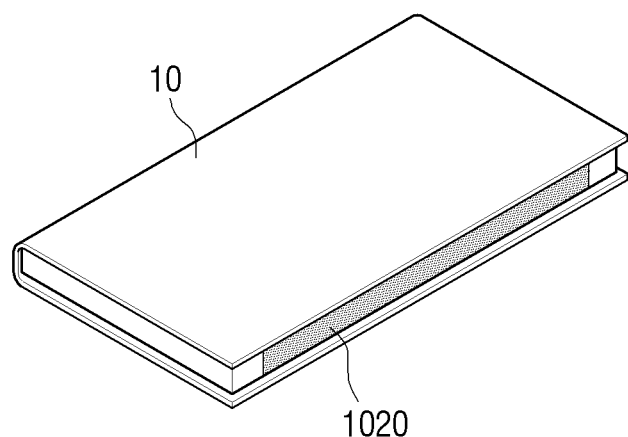
Figure 21:
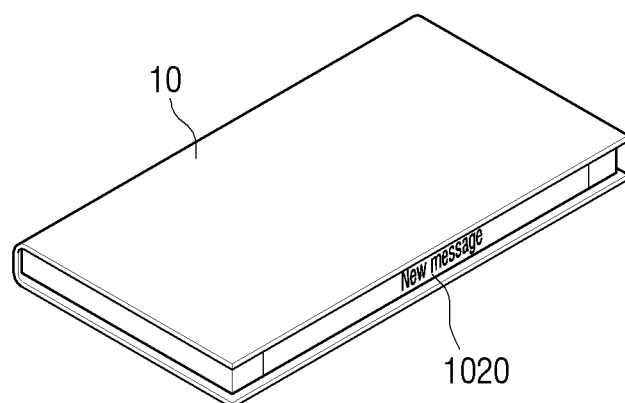
Figure 22:
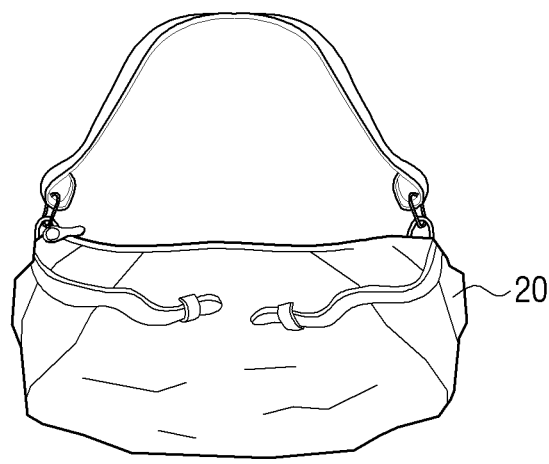
Figure 22:
Figure 22:
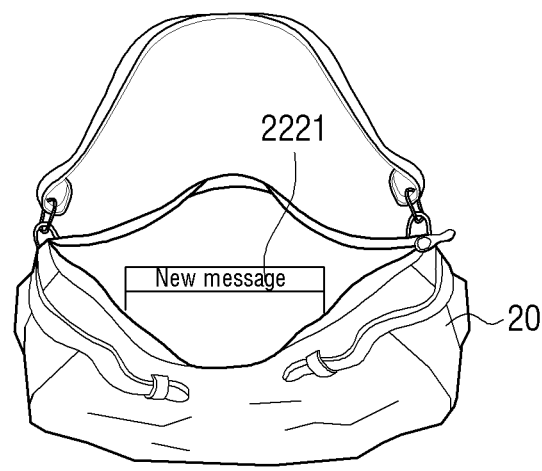
Figure 23:
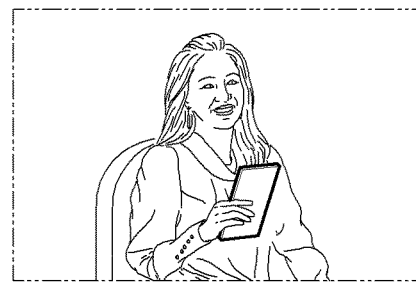
Figure 23:
Figure 23:
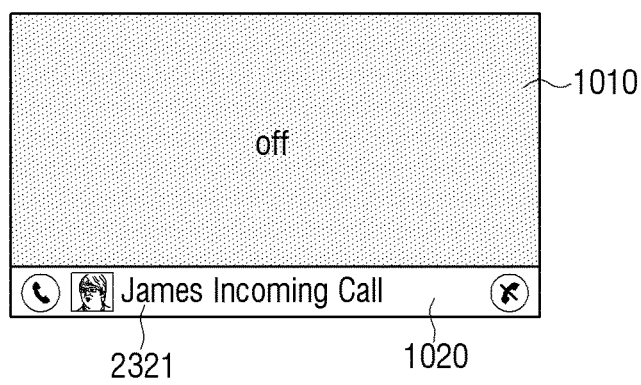
Figure 23:
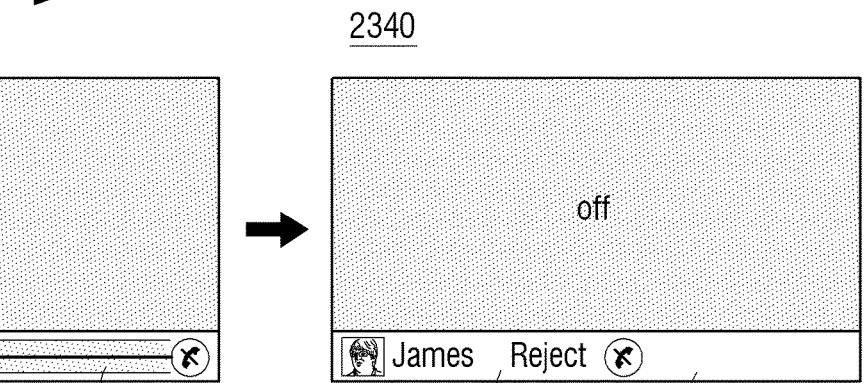
Figure 23:
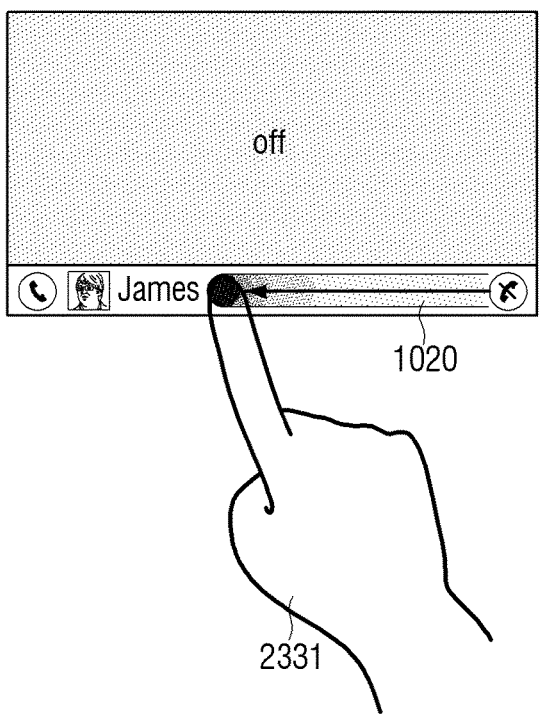

FIGS. 21 to 23 are diagrams explaining exemplary embodiments for displaying an application on the sub area by considering the surrounding environment.

In FIGS. 21 to 23, the controller 200 may determine the surrounding environment of the user terminal device 1000 by using one or more sensors (not illustrated) provided in the user terminal device 1000. For example, the controller 200 may determine illumination surrounding the user terminal device 1000 by using the illumination sensor. Further, the controller 200 may determine a place where the user terminal device 1000 operates by using the GPS chip 320 or other position sensors. Further, the controller 200 may determine whether one or more objects stand within a certain distance of the user terminal device 1000 by using the distance sensor. Further, the controller 200 may determine illumination surrounding the user terminal device 1000, a place where the user terminal device 1000 operates, or whether one or more objects stand within a certain distance of the user terminal device 1000 by using the camera 380. The controller 200 may determine the surrounding environment of a user, whether the user terminal device 1000 is covered by the cover of the user terminal device 1000 or other objects, carried within a purse, or placed at a public place (e.g., in a theater or a meeting room). Methods of determining the surrounding environment of a user may not be limited to the above exemplary embodiments and those skilled in the art can implement various exemplary embodiments within a technical scope of the exemplary embodiments.

Referring to 2110 of FIG. 21, when an event to display an application occurs, the controller 200 may determine whether the main area of the bended touch screen 100 is covered by the cover 10 of the user terminal device 1000 or other objects. Herein, the event to display an application may be various events such as an event of receiving messages or emails from external devices, an event of receiving signals to request displaying of a specific application from external devices, an event of receiving user gestures to execute a specific application and display the executing screen, an event in which the preset time period approaches, and event in which an update version regarding the applications stored in the user terminal device 1000 is generated. 2110 of FIG. 21 illustrates the exemplary embodiment in which the event occurs while the cover 10 covers the user terminal device 1000.

When the main area of the bended touch screen 100 is covered with the cover 10 of the user terminal device 1000 or other objects, the controller 200 may display an application in the first layout on the sub area 1020, as illustrated in 2120 of FIG. 21. In 2120 of FIG. 21, the application to display a new message is displayed in layout corresponding to the sub area 1020.

Further, when a part of the main area 1020 regarding the bended touch screen 100 is covered by the cover 10 of the user terminal device 1000 or other objects, the user terminal device 1000 may display an application on one or more area among the areas of the main area 1010 which are not covered and the sub area 1020.

FIG. 22 illustrates an exemplary embodiment which the user terminal device 1000 is carried within a purse. Referring to 2210 of FIG. 22, when the above described event occurs, the controller 200 may display an application by using a part of the main area 1010 or the sub area 1020. For example, the controller 200 may receive alarm information to request displaying the application to provide information from external devices. In this case, the controller 200 may confirm the surrounding situation of the user terminal device 1000, determine whether a user intends to confirm the alarm information or not, and display the application according to the determined result. In 2210 of FIG. 22, when the user does not open the purse 20, the controller 200 may determine that the user does not intend to confirm the alarm information, and may keep the screens of the main area and the sub area in off state. Meanwhile, as illustrated in 2220 of FIG. 22, when the user opens the purse 20, the controller 200 may determine that the user intends to confirm the alarm information, and may display the application to provide the alarm information in the first layout on the sub area 1020. In order to determine whether the user opens the purse 20 or not, the controller 200 may use the illumination sensor, the distance sensor, and the camera 380 provided in the user terminal device 1000. Specific determining methods are already explained in the above and will not be further explained.

FIG. 23 is a diagram provided to explain another exemplary embodiment of an operation to provide different displays according to surrounding environment. Referring to 2310 of FIG. 23, while the user terminal device 1000 is located at public places (e.g., in a theater), the controller 200 may receive signals requesting displaying of an application. For example, the controller 200 may receive alarm information to requesting displaying of the application to provide information (e.g., call arriving information). The controller 200 may determine whether the user terminal device 1000 operates at public places or not by using the illumination sensor or the camera 380 provided in the user terminal device 1000. Specifically, when illumination sensed by the illumination sensor is less than a certain level, and images photographed by the camera 380 include a theater logo, movie title, and an audience, the controller 200 may recognize the current position to be a public place. Further, when a user converts the call arriving mode of the user terminal device 1000 from a sound mode to the soundless or vibrating mode, the controller 200 may determine the place where the user terminal device 1000 operates to be public place. Further, the controller may determine whether the place is public or not based on position information sensed by the GPS chip 320.

In 2320 of FIG. 23, when it is determined that the user terminal device 1000 is positioned at a public place, the controller 200 may display the application to provide alarm information 2321 in the first layout on the sub area 1020. The brightness of the sub area 1020 may be adjusted according to the illumination of the surrounding environment. For example, the brightness of the sub area 1020 may be displayed with a lower level if illumination of the surrounding environment is low. Meanwhile, the controller 200 may inactivate the main area 1010.

In this situation, the controller 200 may perform a controlling operation corresponding to user gestures performed on the sub area 1020.

For example, in 2330 of FIG. 23, when an application is displayed on the sub area, a user may reject the arriving call related with the alarm information 2321 by performing user gesture (e.g., dragging gestures or flicking gestures) 2331 toward a first direction. Further, the user may receive the arriving call by performing user gesture (e.g., dragging gestures or flicking gestures) 2331 toward a second direction different from the first direction on the sub area 1020. 2340 of FIG. 23 illustrates the situation when the controller 200 rejects the arriving call. According to 2340 of FIG. 23, the controller 200 may display an object 2341 on the sub area 1020 indicating that the arriving call has been rejected, in response to the user gesture 2331 rejecting the arriving call.

Therefore, a user may reduce inconvenience to other people due to the lights of the screen of the user terminal device 1000 in public places such as a dark movie theater. Thus, because size of the screen regarding the sub area is smaller than size of the main area, it may minimize inconvenience to the other people by minimizing the screen lights or leakage of information displayed on the screen.

According to another exemplary embodiment, displaying may be performed by considering electrical power of the user terminal device 1000.

Figure 24:
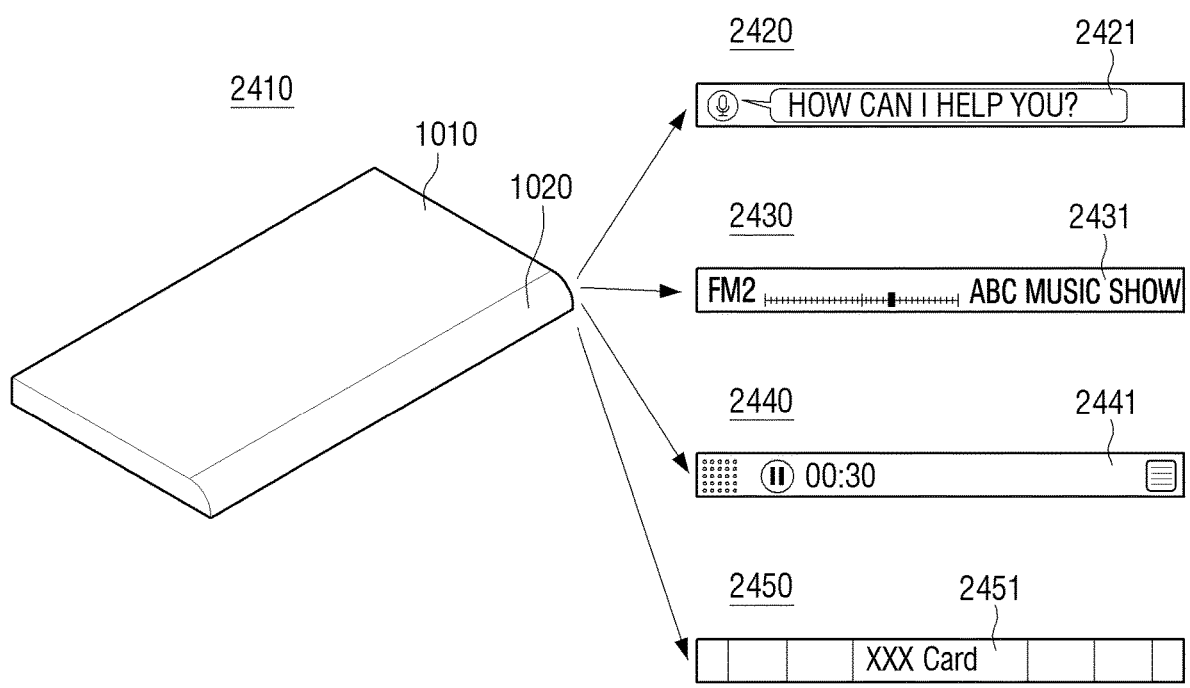

FIG. 24 is a diagram provided to explain an operation of the user terminal device 1000 according to an exemplary embodiment. FIG. 24 illustrates operation of the user terminal device 1000 which displays an application on the sub area 1020 of the bended touch screen 100 by considering the electrical power situation. Referring to 2410 of FIG. 24, the controller 200 may measure the amount of charge remaining in the battery when an event to display an application occurs. Types of events are explained in the above and will not be further described. The controller 200 may determine whether the amount of charge remaining in the battery is less than a predetermined value (e.g., 20% of whole battery amount). When the amount of charge remaining in the battery is less than a predetermined value, the controller 200 may display an application by using the sub area 1020.

When the amount of charge remaining in the battery is less than a predetermined value, 2420 of FIGS. 24 to 2450 of FIG. 24 illustrate various examples of an application displayed in the first layout on the sub area 1020. In 2420 of FIG. 24, when signals requesting displaying of the voice recognizing application are received from a user, the controller 200 may display the voice recognizing application 2421 in the first layout on the sub area 1020. Further, in 2430 of FIG. 24, when signals requesting displaying of the radio application are received from a user, the controller 200 may display the radio application 2431 in the first layout on the sub area 1020. Further, in 2440 of FIG. 24, when signals requesting displaying of the recording application are received from a user, the controller 200 may display the recording application 2441 in the first layout on the sub area 1020. Further, in 2450 of FIG. 24, when signals requesting displaying of the payment application are received from a user, the controller 200 may display the payment application 2451 in the first layout on the sub area 1020.

Further, when the amount of charge remaining in the battery is less than a predetermined value, the controller 200 may display alarm information which is displayed on the main area 1010 (e.g., call arriving information and message arriving information) on the sub area 1020.

As described above, when the controller 200 displays an application on the sub area 1020 by considering the amount of charge remaining in the battery, battery consumption of the user terminal device 1000 may be reduced.

In addition, the user terminal device 1000 may display an application on the sub area by considering various current situations as well as the amount of charge remaining in the battery. For example, if battery charging is difficult when a user is taking a trip, the controller 200 may display the application to perform searching or finding roads (e.g., navigation) on the sub area 1020. In this case, when the user terminal device 1000 can provide voice recognizing, performing results of searching or finding the roads with the voice recognizing can be displayed on the sub area 1020.

Further, the controller 200 may display the application on the sub area by considering the type of the executed application. For example, when the application is application to provide simple information such as alarm information, time information, battery information, network connecting information, and mode situation information of the user terminal device 1000, the controller 200 may display the application on the sub area 1020 by considering the type of the executed application. Meanwhile, regarding web browser screens requesting more than a certain size of the screen, map screens or video screens, the controller 200 may display the screens on the main area 1010.

Figure 25:
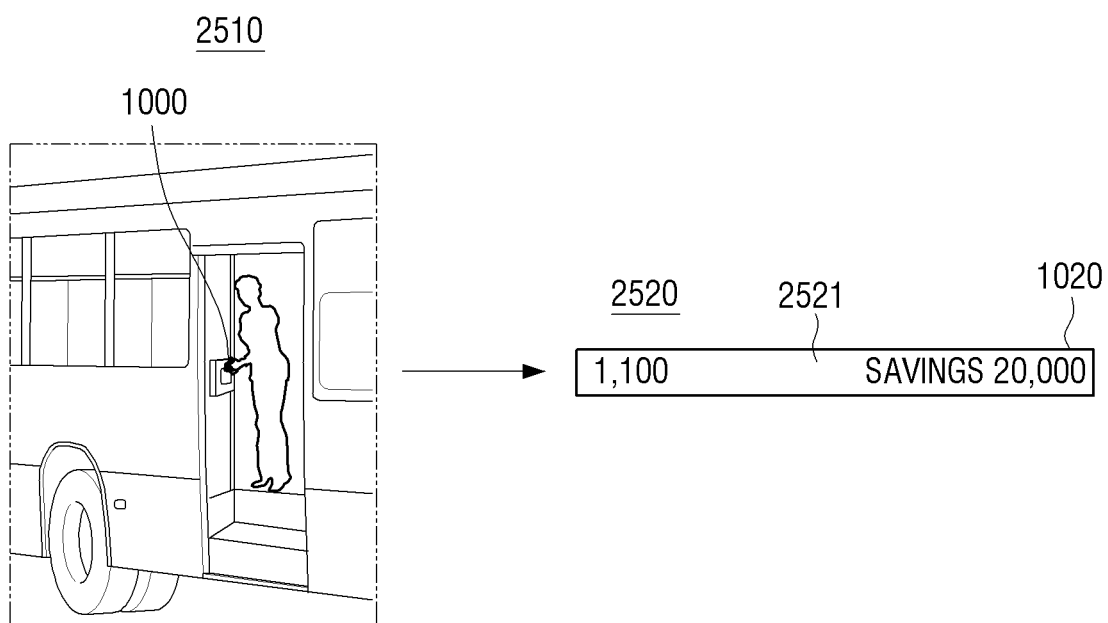
Figure 26:
Figure 27:
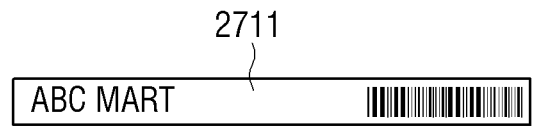

FIGS. 25 to 27 are diagrams explaining exemplary embodiments for displaying an application on the sub area 1020 by considering a security situation of the user terminal device 1000.

In FIGS. 25 to 26, the controller 200 may determine whether the user terminal device 1000 needs a security function. For example, when a user executes a payment application, or performs the mobile paying function by using NFC (near field communication) or barcode, the controller 200 may determine that security is needed for current situation of the user terminal device 1000.

Referring to 2510 of FIG. 25, when a user performs mobile payment to pay fares of the public transportation, the controller 200 may determine the current status of the user terminal device 1000 to request the security. When the fares of the public transportation is paid in 2520 of FIG. 25, the controller 200 may display a message 2521 indicating the approved payment and a balance provided from the payment application on the sub area 1020. During this process, the screen of the main area 1010 may be turned off or display information irrelevant to the payment application. For example, when a user performs a mobile payment while viewing multimedia contents, the multimedia contents may continue to be displayed on the main area 1010, and the above described message 2521 may be displayed on the sub area 1020.

FIG. 26 illustrates an example of when a user purchases goods by using an electronic wallet application at a market or shopping mall. Referring to 2610 of FIG. 26, when the user executes the electronic wallet application at a market, the controller 200 may determine the current status of the user terminal device 1000 to request the security. When the electronic wallet application is executed in 2620 of FIG. 26, the controller 200 may display card information 2621 provided from the electronic wallet application on the sub area 1020.

As another example, if there are coupons that a user can use when performing mobile payment, the controller 200 may display coupon information on the sub area 1020. FIG. 27 illustrates that barcode 2231 of the coupon is displayed on the sub area 1020. The coupon image or a list of the other coupons that can be used may be displayed on the main area 1010. Thereby, a user may minimize leakage risk of payment information toward a third party by using the sub area 1020 to display the payment information.

Meanwhile, although the above describes the exemplary embodiments in which various screens are displayed on one or more of the main area 1010 and the sub area 1020 based on the user situation and the surrounding environment of the user terminal device 1000, the screens may be implemented to be displayed based on user intentions.

Figure 28:
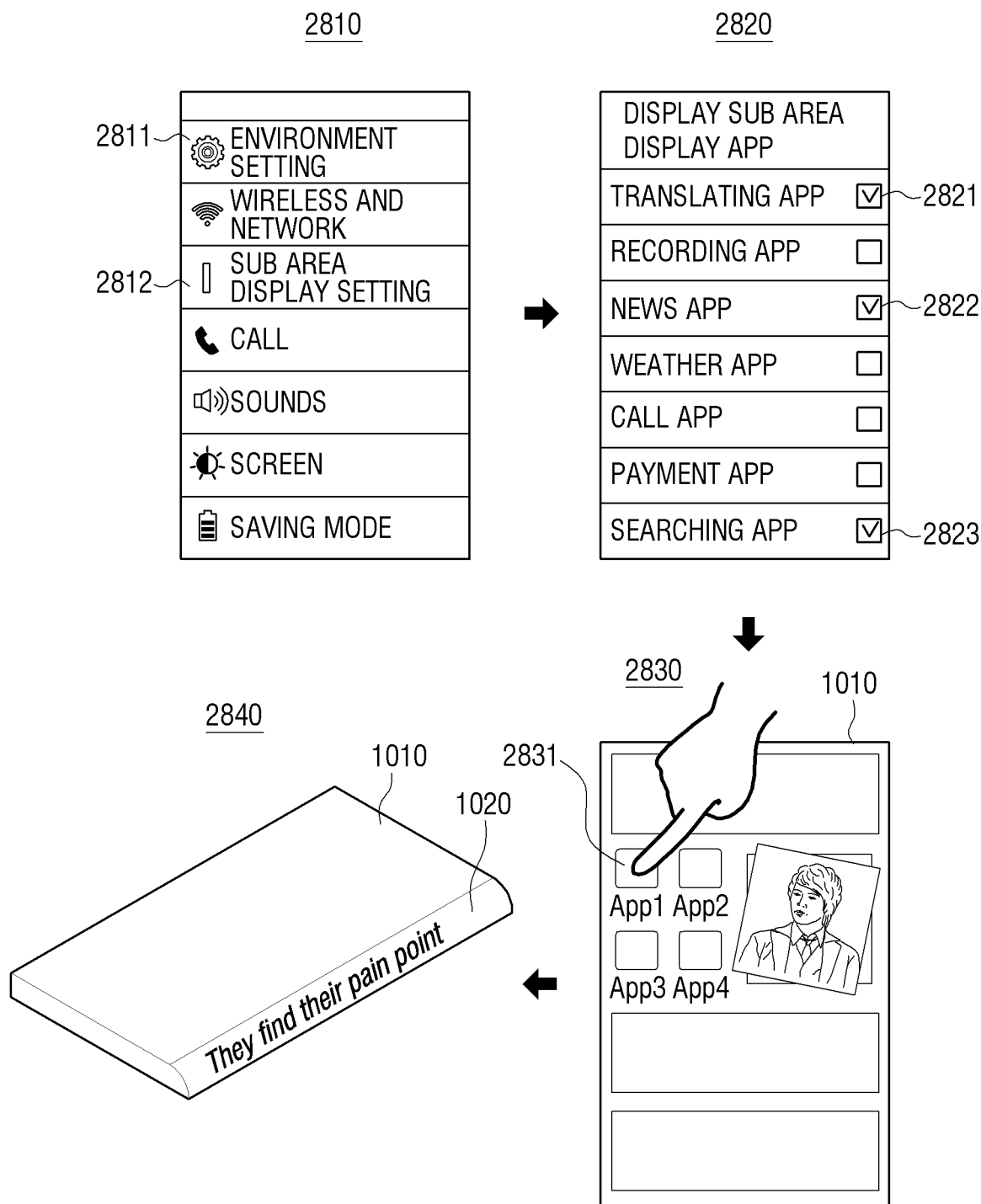
Figure 29:
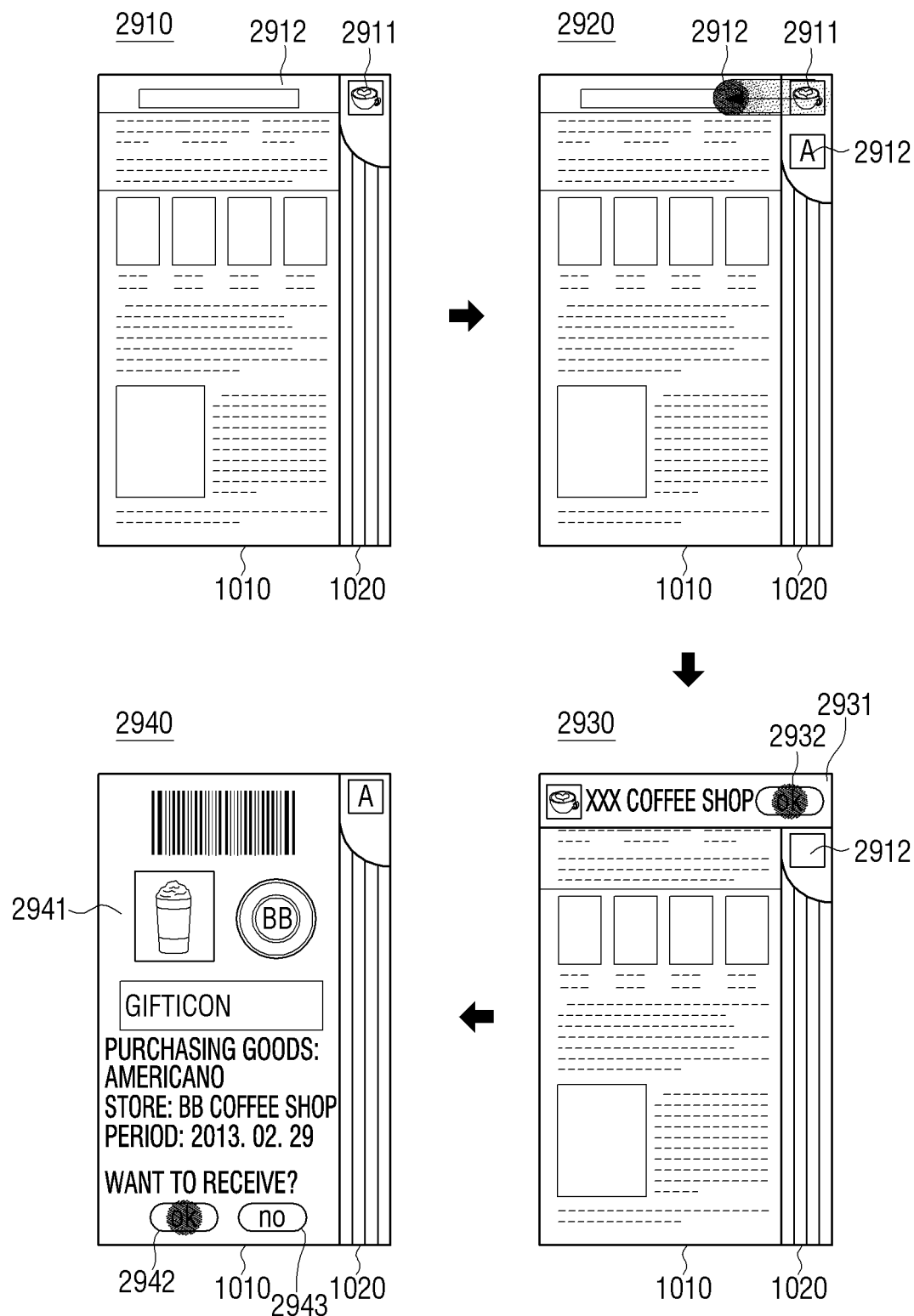

FIGS. 28 and 29 are diagrams explaining an exemplary embodiment to display an application on the sub area by considering user intentions.

In FIGS. 28 and 29, the controller 200 may display an application on the sub area 1020 by considering user intentions. For example, a user may request that battery consumption of the user terminal device 1000 be reduced. Further, the user may request the sub area 1020 to maintain an on state and request to use the user terminal device 1000 as table-set display device. Further, if the current user environment makes it difficult to use the main area 1010, a user may passively establish the executing application to be displayed only on the sub area 1020.

For example, when a user selects an application to execute, the controller 200 may display pop-up window to receive a user selection indicating whether an application is to be displayed on the main area 1010 or the sub area 1020 of the bended touch screen 100. The user may select a button to display on the sub area 1020 in the pop-up window. When the button is selected, the controller 200 displays the executed application on the sub area 1020. Further, if it is sensed that a user performs specific gestures when executing an application, the controller 200 may display the executing application on the sub area 1020.

For example, when a user directly touches an icon corresponding to an application for executing the application and simultaneously touches the sub area 1020 with another finger, the controller 200 may execute the application, and display the executing application on the sub area 1020. Further, a user may designate an application to be displayed on the sub area 1020 from the application list by using environment setting menu or separate menu.

Methods of displaying an application on the sub area 1020 according to user intentions are not limited to the above examples and those skilled in the art may implement various other exemplary embodiments within the technical scope of the exemplary embodiments.

FIG. 28 is a diagram provided to explain a method in which a user establishes an application to be displayed on the sub area. When the user selects a menu for environment setting, the controller 200 may display the environment setting menu 2811 including various menus that can be established as illustrated in 2810 of FIG. 28. The user may select sub area display setting menu 2812 on the environment setting menu 2811 of the user terminal device 1000. Although FIG. 28 illustrates that the sub area display setting menu 2811 is included in the environment setting menu 2811, it is not limited thereto. Thus, according to another exemplary embodiment, the sub area display setting menu 2812 may be entered by using an application other than the environment setting menu 2811.

When a user selects the sub area display setting menu 2812, the controller 200 displays the screen in which various applications to be displayed on the sub area 1020 can be selected, as illustrated in 2820 of FIG. 28. In 2820 of FIG. 28, the user may select one or more of applications 2821, 2822, 2823 to be displayed on the sub area 1020 when being executed. FIG. 28 illustrates that the translating application 2821, the news application 2822, and the searching application 2823 are selected.

The user may select various objects such as icons or texts from the screen displayed on the main area 1010 in 2830 of FIG. 28, and execute a specific application 2831. During this process, the controller 200 may determine whether the application 2831 is designated to be displayed on the sub area 1020. According to the determined result, when the application 2831 is designated to be displayed on the sub area 1020, the controller 200 may execute and display the application 2831 on the sub area 1020, as illustrated in 2840 of FIG. 28. For example, the sub area 1020 may display news information, alarm information, or weather information while being scrolled toward a certain direction.

Further, when the user terminal device 1000 operates as table-set display device, the sub area 1020 displaying the application may keep displaying the application without entering the screen-off state until another user input is performed.

For example, when the previously designated application is the translation application 2821, dialogue descriptions with a foreigner may be automatically translated and displayed on the sub area 1020. Accordingly, a user may have talks with a foreigner using another language while the user terminal device 1000 is placed on a table.

Meanwhile, according to another exemplary embodiment, the user terminal device 1000 may display alarm information on the sub area by considering its priority order. FIG. 29 is a diagram provided to explain an exemplary embodiment which displays an application on the sub area 1020 by considering the priority order of alarm information. The controller 200 may receive various alarm information from external devices. The alarm information may have a certain priority order according to a user setting or predetermined standard. For example, information with high importance such as a call or text message may have high priority, and information with low importance such as advertising, local information or SNS information may have low priority. In this case, alarm information with high priority may be displayed on the main area 1010, and alarm information with low priority may be displayed on the sub area 1020. Referring to 2910 of FIG. 29, the controller 200 may display the received alarm information 2911 on the sub area 1020. During this process, the displayed application 2912 may be continued to be displayed on the main area 1010.

2920 of FIG. 29 illustrates that two alarm information 2911, 2921 are displayed on the sub area 1020. A user may select one of the alarm information 2911, 2921 which are being displayed on the sub area 1020. For example, a user may touch and drag the alarm information 2911 from the sub area 1020 to the main area 1010 to select it. In this case, the controller 200 may display detailed information of the selected alarm information 2911 on the main area 1010. 2930 of FIG. 29 illustrates that the detailed information 2931 of the selected alarm information 2911 is displayed on the main area 1010.

For example, when the alarm information 2911 is information indicating that a coupon has arrived, the detailed information 2931 displayed on the main area 1010 may include one or more from places and times where the coupon can be used, and a button 2932 for viewing the coupon image. The user may select the button 2932 in order to view the coupon image. 2940 of FIG. 29 illustrates that the user selects the button 2932. In this case, the controller 200 may provide the coupon image 2941 on the main area 1010. The coupon image 2941 may include a receive button 2942 and a cancel button 2943, as well as detailed information regarding the coupon. The user may select the receive button 2942 if they want to receive the coupon. In this case, the controller 200 may provide benefits corresponding to the coupon to the user. For example, if it is free gift coupon, the controller 200 may expand and display the effective number or the barcode to receive free gift so that a third party can recognize the coupon through a POS (point of sales) device. Further, if it is discount coupon, the controller 200 may calculate the payment price by applying the corresponding discount rate to the discount coupon, and process the electronic payment. Further, the controller 200 may provide various other services according to types of coupons.

According to the various exemplary embodiments as described above, the user terminal device 1000 may display various screens by using the main area 1010 and the sub area 1020. Specifically, various applications or alarm information may be displayed on the sub area 1020. Meanwhile, as described above, the sub area 1020 may be implemented to be more than one area, and connected with the main area 1010 by various angles. Thus, the three-dimensional interaction screen may be displayed by using the sub area 1020.

The following will explain exemplary embodiments which can display a three-dimensional interaction screen.

According to another exemplary embodiment, the controller 200 of the user terminal device 1000 may receive signals requesting displaying of the screen constituted with a plurality of pages or a plurality of layers. Herein, a plurality of layers refers to virtual display screens which are consecutively integrated, and a plurality of pages refers to units of screens which are horizontally connected on one layer. For example, one layer may include a plurality of pages. Signals to request displaying the screen constituted with a plurality of pages or a plurality of layers may be signals generated by a user pushing a home button or unlocking the screen in the lock screen situation. The controller 200 may display main contents of the contents provided from the application on the main area 1010 and sub contents of the contents on the sub area 1020, in response to the requesting signals. The sub contents may be contents related with the main contents, and objects indicating one side of the main contents so that the main contents can be displayed dimensionally. Thus, one three-dimensional interaction screen may be generated by combining the main contents and the sub contents.

Figure 30:
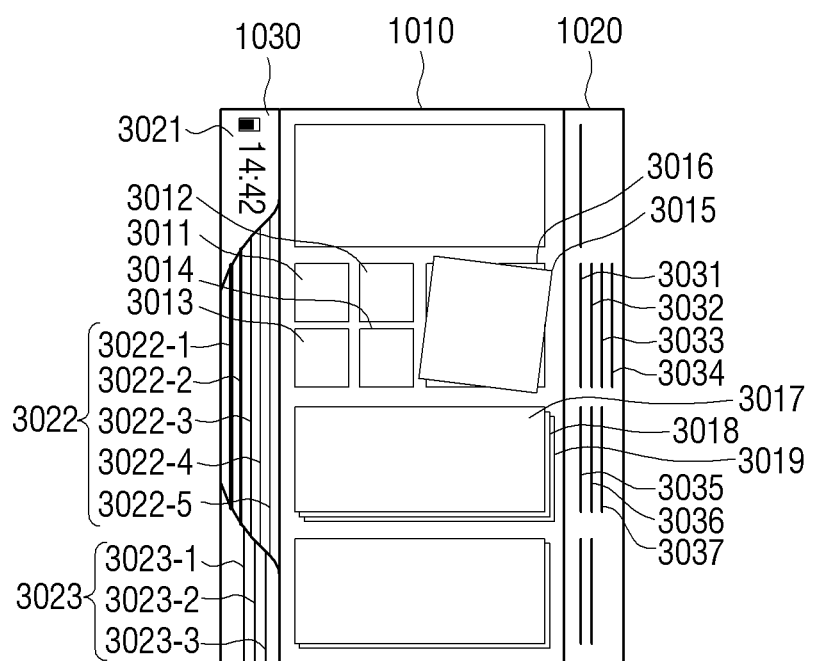

FIG. 30 is a diagram of the screen constituted with a plurality of layers according to an exemplary embodiment.

The screen constituted with a plurality of layers may be displayed on the main area 1010 and the sub areas 1020, 1030 of the bended touch screen. Referring to FIG. 30, contents provided by widget or direct icons may be displayed on the main area 1010 of the screen constituted with a plurality of layers. For convenient explanation, the exemplary embodiment uses the same drawing reference numerals as those illustrated in the above other exemplary embodiments.

The sub areas 1020, 1030 may include the first sub area 1020 displaying an object illustrating that contents included in the first layer among a plurality of layers are piled up, and the second sub area 1030 displaying an object illustrating that a plurality of layers are piled up. Although FIG. 30 illustrates that both sides of the main area 1010 connects to the two sub areas 1020, 1030, number and position of the sub areas may be variously modified according to size, type, and features of the user terminal device 1000, as described above. According to another exemplary embodiment, only one sub area among the first sub area 1020 and the second sub area 1030 may be provided.

Referring to FIG. 30, the main area 1010 may display one or more from the main contents 3015~3019 included in the first layer among a plurality of layers and the direct icons 3011~3014.

A plurality of layers may be divided per category according to types of contents respectively provided from a plurality of layers. For example, a plurality of layers may be divided into a contextual category, a media contents category, an SNS category, and a 'my favorite category.' The contextual category may provide event preview images based on images. The media contents category may provide dynamic images that can be directly controlled by a user. The SNS category may phase providing information, optimize to the information area, and provide the information. The 'my favorite category' may provide widgets that a user requests, frequently used applications, or the call function.

The main contents 3015~3019 may be provided by widgets included in the first layer. The main contents may be updated at real time; for example, weather, messages, SNS, memos or pictures may be information. When the main contents are plural, the main area 1010 may display that a plurality of main contents 3015~3019 is piled up. For example, the main area 1010 may simultaneously display at least part of each of the plurality of main contents 3015~3019. The important content 3015 among the main contents 3015~3019 may be separately displayed to a user so as to be distinguished from the other contents 3016~3019. When the user performs gestures to select and twist the important content 3015, the important content 3015 may be modified so as to be visually distinguished from the other contents 3016~3019. For example, as illustrated in FIG. 30, the controller 200 may rotate the important content 3015 by a certain angle and display.

The direct icons 3011~3014 may be arranged and displayed on a part of the main area 1010. In this case, when the user selects one icon among the direct icons 3011~3014, and performs gestures to expand size of the icon (e.g., pinch gestures or spread gestures), a widget may be automatically generated according to the expanded size. Further, the main contents provided by the generated widget may be displayed on all of the main area 1010.

Figure 31:
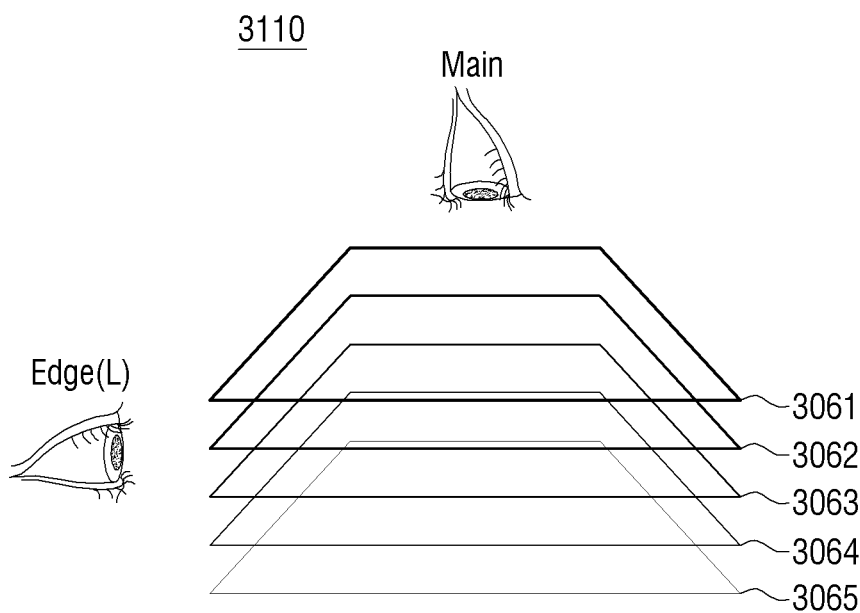
Figure 31:
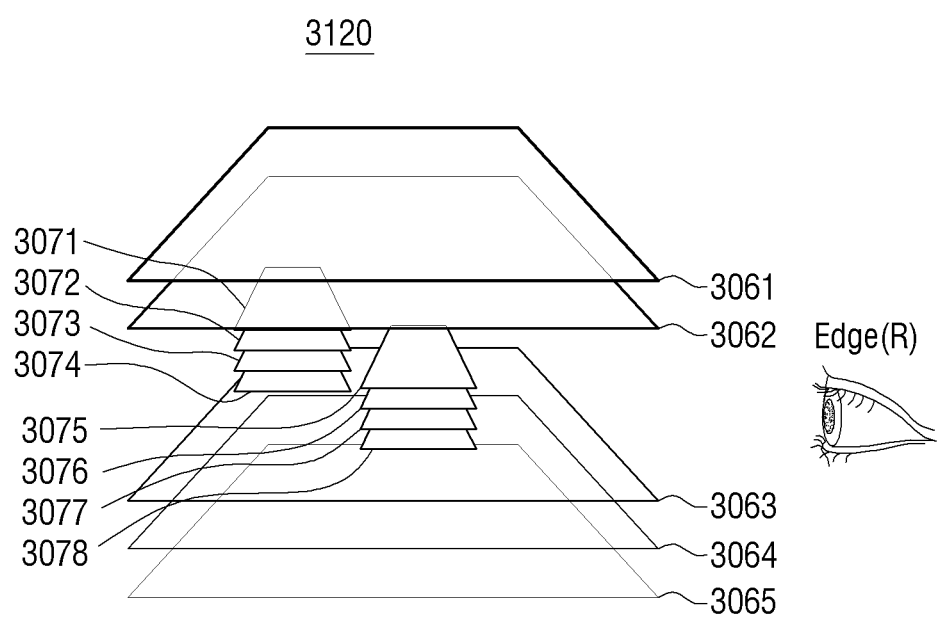

Further, referring to 3110 of FIG. 31, the second sub area 1030 may include one or more of a status area 3021, a category index area 3022, and a running app area 3023. The status area 3021 is area informing of the current status of the user terminal device 1000; for example, information regarding the amount of charge remaining in the battery and current time may be included. The category index area 3022 may display objects 3022-1~3022-5 illustrating that a plurality of layers are piled up.

Referring to the category index area 3022 of FIG. 30, it is clearly illustrated that 5 layers in total are consecutively piled on the main area 1010. The objects 3022-1~3022-5 respectively corresponding to a plurality of layers may be expressed in different colors from each other. Among the objects 3022-1~3022-5 respectively corresponding to a plurality of layers, the object 3022-5 corresponding to the first layer which is currently displayed on the main area 1010 may be highlighted and displayed. The running app area 3023 may display the objects 3023-1, 3023-2, 3023-3 illustrating that currently executing applications are piled up. The application displayed on the main area 1010 may be highlighted and displayed. The running app area 3023 may be provided only when there is executing application, and the objects corresponding to the executing application on the background may not be displayed on the running app area 3023.

Referring to FIG. 30, the first sub area 1020 may display sub contents 3031~3037 related with main contents 3015~3019 which are displayed on the main area 1010. For example, when the main content 3017 is provided through a widget included in the first layout, the first sub area 1020 may display the objects 3035~3037 illustrating that contents that can be provided from the widget are piled up. Meanwhile, the first sub area 1020 may respectively display the first objects 3031~3034 provided from the first widget among a plurality of widgets and the second objects 3035~3037 provided from the second widget among a plurality of widgets. The first objects 3031~3034 and the second objects 3035~3037 may be adjacent and displayed.

For example, as illustrated in FIG. 30, the first objects 3031~3034 and the second objects 3035~3037 may be parted by a certain interval. Further, although not illustrated in FIG. 30, a marked distinguishing line may be included between the first objects 3031~3034 and the second objects 3035~3037.

FIG. 31 illustrates interaction screens viewed by a user from different directions. 3110 of FIG. 31 illustrates one example of the interaction screen constituted with 5 layers 3061~3065. When the user's gaze is directed toward the user terminal device 1000, the main area 1010 and the sub areas 1020, 1030 may selectively display one from among objects showing side surfaces regarding a plurality of layers 3061~3065, contents 3071~3078 included in the plurality of layers 3061~3065, and objects showing side surfaces regarding the contents.

In 3110 of FIG. 31, the user's gaze may be directed toward the left side surface of the user terminal device 1000. The user may view a plurality of objects respectively showing side surfaces regarding the plurality of layers 3061~3065 through the second sub area 1030. Specifically, as illustrated in FIG. 30, the screen constituted with a plurality of areas 3021, 3022, 3023 may be displayed on the second sub area 1030. Further, the user may view contents included in the layer selected by the user among the plurality of layers 3061~3065 through the main area 1010. Referring to 3110 of FIG. 31, the layer selected by the user may be displayed on the most upper portion so as to be viewable to the user.

3120 of FIG. 31 illustrates the user's gaze directed toward the right side surface of the user terminal device 1000. In this case, the user may view a plurality of objects showing side surfaces of contents that can be provided by widget included in the layer displayed on the main area 1010 through the first sub area 1020. The user may select one from the plurality of objects showing side surfaces regarding the plurality of layers 3061~3065 displayed on the first sub area 1020. In this case, while the Z axis is expanding based on the layer corresponding to the selected object, objects showing side surfaces of contents 3071~3078 that can be provided by widget included in the corresponding layer may be displayed, as illustrated in 3120 of FIG. 31. Such objects may be expressed in various formats 3031~3037 as illustrated in FIG. 30.

Meanwhile, as described above, a plurality of layers may be respectively constituted with one or more pages. When a plurality of pages are included in the currently selected layer, a user may freely navigate a plurality of pages.

Figure 32:
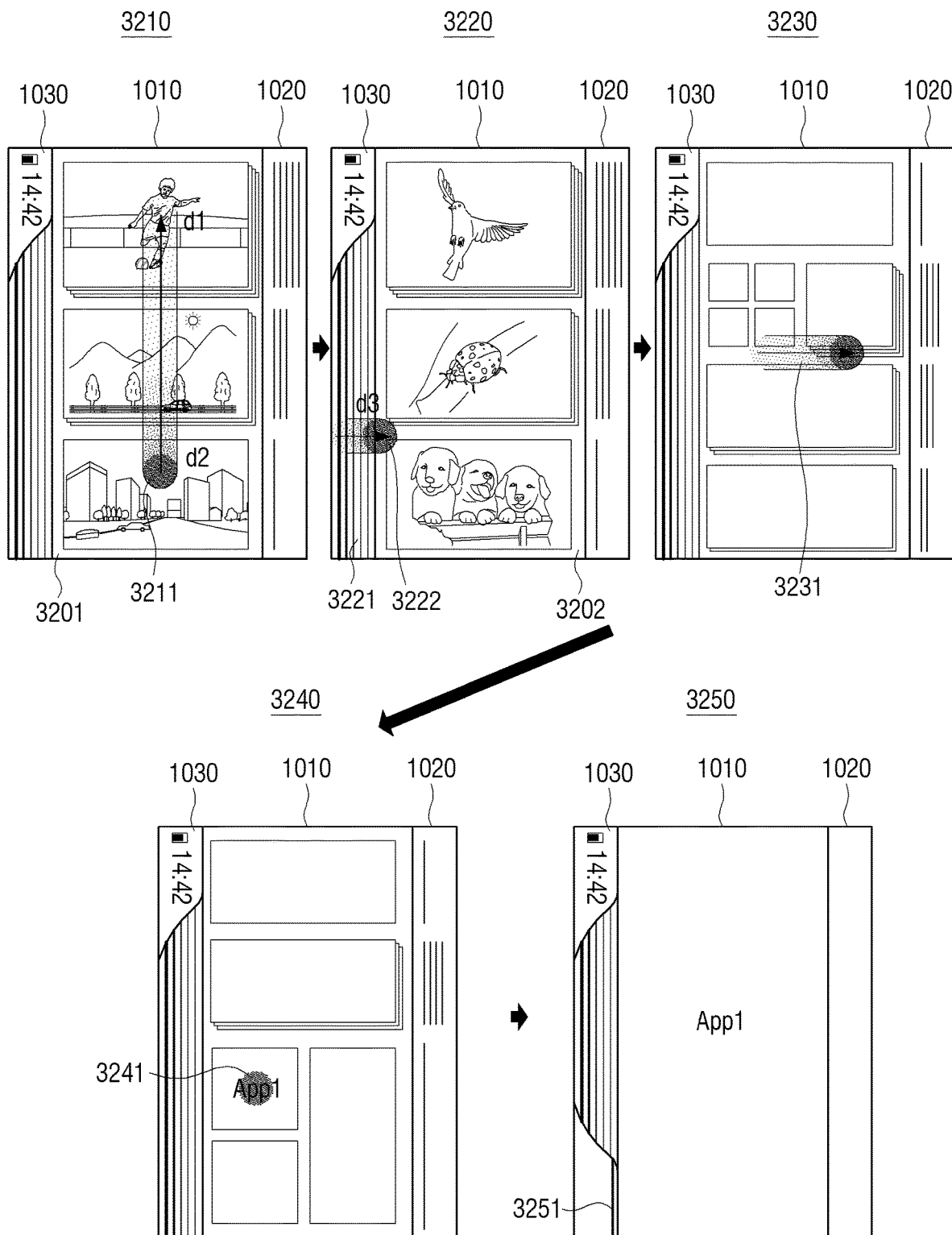

FIG. 32 is a diagram provided to explain how a user navigates the screen constituted with a plurality of pages or a plurality of layers in the user terminal device 1000 according to an exemplary embodiment.

Referring to 3210 of FIG. 32, the controller 200 consecutively integrates and displays a plurality of layers on the main area 1010. When the first layer is positioned on the most upper portion, the controller 200 may display main contents included in a first page 3201 among a plurality of pages included in the first layer. The user terminal device 1000 may receive user gesture (e.g., dragging gestures or flicking gestures) 3211 toward one direction (e.g., d1 or d2) on the main area 1010.

Referring to 3220 of FIG. 32, the controller 200 may display the main contents included in a second page 3202 among a plurality of pages on the main area 1010 in response to the user gesture 3211. In 3220 of FIG. 32, the user terminal device 1000 may receive a user gesture 3222 to select one object 3221 among objects respectively corresponding to a plurality of layers displayed on the second sub area 1030. 3220 of FIG. 32 illustrates that the user inputs the dragging gesture 3222 by touching one object 3221 and dragging it in a direction d3.

When the dragging gesture 3222 is inputted, the selected object 3221 may be highlighted and displayed so as to be visually distinguished from the other objects. The controller 200 may move the object 3221 and the highlight mark according to the dragging direction toward the main area 1010. When touch of the dragging gesture 3222 is lifted off the screen while the object 3221 is displayed on the main area 1010, the main area 1010 may display main contents of the second layer corresponding to the selected object 3221. The controller 200 may move the second layer corresponding to the selected object 3221 according to the user gesture 3222 on the most upper portion among the plurality of layers. Referring to 3230 of FIG. 32, the controller 200 may display the main contents included in the second layer on the main area 1010 in response to the user gesture 3222.

The user terminal device 1000 may receive input user gesture (e.g., dragging gestures or flicking gestures) 3231 toward a certain direction on the main area 1010. The controller 200 may display contents included in a layer prior or posterior to the second layer displayed on the most upper portion among the plurality of layers according to the direction of the user gesture 3231 on the main area 1010. For example, when the user gesture 3231 is directed toward the right side as in 3230 of FIG. 32, a layer posterior to the second layer, i.e., the third layer placed under the second layer among the plurality of layers, may be displayed on the main area 1010. Meanwhile, when the user gesture 3231 is directed toward the left side, a layer prior to the second layer, i.e., a layer placed above the displayed second layer among the plurality of layers, may be displayed on the main area 1010. When there is no layer above the second layer, it may display a layer placed on the most lower layer among a plurality of layers. In other words, the plurality of layers may be consecutively displayed in rotating format according to the user gesture 3231.

In 3240 of FIG. 32, the third layer may be displayed on the main area 1010 among the plurality of layers in response to the user gesture 3231. The user terminal device 1000 may receive input user gesture (e.g., tapping gestures) 3241 to select one from among widgets or direct icons displayed on the main area 1010.

In 3250 of FIG. 32, the application (i.e., "App1") corresponding to the selected widget or icon may be executed and displayed on the main area 1010 in response to the user gesture 3241. During this process, object 3251, which corresponds to the currently executing application, may be displayed on the second sub area 1030. A user interface to control the displayed application may be displayed on the first sub area 1020.

Figure 33:
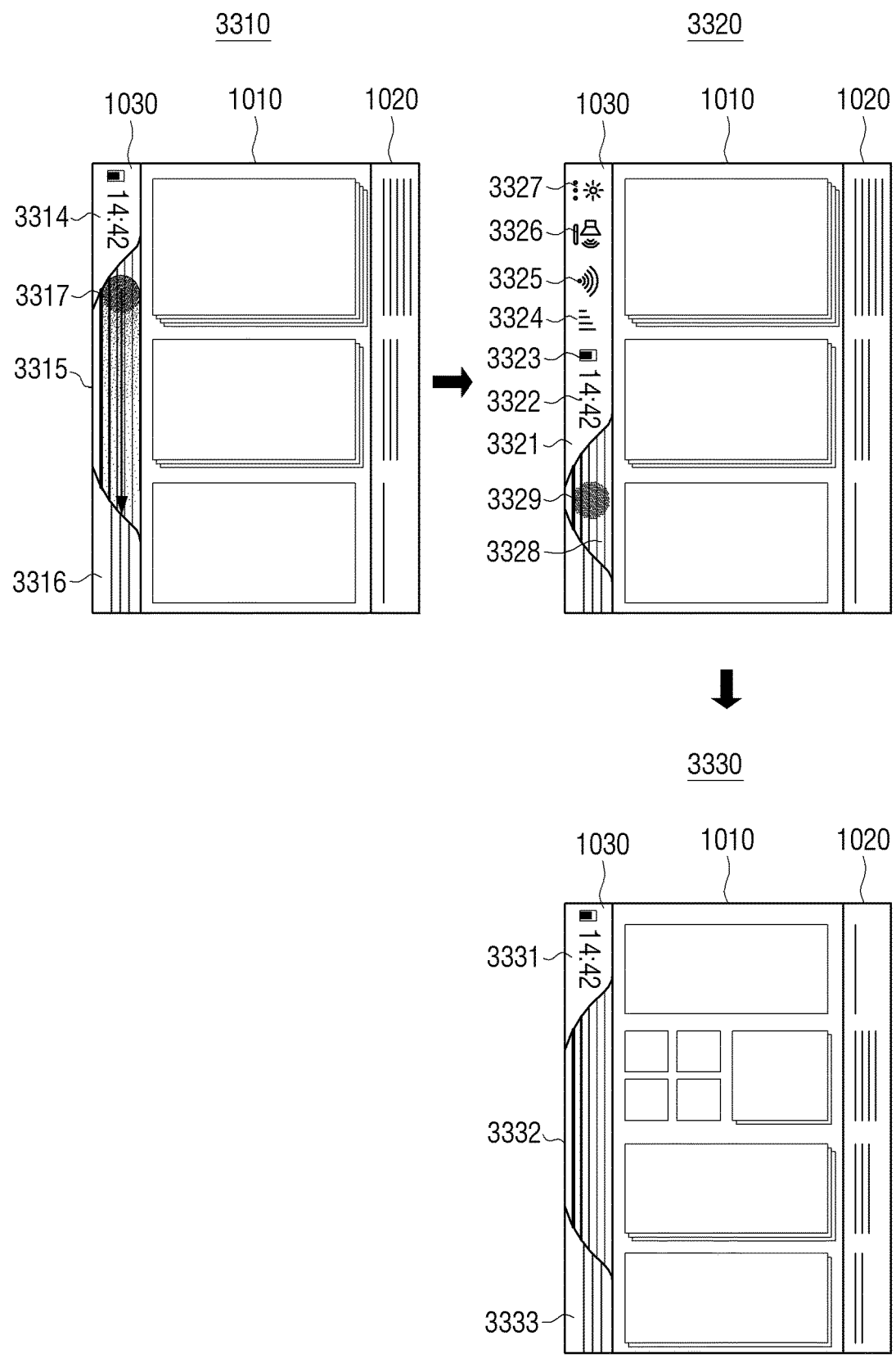

FIG. 33 is a diagram of a user modifying information displayed on the sub area according to an exemplary embodiment.

Referring to 3310 of FIG. 33, the second sub area 1030 may include a plurality of areas. For example, the first sub area 1020 may include the status area 3314, the category index area 3315, and the running app area 3316. The user terminal device 1000 may receive input user gesture 3317 touching and dragging the status area 3314 or boundary between the status area 3314 and the category index area 3315.

Referring to 3320 of FIG. 33, the status area 3314 of the second sub area 1030 may be expanded in response to the user gesture 3317. For example, the controller 200 may expand the status area 3314 to a position where a user drags and lifts off the touch gesture. As the status area 3314 expands, sizes of the category index area 3315 and the running app area 3316 on the second sub area 1030 may made be relatively smaller.

The expanded status area 3321 may include more information as compared to previously displayed information. For example, in addition to current time information 3322 and battery remaining amount information 3323 displayed on the status area 3314 before being expanded, one or more of network connecting information 3324, nearfield network connecting information 3325, volume information 3326, or brightness information 3327 may be further displayed on the expanded status area 3321. Each of the information 3322~3327 may be consecutively displayed as the status area 3314 is expanded. The user terminal device 1000 may receive user gesture (e.g., tapping gestures) 3329 selecting one of the objects corresponding to a plurality of layers displayed on the reduced category index area 3315 of the second sub area 1030.

Referring to 3330 of FIG. 33, the controller 200 may display main contents included in the second layer corresponding to the selected object on the main area 1010 in response to the user gesture 3329. Further, the status area 3331, the category index area 3332 and the running app area 3333 may return to how they were displayed before being expanded and displayed on the second sub area 1030. Thus, while the layer displayed on the main area 1010 changes, the second sub area 1030 may respectively display the status area 3331, the category index area 3332, and the running app area 3333 in predetermined sizes.

Figure 34:
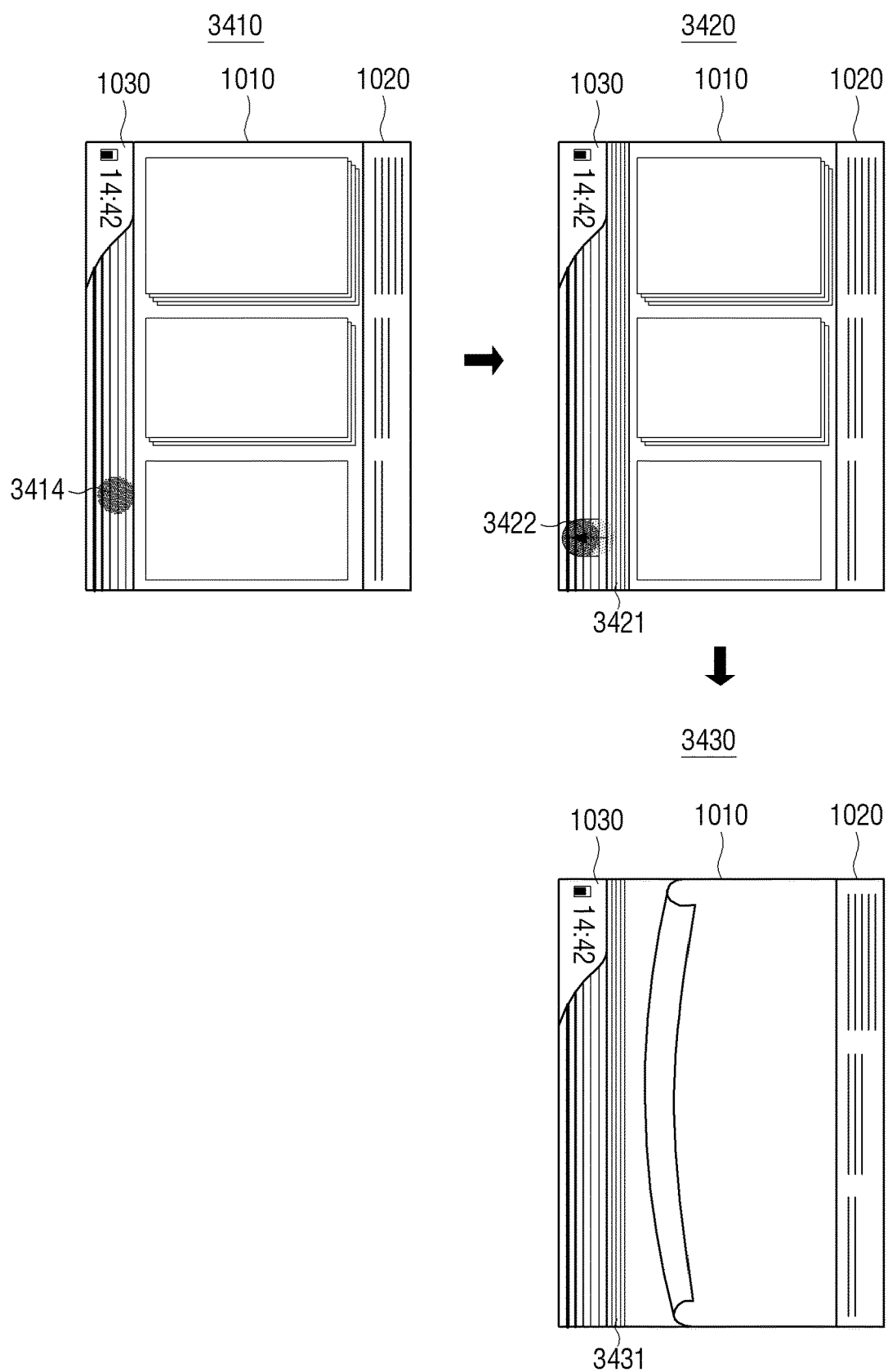
Figure 35:
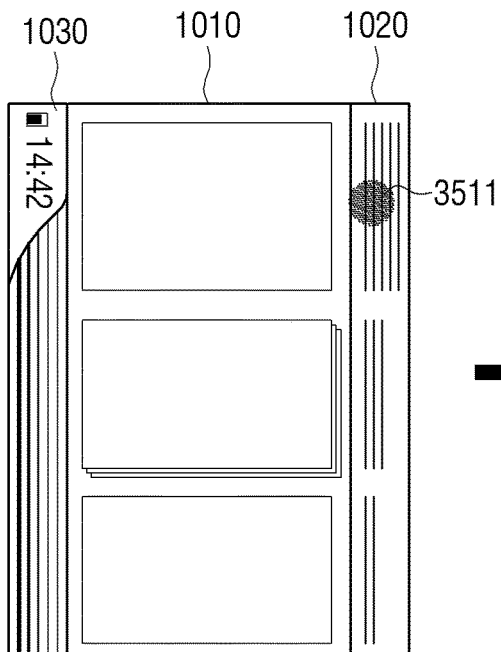
Figure 35:
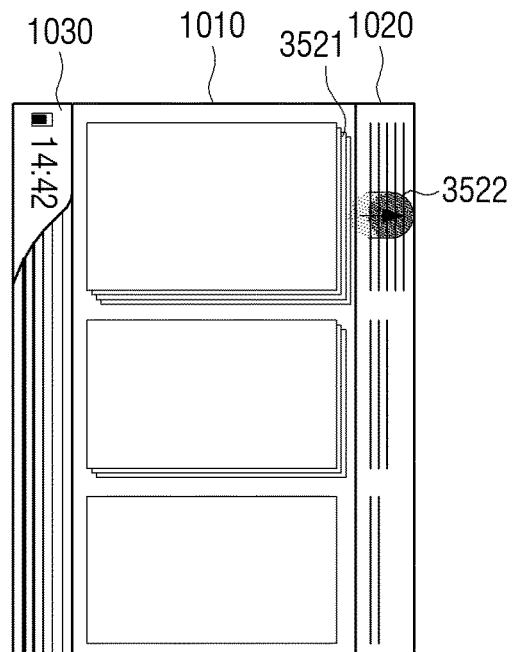
Figure 35:
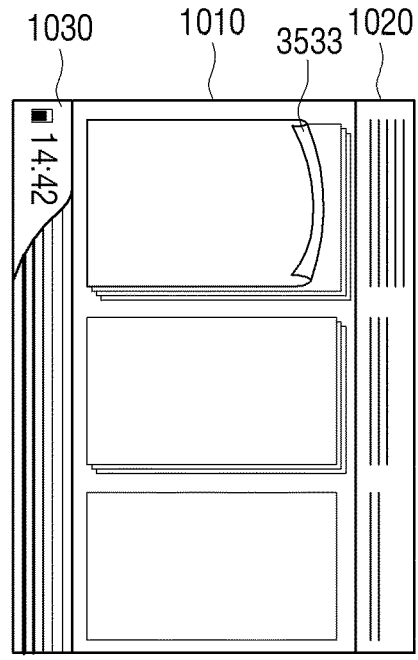

A user may perform various interactions by using the sub areas 1020, 1030. FIGS. 34 and 35 are diagrams explaining a method previewing layers or contents according to another exemplary embodiment.

Referring to 3410 of FIG. 34, the bended touch screen 100 may include the main area 1010, the first sub area 1020, and the second sub area 1030. The main area 1010 displays a plurality of layers and the second sub area 1030 displays a plurality of objects corresponding to the plurality of layers. The user terminal device 1000 may receive input user gesture (e.g., long-tapping gestures) 3414 touching one or more of the plurality of objects displayed on the second sub area 1030 for more than a certain time. For example, the certain time may be more than 1 second.

3420 of FIG. 34 is a diagram of an operation of the user terminal device 1000 according to the user gesture 3414. Referring to 3420 of FIG. 34, the controller 200 may display preview image 3421 regarding one or more layers excluding the layer displayed on the main area 1010 in response to the user gesture 3414. For example, the preview image 3421 may show a part of one or more layers placed under the layer displayed on the main area 1010.

Meanwhile, the user terminal device 1000 may receive an input user gesture 3422 (e.g., dragging gestures) by a user touching one or more objects among the objects corresponding to a plurality of layers displayed on the second sub area 1030, and dragging toward one direction. 3430 of FIG. 34 is a diagram of operation of the user terminal device 1000 when the dragging gesture 3422 is inputted. Referring to 3430 of FIG. 34, the controller 200 may display preview image 3431 regarding lower layers while turning one or more layers like a flipbook on the main area 1010 in response to the dragging gesture 3422. The number of the layers and the speed at which they are turned over like a flipbook may be determined according to dragging distance and speed of the user gesture 3422. Thus, when a relatively longer distance is quickly dragged, a larger number of layers may be flipped faster.

Meanwhile, FIG. 35 is a diagram provided to explain an operation when user gestures are inputted on the first sub area 1020. More specifically, 3510 of FIG. 35 illustrates that various contents provided by the first application are displayed on the main area 1010 and objects corresponding to the contents of the first application displayed on the main area 1010 are displayed on the first sub area 1020.

Referring to 3510 of FIG. 35, the user terminal device 1000 may receive input user gesture (e.g., long-tapping gestures) 3511 by a user touching one or more contents for more than a certain time among a plurality of contents on the first sub area 1020. In 3510 of FIG. 35, the controller 200 may display preview image 3521 on the main area 1010 regarding other contents from the contents provided by the first application in response to the user gesture 3511. For example, the preview image 3521 may be a part of other contents from the contents displayed on the main area 1010. Meanwhile, the user terminal device 1000 may receive input user gesture (e.g., dragging gestures) 3522 by a user touching one or more among a plurality of objects displayed on the first sub area 1020 for more than a certain time, and dragging the touch toward one direction. Referring to 3530 of FIG. 35, the controller 200 may display other contents or preview image 3533 of other contents while turning the contents displayed on the main area 1010 like a flipbook in response to the user gesture 3522. The number of contents and the speed at which the contents are turned over like a flipbook may be determined according to the dragging distance and speed of the user gesture 3522.

According to another exemplary embodiment, a user may mark contents on the main area by using the sub area.

Figure 36:
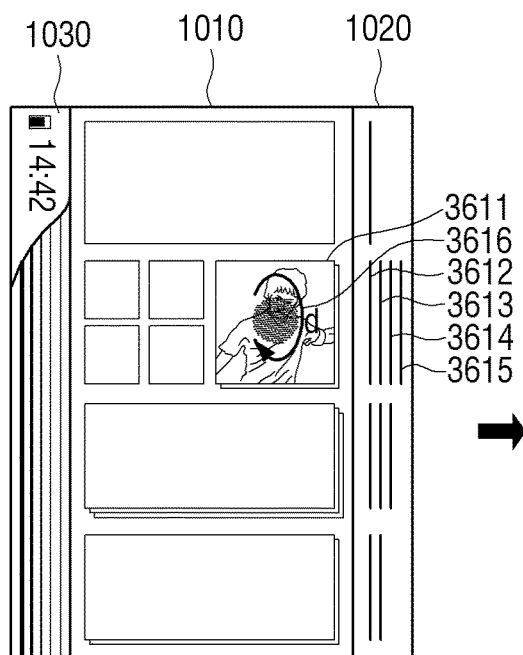
Figure 36:
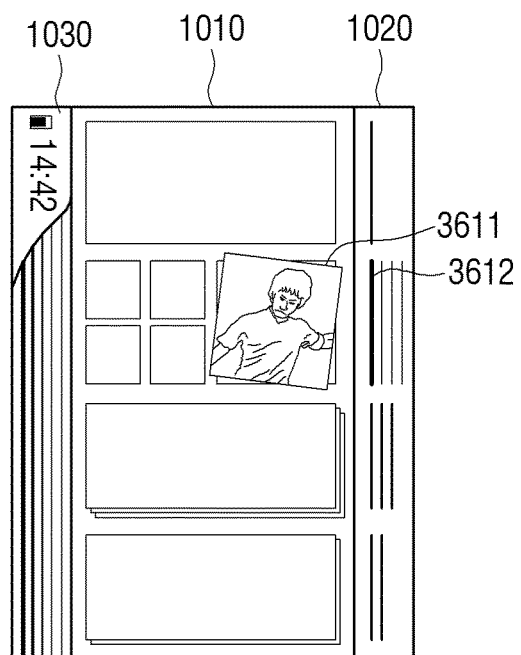
Figure 36:
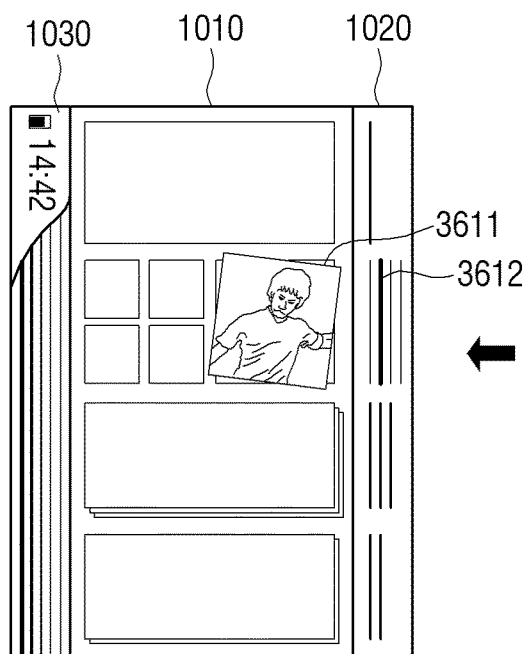
Figure 36:
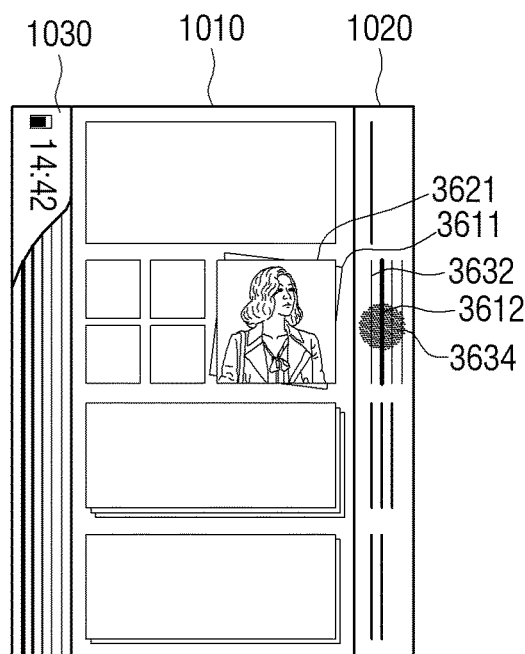

FIG. 36 is a diagram provided to explain an operation of the user terminal device 1000 according to such an exemplary embodiment. Referring to 3610 of FIG. 36, the bended touch screen 100 may include the main area 1010, the first sub area 1020, and the second sub area 1030. The main area 1010 may display one or more main contents 3611 provided by an application. The first sub area 1020 may display sub contents 3612~3615 that can be provided by an application. In this process, a user may perform twisting the main content 3611 displayed on the main area 1010 in order to mark specific contents. For example, the user may perform gesture (e.g., twisting gestures) 3616 to rotate the main content 3611 by a certain angle in a "d" direction while touching the main content 3611.

Referring to 3620 of FIG. 36, the controller 200 may display the main content 3611 so as to be visually distinguished from the other contents in response to the user gesture 3616. In 3620 of FIG. 36, the marked main content 3611 may be displayed on the main area 1010 while being rotated by a certain angle. The rotating angle may be uniform to the rotating angle of the user gesture; however, it is not limited thereto. For example, when the rotating angle of the user gesture is more than a certain angle, the controller 200 may rotate the main content 3611 by a predetermined angle.

Further, the controller 200 may display the sub content 3612 related with the marked main contents 3611 so as to be visually distinguished from the other sub contents 3614, 3615, 3616. For example, the sub content 3612 may be displayed in a curved format, a projected format, or a highlighted format so that a user can intuitively recognize the marked sub content. 3620 of FIG. 36 illustrates that the marked sub contents 3612 is displayed in a format bolder than the format of the other sub contents 3614, 3615, 3616.

Meanwhile, the user terminal device 1000 may generate or receive new contents. For example, when a user photographs a picture or receive new contents from external devices by using the user terminal device 1000, the user terminal device 1000 may generate or receive new contents. 3630 of FIG. 36 illustrates that a new content is received. Referring to 3630 of FIG. 36, the controller 200 may display new content 3621 overlapped on the marked main contents 3611 displayed on the main area 1010. In this case, the sub content 3632 related with the new content 3621 may be displayed on the first sub area 1020. Next, the user terminal device 1000 may receive user gesture (e.g., tapping gestures) 3634 selecting the sub content 3612 related with the marked main content 3611 among a plurality of sub contents displayed on the first sub area 1020.

Referring to 3640 of FIG. 36, the controller 200 may display the marked main content 3611 related with the marked sub content 3612 again on the main area 1010 in response to the user gesture 3634 to select the marked sub content 3612. Thus, when the marked sub content 3612 is displayed so as to be distinguished from the other sub contents on the first sub area 1020, a user may quickly display the marked main content 3611 on the main area 1010 by selecting the marked sub content 3612.

Figure 37:
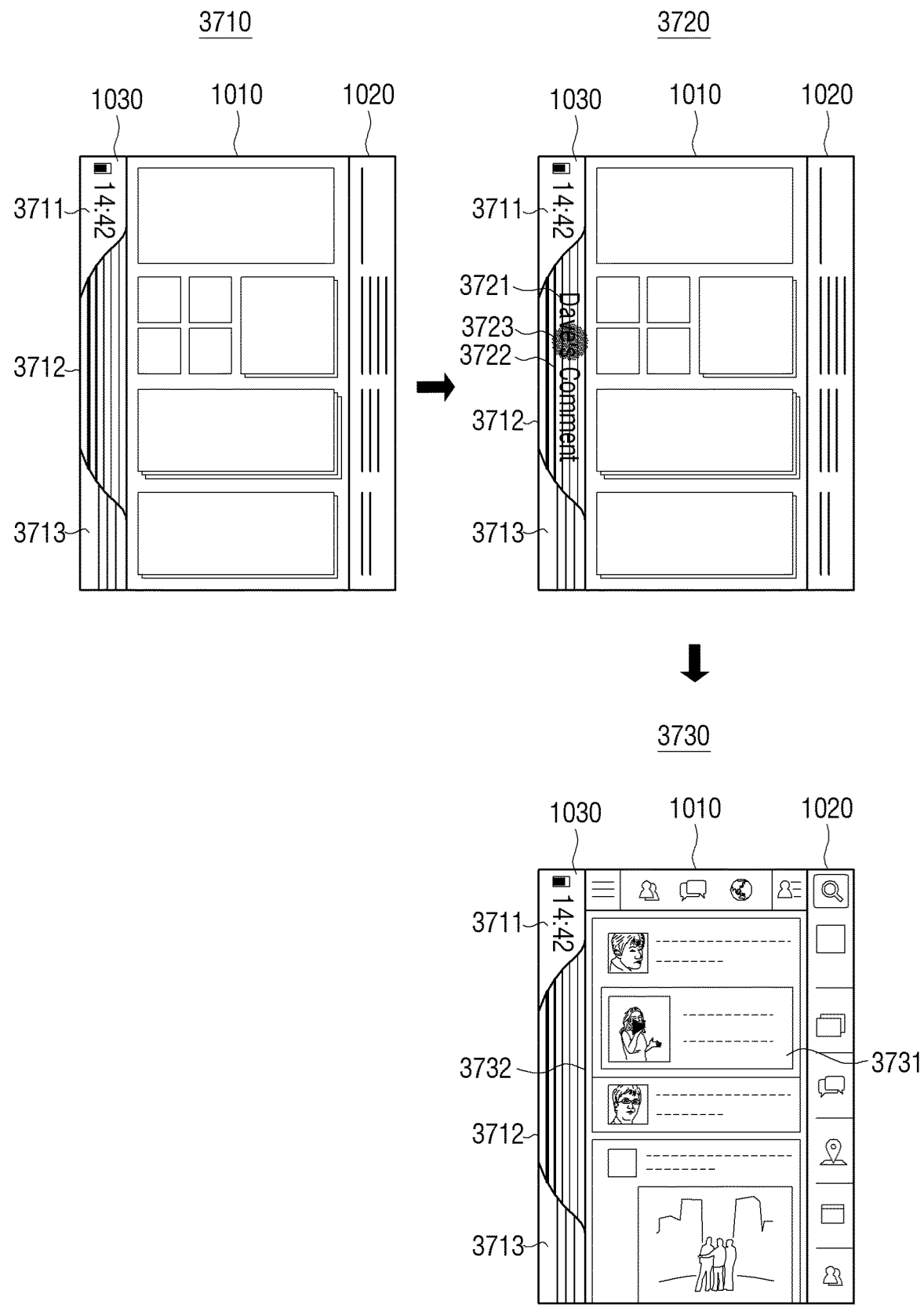

FIG. 37 is a diagram provided to explain a method of displaying alarm information of the user terminal device 1000 according to another exemplary embodiment. Referring to 3710 of FIG. 37, the bended touch screen 100 may include the main area 1010, the first sub area 1020, and the second sub area 1030. The second sub area 1030 may include the status area 3711, the category index area 3712, and the running app area 3713. The user terminal device 1000 may receive notification information or alert information while displaying information on the main area 1010, the first sub area 1020, and the second sub area 1030.

Referring to 3720 of FIG. 37, the controller 200 may display the notification information or the alert information on the second sub area 1030 of the bended touch screen 100 in response to the notification information or the alert information. For example, the status area 3711 may display the notification information or the alert information related with the OS of the user terminal device 1000. The running app area 3713 may display the notification information or the alert information regarding the executing application. Further, the category index area 3712 may highlight and display objects related with the notification information or the alert information among the objects corresponding to a plurality of layers. 3720 of FIG. 37 illustrates that the object 3721 corresponding to the layer including the application related with the notification information or the alert information is highlighted and displayed. For example, the object 3721 may be displayed while slowly flashing. In this process, the category index area 3712 may display preview information 3722 related with the notification information or the alert information. For example, at least some of the notification information or the alert information may be automatically scrolled toward one direction and displayed on the second sub area 1030.

Meanwhile, when the layer including the application related with the notification information or the alert information is layer currently displayed on the main area 1010, the controller 200 may display the main contents or widgets related with an application corresponding with a highlight on the main area 1010.

Further, the first sub area 1020 may highlight and display the sub contents of the contents related with the corresponding application on the first sub area 1020. The highlighted main contents or sub contents may be slowly flashed and displayed.

Meanwhile, a user may voluntarily select an object on the second sub area 1030. For example, in 3720 of FIG. 37, the user terminal device 1000 may receive input user gesture (e.g., tapping gestures) 3723 to select one object 3721 on the category index area 3712. The user gesture 3723 may be performed while the object 3721 is highlighted and displayed. The highlight of the object 3721 may be automatically removed after a certain time.

The controller 200 may display the layer corresponding to the selected object 3721 on the main area 1010 in response to the user gesture 3723 as illustrated. If there is no object corresponding to the layer including the application related with the notification information or the alert information on the second sub area 1030, when a user selects the second sub area 1030 while displaying the notification information or the alert information, new application 3731 that can control the notification information or the alert information may be executed and displayed on the main area 1010. In this process, a layer corresponding to the newly executing application may be generated, and new object 3732 corresponding to the generated layer may be displayed on the second sub area 1030.

Meanwhile, the notification information or the alert information may be generated or received even when the main screen 1010 and the second sub screen 1030 of the user terminal device 1000 are turned off. In this case, the controller 200 may display the position of the application related with the notification information or the alert information on the second sub area 1030.

Figure 38:
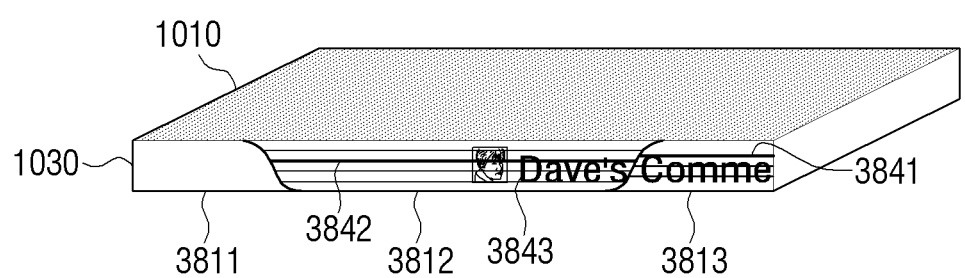

FIG. 38 is a diagram provided to explain an operation of the user terminal device 1000 according to an exemplary embodiment. For example, when an application is executing, the controller 200 may display an object 3841 corresponding to the application to be highlighted on the running app area 3813. Further, the controller 200 may display an object 3842 corresponding to the layer including the application to be highlighted on the category index area 3812. Herein, highlighting the objects 3841, 3842 may be implemented to be flashing objects while slowly fading in or fading out. When the user terminal device 1000 receives the notification information or the alert information, the second sub area 1030 may display at least part 3843 of the notification information or the alert information. For example, at least part 3843 of the notification information or the alert information may be scrolled toward one direction and displayed on the status area 3811, the category index area 3812, and the running app area 3813 of the second sub area 1030.

Figure 39:
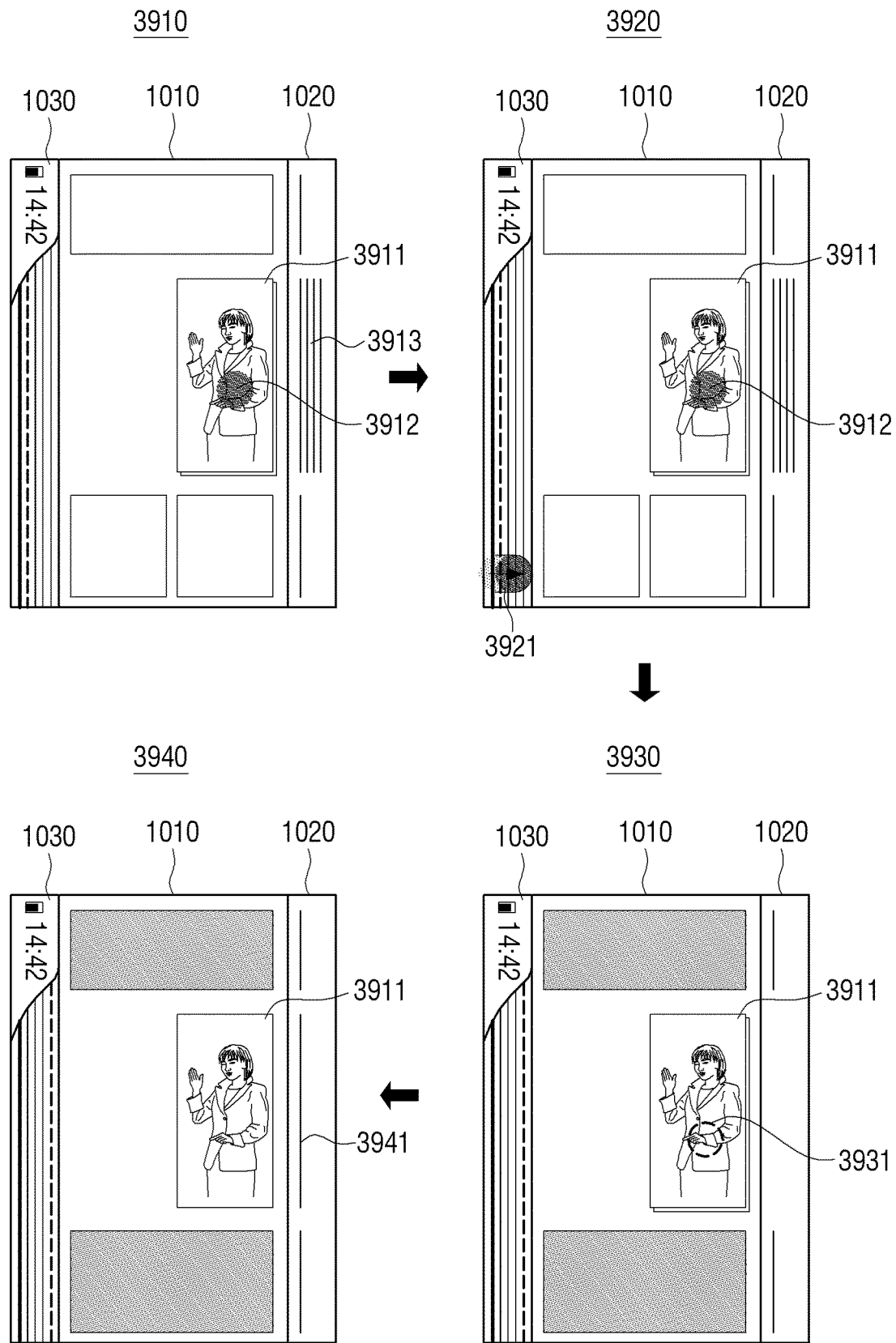

FIG. 39 is a diagram provided to explain how the user terminal device 1000 moves contents or applications into another layer according to another exemplary embodiment. Referring to 3910 of FIG. 39, the bended touch screen 100 may include the main area 1010, the first sub area 1020, and the second sub area 1030. The main area 1010 may display the main content 3911 provided by an application. The first sub area 1020 may display the sub content 3913 that can be provided by an application. When the main content 3911 is displayed on the main area 1010, the user terminal device 1000 may receive input user gesture (e.g., long-tapping gestures) 3912 touching the main content 3911 and maintaining touching for more than a certain time.

Referring to 3920 of FIG. 39, the controller 200 may fix the main content 3911 on the main area 1010 in response to the user gesture 3912. For example, the controller 200 may display the selected main content 3911 on the main area 1010 as if it is floating. Thus, the main content 3911, and the contrast, color, or position of surrounding graphics near the main contents 3911 may be modified.

Next, the user terminal device 1000 may receive input user gesture (e.g., flicking gestures) 3921 flicking the objects corresponding to a plurality of layers on the second sub area 1030 while maintaining the touch. When such user gesture 3921 is inputted, the controller 200 may display contents of the other layers on the main area 1010 while the main content 3911 is fixed on the main area 1010, as illustrated in 3930 of FIG. 39. Thus, it may provide the effect as if the main content 3911 penetrates through the other layers while being fixed on the main area 1010.

When a user finds a layer in which the main content 3911 will be positioned, the user terminal device 1000 may receive input user gesture (e.g., releasing gestures) 3931 lifting off the touch on the main content 3911.

Referring to 3940 of FIG. 39, the main content 3991 may be positioned on the layer currently displayed on the current main area 1010 in response to the user gesture 3931. In this process, the first sub area 1020 may display the sub content 3941 related with the main contents 3911 together.

Meanwhile, according to another exemplary embodiment, the user terminal device 1000 may display weather contents by using the main area and one or more of the sub areas. FIGS. 40 to 43 illustrate various exemplary embodiments to display weather contents.

Figure 40:
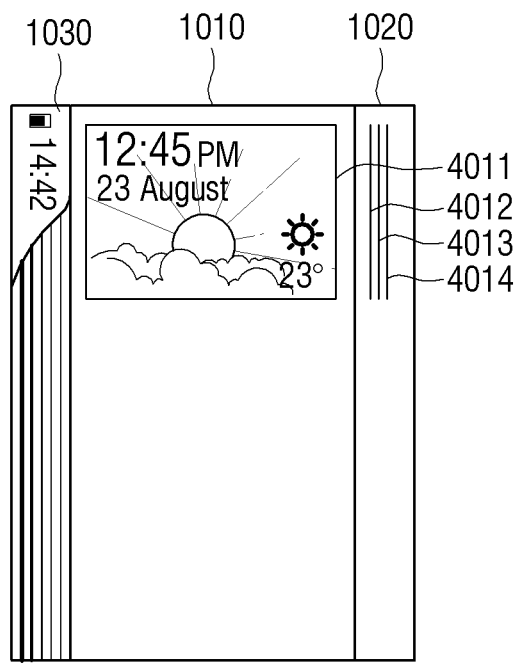

Referring to FIG. 40, the bended touch screen 100 may include the main area 1010, the first sub area 1020, and the second sub area 1030. The main area 1010 may display weather content 4011 which is main contents provided by the weather application. For example, the weather content 4011 may include one or more from climate icons such as the clouds, the sun, the moon, the rain or the snow, and icons indicating the current time.

The first sub area 1020 may display the sub contents 4012~4014 of the weather application. For example, the sub contents 4012~4014 may be sub contents corresponding to weather contents per local area. The first sub content 4012 corresponds to weather contents of a London local area currently displayed on the main area 1010, the second sub content 4013 corresponds to weather contents of a Seoul local area, and the third sub content 4014 corresponds to weather contents of a Busan local area.

Figure 41:
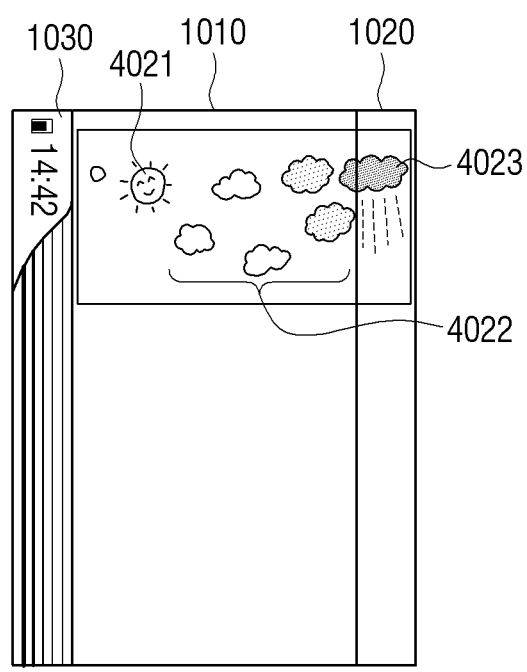

FIG. 41 is a diagram of weather contents according to another exemplary embodiment. Referring to FIG. 41, the bended touch screen 100 may include the main area 1010, the first sub area 1020, and the second sub area 1030. The main area 1010 and the second sub area 1030 may display weather contents provided by the weather application. Herein, the weather contents may be divided and displayed with respect to time. For example, the controller 200 may display that the weather changes as the time goes from the main area 1010 to the first sub area 1020. Specifically, the controller 200 may display an object 4021 indicating the weather at current time on the left side or the center of the main area 1010, and consecutively display objects indicating changes of the weather as the time goes toward the first sub area 1020 direction. Referring to FIG. 41, the controller 200 may display the object 4021 indicating the clear weather on the left side of the main area 1010, an object 4022 indicating that it gets cloudy while going to the first sub area 1020, and an object 4023 indicating that it is raining on the first sub area 1020. A user may intuitively recognize that the weather will get cloudy by viewing such a UI.

Figure 42:
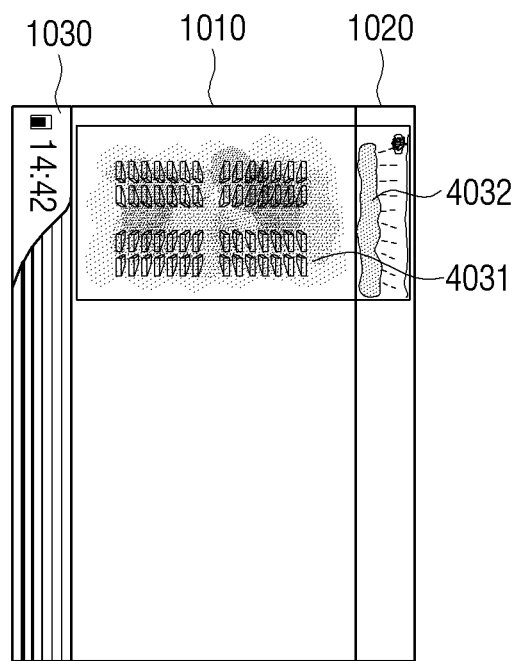

FIG. 42 is a diagram of weather contents according to another exemplary embodiment. Referring to FIG. 42, the bended touch screen 100 may include the main area 1010, the first sub area 1020, and the second sub area 1030. The main area 1010 and the first sub area 1020 may display weather contents provided by the weather application. The main contents 4031 regarding the weather contents displayed on the main area 1010 may be image or video displaying a view as if a user was in the sky looking toward the ground or alternatively as if a user was standing on the ground looking toward the sky. Further, the sub content 4032 regarding the weather contents displayed on the first sub area 1020 may be image or video displaying a view as if a user was standing on the ground looking toward the horizon. For example, when the weather is raining at current time, the main area 1010 may display image or video showing the clouds, the landscape between the clouds, or the glass ceiling meeting the falling raindrops. Further, the first sub area 1020 may display a landscape in which the rain is coming to the ground or which living things or non-living things are meeting the falling raindrops.

Figure 43:
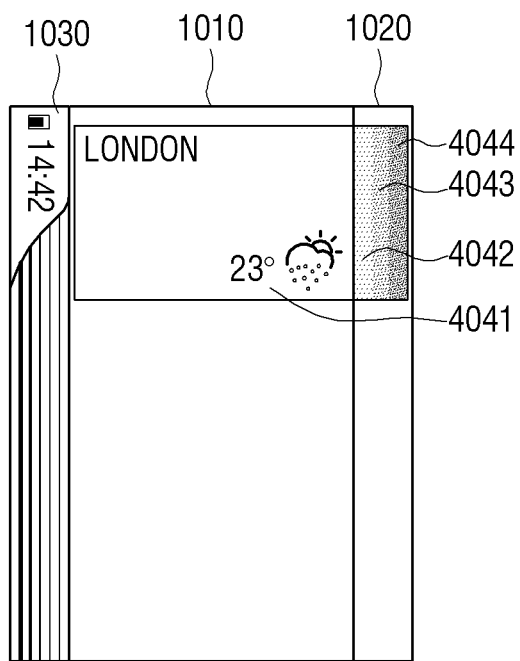

FIG. 43 is a diagram of weather contents according to another exemplary embodiment. Referring to FIG. 43, the bended touch screen 100 may include the main area 1010, the first sub area 1020, and the second sub area 1030. The main content 4041 regarding the weather contents displayed on the main area 1010 may be image, video, or widget related with the weather of the current time. The first sub area 1020 may display objects 4042~4044 related with the weather after the current time. The objects 4042~4044 may be piled up in different color codes with respect to each other and displayed according to the weather types after the current time. For example, the clear weather may be displayed in a yellow color code, and the cloudy weather may be displayed in a grey color code. Further, the color code 4042 near to the main area 1010 may show the weather near to the current time.

FIGS. 40 to 43 explain that the weather contents are displayed by combining the main area 1010 and the first sub area 1020 on the right side; however, according to a modified exemplary embodiment, the second sub area 1030 on the left side may display the weather contents with the main area 1010. Such modified exemplary embodiments will not be further illustrated and explained.

Figure 44:
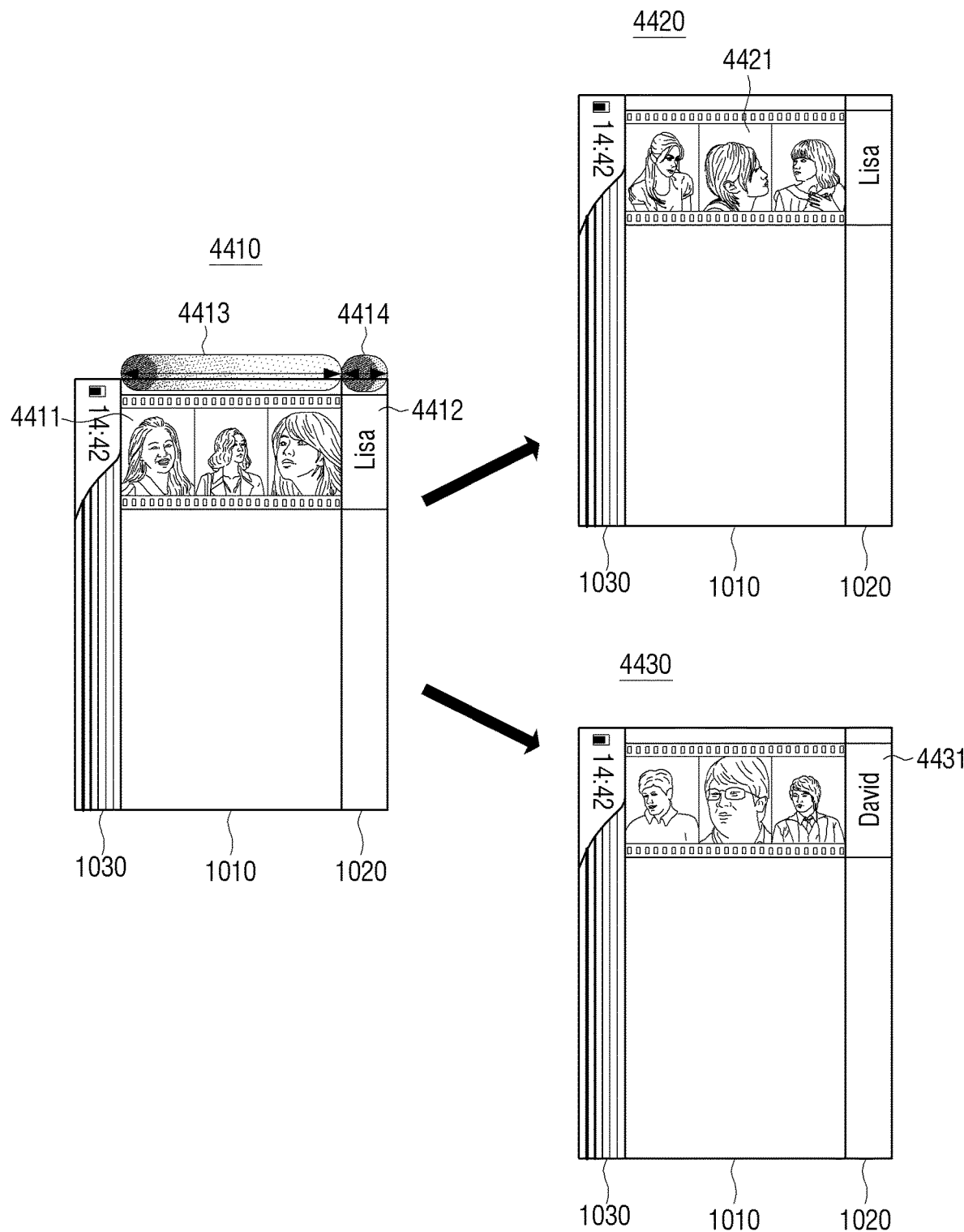
Figure 45:
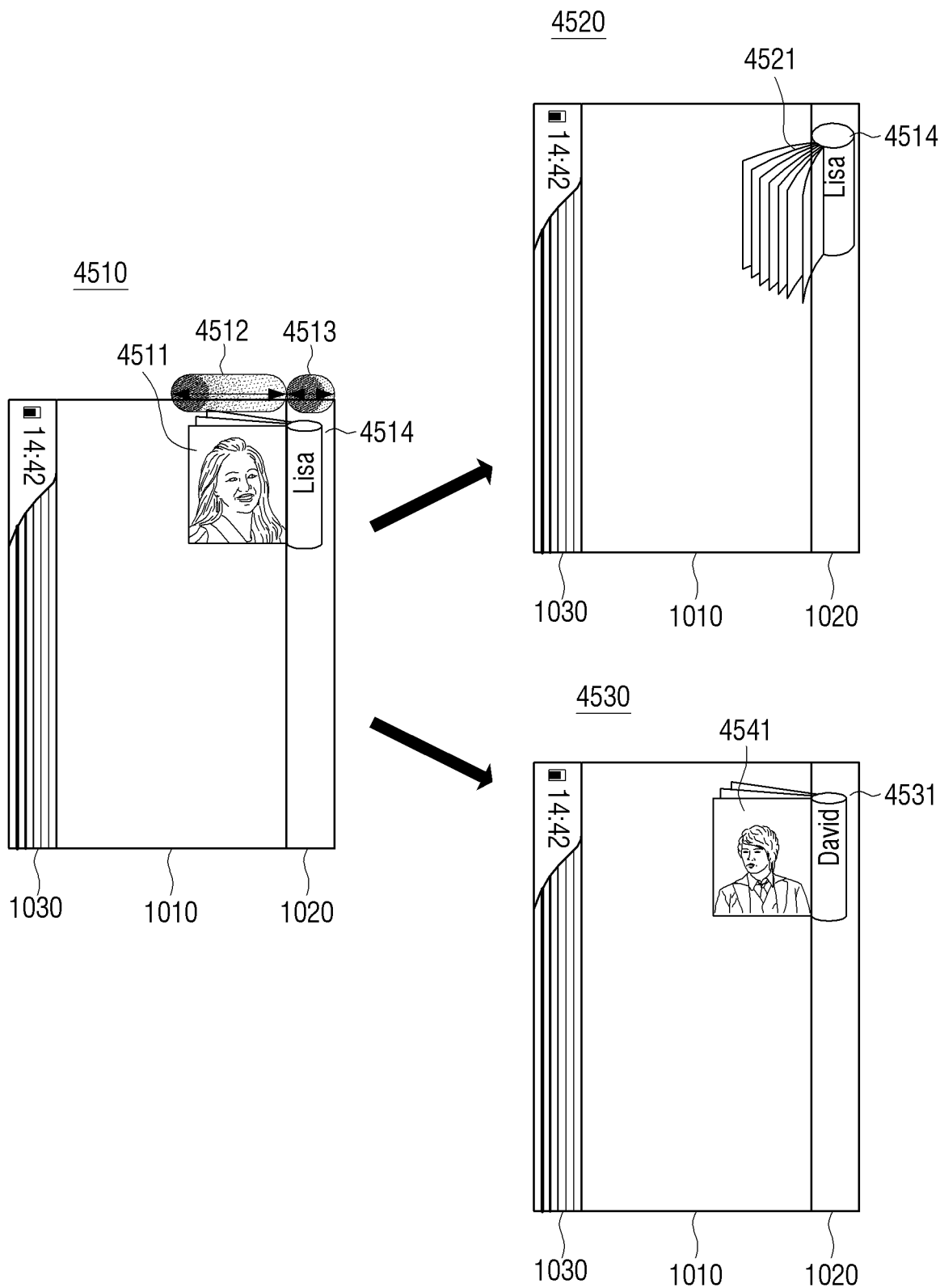

Various contents may be provided through the main area and one or more sub area by executing various applications. FIGS. 44 and 45 are diagrams explaining an exemplary embodiment of providing various contents according to execution of a gallery application. Referring to 4410 of FIG. 44, the bended touch screen 100 may include the main area 1010, the first sub area 1020, and the second sub area 1030.

The user terminal device 1000 may receive a request to execute the gallery application. The gallery application is program to provide various contents such as images, videos, or texts which are photographed by a user or received from external devices. When a user selects an icon corresponding to the gallery application among the icons displayed on the screen, the controller 200 executes the gallery application. When the gallery application is executed, the first sub area 1020 may display an object illustrating a film container which refers to a specific folder among folders provided by the gallery application. The folders may store contents which are classified according to one or more standards among a person, a storing or photographing time, a position, and a user setting.

The first sub area 1020 in 4410 of FIG. 44 may display an object 4412 illustrating a film container which indicates a person's folder, 'Lisa.' The main area 1010 may display contents included in specific folder. In this process, the contents may be displayed within the frame area of the object 4412 illustrating the film. Thus, each contents 4411 may be displayed in a film format as if the contents are outputted from the film container to the main area 1010. The user terminal device 1000 may receive input user gesture (e.g., dragging or flicking gestures) 4413 toward one direction on the main area 1010. Further, the user terminal device 1000 may receive input user gesture (e.g., dragging or flicking gestures) 4414 toward one direction on the first sub area 1020.

4420 of FIG. 44 illustrates an operation when a user performs the gesture 4413 of touching the main area 1010 and moving the touch toward the left or right direction. Referring to 4420 of FIG. 44, within the folder including the contents displayed on the main area 1010, the controller 200 may display different contents 4421 on the main area 1010 in response to the user gesture 4413 being inputted on the main area 1010. In this process, the direction or speed in which the other contents 4421 are displayed may be determined according to the direction or speed of the user gesture 4413. When the user inputs the dragging or flicking gestures 4413 toward the left side, the controller 200 may display new images 4421 as if they are coming out from the object 4412 in a film container shape while moving the images displayed on the main area 1010 toward the left side.

4430 of FIG. 44 is a diagram provided to explain an operation when a user inputs the gesture 4414 on the first sub area 1020. Referring to 4430 of FIG. 44, the controller 200 may display an object 4431 indicating another folder instead of the object 4412 indicating the folder displayed on the first sub area 1020 in response to the user gesture 4414. In this process, different folders may be selected according to direction and speed of the user gesture 4414. For example, when a user quickly flicks toward the left direction, a folder on a position corresponding to the speed may be selected among the folders previous to the current folder. Meanwhile, when a user slowly flicks toward the right direction, the next folder after the current folder may be selected.

4430 of FIG. 44 illustrates that the 'David' folder is selected instead of the 'Lisa' folder. Thereby, the main area 1010 may newly display contents included in the new David folder. FIG. 45 illustrates another example of the method of displaying the gallery application. Referring to 4510 of FIG. 45, the bended touch screen 100 may include the main area 1010, the first sub area 1020, and the second sub area 1030. The user terminal device 1000 may receive a request to execute the gallery application to provide contents. In response to the request to execute the application, the main area 1010 may display contents included in a specific folder. In this process, the contents may be displayed within an object 4511 illustrating a flip clock or color cube. The first sub area 1020 may display an object 4514 indicating a person's folder, 'Lisa,' among the folders provided by the gallery application. In this process, the object 4514 may be displayed in rotating axis or cylinder shape format. The user terminal device 1000 may receive input user gesture (e.g., dragging or flicking gestures) 4512 toward one direction on the main area 1010. Further, the user terminal device 1000 may receive input user gesture (e.g., dragging or flicking gestures) 4513 toward one direction on the first sub area 1020.

4520 of FIG. 45 illustrates operation when the user gesture 4512 is inputted on the main area 1010. Referring to 4520 of FIG. 45, when the user gesture 4512 is inputted on the main area 1010, the controller 200 may display different contents 4521 within the same folder including the contents displayed on the main area 1010. In this process, the direction or speed in which the other contents 4521 are displayed may be determined according to the direction or speed of the user gesture 4512. For example, when a user quickly flicks toward the right direction, the contents 4521 arranged farther from the currently displayed contents may be displayed.

4530 of FIG. 45 is a diagram provided to explain an operation when the user gesture 4513 is inputted on the first sub area 1020. Referring to 4530 of FIG. 45, when the user gesture 4513 is inputted on the first sub area 1020, the controller 200 may display an object 4531 indicating another folder instead of an object 4514 indicating the folder displayed on the first sub area 1020. Further, the controller 200 may display contents 4541 included in another folder, i.e., the David folder, on the main area 1010. In this process, a different folder may be selected because the direction or speed in which the other folders are displayed may be determined according to the direction or speed of the user gesture 4513.

Figure 46:
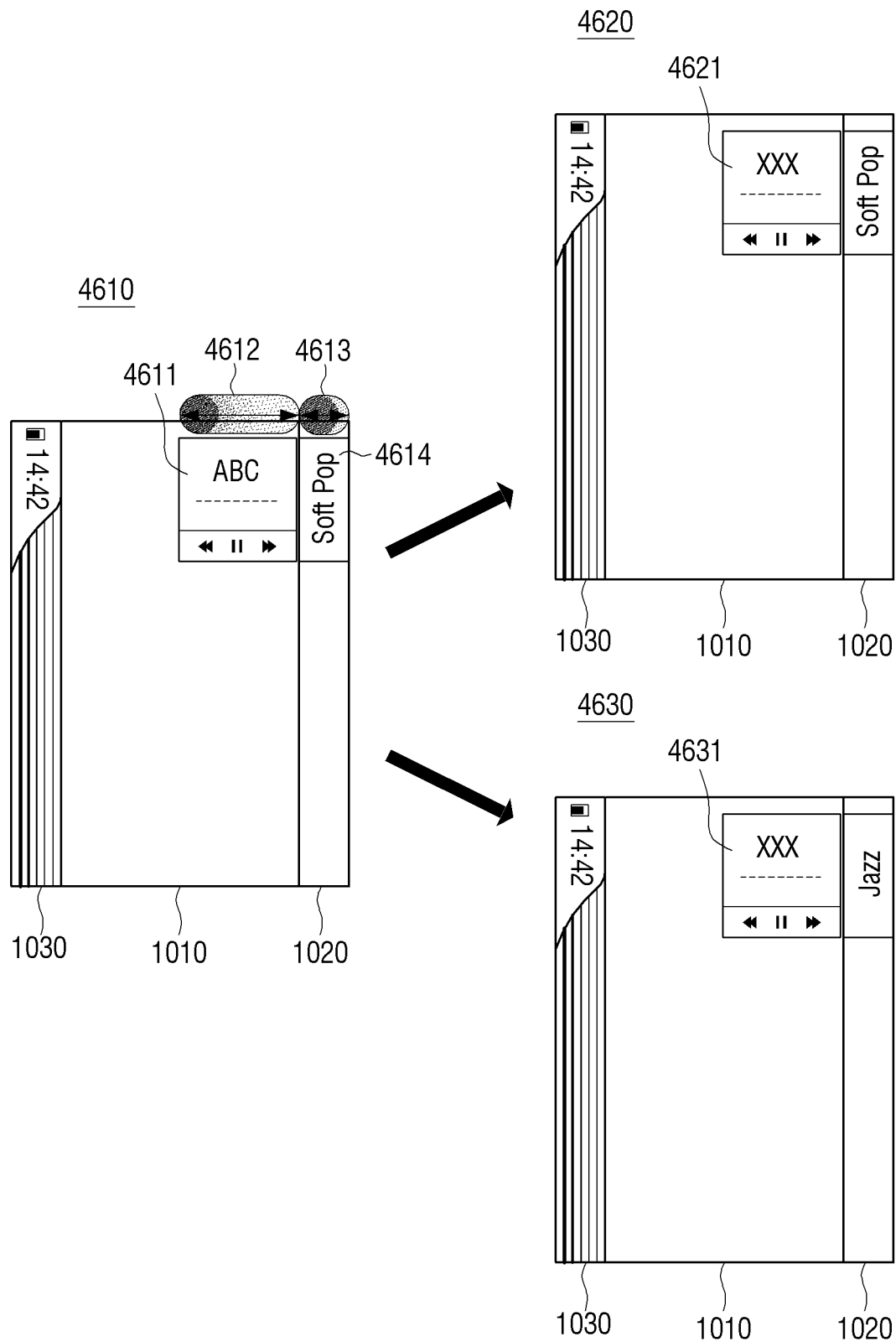

FIG. 46 is a diagram provided to explain an exemplary embodiment of displaying the music application. Referring to 4610 of FIG. 46, the bended touch screen 100 may include the main area 1010, the first sub area 1020, and the second sub area 1030. The user terminal device 1000 may receive a request to execute the music application to provide music contents. For example, when a user selects an icon corresponding to the music application, the controller 200 may determine that the music application is requested to be executed. In response to the request to execute the application, the controller 200 may display an object 4611 including currently reproducing music contents and menu that can manipulate the music contents on the main area 1010. In this process, the music contents included in the object 4611 may be automatically converted into other music contents as the time goes.

The first sub area 1020 may display an object 4614 including equalizer information of the music which is currently reproducing. The user terminal device 1000 may receive input user gesture (e.g., dragging or flicking gestures) 4612 toward one direction on the main area 1010. Further, the user terminal device 1000 may receive input user gesture (e.g., dragging or flicking gestures) 4613 toward one direction on the first sub area 1020.

4620 of FIG. 46 is a diagram provided to explain an operation when the user gesture 4612 is inputted on the main area 1010. Referring to 4620 of FIG. 46, when the user gesture 4612 is inputted on the main area 1010, the controller 200 may display an object 4621 regarding music contents prior or posterior to the music contents displayed on the main area 1010. For example, when the user gesture 4612 is performed toward the right direction, it may display music contents included later (i.e., later than the currently displayed music contents) on a music list including the currently displayed music contents. On the contrary, when the user gesture is moving toward the left direction, it may display music contents included earlier (i.e., earlier than the currently displayed music contents) on the music list including the currently displayed music contents. That is to say, the user gesture 4612 can navigate a music list (i.e., a playlist).

4630 of FIG. 46 illustrates operation when the user gesture 4613 is inputted on the first sub area 1020. Referring to 4630 of FIG. 46, when the user gesture 4613 is inputted on the first sub area 1020, the controller 200 may modify an equalizer of the music which is currently reproducing. For example, 4630 of FIG. 46 illustrates that the equalizer of the currently reproducing music into "Jazz" equalizer 4631.

Figure 47:
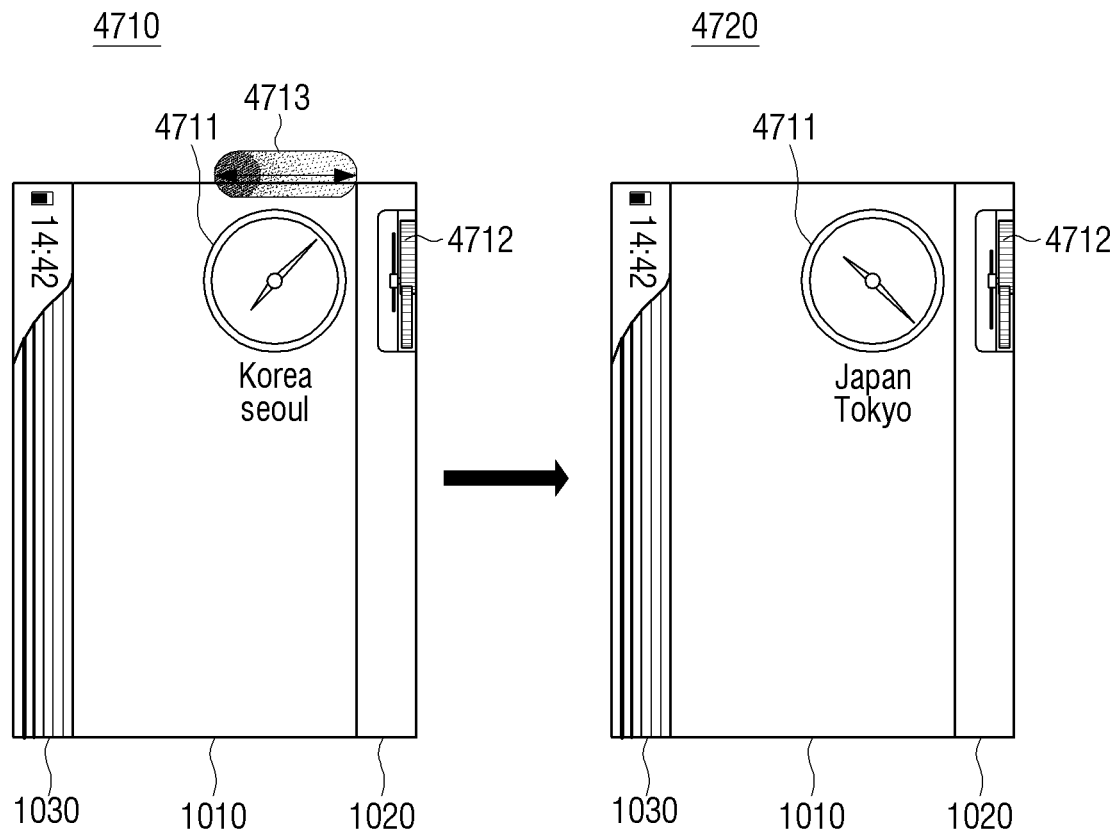

FIG. 47 is a diagram provided to explain an exemplary embodiment of displaying the clock application. Referring to 4710 of FIG. 47, the bended touch screen 100 may include the main area 1010, the first sub area 1020, and the second sub area 1030. The user terminal device 1000 may receive a request to execute the clock application to provide clock contents.

For example, a user may request executing the clock application by selecting an icon corresponding to the clock application. The controller 200 may execute the clock application according to the executing request. Further, the user terminal device 1000 may execute the clock application on stand-by status as a default. The controller 200 may execute the clock application, and display the main contents 4711 in a clock shape on the main area 1010. The clock contents 4711 may indicate the current time in an analogue or digital clock format.

The first sub area 1020 may display the sub contents 4712 of the clock application. When the main contents 4711 is analogue clock, the sub contents 4712 may indicate operating within the interior part of the analogue clock. As the time goes, the controller 200 may modify and display operating within the interior part of the sub contents 4712 together while modifying the time of the clock contents 4711.

The user terminal device 1000 may receive input user gesture (e.g., dragging or flicking gestures) 4713 toward one direction on the main area 1010. Referring to 4720 of FIG. 47, when the user gesture 4713 is inputted on the main area 1010, the controller 200 may modify the clock contents 4713 displayed on the main area 1010 into clock contents 4721 indicating the current time of another local area.

For example, when the main contents 4711 before being modified shows a standard time in Korea, the main contents 4721 after being modified may show a standard time in China or Japan instead of Korea. According to the distance or speed in which the user gesture like dragging or flicking is performed, the local area which will be displayed thereafter may be differently selected. For example, when a user quickly flicks, it may display clock contents indicating a time in America or Canada which are relatively farther from Korea than Japan. When a user slowly flicks, it may display the clock contents indicating a time in Japan or China which are nearer to Korea (than e.g., America or Canada).

Figure 48:
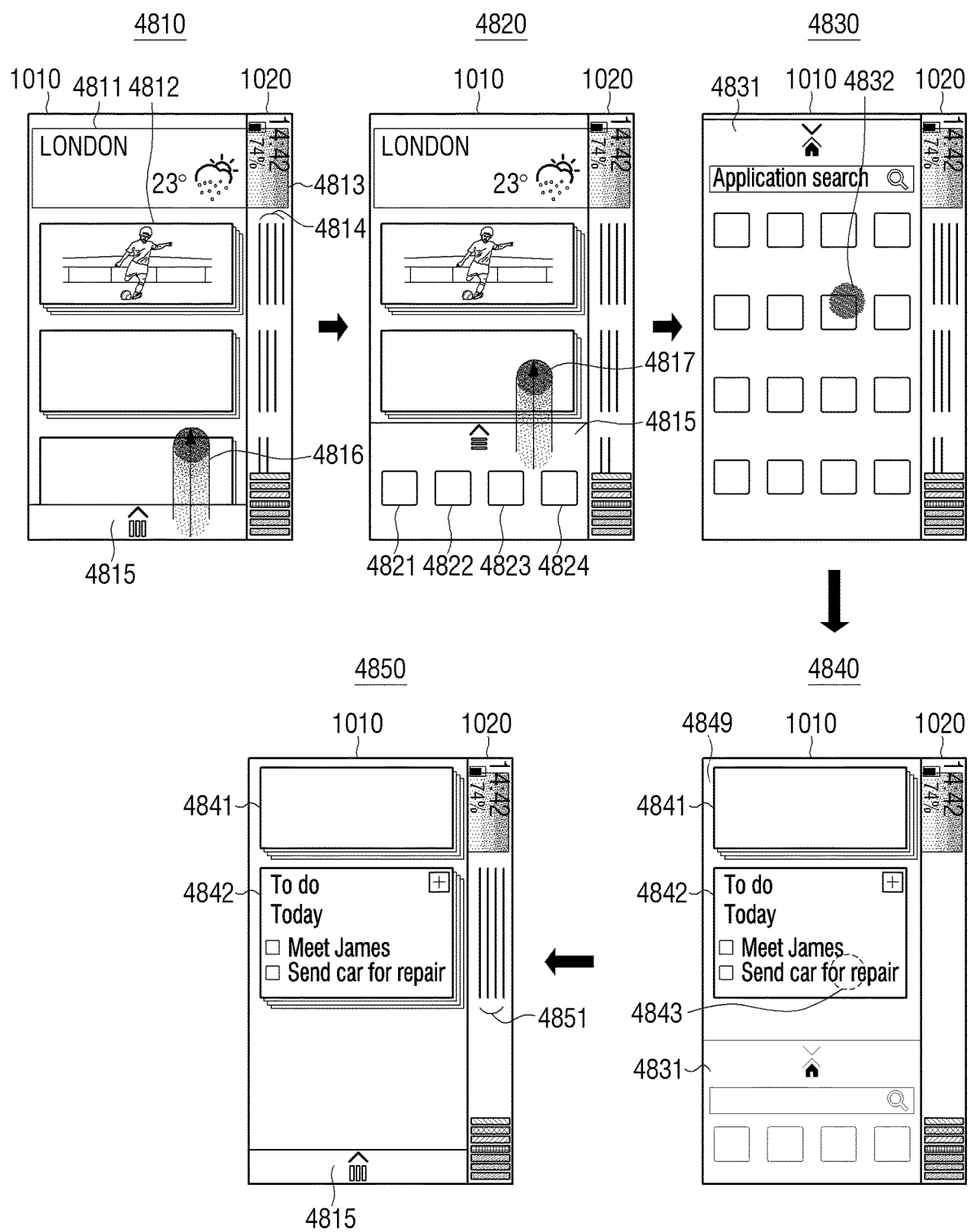

Meanwhile, according to another exemplary embodiment, a home screen may be displayed in various formats through the main area or the sub area. FIG. 48 is a diagram provided to explain a display method of a home screen according to another exemplary embodiment. The home screen is screen displayed after the user terminal device 1000 is turned on and the system is ready, which displays a screen displaying the functions to start another application or provide a widget. The home screen may be differently named as, for example, a main screen, a basic screen, or an initial screen; however, for convenience of explanation this specification uniformly refers to this screen as the home screen.

Referring to 4810 of FIG. 48, the bended touch screen 100 may include the main area 1010 and the first sub area 1020. The home screen displayed on the main area 1010 may respectively display the main contents provided by widgets corresponding to the applications installed in the user terminal device 1000. For example, the main area 1010 may display weather content 4811 provided by the weather application or gallery content 4812 provided by the gallery widget.

The first sub area 1020 may display one or more sub contents 4813, 4814 provided by the widgets. For example, the first sub area 1020 may display the sub contents 4813 provided by the weather widget or the sub contents 4814 provided by the gallery widget. The lower of the main area 1010 may provide app dock 4815 that an application list can be viewed. The user terminal device 1000 may receive input user gesture (e.g., dragging gestures) 4816 to pull up the app dock 4815 toward one direction.

4820 of FIG. 48 is a diagram provided to explain an operation when the user gesture 4816 is inputted. Referring to 4820 of FIG. 48, the controller 200 may cover a part of the main area 1010 by expanding the app dock 4815 in response to the user gesture 4816. The app dock 4815 may display shortcut icons 4821~4824 of the applications that a user frequently uses.

Further, the user terminal device 1000 may receive input user gesture (e.g., flicking gestures) 4817 to spread the app dock 4815 toward one direction. 4830 of FIG. 48 illustrates an operation when the flicking gesture 4817 is inputted. In 4830 of FIG. 48, the controller 200 may expand and display the app dock 4815 to the whole of the main area 1010 in response to the user gesture 4817. Thereby, the main area 1010 may display application home 4831. The application home 4831 may display a plurality of icons corresponding to applications that can be executed by a user. The user terminal device 1000 may receive user gesture (e.g., long-tapping gestures) 4832 selecting one icon among the plurality of icons and maintaining the touching for more than a certain time.

Referring to 4840 of FIG. 48, the controller 200 may execute an application corresponding to the selected icon in response to the user gesture 4832. When one application is selected and executed, the controller 200 may display a new home screen 4849 including empty area that widget 4842 provided by the selected application can be displayed while closing the application home 4831 displayed on the main area 1010. On the position where a user maintains the touching on the displayed home screen 4849, the widget 4842 provided by the selected application may be generated. If there is another widget on the position where the user maintains the touching, the controller 200 may automatically move and display the widget 4842 to the empty area where another widget is not displayed. Further, the user may move the widget 4842 to another position on a home screen 4811 by maintaining the touching and dragging.

Next, the user terminal device 1000 may receive input user gesture (e.g., lifting-off gestures) 4843 lifting off the touching. Referring to 4850 of FIG. 48, the widget 4842 provided by the selected application may be added to a home screen 4811 displayed on the main area 1010 in response to the user lifting-off gesture 4843. In this process, the first sub area 1020 may display the sub contents 4851 that can be provided by the widget 4842. In this situation, a user may spread the app dock 4815 again. When a user gesture 4816 to spread the app dock 4815 toward one direction is inputted again, the controller 200 may display the application home 4831 again as illustrated in 4830 of FIG. 48.

A user may go back to the home screen by inputting preset gestures regarding the application home 4831.

Figure 49:
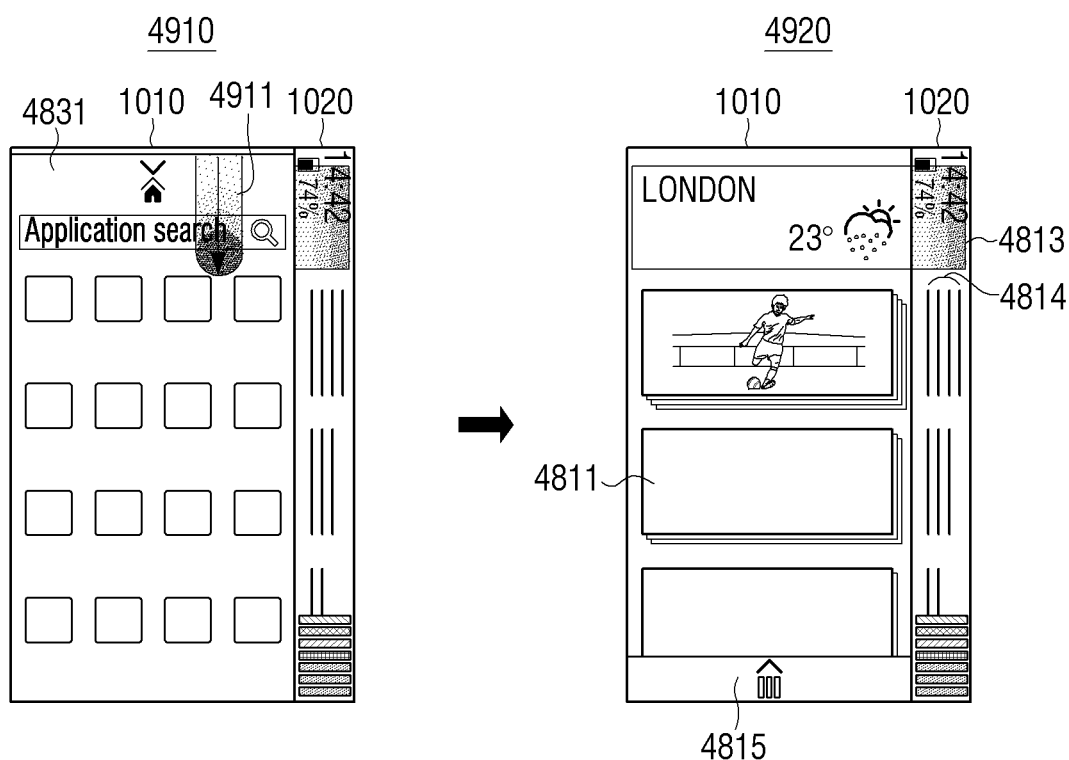

FIG. 49 is a diagram of an exemplary embodiment of closing the application home and displaying a home screen. Referring to 4910 of FIG. 49, the user terminal device 1000 may receive input user gesture (e.g., flicking gestures) 4911 to close the application home 4831.

When such gesture 4911 is inputted, the controller 200 may display the home screen 4811 again on the main area 1010, as illustrated in 4920 of FIG. 49.

According to another exemplary embodiment, a user may perform interaction by using the sub area, and modify display situation of the main contents displayed on the main area. The following will explain in greater detail various exemplary embodiments of performing interactions by using the sub area.

Figure 50:
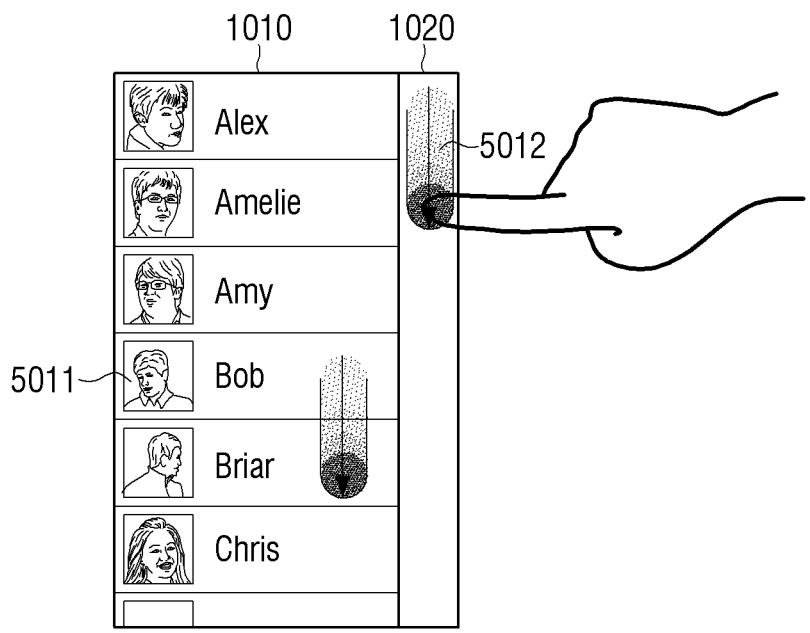

FIG. 50 is a diagram provided to explain a method of displaying an address book on the user terminal device 1000 according to another exemplary embodiment.

When a user selects an icon or menu displayed on the user terminal device 1000, and executes an address book application, the controller 200 displays the address book 5011 on the main area 1010 by using address book information stored in the storage 310. In this situation, a user may scroll through the address book 5011 by using the sub area 1020. For example, when the user inputs a dragging or flicking gesture 5012 toward one direction while touching the sub area 1020, the controller 200 scrolls and displays the address book 5011 on the main area 1010 according to the direction and speed of the gestures. When one of the address book information is touched on the main area 1010, the controller 200 may connect a phone call by using corresponding address book information, or display a screen for writing emails or messages which will be transmitted a contact included in the address book information on the main area 1010. Thereby, the user may perform modifying interactions to modify view points of the information displayed on the main area by using the sub area.

Figure 51:
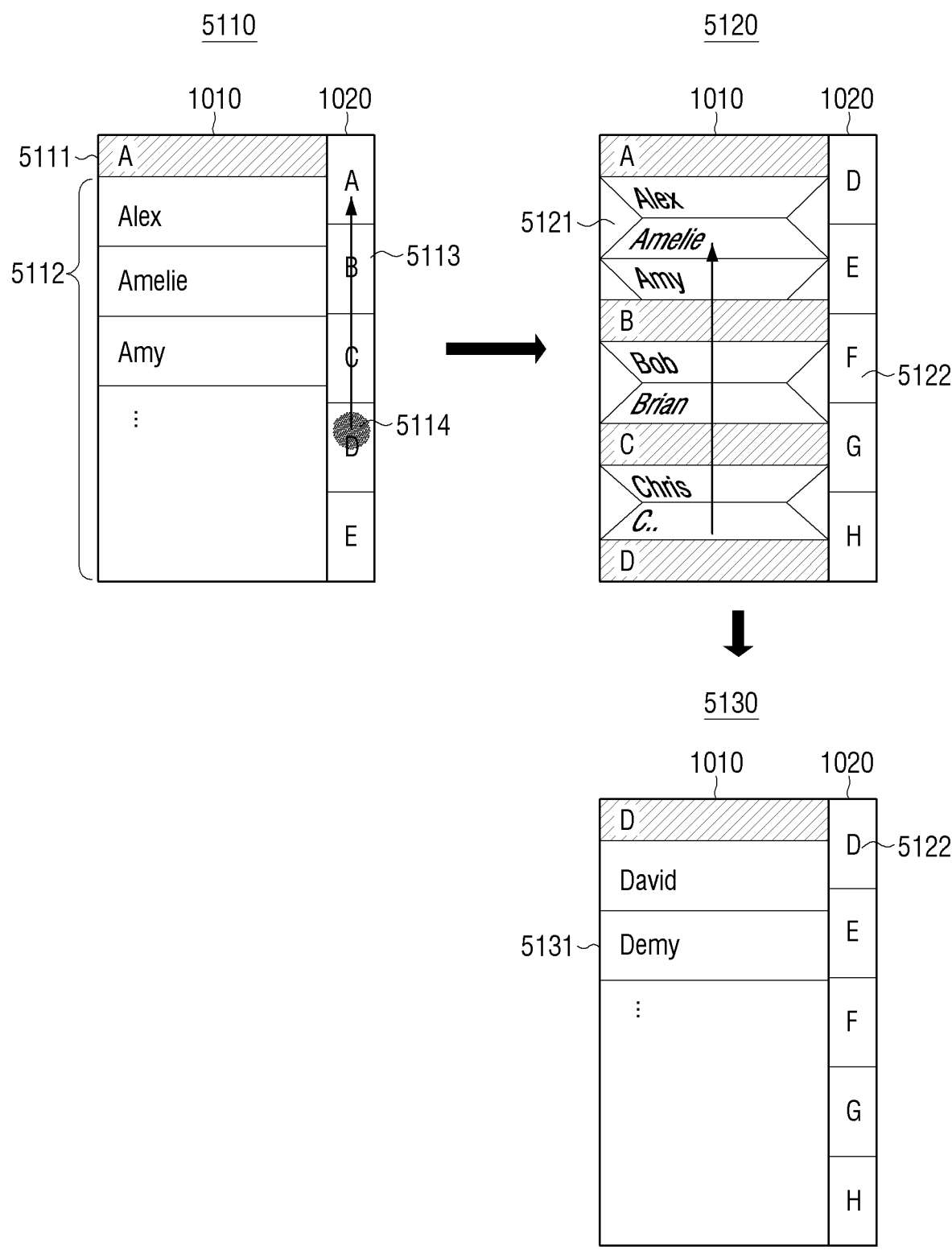

FIG. 51 is a diagram provided to explain another method of scrolling through the address book information by using the sub area.

Referring to 5110 of FIG. 51, the address book information displayed on the main area 1010 may be constituted with an index 5111 and information 5112 included in the index 5111. The sub area 1020 may display each of indexes 5113. A user may input a gesture 5114 dragging or flicking toward one direction after touching the sub area 1020.

5120 of FIG. 51 illustrates an operation when the gesture 5114 touching the D index and dragging the touch toward the upper direction is inputted. Referring to 5120 of FIG. 51, the controller 200 displays information 5121 respectively included in the A, B, C indexes between the A index currently displayed on the main area 1010 and the touched D index as if the information is consecutively folded, and scroll toward the illustrated arrow direction. Thereby, as illustrated in 5130 of FIG. 51, the main area 1010 displays the address book information 5131 included in the D index, and the sub area 1020 displays the D index touched by a user on the most upper position while displaying the next indexes positioned lower than the D index. Therefore, a user may perform a quick jumping interaction to jump over or skip a plurality of address book information by using the sub area 1020.

Figure 52:
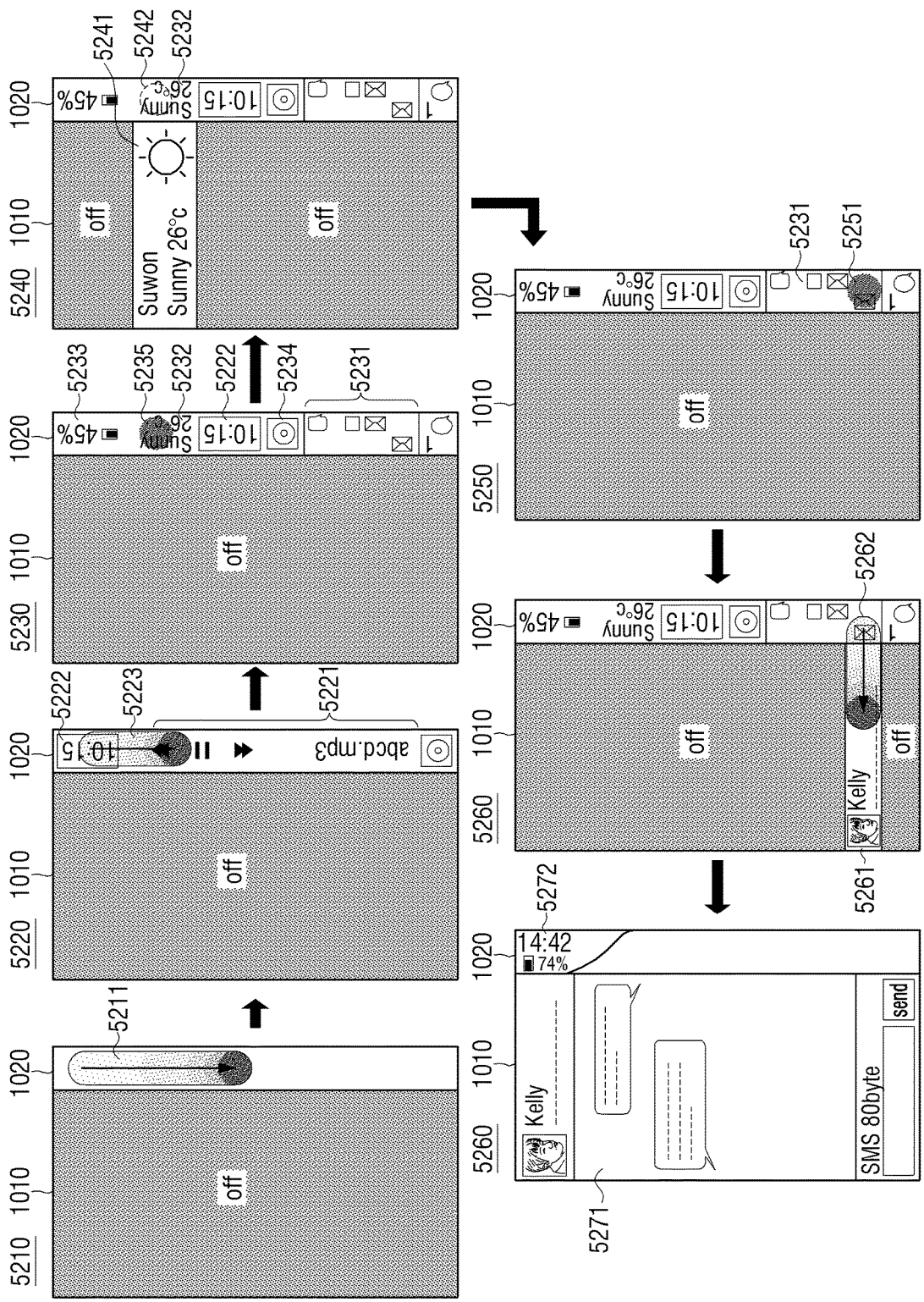

According to another exemplary embodiment, while a user may just confirm necessary information by activating the main area only or the sub area only, the user may also activate and use another area if they feel the need to. FIG. 52 is a diagram provided to explain an operation of the user terminal device 1000 according to an exemplary embodiment.

Referring to FIG. 52, the user terminal device 1000 includes the bended touch screen 100 which is divided into the main area 1010 and the sub area 1020. When a user does not use the user terminal device 1000 for a certain time, or when the user pushes an inactivating button, the controller 200 may inactivate the main area 1010 and the sub area 1020. 5210 of FIG. 52 illustrates that the user terminal device 1000 is inactivated, and all of the main area 1010 and the sub area 1020 are turned off. In this situation, when the user pushes an activating button or inputs preset activating gestures, the controller 200 may convert into activating status by simultaneously turning on the main area 1010 and the sub area 1020. Further, when the user inputs a gesture 5211 rubbing the sub area 1020, the controller 200 may convert into activating status by only turning on the sub area 1020. 5220 of FIG. 52 illustrates that the sub area 1020 is activated.

When a specific application executes, the controller 200 displays contents provided by the application on the sub area 1020. 5220 of FIG. 52 illustrates that the sub area 1020 displays contents 5221 including information regarding the contents reproduced by the music application and its control menu, when the music application executes. Within the sub area 1020, current time information 5222 may be displayed together with the contents 5221 of the music application. The controller 200 may display only the current time information 5222 on the sub area 1020 when there is no executing application, or various information such as date information, weather information, and battery information on the sub area 1020.

As illustrated in 5220 of FIG. 52, a user may input a gesture 5223 dragging or flicking the sub area 1020 again, and modify the sub contents displayed on the sub area 1020.

When the gesture 5223 is inputted, the controller 200 adds weather sub contents 5232 and battery sub contents 5233 while moving the touched time information 5222 toward a lower direction according to the direction of the gestures 5223, as illustrated in 5230 of FIG. 52. Further, the contents 5221 of the music application may be modified into sub contents 5234 in a reduced album shape, or sub contents 5231 regarding emails or other messengers may be displayed. In this situation, when a user touches one sub content 5232 on the sub area 1020 and maintains the touch for more than a certain time, the controller 200 may display information regarding the touched sub contents on the main area 1010.

5240 of FIG. 52 illustrates an operation displaying weather information 5241 related with the sub contents 5232 on the main area 1010 while the weather sub contents 5232 is touched. The controller 200 may display the weather information 5241 by activating a sectional area corresponding to the position of the sub area 1020 where the weather sub contents 5232 is displayed without activating whole of the main area 1010. In this situation, when a user lifts off the touch, the controller 200 deletes the weather information 5241 displayed on the section of the main area 1010, as illustrated in 5250 of FIG. 52.

Meanwhile, a user may select another sub content within the sub area 1020. As illustrated in 5250 and 5260 of FIG. 52, when a user touches the mail sub contents 5231, new arriving mail information 5261 (e.g., email information) received by the main application is displayed on the section of the main area 1010. In this situation, when a user inputs gesture 5262 dragging or flicking toward the main area 1010 while maintaining the touch, the controller 200 activates the whole of the main area 1010, and displays mail application screen 5271, as illustrated in 5270 of FIG. 52. The controller 200 displays sub contents 5272 corresponding to the mail application screen 5271 on the sub area 1020.

Figure 53:
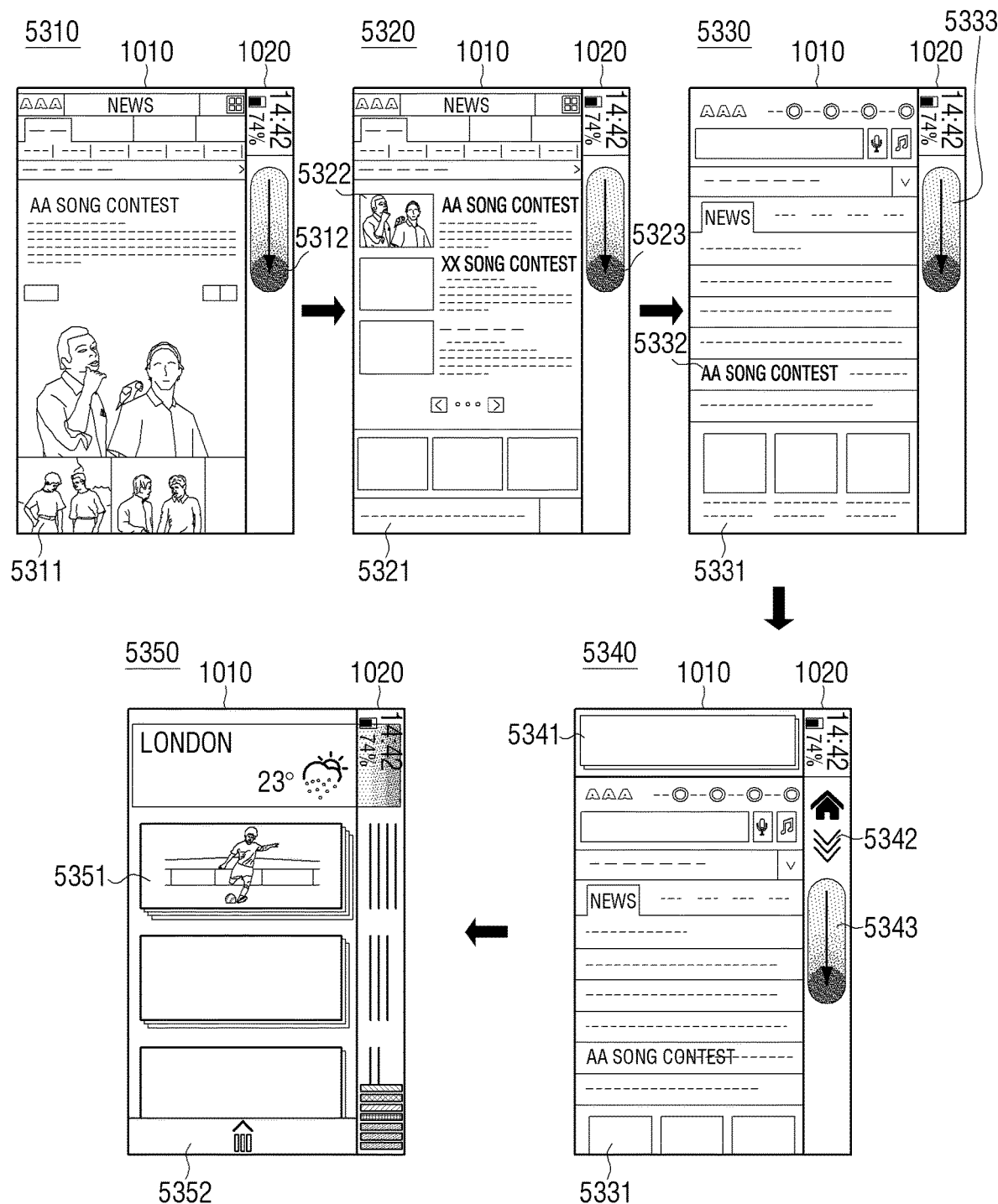

Various operations may be mapped with user gestures performed on the sub area 1020. FIG. 53 illustrates an exemplary embodiment of mapping the back function with the dragging or flicking gestures toward the sub area 1020.

As illustrated in 5310 of FIG. 53, the user terminal device 1000 may display a first web page 5311 on the main area 1010. The sub area 1020 may display the sub contents corresponding to the first web page 5311 and various information to inform status of the user terminal device 1000.

When a user gesture 5312 dragging or flipping toward one direction on the sub area 1020 is inputted, the controller 200 performs the back function to display a second page 5321, which is a page previous to that of the first page, as illustrated in 5320 of FIG. 53. When one object 5322 is selected among objects displayed on the second page 5321, the controller 200 displays the first page 5311 again as illustrated in 5310 of FIG. 53. Further, when user gesture 5323 is inputted again on the sub area 1020 while the second page 5321 is displayed, the controller 200 displays a third page 5331 which is upper page of the second page, as illustrated in 5330 of FIG. 53. The third page 5331 may display various objects including an object 5332 that can be linked to the second page 5321. In FIG. 53, the third page 5311 indicates a main screen of a portal web site, the second page 5321 indicates a screen including various information related with the object when one object is selected within the main screen, and the first page 5331 indicates a screen of detailed information linked when the information is selected within the second page 5321.

When the third page 5331 is the most upper page of a portal web site, i.e., main screen, the controller 200 displays an affordance image 5341 as if the third page 5331 is pushed toward the lower on one side of the third page, and displays a guide 5342 providing a 'go to the home screen' on the sub area 1020, when user gesture 5333 is inputted again. When a user inputs user gesture 5343 on the sub area 1020 again, the controller 200 closes the web browser and displays a home screen 5351.

5350 of FIG. 53 illustrates that the home screen 5351 is displayed in response to the user gesture 5343. As illustrated in 5340 of FIG. 53, when the user gesture 5343 is performed toward the lower direction, the home screen 5351 is displayed as if it is sliding down from the upper part of the screen, and the app dock 5352 is displayed as if it is pulled over from the lower part of the screen when the home screen 5351 has completed sliding down. The app dock 5352 is explained in FIG. 48, and will not be further explained.

Meanwhile, the forward function may be mapped to user gestures moving toward the upper direction on the sub area 1020 of FIG. 53. For example, when a user gesture moving toward the upper direction is inputted while the third page 5331 is displayed, the second page 5321 may be displayed, and the first page 5311 may be displayed when the user gesture is inputted again.

Further, although FIG. 53 describes that the web pages are displayed according to the executing of the web browser, the same exemplary embodiment may be executed in the executing screen of other programs.

Figure 54:
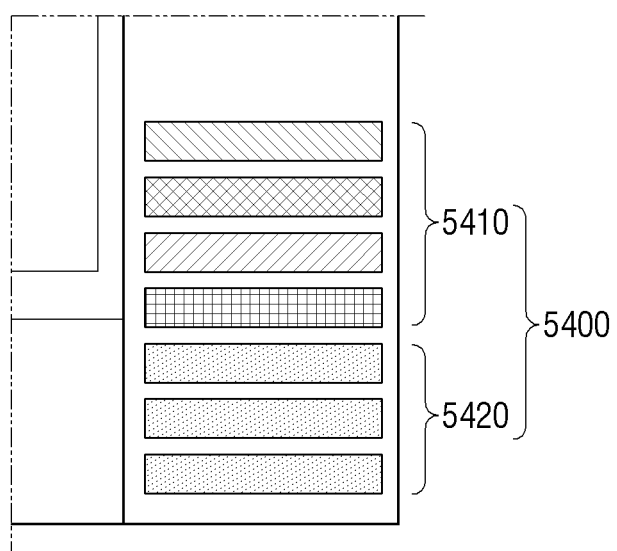

FIG. 54 is a diagram of another example of objects that can be displayed on the sub area 1020. Referring to FIG. 54, a task switching object 5400 may be displayed on the sub area 1020. The task switching object 5400 may include a monochrome object 5420 and a technicolor object 5410.

The monochrome object 5420 is used as a using app area providing an application which is currently executing or which was recently used, and the technicolor object 5410 is used as a favorite function area providing functions preferred by a user.

Figure 55:
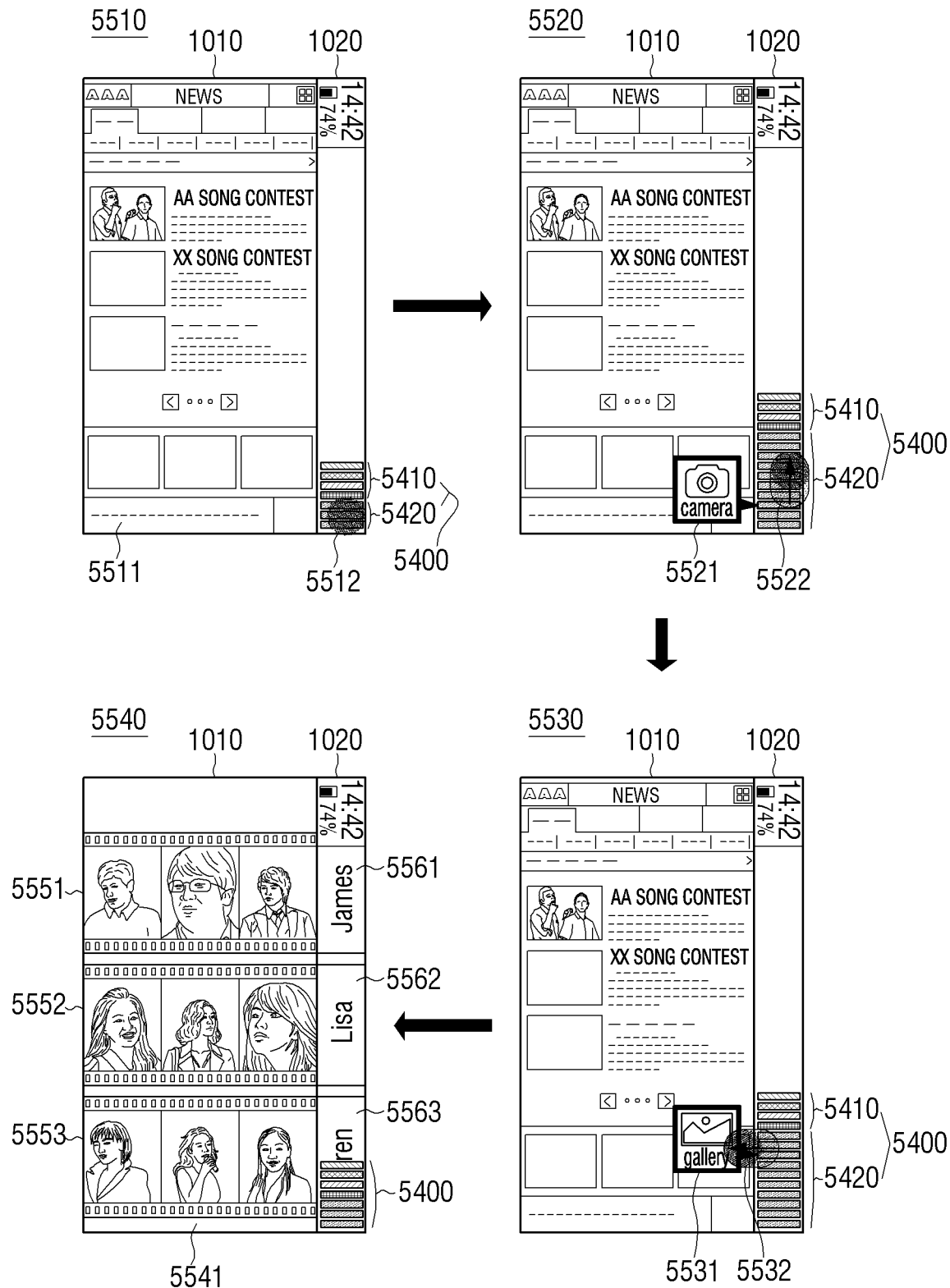

FIG. 55 is a diagram provided to explain an operation of the user terminal device 1000 which provides the objects of FIG. 54 according to an exemplary embodiment.

Referring to 5510 of FIG. 55, while some screen 5511 is displayed on the main area 1010, the controller 200 may display the task switching object 5400 on the sub area 1020. A user may touch the monochrome object 5420 or the technicolor object 5410 among the task switching object 5400. When a user touches the monochrome object 5420, the controller 200 expands the area where the monochrome object 5420 is displayed as illustrated in 5520 of FIG. 55. Further, the controller 200 may display application information 5521 corresponding to the touched monochrome object 5420 on one side of the touched point in the main area 1010. 5520 of FIG. 55 illustrates that the information 5521 related to the camera application is displayed.

When a user inputs a gesture 5522 moving the touched point, the controller 200 displays application information 5531 corresponding to the modified touched point, as illustrated in 5530 of FIG. 55. In 5530 of FIG. 55, the information 5521 of the camera application is modified into the information 5531 of the gallery application.

When a user inputs a gesture 5532 moving the touched point toward the main area 1010 direction, the controller 200 displays executing screen 5541 of the gallery application on the main area 1010, and the sub contents corresponding to the gallery application on the sub area 1020, as illustrated in 5540 of FIG. 55. As described in FIG. 44, 5540 of FIG. 55 illustrates that the sub contents are expressed to be objects 5561, 5562, 5563 in a film container shape. The controller 200 may display the objects 5561, 5562, 5563 respectively showing folders which group various contents such as pictures, videos, and texts on the sub area 1020, and contents 5551, 5552, 5553 respectively included in the folders as if they are output from film containers on the main area 1010.

Figure 56:
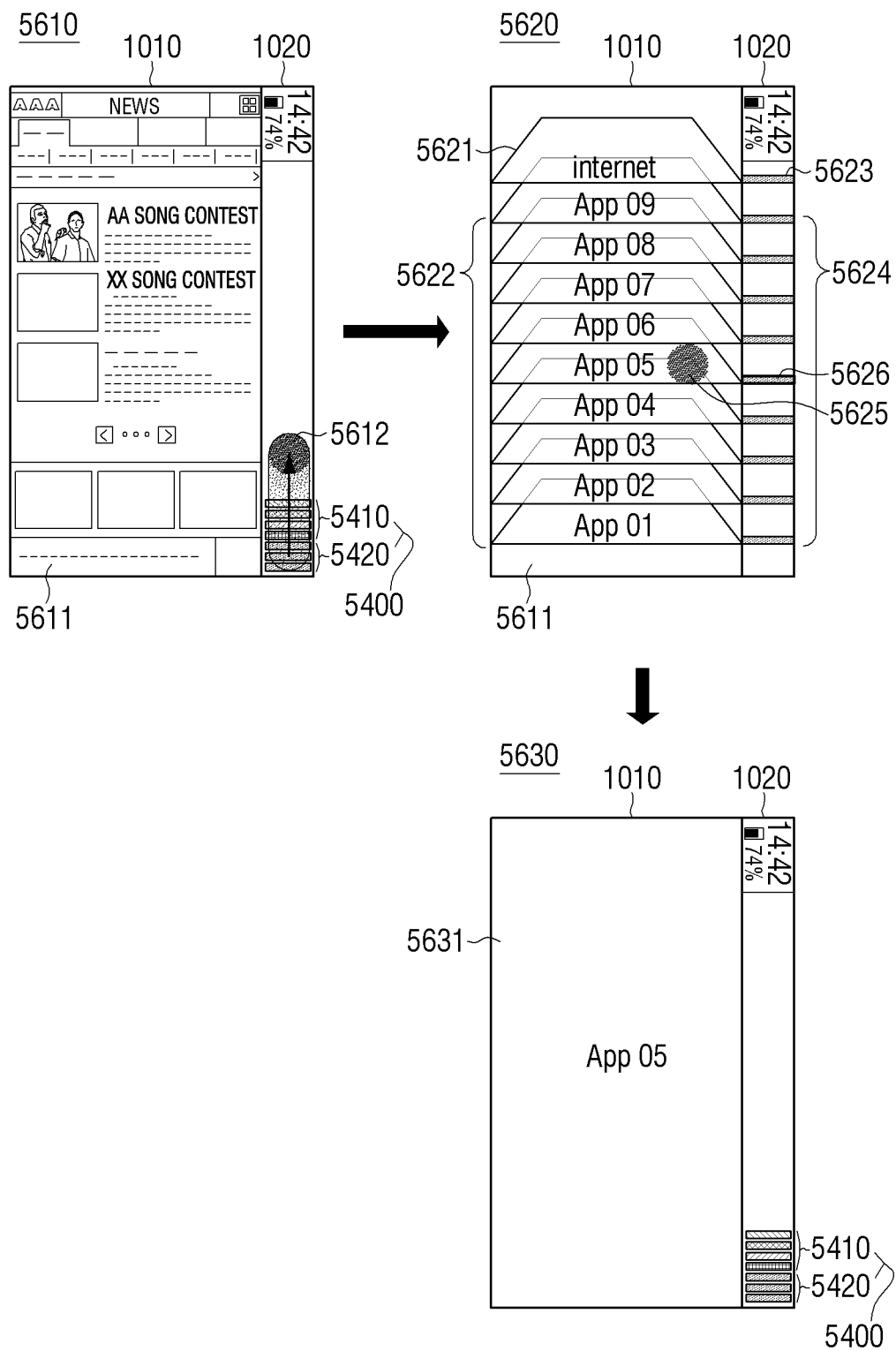

FIG. 56 is a diagram provided to explain another exemplary embodiment of performing interactions by using the sub area. Referring to 5610 of FIG. 56, the controller 200 may display the monochrome object 5420 and the technicolor object 5410 on the sub area 1020 while displaying some screen 5611 on the main area 1010. When a user inputs a flicking gesture 5612 by more than a certain distance or by more than a certain speed after touching the monochrome object 5420, the controller 200 modifies the currently displayed screen 5611 on the main area 1010 into an object 5621 in a shape lying down toward the back direction while displaying objects 5622 corresponding to various tasks as if they are pulled up from the lower of the object 5621, as illustrated in 5620 of FIG. 56.

Further, the controller 200 displays a plurality of sub objects 5623, 5624 corresponding to the objects 5621, 5622 on the sub area 1020. The object displayed on the most upper portion of the screen and the sub objects 5621, 5623 correspond to the screen 5611 displayed before the user gesture 5612 is inputted. A user may convert the main area into different screens by selecting each of the objects or the sub objects.

As illustrated in 5620 of FIG. 56, when a user touches App 05, the controller 200 modifies the color of sub object 5626 which corresponds to App 05, and immediately executes the application corresponding to App 05. Thereby, the controller 200 displays an App 05 screen 5631 on the main area 1010, and displays the task switching object 5400 in an original size on the sub area 1020 again. The size of the task switching object 5400 may be established as a default; however, it is not limited thereto. According to another exemplary embodiment, the size of the task switching object 5400 may be determined differently according to the number of user favorite functions or most recently executed applications.

Figure 57:
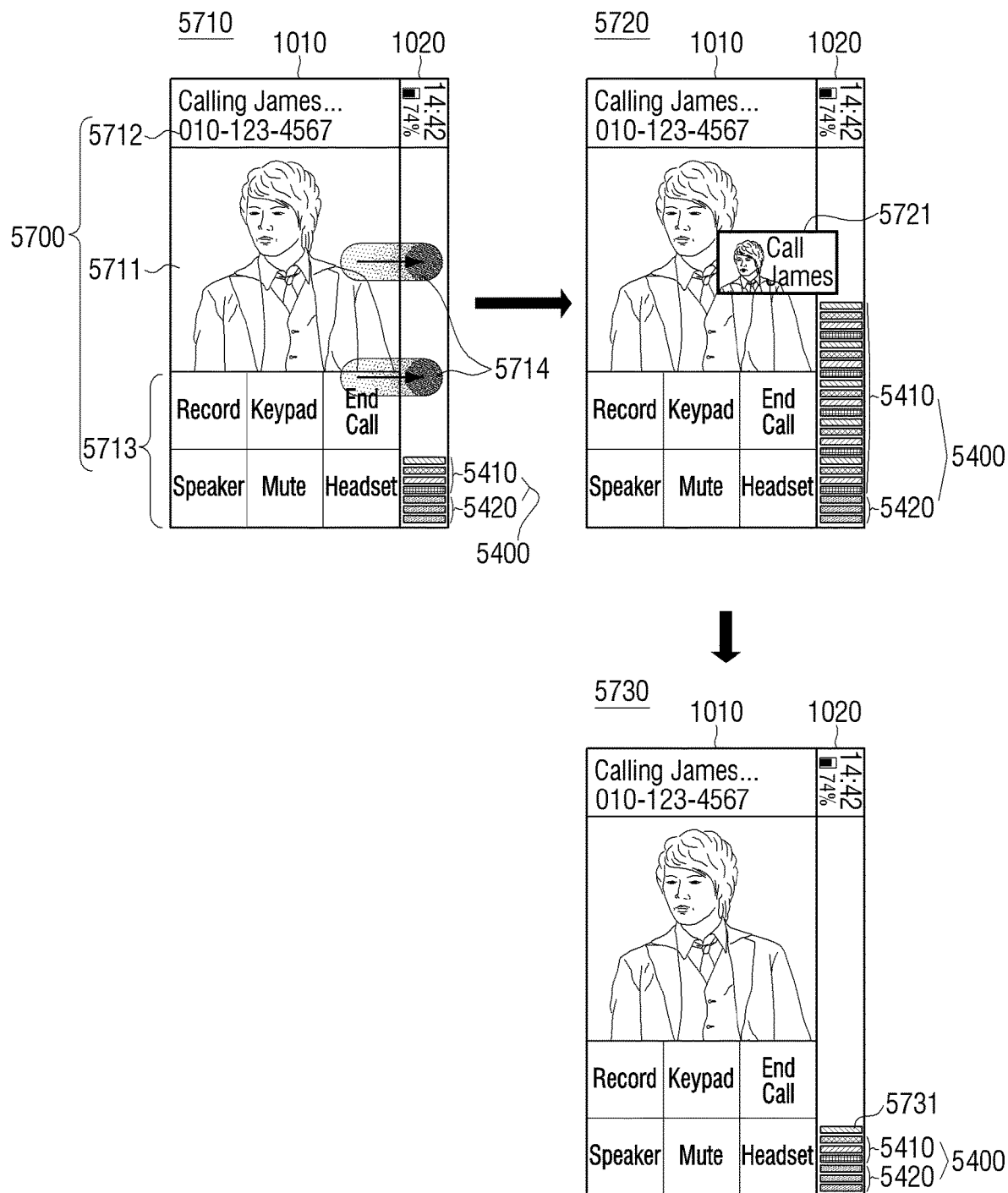

Meanwhile, although FIG. 56 describes the operation when the monochrome object 5420 is selected within the task switching object 5400, a user may also select the technicolor object 5410. In this case, favorite functions which are previously selected by a user may be executed and provided through the main area 1010. FIG. 57 is a diagram provided to explain a process of registering the task switching object 5400 by selecting a favorite function.

5710 of FIG. 57 illustrates that some screen is displayed on the main area 1010, and the task switching object 5400 is displayed on the sub area 1020. For example, 5710 of FIG. 57 illustrates a transmitting screen in which a user calls a specific person on the main area 1010. Within the transmitting screen, a person image 5711, a message indicating that calling is processing 5712, and a relevant menu 5713 may be included. The user may input a preset gesture 5714, and register the function of calling a corresponding person on the task switching object 5400. 5710 of FIG. 57 illustrates that the user performs the gesture 5714 by touching the main area 1010 with two fingers, and dragging or flicking the touching toward the sub area 1020 direction.

When such gesture 5714 is inputted, the controller 200 adds the currently executing function, i.e., calling James to the favorite function area within the task switching object 5400. The controller 200 may generate an object 5721 indicating a corresponding function, move the object 5721 toward a direction of the favorite function area, and expand the size of the technicolor object 5410 corresponding to the favorite function area so as to intuitively inform a user of adding the corresponding function to the favorite function area. The technicolor object 5410 may be expressed in different colors per application, and different functions provided from the same application may be expressed in different contrasts.

For example, the calling James may be expressed in thick red colors, and the calling Andy may be expressed in light red colors. Meanwhile, the sending a message to James may be expressed in blue colors. When registering completes, the controller 200 displays the task switching object 5400 displayed on the sub area 1020 in an original size, as illustrated in 5730 of FIG. 57. The controller 200 may display an object 5731 corresponding to the newly added function on the most upper portion among the color objects 5410.

Further, the controller 200 may highlight or flash corresponding object 5731 for a certain time so that a user can intuitively recognize that the object 5731 corresponds to the newly added function. Meanwhile, the controller 200 may perform the function operating on the main area 1010 as it does, separately from displaying the task switching object 5400 on the sub area 1020. Thus, the main area 1010 may display calling screen 5700.

Figure 58:
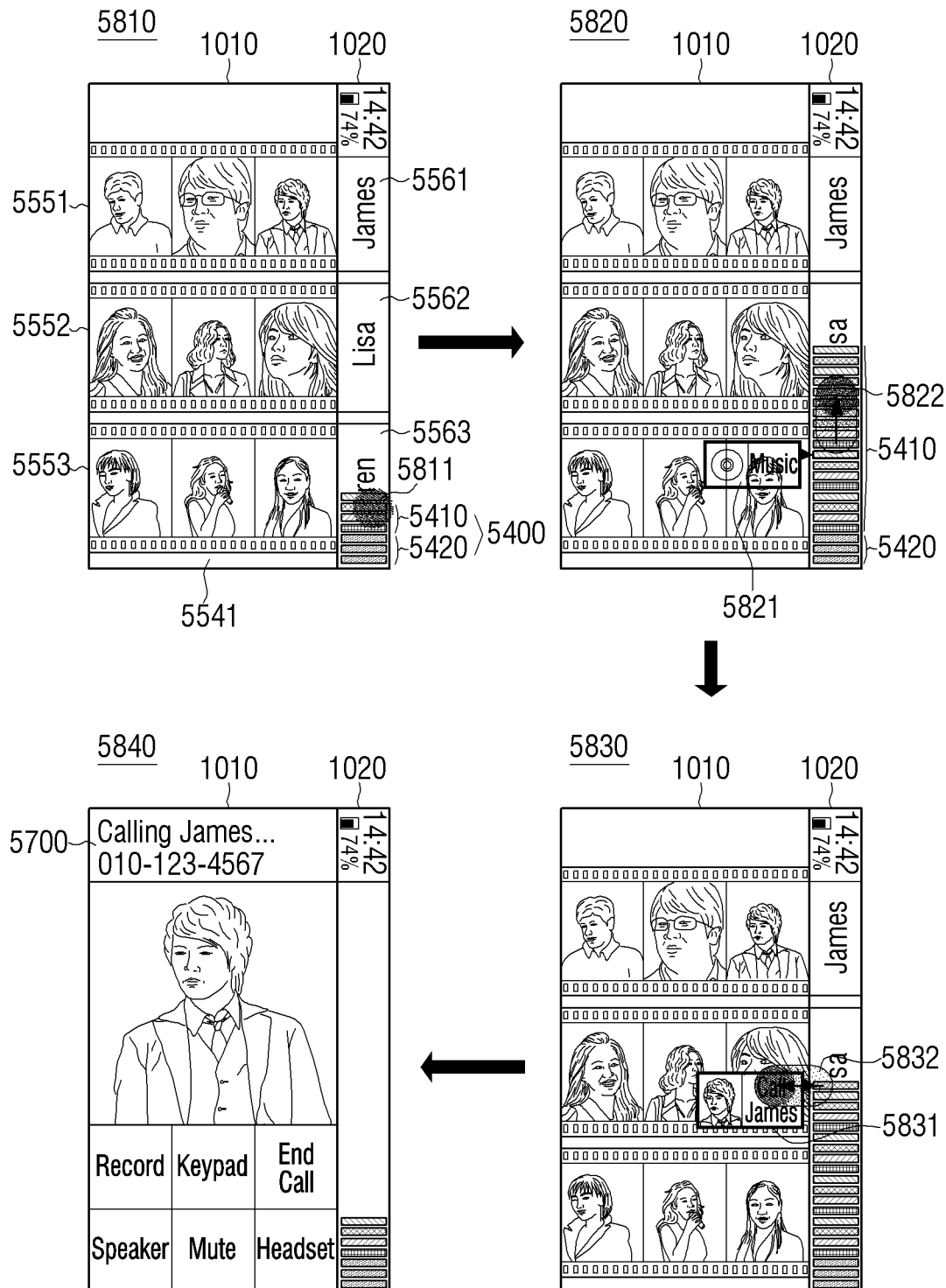

FIG. 58 is a diagram provided to explain a method of switching tasks by using the favorite function area within the task switching object 5400. 5810 of FIG. 58 illustrates some screen 5541 displayed on the main area 1010, and the task switching object 5400 is displayed on the sub area 1020. When a user touches the technicolor object 5410, the controller 200 expands the area where the technicolor object 5410 is displayed as illustrated in 5820 of FIG. 58. Further, the controller 200 may display application information 5821 corresponding to the touched technicolor object on one side of the touched point in the main area 1010. 5820 of FIG. 58 illustrates that the information 5821 related to the music application is displayed.

When a user inputs a gesture 5822 moving the touched point, the controller display application information 5831 corresponding to the modified touched point, as illustrated in 5830 of FIG. 58. In 5830 of FIG. 58, the information 5821 of the music application is modified into the information 5831 of "call James" application (i.e., the application registered in FIG. 57).

When a user inputs a gesture 5832 moving the touched point toward the main area 1010 direction, the controller 200 displays executing screen 5700 of the "call James" application, in which a user calls James, on the main area, as illustrated in 5840 of FIG. 58.

Figure 59:
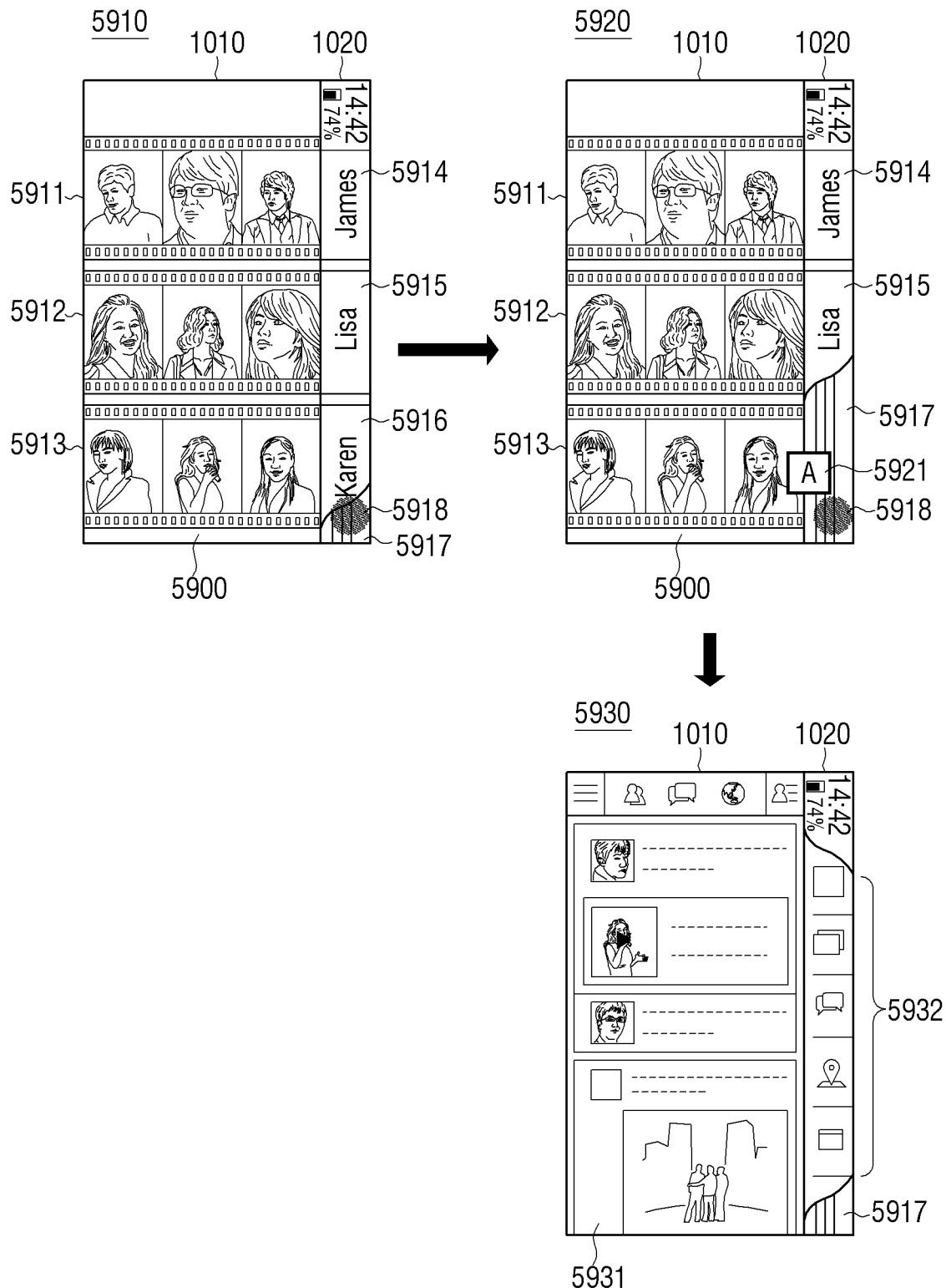

FIG. 59 is a diagram provided to explain a method of switching tasks by using the favorite function area within the task switching object. FIG. 59 illustrates task switching area 5917 in different format from the task switching object 5400 described in FIGS. 54 to 58. Referring to 5910 of FIG. 59, the controller 200 displays the task switching area 5917 within the sub area 1020. The task switching area 5917 may be expressed in a vertical line format. It may be constituted that some of the vertical lines are color lines corresponding to the favorite function area, and other some of the vertical lines are mono color lines corresponding to the running app area; however, it is not limited thereto.

The controller 200 may display the task switching area 5917 in a reduced format so as not to greatly cover the sub contents while displaying executing screen 5900 of the application selected by a user on the main area 1010, and displaying the sub contents 5914, 5915, 5916 related with the contents 5911, 5912, 5913 within the executing screen 5900 on the sub area 1020. When a user touches the task switching area 5917, and drags or flicks the touch toward the upper direction, the controller 200 expands the task switching area 5917. While the touch is maintained, the controller 200 displays preview object 5921 showing an icon or name of an application corresponding to the touched vertical line, as illustrated in 5920 of FIG. 59. When a user lifts off the touch or inputs dragging or flicking gestures to move the touched point toward a direction of the main area 1010, the controller 200 executes the application corresponding to the preview object 5921, and displays the executing screen 5931 on the main area 1010.

5930 of FIG. 59 illustrates that an SNS (social network service) program executes its service screen 5931 is displayed on the main area 1010 and the various sub contents 5932 related with the service screen 5931 are displayed on the sub area 1020. The controller 200 may display the task switching area 5917 in an original size or original format on the sub area 1020 when task switching completes.

According to another exemplary embodiment, the user terminal device 1000 may modify the display position of various menus and menu types by considering a user's grip on the user terminal device 1000. Thus, the user terminal device 1000 produced in mobile format may be gripped with a left hand, a right hand, and both hands of a user. Further, the user terminal device 1000 may be rotated toward a horizontal direction, stood toward a vertical direction, or laid down to be used according to necessity. The following will explain various exemplary embodiments of reconstituting interaction screens by considering the user's grip on the user terminal device 1000.

Figure 60:
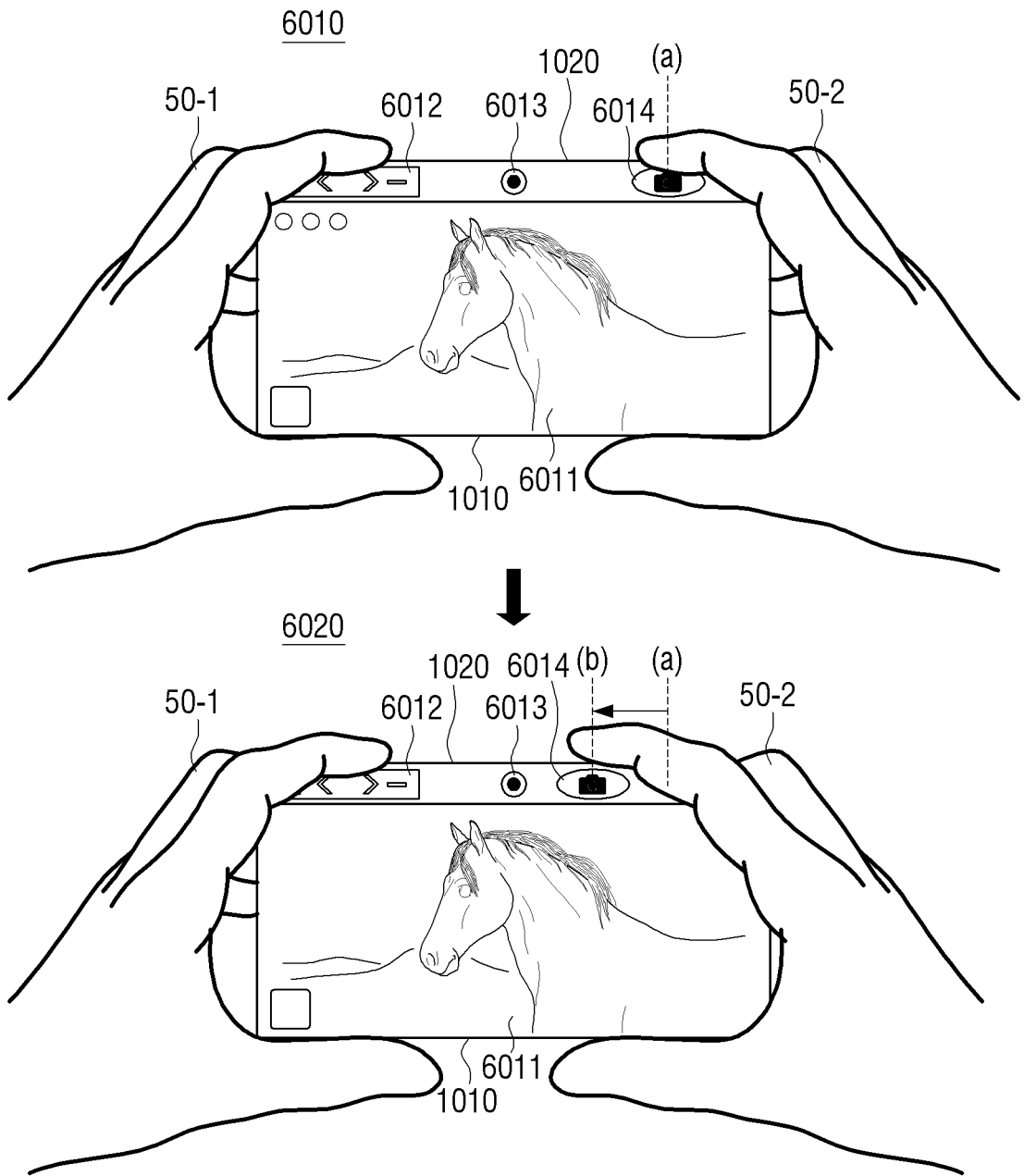

FIG. 60 illustrates that a user rotates the user terminal device 1000 toward a horizontal direction and grips it with both hands 50-1, 50-2 while the user terminal device 1000 is executing the camera application. Referring to FIG. 60, the controller 200 displays live view 6011 inputted from the camera 380 on the main area 1010, and various menus 6012, 6013, 6014 to control the photographing operation on the sub area 1020.

The user terminal device 1000 may determine that a user grips with both hands based on whether the user touches or approaches the main area 1010 and the sub area 1020. If it is determined that a user grips with both hands, the controller 200 may modify display position of menus 6012, 6013, 6014 according to positions of fingers regarding both hands. For example, as illustrated in 6010 of FIG. 60, when the user's forefinger of the right hand 50-2 is placed on (a) position, it may display the photographing menu 6014 to input a photographing command on (a) position. As illustrated in 6020 of FIG. 60, when a user further moves their right hand 50-2 toward the left and their forefinger moves to (b) position, the controller 200 may move the photographing menu 6014 to (b) position. In this case, display positions of the other menus 6012, 6013 may be modified according to display position of the photographing menu 6014. For example, when the photographing menu 6014 moves to the position of the camera turn off menu 6013, the controller 200 may move the camera turn off menu 6013 to the left and display it as if it has been pushed over by the photographing menu 6014.

Further, when another menu (e.g., 6013) is placed on (b) position, the controller 200 may move the photographing menu 6014 to the position that does not overlap with the other menu 6013.

Therefore, a user may easily select a menu even if they grip the user terminal device 1000 with various gestures.

Figure 61:
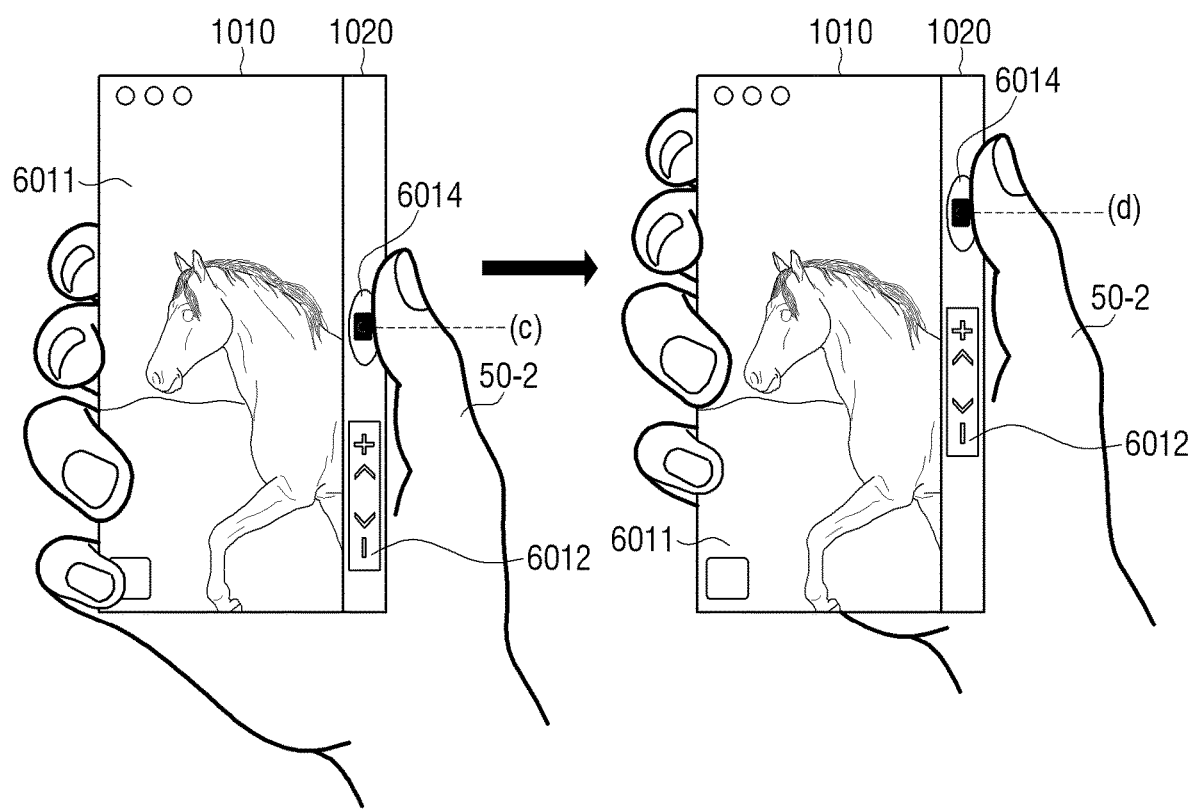

FIG. 61 illustrates that a user rotates the user terminal device 1000 toward a vertical direction while the camera application is executing, and grips it with their right hand 50-2. While rotating toward the vertical direction, the main area 1010 may display the live view 6011 standing toward the vertical direction.

Referring to FIG. 61, the thumb of the right hand 50-2 is placed toward the direction of the sub area 1020. The controller 200 determines the position of the thumb by using the touch sensor or the nearfield approaching sensor. Therefore, the controller 200 displays the photographing menu 6014 on (c) position of the sub area 1020, and the other menu 6012 on modified position according to the position of the photographing menu 6014.

6110 of FIG. 61 illustrates that a user grips a lower part of the user terminal device 1000, and 6120 of FIG. 61 illustrates that a user grips an upper part of the user terminal device 1000. Referring to 6120 of FIG. 61, because the position of the thumb moves from (c) position to (d) position, the controller 200 displays the photographing menu 6014 on (d) position of the sub area 1020. Further, the controller 200 moves and displays the other menu 6012 on the upper side as the photographing menu 6014 is moved and displayed on the upper side.

According to the above exemplary embodiments, a user may perform photographing by conveniently gripping the user terminal device 1000 and touching any area of the sub area 1020. Thereby, it may remove inconvenience in which a user needs to check the position of a photographing button (i.e., photographing menu 6014) with their eyes when photographing. Meanwhile, in order to remove confusing possibility with user gestures, the controller 200 may not display the menu on a part which is touched with the display surface with the user's grip.

Figure 62:
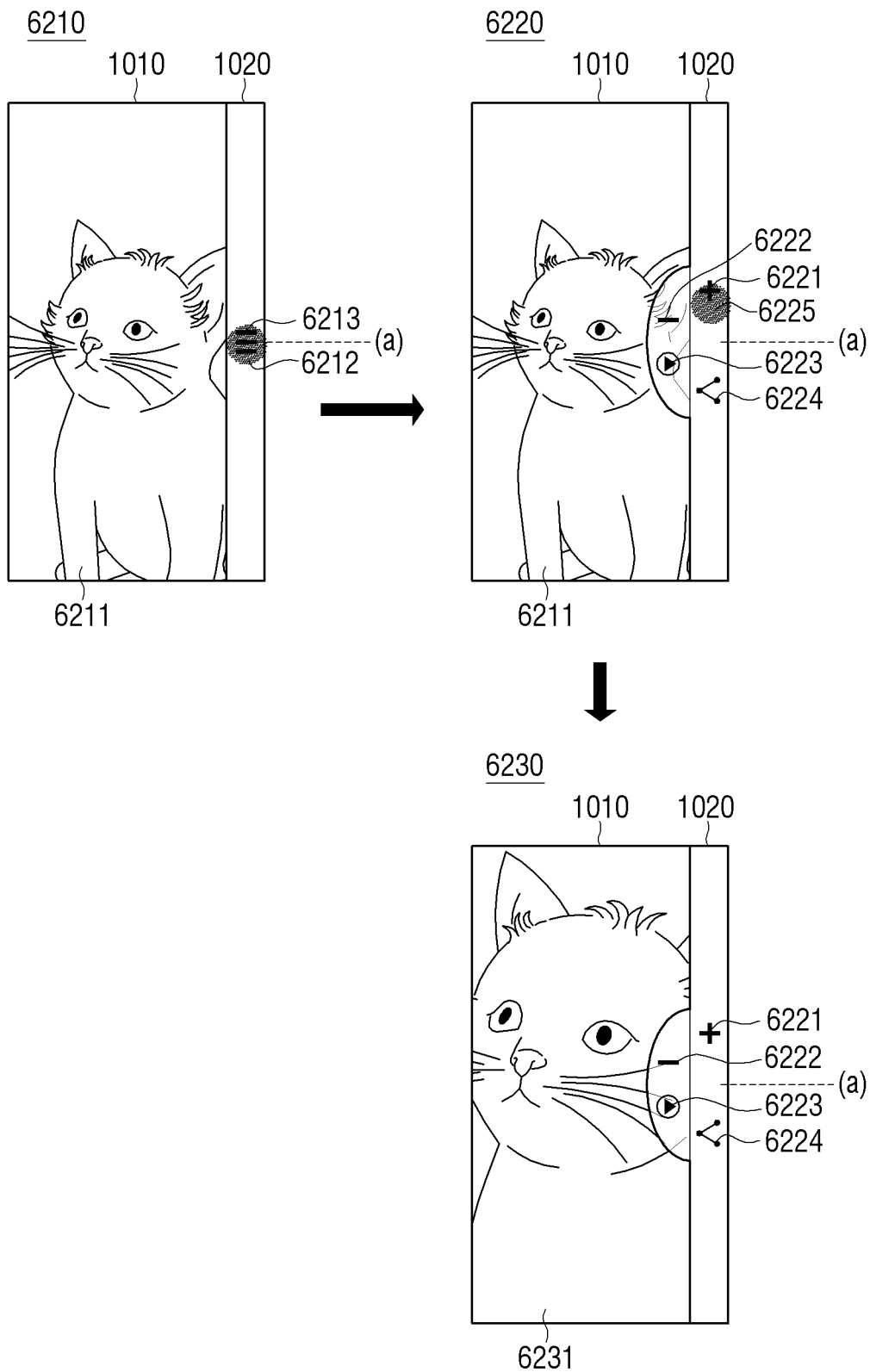

FIG. 62 illustrates that picture contents are displayed on the main area 1010 while the user terminal device 1000 is stood in a vertical direction and gripped with the right hand of a user. Referring to 6210 of FIG. 62, the controller 200 displays menu 6212 regarding the picture contents 6211 on the sub area 1020. The controller 200 may modify display position of the menu 6212 according to position of the thumb of the right hand 50-2. 6210 of FIG. 62 illustrates that the menu 6212 is displayed on (a) position. When the user taps the menu 6212 with their thumb, the controller 200 arranges and displays a plurality of menus 6221~6224 in circle format based on (a) position of the thumb, as illustrated in 6220 of FIG. 62. When the user taps one menu 6221 again, the controller 200 performs a controlling operation corresponding to the menu 6221. 6220 of FIG. 62 illustrates that the user taps the expand menu 6221. When the user taps the expand menu 6221, the controller 200 expands and displays the picture contents on the main area 1010, as illustrated in 6230 of FIG. 62.

Figure 63:
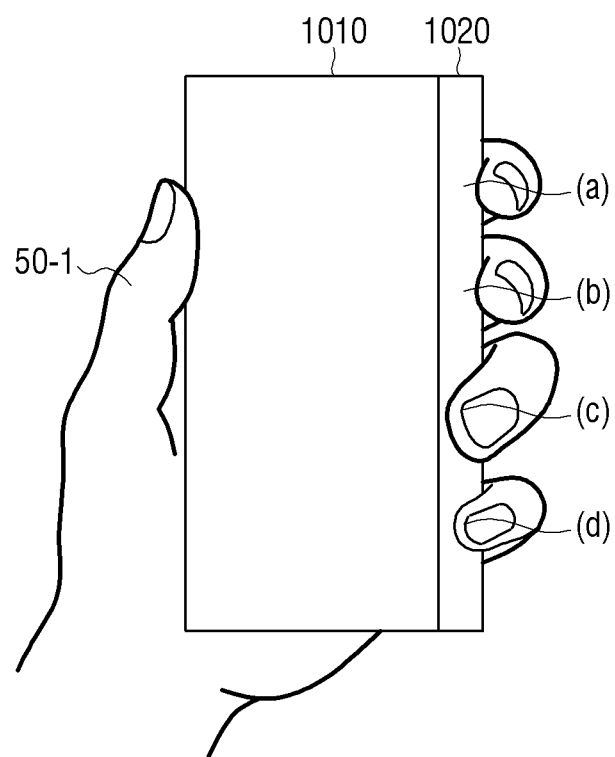

FIG. 63 illustrates that a user grips the user terminal device 1000 with their left hand. Referring to FIG. 63, the other four fingers (i.e., excluding the thumb) are placed toward the sub area 1020 direction. The controller 200 may display a plurality of menus on the sub area 1020 according to positions a, b, c, d of the four fingers.

Figure 64:
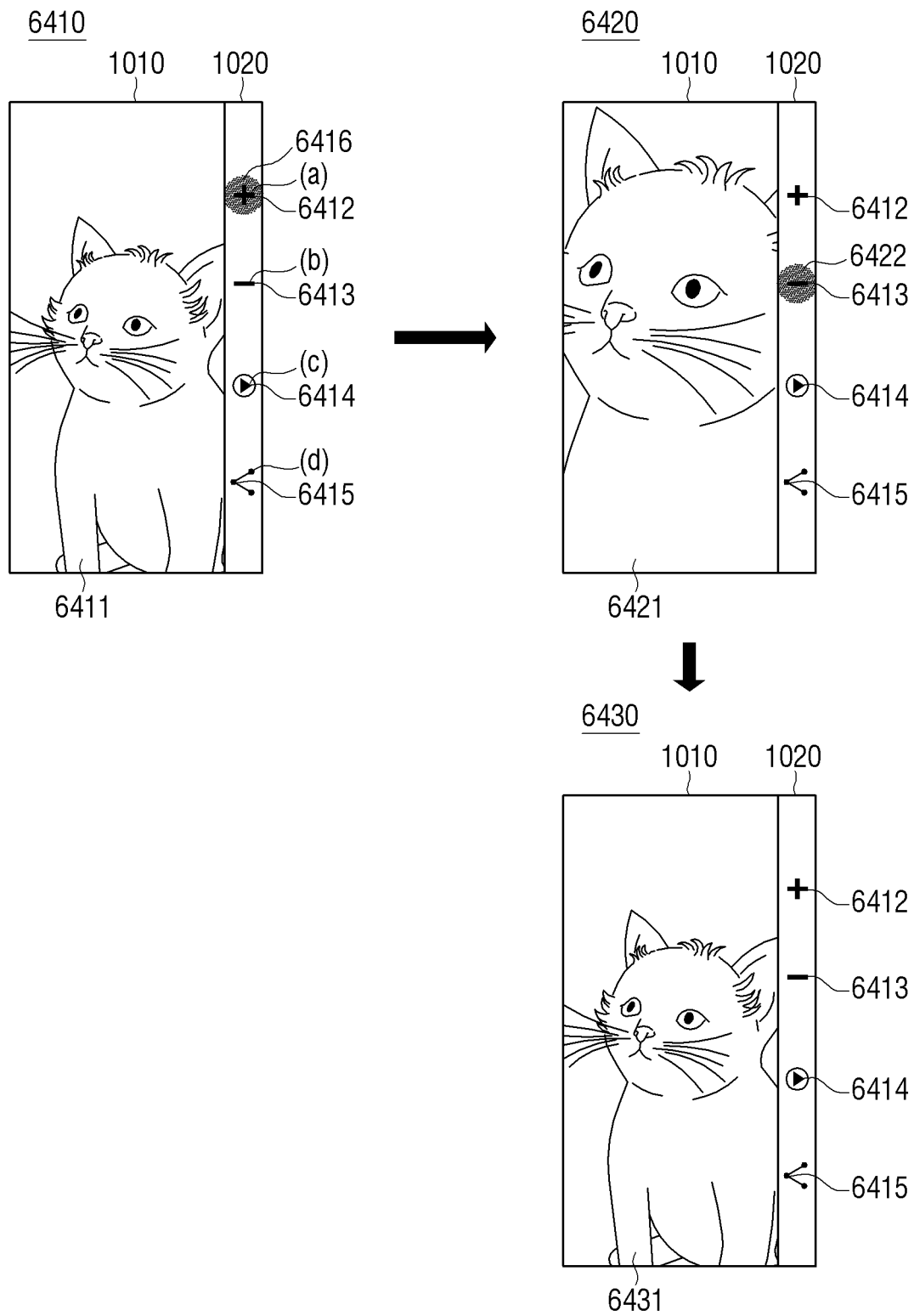

FIG. 64 illustrates that picture contents are displayed. Referring to 6410 of FIG. 64, the controller 200 may display various menus 6412~6415 that can control the picture contents 6411 correspondingly to the finger positions a, b, c, d while displaying the picture contents 6411 on the main area 1010. FIG. 64 illustrates that the expand menu 6412, the reduce menu 6413, the play menu 6414, and the share menu 6415 are displayed. These menus may be uniform to the menus 6221~6224 displayed when the initial menu 6212 is selected while gripping the user terminal device 1000 with a right hand; however, it is not limited thereto.

As illustrated in 6410 of FIG. 64, when a user taps the expand menu 6412, the controller 200 displays the expanded picture contents 6421 on the main area 1010 as illustrated in 6420 of FIG. 64. When the user taps the reduce menu 6413 again, the controller 200 may display the reduced picture contents 6331 as illustrated in 6430 of FIG. 64. The controller 200 may modify display positions of the menus 6412~6415 according to the modified positions when the positions of the four fingers are modified.

The user terminal device 1000 may be in a format in which the two sub areas 1020, 1030 provided on both sides of the main area 1010 may provide menus on various positions according to a user's grip on the user terminal device 1000.

Figure 65:
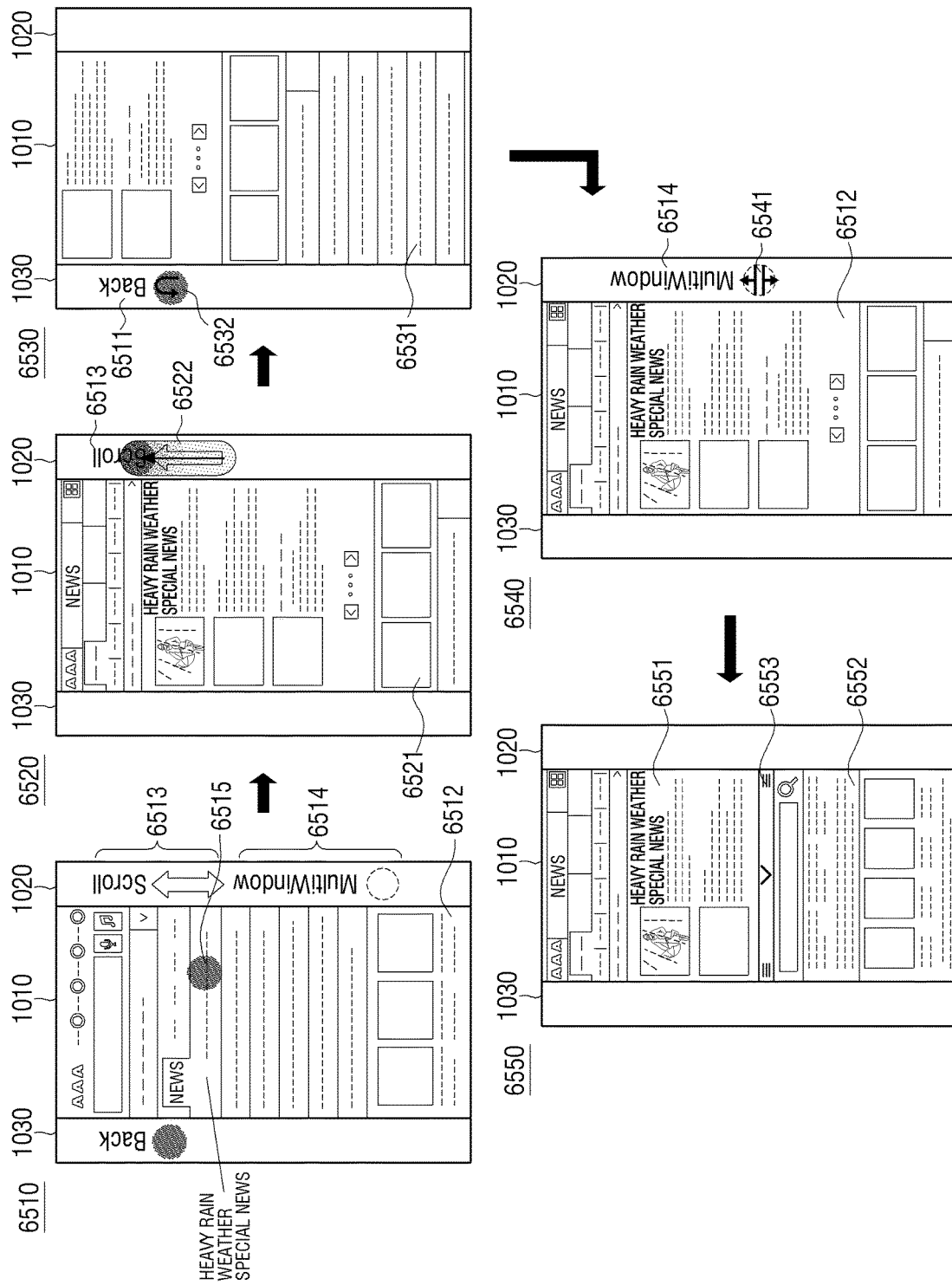

FIG. 65 is a diagram provided to explain an operation of the user terminal device 1000 according to such an exemplary embodiment. Referring to FIG. 65, the bended touch screen 100 includes the main area 1010, the first sub area 1020, and the second sub area 1030.

FIG. 65 illustrates that a user stands the user terminal device 1000 up toward a vertical direction, and grips it with their left hand. In this case, the thumb is placed on the second sub area 1030 side, and the other fingers placed on the first sub area 1020 side. The controller 200 displays menu 6511 or interaction guides 6513, 6514 respectively on the position of the thumb within the second sub area 1030, and positions of the one or more fingers within the first sub area 1020. 6513 of FIG. 65 displays web page screen 6512 on the main area 1010, the second sub area 1030 displays back menu 6511 on the thumb position, and the first sub area 1020 displays the interaction guide 6513 indicating the scroll function and the interaction guide 6514 indicating the multi window function respectively on the forefinger position and the middle finger position. The interaction guide may be text or an image to guide controlling operations performed when user gestures are inputted on a corresponding area. Although 6510 of FIG. 65 displays the interaction guide format, it may be displayed to be menu. According to various exemplary embodiments, each of the menu 6511 and the interaction guides 6513, 6514 may be continuously displayed on the first and the second sub areas 1020, 1030, or displayed for a certain time and closed. If they are closed, they may be displayed again when the fingers approach or touch each of the sub areas 1020, 1030.

6520 of FIG. 65 illustrates operation when a user taps one item within the web page screen 6512 displayed on the main area 1010. In this case, the controller 200 displays a screen 6521 corresponding to the item on the main area 1010. When the user inputs gestures to touch the first interaction guide 6513 on the first sub area 1020 with the forefinger, and drags or flicks the touch toward one direction, the controller 200 displays a new screen area 6531 which was not previously displayed on the main area 1010 by scrolling the screen 6521, as illustrated in 6530 of FIG. 65.

Meanwhile, when the user touches the back menu 6511 on the second sub area 1030 with their thumb, the controller 200 displays the previous screen 6512 again by executing the back function, as illustrated in 6540 of FIG. 65.

Further, as illustrated in 6540 of FIG. 65, when the user touches the second interaction guide 6514 within the first sub area 1020 with their middle finger, the controller 200 executes the multi window function to divide the screen displayed on the main area 1010 into a plurality of screens. 6550 of FIG. 65 illustrates displaying the screen when the multi window function is performed. As illustrated in 6550 of FIG. 65, the controller 200 displays boundary line 6553 on a position corresponding to the point which a user touches and lifts off, and displays two different screens 6551, 6552 with each other on each side of the boundary line 6553, respectively. The user may touch the boundary line 6553 again and modify the position.

Meanwhile, a user touch or approach interaction on the sub area may be used on the unlock function of the user terminal device 1000. In user terminal devices of the related art, an unlock function to release a lock screen is executed when a user draws some pattern on the display and inputs a password. Accordingly, when another person in the surrounding area may watch the user inputting the pattern or password, and learn the pattern or password. According to exemplary embodiments, security may be further enhanced when the user's grip of the user terminal device 1000 with respect to the sub area is considered when performing the unlocking.

Figure 66:
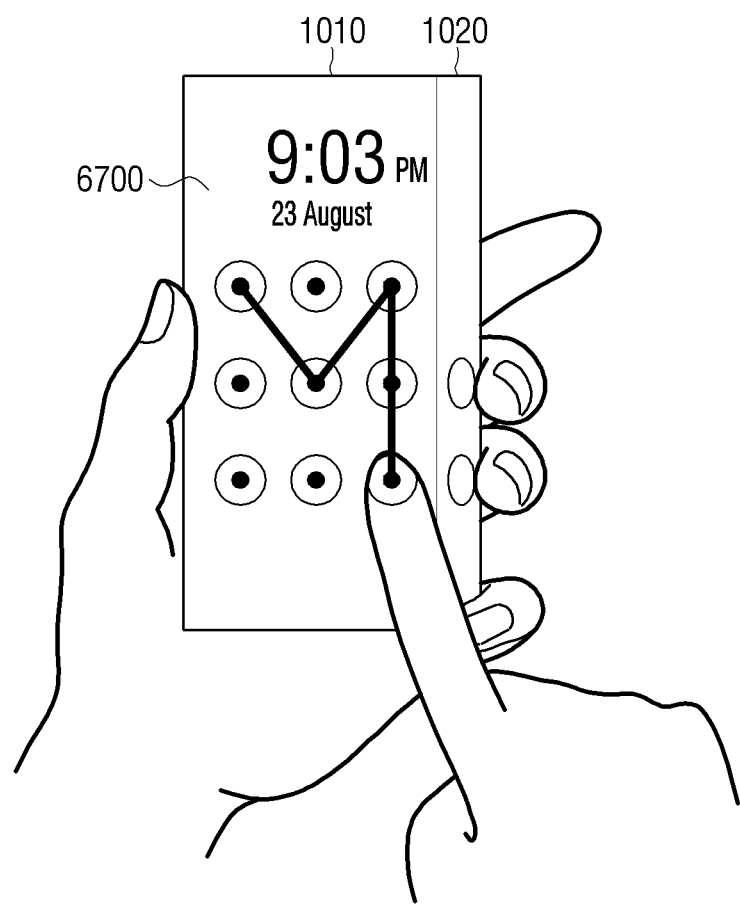

FIG. 66 is a diagram provided to explain a method for performing the unlocking by using both of the main area and the sub area according to an exemplary embodiment.

FIG. 66 illustrates that a user touches a part of the sub area 1020 and draws some pattern on the main area 1010 while gripping the user terminal device 1000. When the drawn pattern matches a previously determined pattern when the pattern is drawn while touching is performed on the prestored sub area 1020 position, the controller 200 may determine that the user has authorization and perform the unlocking. Specifically, the controller 200 determines the authorization by comparing drawing tracks sensed in the main area 1010 with the prestored unlock pattern in the storage 310. The controller 200 further determines the authorization by comparing position or number of touched points sensed in the sub area 1020 with the unlock point information prestored in the storage 310. When both of the drawing pattern and the touch points match with the prestored information, the controller 200 may activate the main area 1010 and display a home screen.

Figure 67:
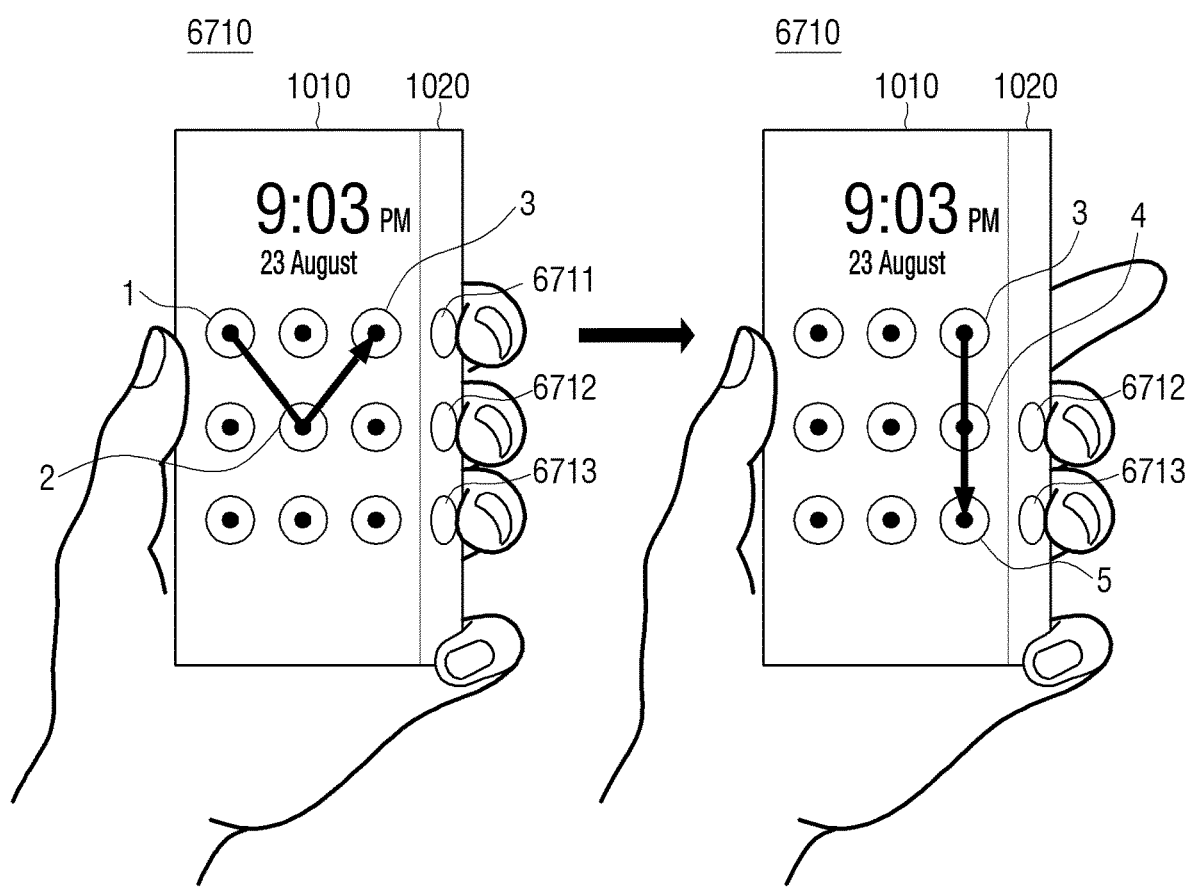

FIG. 67 is a diagram provided to explain another exemplary embodiment regarding the method for performing the unlocking by using the main area and the sub area. Referring to FIG. 67, a user may modify the touched position within the sub area 1020 while drawing the pattern. Specifically, as illustrated in 6710 and 6720 of FIG. 67, a user may touch three points 6711, 6712, 6713 with three fingers when they are drawing to consecutively pass through objects 1, 2, 3 within the main area 1010, and then pull off one finger so as to touch only the two points 6712, 6713 when they are drawing to pass through objects 4, 5. The controller 200 may divide the drawing pattern per section, determine the touched points or number of touches on the second sub area 1020 in each pattern section, and determine whether the user has authorization. During registering of the unlock pattern, a user may store a complex unlock pattern information in the storage 310 by inputting a drawing on the main area 1010 and performing the touch with their fingers on the sub area 1020.

According to the above exemplary embodiments, the controller 200 may sense whether a user touches or approaches the user terminal device 1000 by using the touch sensor or the nearfield approach sensor, and determine finger positions based on the sensing results.

Figure 68:
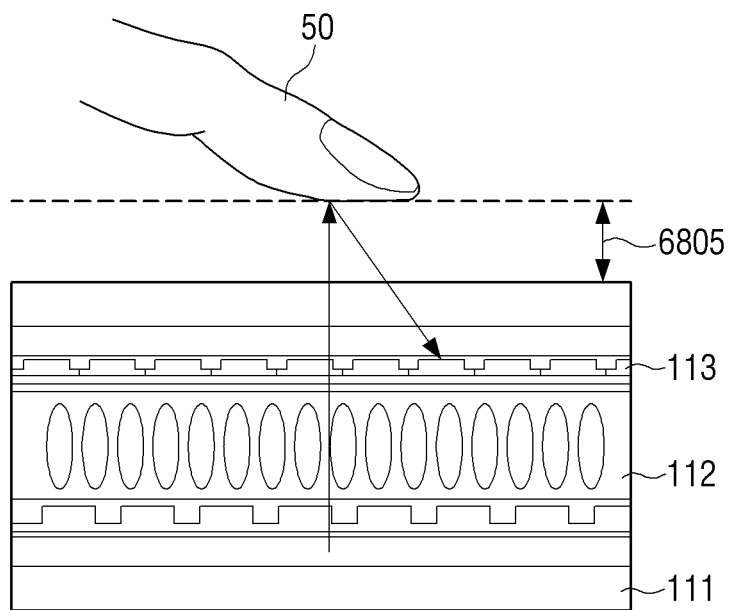

FIG. 68 is a diagram provided to explain an operation of the nearfield approach sensor to sense finger position. FIG. 68 illustrates one example of the sectional structure regarding the main area 1010 and the sub areas 1020, 1030.

Referring to FIG. 68, the bended touch screen 100 may include an infrared source 111, a display panel 112, and an infrared sensor 113.

The display panel 112 may be implemented to be format in which a plurality of gate lines and a plurality of data lines are crossed with each other to form pixel areas. When the display panel 112 is OLED type, each pixel area may be implemented in format in which R (Red), G (Green), and B (Blue) light-emitting components (e.g., OLED) are formed. Further, each pixel area forms switching components, i.e., TFT. The lower side of each pixel area may arrange sensors to sense user gestures made by a user's body or a pen. Thus, various sensors are provided with the display panel 112, and user gestures may be sensed on a pixel basis.

The infrared source 111 is provided on one surface of the display panel 112, and the infrared sensor 113 is provided on another surface of the display panel 112. The infrared source 111 projects infrared lights toward the surface direction of the display panel 112. Thereby, some area that can recognize approaching of a user finger 50 is formed on the surface of the display panel 112. This area becomes effective recognizing area 6805 that can recognize whether the display panel 112 is approached or not.

The infrared sensor 113 may include a plurality of infrared sensing components arranged in an array format. Thus, when the finger 50 approaches within the effective recognizing area 6805, the infrared sensor 113 may generate infrared scan images by sensing infrared lights reflecting from the finger 50. The controller 200 may sense the approaching inputting by using the infrared scan images. When the approaching input is sensed, the controller 200 may determine the approaching position of the user finger 50 by confirming the coordinate values of the infrared sensing components to sense approaching inputting within a corresponding area.

In addition to the units illustrated in FIG. 68, the bended touch screen 100 may further include other various units, or may also have fewer of the units.

Meanwhile, as described above, the bended touch screen may be constituted in format which the plane including the main area and the plane including one or more sub area are connected and fixed with each other to form an obtuse angle. Thereby, a boundary area is provided between the main area and the sub areas. The following will explain various exemplary embodiments of performing interactions by using the boundary area.

Figure 69:
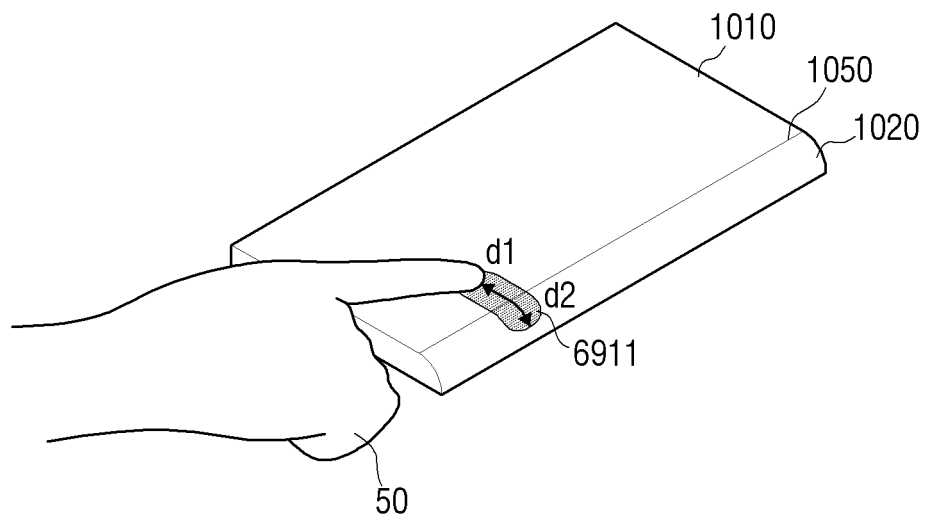

FIG. 69 illustrates a constitution of the user terminal device 1000 including the main area 1010, the sub area 1020 and the boundary area 1050 between the above two areas. Although FIG. 69 illustrates a line format of the boundary area 1050, the boundary area 1050 may be an area having more than a certain size when the main area 1010 and the sub area 1020 are connected by a smoothly curved angle. A user may touch one of the main area 1010 and the sub area 1020, and input a gesture 6911 dragging or flicking toward different area direction (d1 or d2). Thus, a user may input the gesture 6911 to pass through the boundary area 1050 between the main area 1010 and the sub area 1020. Such gesture 6911 may be mapped with functions different from the gestures performed only on the main area 1010 or the gestures performed only on the sub area 1020.

The controller 200 may determine that dragging or flicking is performed toward the d2 direction, when the touch is consecutively sensed on the surrounded sub area 1020 while the touch is first performed on the main area 1010 and not lifted off. Meanwhile, the controller 200 may determine that a user gesture is performed toward the d1 direction when the touch is consecutively sensed on the surrounded main area 1010 while the touch is first performed on the sub area 1020 and not lifted off. The controller 200 may perform different controlling operations according to the types of contents displayed on the main area 1010 or the sub area 1020 and the directions of user gestures.

Figure 70:
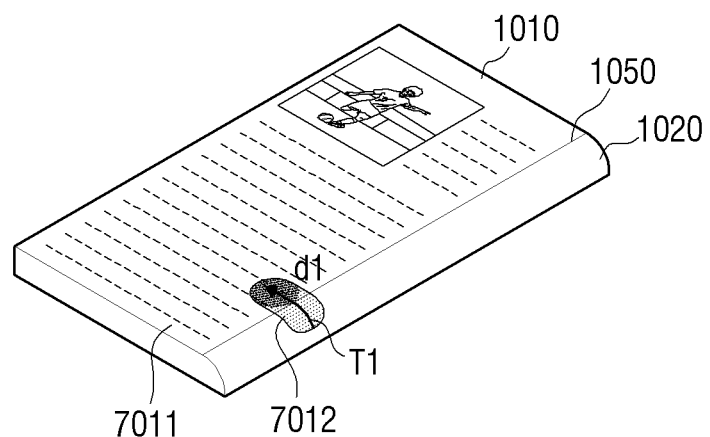
Figure 70:
Figure 70:
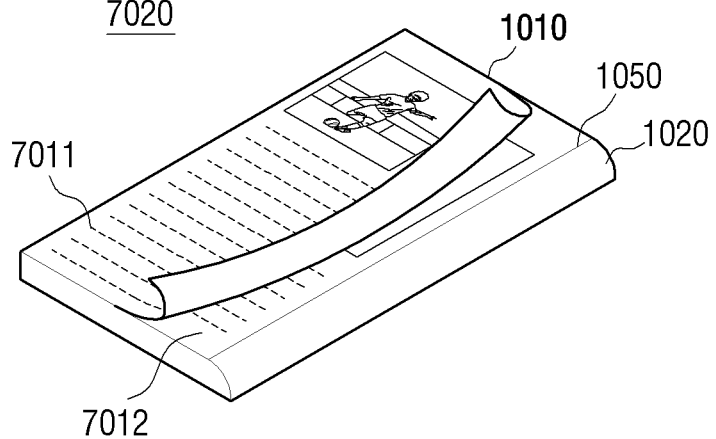

FIG. 70 illustrates that electronic book contents 7011 are displayed on the main area 1010. Referring to 7010 of FIG. 70, a user may touch some point T1 within the sub area 1020, and input a gesture 7012 passing through the boundary area 1050 by dragging or flicking toward the main area 1010 direction, i.e., the d1 direction. When such gesture 7012 is inputted, the controller 200 may display graphic effects as if book pages are turned over as illustrated in 7020 of FIG. 70, and display next page 7012 of the electronic book contents. On the contrary, when the gestures is inputted toward the d2 direction (not illustrated), the controller 200 may display the previous page of the current page 7011.

Meanwhile, when dragging or flicking is performed within the main area 1010, the controller 200 may perform scrolling of the page which is currently displayed toward the gesture's direction, or modifying into another electronic book contents.

Figure 71:
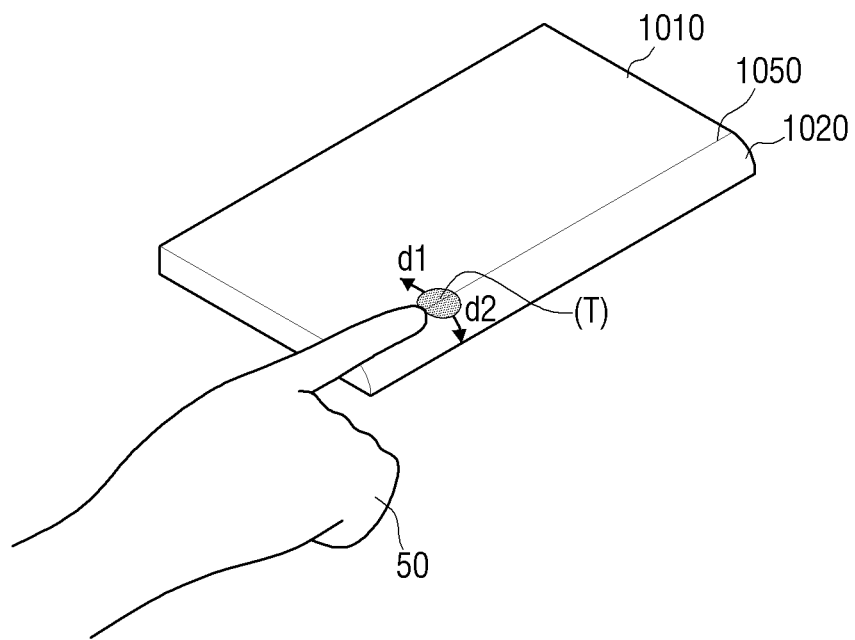

FIG. 71 is a diagram provided to explain another exemplary embodiment of interactions by using the boundary area. Referring to FIG. 71, a user may touch the boundary area 1050, and input gestures moving toward the d1 or d2 direction. Such gestures may be distinguished and mapped with functions different from the other gestures.

Figure 72:
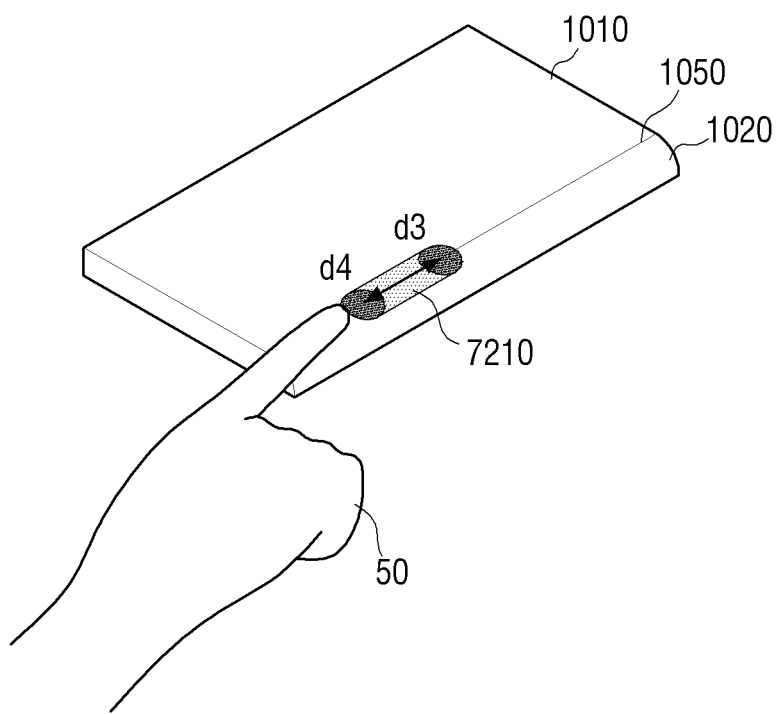

FIG. 72 is a diagram provided to explain another exemplary embodiment of interactions by using the boundary area. Referring to FIG. 72, a user may touch the boundary area 1050, and input a gesture 7210 moving the touched point so as to follow the boundary area 1050 toward a d3 or d4 direction. Such gestures may be also distinguished and mapped with functions different from the other gestures.

Figure 73:
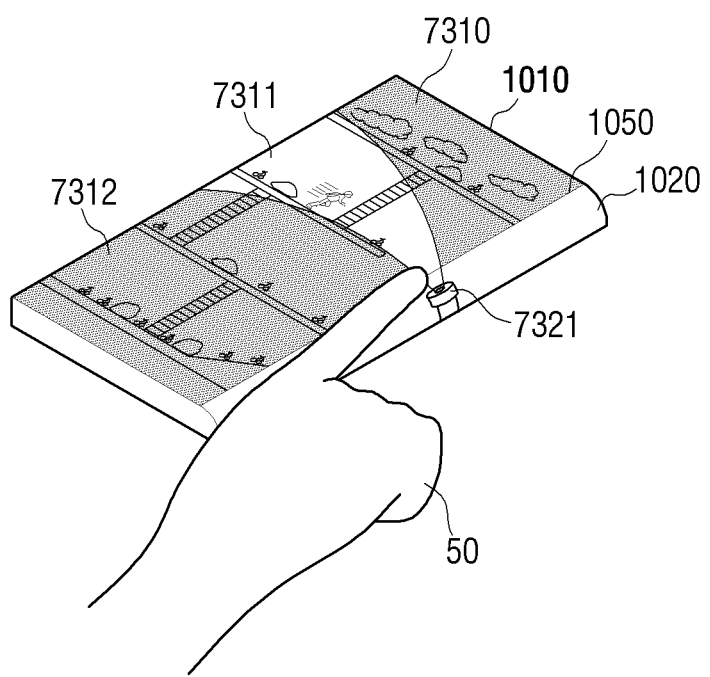

FIG. 73 is a diagram of an exemplary embodiment of a game application screen which uses the gestures of FIG. 72. Referring to FIG. 73, the game screen 7310 may be displayed on the main area 1010, and an object 7321 related with the game may be displayed on the sub area 1020. For example, FIG. 73 illustrates that the object 7321 in flash format is displayed on the sub area 1020. On the game screen 7310, only the area lighted by the flash object 7321 may be displayed brightly, and the other areas may be displayed darkly. A user may modify the area lighted by the flash object 7321 by touching the boundary area 1050 and dragging the touch toward the d3 or d4 direction, thereby improving enjoyment of playing the game.

Figure 74:
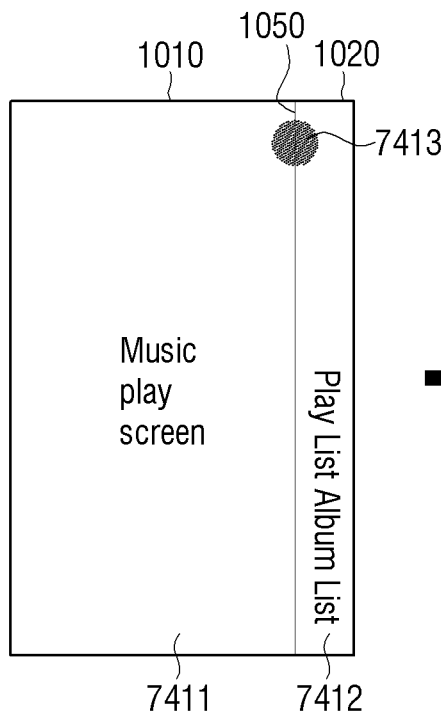
Figure 74:
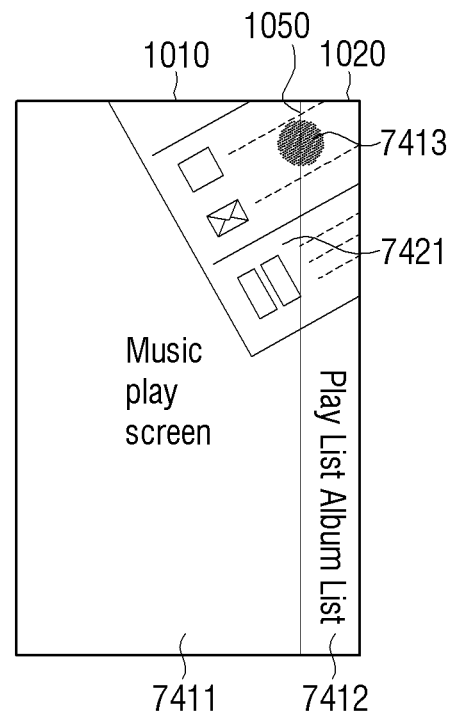
Figure 74:
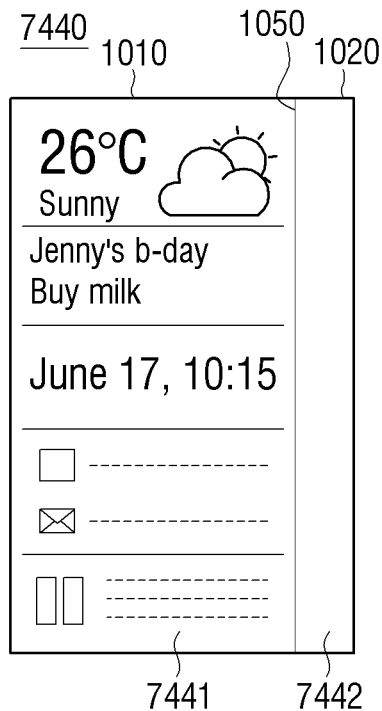
Figure 74:
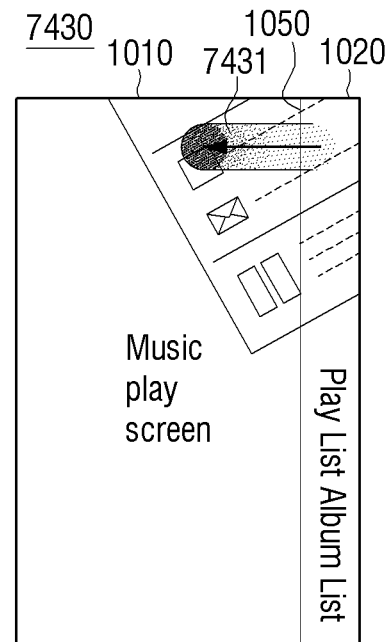

FIG. 74 is a diagram provided to explain another exemplary embodiment of using the gestures in FIG. 72.

Referring to FIG. 74, the user terminal device 1000 may display music reproducing screen 7411 on the main area 1010, and album jacket pictures 7412 including the music contents or other information regarding the music contents on the sub area 1020, when the music application executes. When a user touches the boundary area 1050 as illustrated in 7410 of FIG. 74, the controller 200 displays preview image 7421 regarding a home screen on the main area 1010 and the sub area 1020 near to the touched point 7413.

7420 of FIG. 74 illustrates that the preview image 7421 is sliding down from the upper direction of a right diagonal line to the lower direction of a left diagonal line. As illustrated in 7430 of FIG. 74, when a user inputs a gesture 7431 dragging or flicking toward the main area 1010 direction, the controller 200 rotates the preview image 7421 toward the main area 1010 direction and displays a home screen 7441 on the whole of the main area 1010, as illustrated in 7440 of FIG. 74. Further, the controller 200 displays an object corresponding to the home screen 7441 on the sub area 1020.

Figure 75:
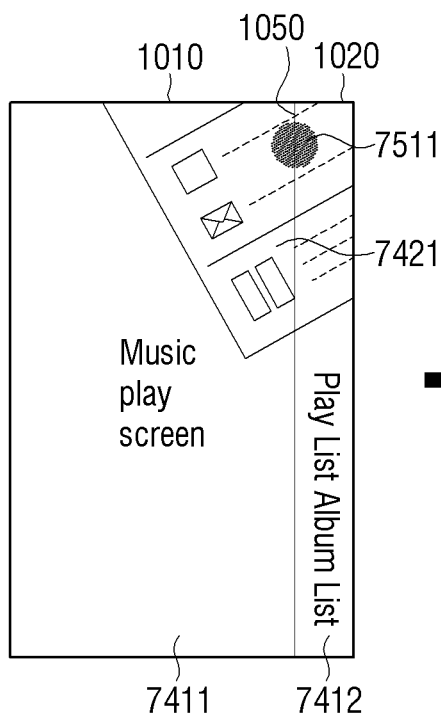
Figure 75:
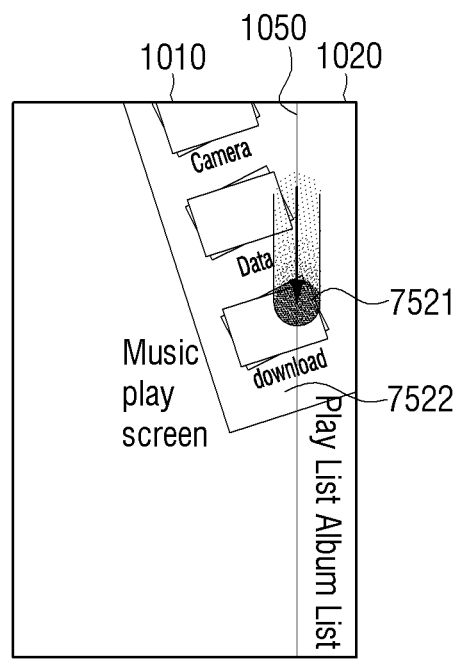
Figure 75:
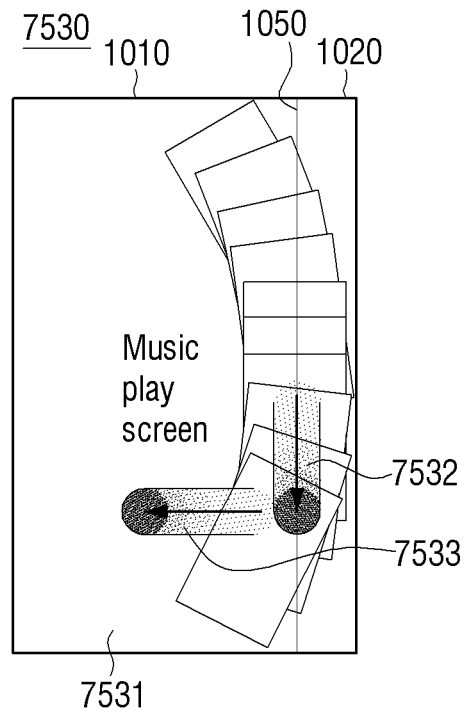

FIG. 75 is a diagram provided to explain another exemplary embodiment of using the gestures in FIG. 72. Referring to 7510 of FIG. 75, when a user touches the boundary area 1050, the preview image 7421 regarding a home screen may be displayed near to the touched point. When a user performs dragging toward the lower direction 7521, 7532 follows the boundary area 1050, and a plurality of screen images 7522 are consecutively displayed according to the dragging, as illustrated in 7520, 7530 of FIG. 75.

For example, the preview image 7421 regarding a home screen is initially displayed, and preview images regarding various application screens such as APP01, APP02, APP03 may be displayed according to the dragging. When a user inputs gesture 7533 dragging or flicking toward the main area 1010 direction, the controller 200 displays a screen 7541 corresponding to the finally displayed preview image 7531 on the main area 1010, and displays an object 7542 corresponding to the screen 7541 on the sub area 1020, as illustrated in 7540 of FIG. 75. FIG. 75 illustrates that address book information is displayed on the main area 1010, and the object 7542 indicating an index is displayed on the sub area 1020.

Figure 76:
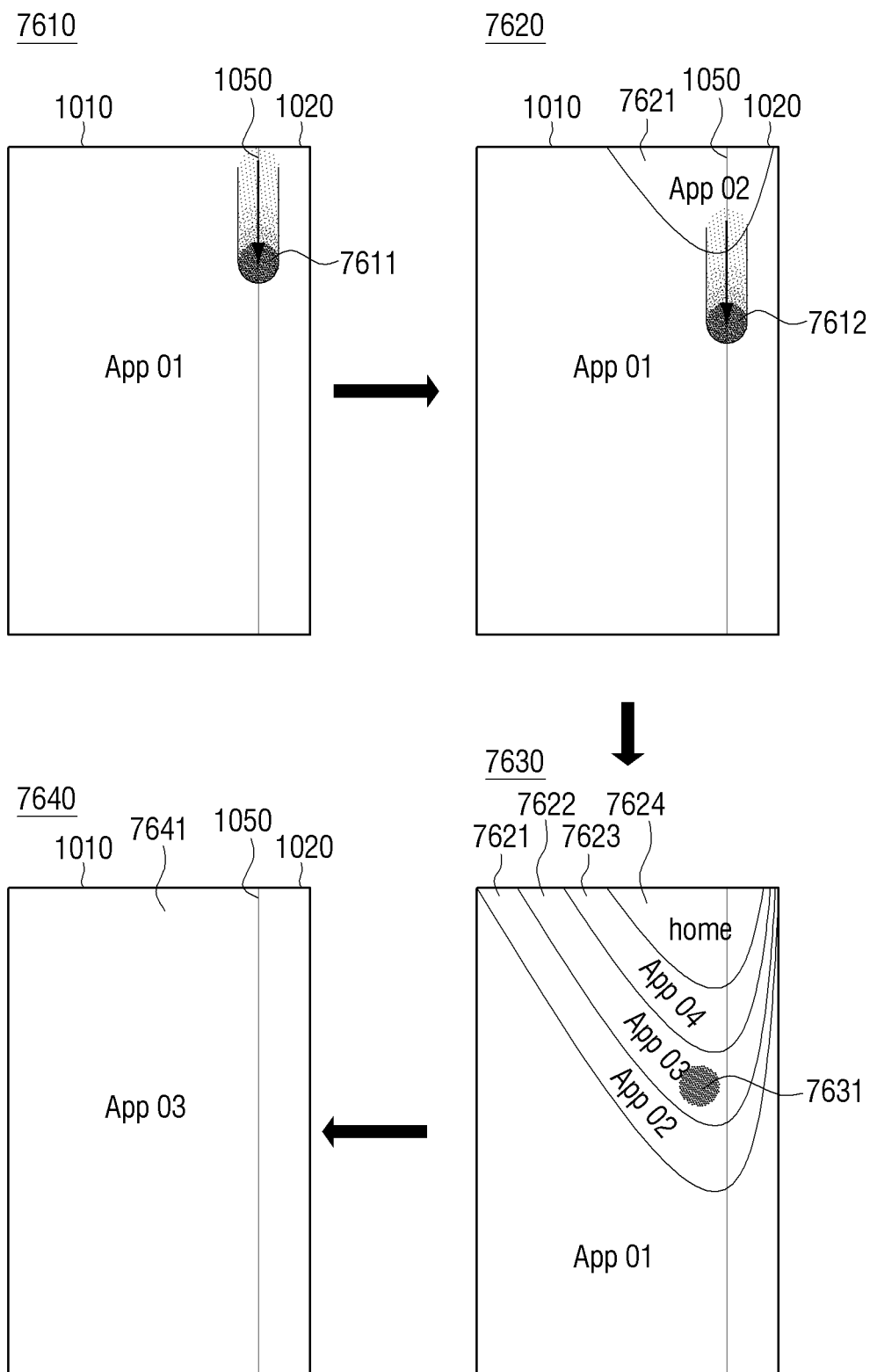

FIG. 76 is a diagram provided to explain another exemplary embodiment of using the gestures in FIG. 72. Referring to 7610 of FIG. 76, when a user inputs a gesture 7611 dragging from the end part of the boundary area 1050 to the lower direction while APP01 is displayed on the main area 1010, the controller 200 displays a preview image 7621 regarding another application screen APP02 according to the dragging. Referring to 7620 of FIG. 76, the controller 200 may display as if the APP01 screen is pulled over by the dragging and the lower APP02 screen appears. When the user further drags toward the lower direction 7612, the controller 200 may consecutively display preview images 7621, 7622, 7623, 7624 regarding a plurality of screens, as illustrated in 7630 of FIG. 76. When the user completes the dragging, such preview images 7621, 7622, 7623, 7624 may be displayed for a certain time before being closed. When the user selects one preview image before the preview images 7621, 7622, 7623, 7624 are closed, a screen corresponding to the selected preview image is displayed on the main area 1010. 7630 and 7640 of FIG. 76 illustrate that APP03 is selected. The controller 200 displays screen 7641 of the selected APP03 on the main area 1010, and the sub contents related with APP03 on the sub area 1020.

According to another exemplary embodiment, when gestures moving along the boundary area 1050 are inputted, the controller 200 may lay down the currently displayed screen on the main area 1010 toward the back direction and display a plurality of objects, as illustrated in FIG. 56.

Figure 77:
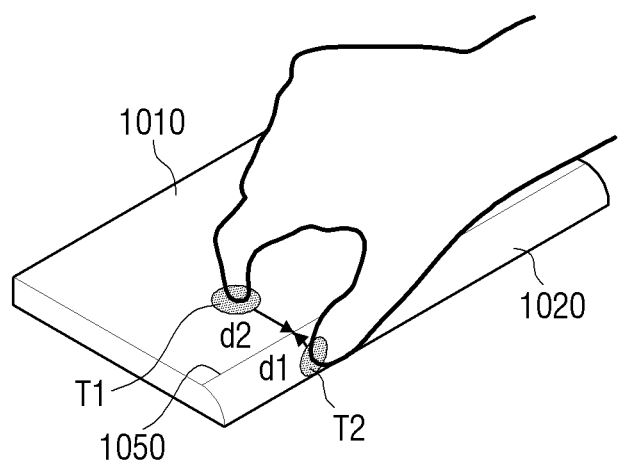

Meanwhile, a user may perform interactions by using pinch gestures. FIG. 77 illustrates a pinch-in gesture in which a user respectively touches a point (T1) on the main area 1010 and a point (T2) on the sub area 1020 with a plurality of fingers, and gathers the touched points toward the boundary area 1050. Similarly, a user may input a pinch-out gesture by respectively touching the main area 1010 and the sub area 1020 with a plurality of fingers and expanding the interval between the touched points. The controller 200 performs controlling operations mapped with the gestures when the pinch-in gestures and the pinch-out gestures are inputted.

Figure 78:
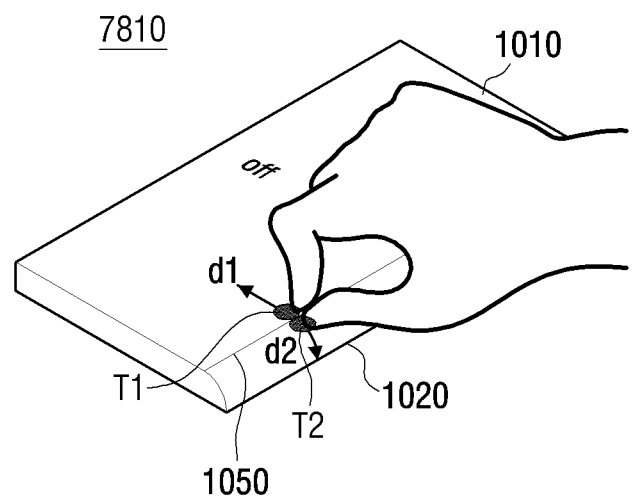
Figure 78:
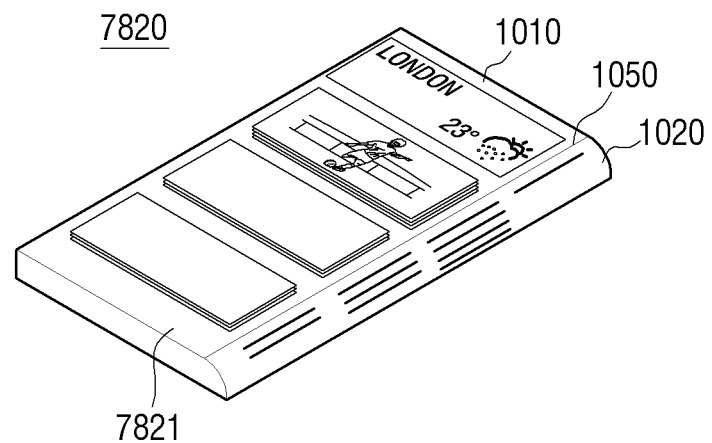

FIG. 78 is a diagram provided to explain one example regarding a controlling operation when the pinch-out gesture is inputted. 7810 of FIG. 78 illustrates that the user terminal device 1000 is locked. When the user terminal device 1000 is locked, the controller 200 may respectively turn off the main area 1010 and the sub area 1020. When first pinch gesture is inputted, the controller 200 may perform an unlock operation to activate the user terminal device 1000. The first pinch gesture may be a pinch-out gesture.

7810 of FIG. 78 illustrates that a user performs the pinch-out gesture by touching the boundary area 1050 between the main area 1010 and the sub area 1020 respectively with a plurality of fingers (T1, T2), and expanding the interval between the touched points. The pinch-out gesture does not necessarily start from the boundary area 1050. Instead, the controller 200 may determine that the pinch-out gesture is inputted when a user respectively touches the main area 1010 and the sub area 1020, and expands the interval between the touched points.

Referring to 7820 of FIG. 78, the controller 200 performs the unlocking as the pinch-out gesture is inputted, and displays a home screen 7821 on the main area 1010. Further, the controller 200 may display an object corresponding to the home screen 7821 on the sub area 1020.

Meanwhile, when a second pinch gesture is inputted while the user terminal device 1000 is unlocked, the controller 200 may perform the locking to inactivate the user terminal device 1000. The second pinch gesture may be a pinch-in gesture.

Figure 79:
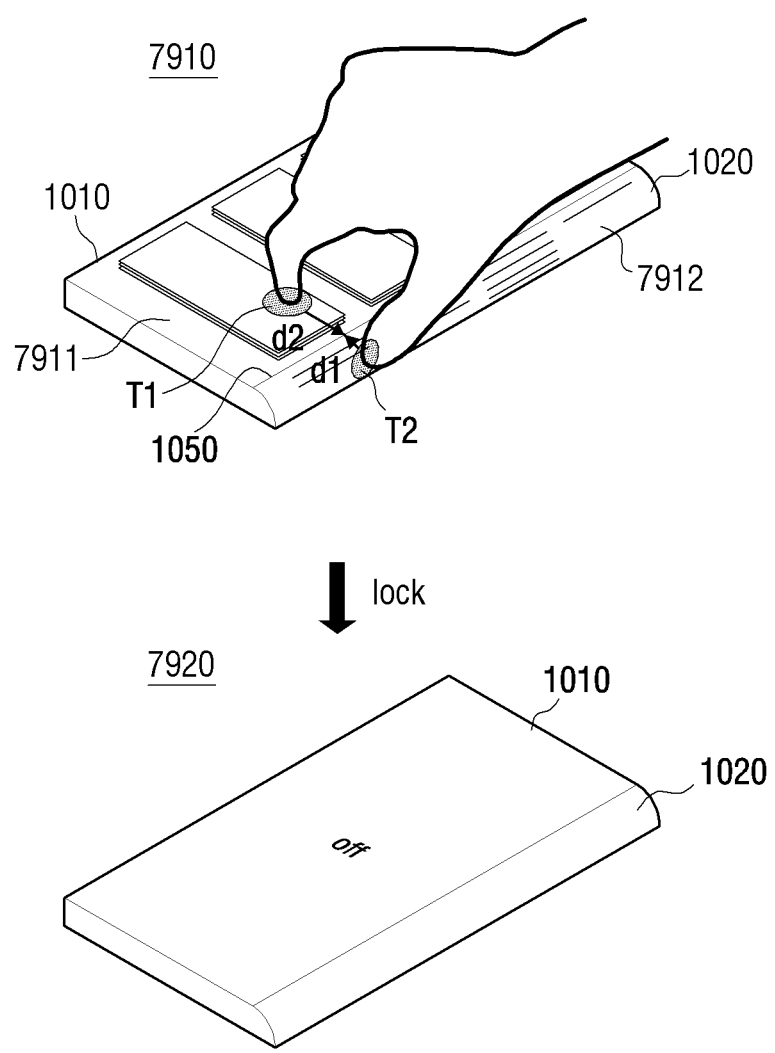

FIG. 79 is a diagram provided to explain a method for performing the locking. Referring to 7910 of FIG. 79, the controller 200 may sense whether the pinch-in gesture is inputted while some screen 7911 is displayed on the main area 1010, and while the object 7912 corresponding to the screen 7911 is displayed on the sub area 1020. When a user inputs the pinch-in gesture by respectively touching one point (T1) within the main area 1010 and one point (T2) within the sub area 1020 and gathering the interval between the touched points, the controller 200 may perform the locking to respectively turn off the main area 1010 and the sub area 1020, as illustrated in 7920 of FIG. 79.

The pinch-in gestures and the pinch-out gestures may also be inputted following along the boundary area 1050.

Figure 80:
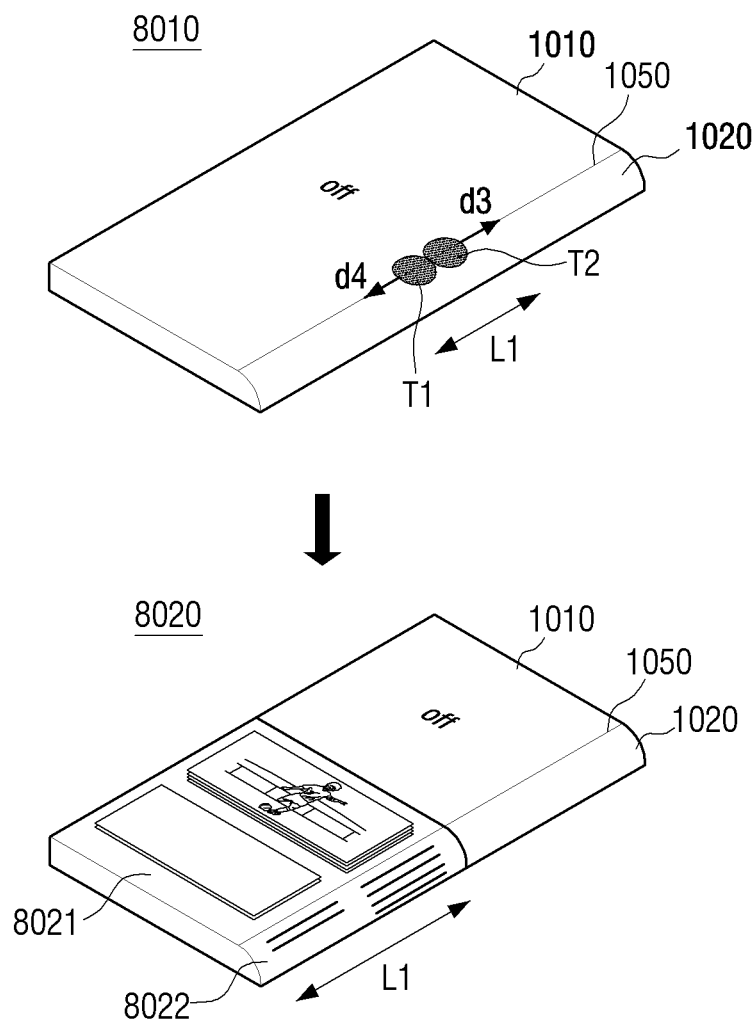

FIG. 80 illustrates one example of operation when the pinch-out gesture is inputted following along the boundary area. Referring to 8010 of FIG. 80, a user may input the pinch-out gesture by respectively touching the two points (T1, T2) on the boundary area 1050 with a plurality of fingers and expanding the touched points while the user terminal device 1000 is inactivated. 8010 of FIG. 80 illustrates that the pinch-out is performed by L1.

When the pinch-out gesture is performed following along the boundary area 1050, the controller 200 may activate sections on the main area 1010 and the sub area 1020 respectively by the distance over which the pinch-out gesture is performed, i.e., L1, as illustrated in 8020 of FIG. 80. The controller 200 displays screens 8021, 8022 within the activated sections on the main area 1010 and the sub area 1020.

Figure 81:
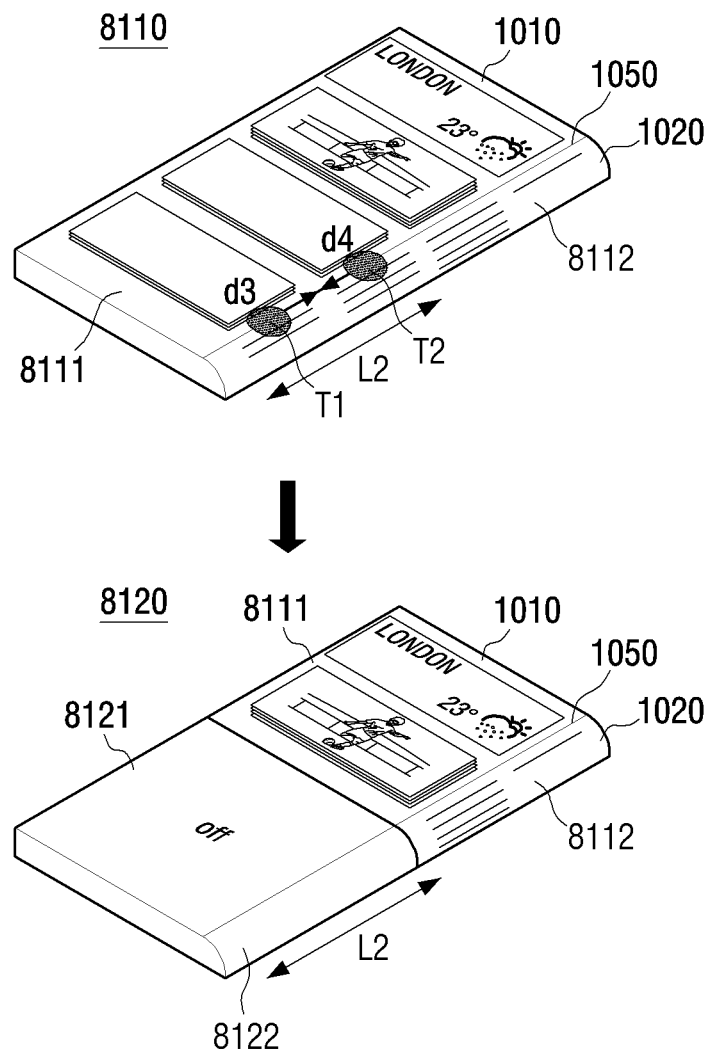

FIG. 81 is a diagram provided to explain an operation of inactivating sections while the user terminal device 1000 is unlocked. 8110 of FIG. 81 illustrates that a user performs the pinch-in gesture following along the boundary area 1050 while some screen 8111 is displayed on the main area 1010 and an object 8112 corresponding to the screen 8111 is displayed on the sub area 1020. The user may perform the pinch-in gesture by touching the two points (T1, T2) on the boundary area 1050 with two fingers, moving the touched points respectively toward d3 and d4 directions, and gathering the interval.

When the pinch-in gesture is inputted, the controller 200 inactivates the sections on the main area 1010 and the sub area 1020, as illustrated in 8120 of FIG. 81. Specifically, the controller 200 turns off the sections on the main area 1010 and the sub area 1020 which correspond to the distance performed by the pinch-out gesture, i.e., L2. Thereby, the main area 1010 displays the screen 8111 on the area excluding the turned-off section 8121 and the object 8112 on the area excluding the turned-off section 8122.

Figure 82:
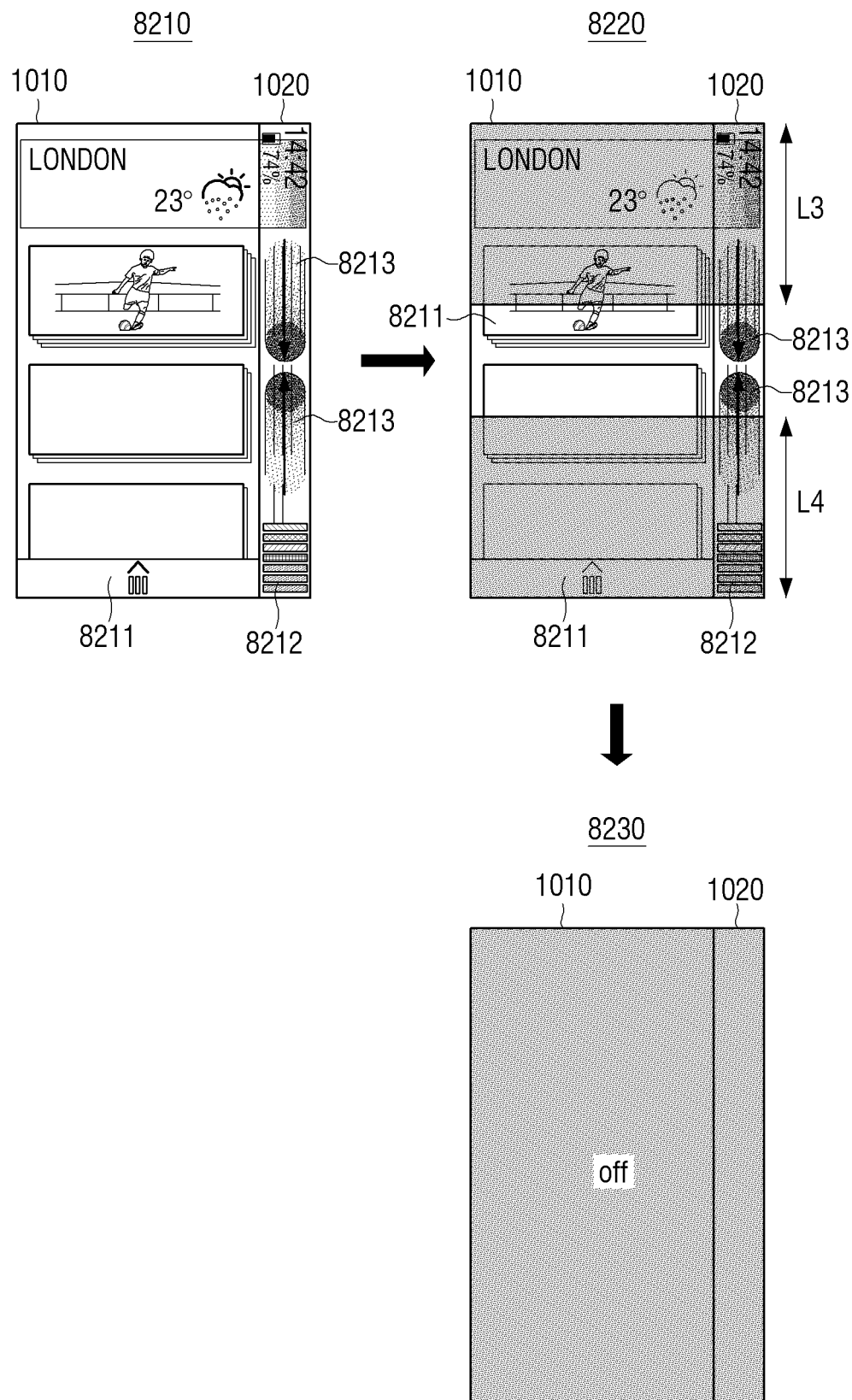

FIG. 82 is a diagram provided to explain an operation when the pinch gesture is performed on the sub area. Referring to 8210 of FIG. 82, a home screen 8211 may be displayed on the main area 1010, and an object 8212 corresponding to the home screen 8211 may be displayed on the sub area 1020. When a user inputs the pinch-in gesture 8213 by touching the sub area 1020 with a plurality of fingers and gathering the interval between the touched points, the controller 200 may inactivate the sections of the areas in which the main area 1010 and the sub area 1020 respectively become darker from the both ends. Thereby, as illustrated in 8220 of FIG. 82, the main area 1010 and the sub area 1020 enter a turned-off state according to the distance from the upper end to the first point (T1) touched by the user, i.e., L3 and the distance from the lower end to the second point (T2) touched by the user, i.e., L4, and the screen 8211 is displayed between the area excluding for the turned-off sections.

When a user performs the pinch-in gesture 8213 to gather the first and the second touched points to meet with each other as illustrated in 8220 of FIG. 82, the controller 200 turns off all of the main area 1010 and the sub area 1020 by performing the locking. 8230 of FIG. 82 illustrates that the user terminal device 1000 is locked by the pinch-in gesture.

Meanwhile, although FIG. 82 illustrates the exemplary embodiment which the user terminal device 1000 is controlled with a pinch gesture inputted on one sub area 1020, when the bended touch screen 100 including the constitution described in FIGS. 6 and 7 is provided, a user may input gestures dragging toward the center or dragging out from the center toward the first sides and the second sides while simultaneously gripping the first sides of the first and the second sub areas 1020, 1030 with two fingers of the right hand and simultaneously gripping the second sides of the first and the second sub areas 1020, 1030 with two fingers of the left hand. The controller 200 may perform the locking or the unlocking according to such user gestures.

Figure 83:
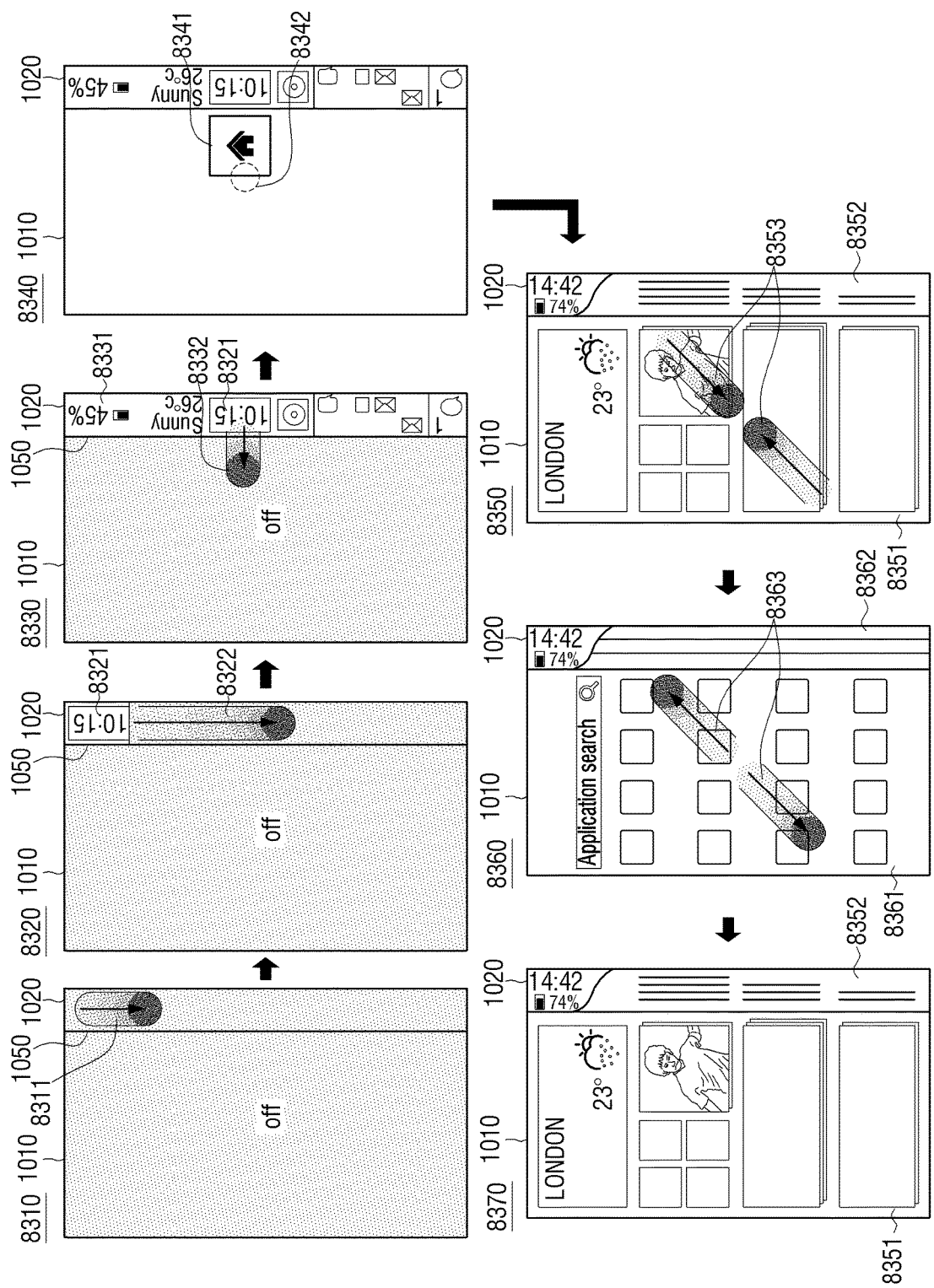

FIG. 83 is a diagram provided to explain an exemplary embodiment of performing interactions according to various user gestures inputted through the main area and the sub area. Referring to 8310 of FIG. 83, a user may input a gesture 8311 dragging the sub area 1020 while the user terminal device 1000 is inactivated. When the user gesture 8311 is inputted, the controller 200 activates the sub area 1020 as illustrated in 8320 of FIG. 83. The controller 200 may gradually activate the sub area 1020 according to the direction in which the user gesture 8311 is performed. 8320 of FIG. 83 illustrates that a time object 8321 indicating the current time is displayed while the sub area 1020 is activated from the upper end toward the lower end. When the user gesture 8311 is performed for more than a certain distance, the whole of the sub area 1020 is activated as illustrated in 8330 of FIG. 83. When a user inputs a gesture 8332 selecting one object and dragging or flicking the selection toward the main area 1010 direction, the controller 200 activates the main area 1010. Further, the controller 200 modifies and displays the corresponding object 8321 into home icon 8341 as illustrated in 8340 of FIG. 83, and displays a home screen 8351 when the touch is lifted off, as illustrated in 8350 of FIG. 83. The sub area 1020 displays an object 8352 corresponding to the home screen 8351. The screen 8351 may display widgets, icons, and text.

When a user inputs the pinch-in gesture 8353 on the home screen 8351, the controller 200 displays an application list 8361 by reducing the home screen 8351 as illustrated in 8360 of FIG. 83. Further, the controller 200 summarizes objects 8352 displayed on the sub area 1020 and displays one layer panel 8362. When the user inputs the pinch-out gesture 8363, the controller 200 displays the home screen 8351 and the object 8352 on the main area 1010 and the sub area 1020 again as illustrated in 8370 of FIG. 83.

Figure 84:
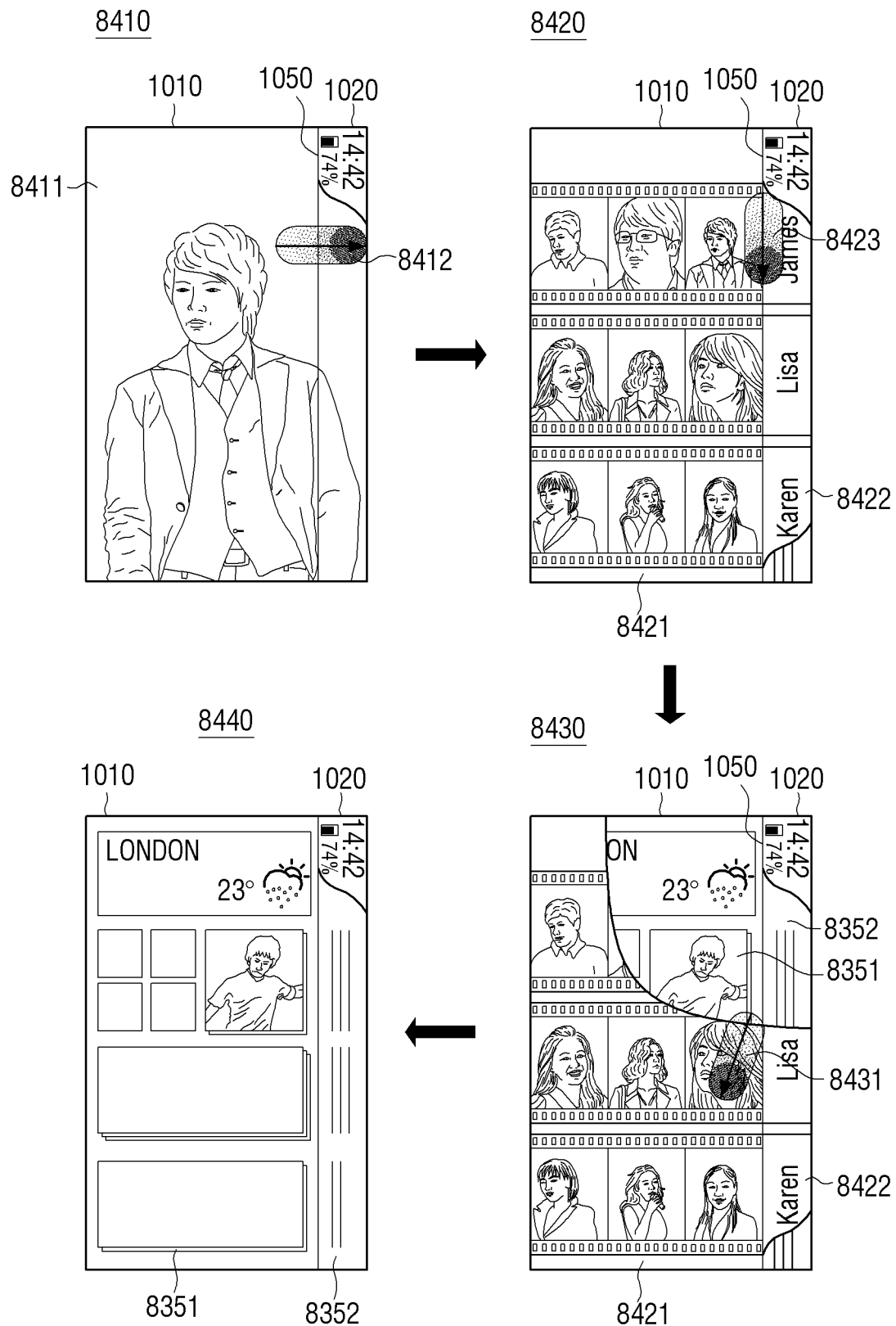

FIG. 84 is a diagram provided to explain a method for performing the back function by using the boundary area. 8410 of FIG. 84 illustrates that picture contents 8411 are displayed across the main area 1010 and the sub area 1020. The picture contents 84110\ indicate picture images displayed when one thumbnail image is selected within the executing screen of the gallery program.

When a user touches the boundary area 1050, and inputs a gesture 8412 dragging or flicking toward the sub area 1020 direction, the controller 200 displays gallery screen 8421 prior to the picture contents on the main area 1010, and displays a plurality of objects 8422 corresponding to the gallery screen 8421 on the sub area 1020. 8420 of FIG. 84 illustrates that the gallery screen 8421 and the objects 8422 are respectively displayed on the main area 1010 and the sub area 1020. When the user touches the boundary area 1050 and inputs a gesture 8423 dragging or flicking toward one direction, the controller 200 deletes some of the gallery screen 8421 currently displayed according to the user gesture 8423, and exposes the home screen 8351 and its objects 8352. When the user inputs user gesture 8431 to expand the exposed area, the controller 200 removes the gallery screen 8421, and respectively displays the home screen 8351 and the objects 8352 on the main area 1010 and the sub area 1020.

Figure 85:
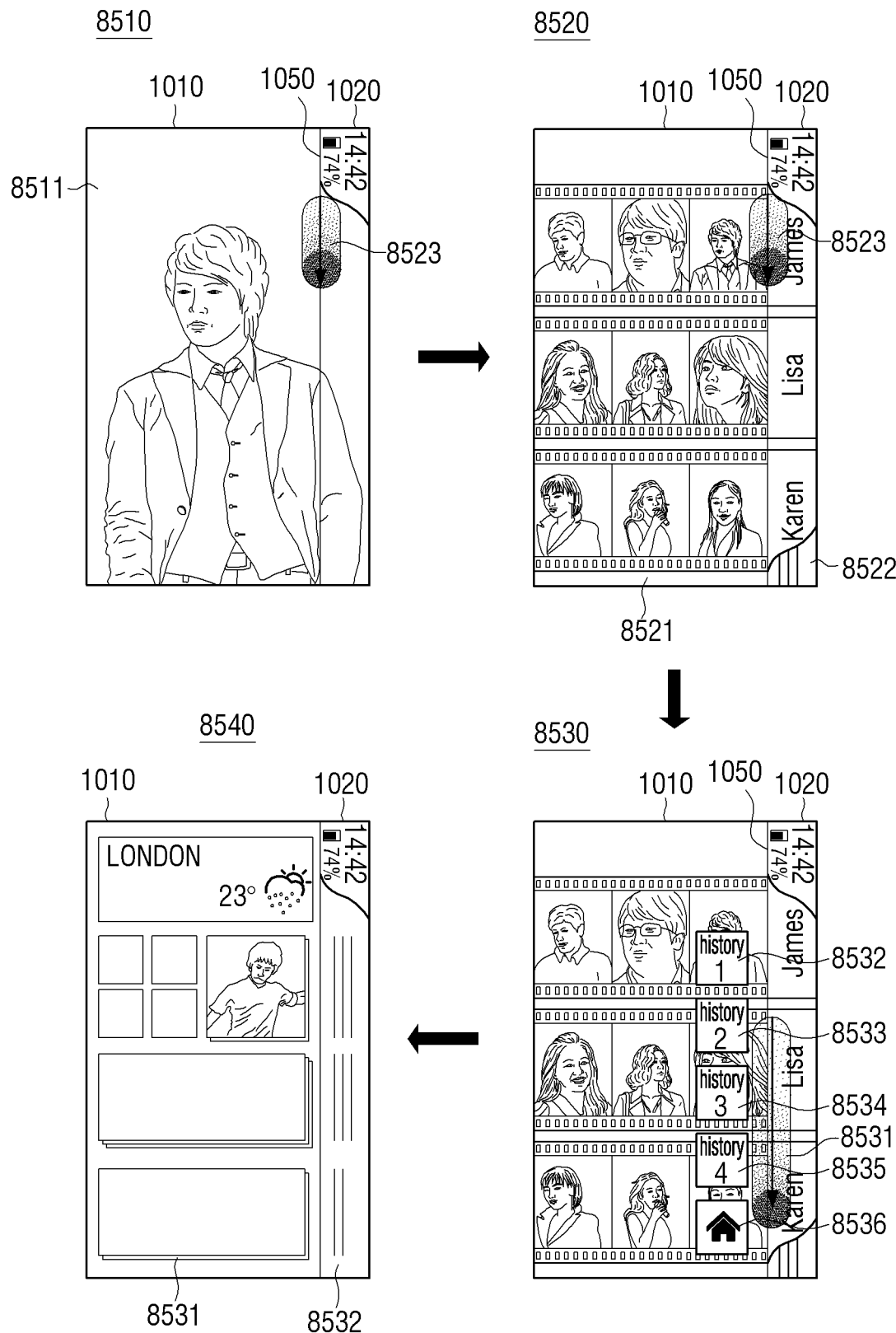

FIG. 85 is a diagram provided to explain another method for performing the back function by using the boundary area.

Referring to 8510 of FIG. 85, when the picture contents 8511 are displayed across the main area 1010 and the sub area 1020, a user may an input gesture 8512 dragging or flicking along to the boundary area 1050.

The controller 200 displays the gallery screen 8521 and its object 8522 in response to the user gesture 8512, as illustrated in 8520 of FIG. 85. When the user touches the boundary area 1050 and inputs gestures 8523, 8531 dragging for more than a certain distance following along the boundary area, the controller 200 consecutively displays a plurality of objects 8532~8536 indicating using history according to dragging points, as illustrated in 8530 of FIG. 85. The last one object 8536 among the objects may correspond to a home screen. When dragging completes, a screen corresponding to the displayed object at the completing time is displayed on the main area 1010. For example, when the user performs the dragging to the last object, the controller 200 displays the home screen 8531 on the main area 1010 as illustrated in 8540 of FIG. 85, and displays the objects 8532 corresponding to the home screen 8531 on the sub area 1020.

According to the various exemplary embodiments, the user terminal device 1000 may perform various controlling operations according to the inputted user gestures when user gestures regarding the boundary area 1050 dividing the main area 1010 and the sub area 1020 are inputted in addition to user gestures regarding the main area 1010 and the sub area 1020. User gestures inputted on the boundary area 1050 may be various gestures such as a first user gesture scrolling along the boundary area 1050, a second user gesture touching the boundary area 1050 and moving the touched point toward the main area 1010 direction, a third user gesture touching the boundary area 1050 and moving the touched point toward the sub area 1020 direction, pinch-in gestures performed on the boundary area 1050, pinch-out gestures, pinch-in gestures gathering toward the boundary area 1050, and pinch-out gestures starting from the boundary area 1050. When one of such gestures is sensed, the user terminal device 1000 may perform different controlling operations according to the sensed user gestures.

The user terminal device 1000 may provide various interactions by combining the main area 1010 and the sub area 1020.

Figure 86:
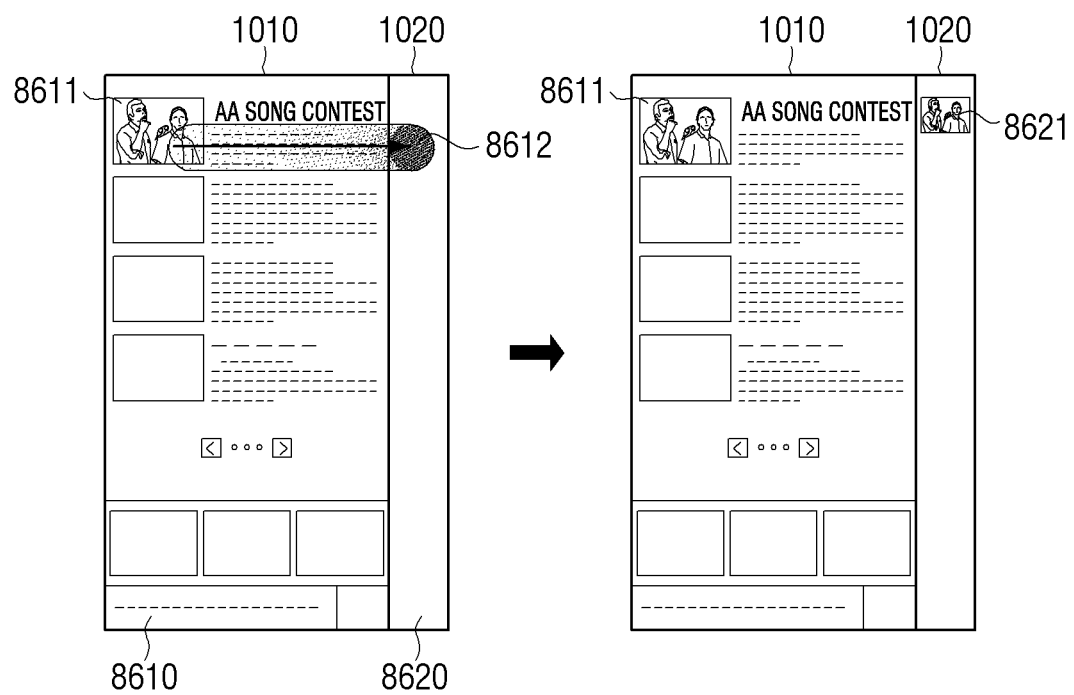

FIG. 86 is a diagram provided to explain an exemplary embodiment of using the sub area as a clip board. As illustrated in FIG. 86, the user terminal device 1000 may display a web page screen 8610 or other application screens on the main area 1010, and display the clip board 8620 on the sub area 1020. When a user selects an object 8611 such as specific image or text within the screen 8610, and inputs a gesture 8612 dragging the selection toward the sub area 1020 direction, the controller 200 separately stores the selected object 8611, and displays a sub object 8621 corresponding to the selected object 8611 on the clip board 8620 within the sub area 1020.

Figure 87:
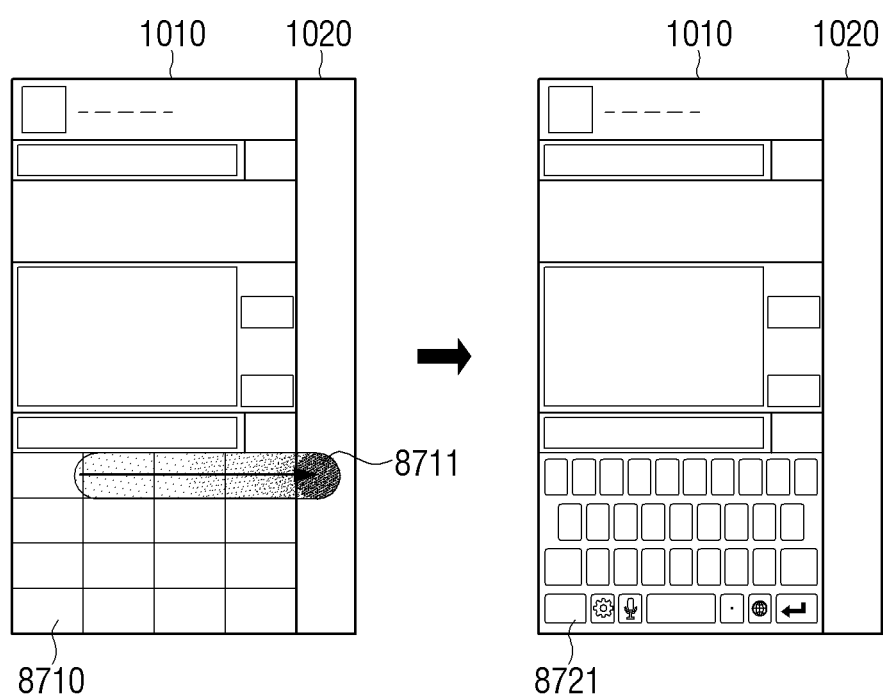

FIG. 87 is a diagram provided to explain an exemplary embodiment regarding operation of the user terminal device 1000 in which a user can perform keyboard typing. Referring to FIG. 87, the user terminal device 1000 may display a keyboard screen 8710 including a keyboard and character display area where characters inputted through the keyboard are displayed on the main area 1010. When the user tilts the user terminal device 1000 toward the main area 1010 direction, and inputs gesture 8711 dragging toward the main area 1010 direction after touching the sub area 1020, the controller 200 modifies the keyboard within the keyboard screen 8710 into special key window 8721. The user may input special characters, symbols, or numbers by selecting keys within the special key window 8721. When there are a plurality of special key windows, the controller 200 may consecutively modify and display another special key window whenever the tilting of the user terminal device 1000 or the gesture 8711 is repeatedly inputted.

Figure 88:
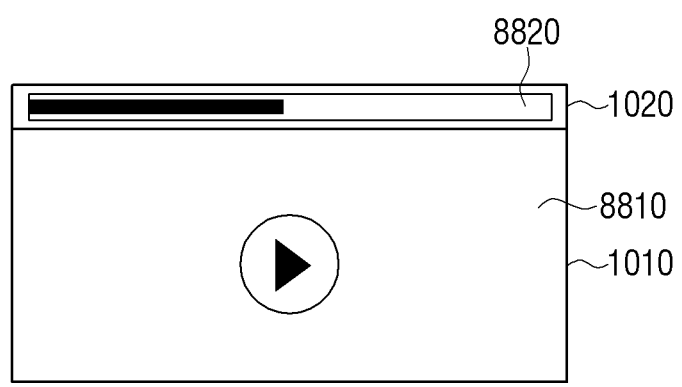

FIG. 88 is a diagram of an exemplary embodiment regarding operation of the user terminal device 1000 which reproduces multimedia contents. Referring to FIG. 88, the controller 200 executes a reproducing program, reproduces the multimedia contents selected by a user, and displays the reproducing screen 8810 on the main area 1010 when user gestures to reproduce multimedia contents are inputted. Further, the controller 200 displays a play bar 8820 indicating how much of the multimedia contents have been produced on the sub area 1020. When the user moves their finger toward the sub area 1020 direction, the controller 200 may display various controlling menus to control a reproducing operation of the multimedia contents on the sub area 1020. The method for sensing the approaching is described in the above exemplary embodiments and will not be further explained.

Figure 89:
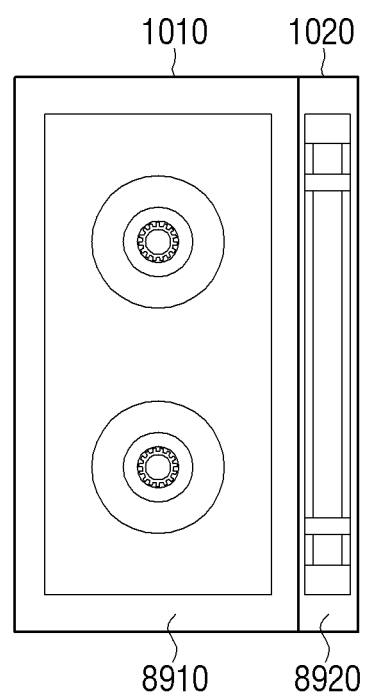

FIG. 89 is a diagram of another exemplary embodiment regarding an operation of the user terminal device 1000 which reproduces multimedia contents. Referring to FIG. 89, the controller 200 may generate and display the reproducing screen 8910 of the multimedia contents selected by a user in a cassette tape format on the main area 1010, and display the upper or the lower image of the cassette tape on the sub area 1020. Thus, according to an exemplary embodiment, the user terminal device 1000 may provide 3D graphic interaction screen in format similar to the item by using the main area 1010 and one or more of the sub areas 1020, 1030. Although FIG. 89 illustrates the exemplary embodiment of reproducing the music contents, it may provide 3D graphic interaction screen in a format corresponding to the reproduced content (e.g., an electronic book or video).

Figure 90:
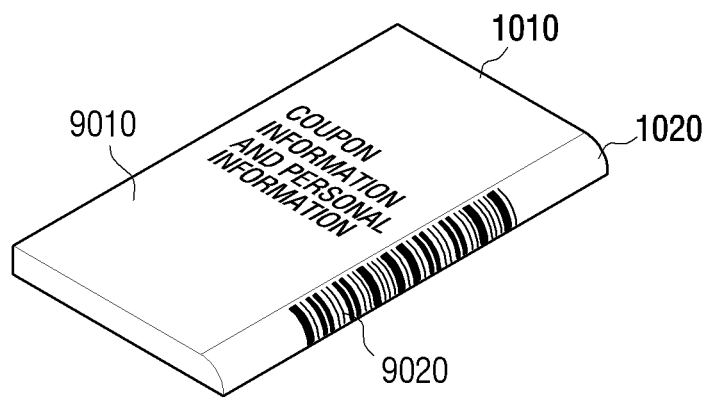

FIG. 90 is a diagram of an example of interaction screen displayed when a payment is performed by using the user terminal device 1000. Referring to FIG. 90, the main area 1010 of the user terminal device 1000 may display payment screen 9010 including various information such as coupon information, payment tool information, personal information, and purchasing goods information. Further, the sub area 1020 may display a barcode 9020 corresponding to the selected item on the payment screen 9010 or other graphic objects. When the item is modified, the controller 200 may modify the object displayed on the sub area 1020 so as to be suitable for the modified item. For example, when a credit card to be used to pay is modified on the payment screen 9010, the controller 200 may display the barcode 9020 corresponding to the modified credit card on the sub area 1020.

Even if a user does not execute another application, a status of the user terminal device 1000 may be expressed by using a sensitive interaction screen.

Figure 91:
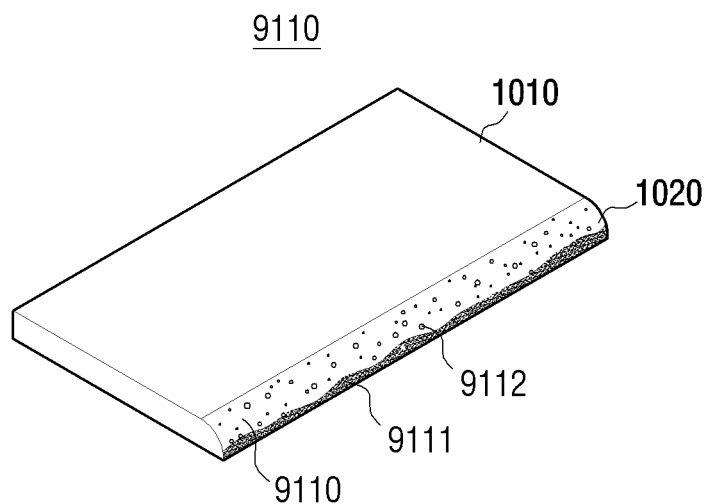
Figure 91:
Figure 91:
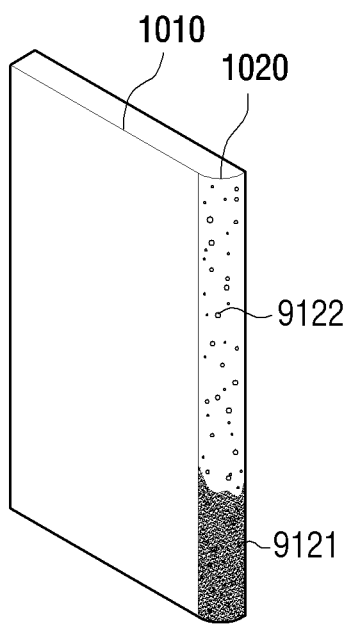

FIG. 91 illustrates an exemplary embodiment of an interaction screen displayed when charging the battery. 9110 of FIG. 91 illustrates that the user terminal device 1000 is charging the battery while being laid down. The controller 200 inactivates the main area 1010, and displays the charging degree by using the sub area 1020. Referring to 9110 of FIG. 91, when the charging begins, the controller 200 displays that dimensional particles 9112 are falling down and piled up within the sub area 1020. The depth of particle layer 9111 piled up on the ground of the sub area 1020 is differently marked according to the charging degree of the battery. When the charging is complete (i.e., the battery is charged to 100%), the sub area 1020 is fully filled with the particles 9112.

9120 of FIG. 91 illustrates that the user terminal device 1000 is charging the battery while being stood vertically. In this case, the controller 200 inactivates the main area 1010, and displays the charging degree by using the sub area 1020. The dimensional particles 9122 within the sub area 1020 are piled up as if influenced by the gravity and form the particle layer 9121. As described above, the depth of the particle layer 9121 is displayed differently according to the charging degree. When the charging completes, the sub area 1020 is fully filled with the particles 9122. Such dimensional particles 9122 may be expressed in various formats such as snow, sand, rain, water drops, and mill powder. Although FIG. 91 illustrates that the particles 9122 are piled up on a lower side of the user terminal device 1000 as if influenced by gravity, the user terminal device 1000 may express the particles 9122 as if they are blowing with the wind by recognizing user motion, or as if they are moving with the influence of the inertia by the movement of the user terminal device 1000.

The user terminal device 1000 may provide various formats of interactions by using the main area 1010 and the sub area 1020. FIGS. 92 to 96 are diagrams explaining various examples regarding such interactions.

Figure 92:
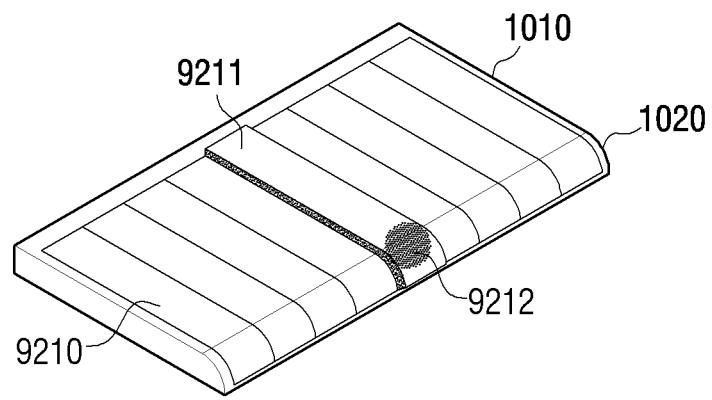

First, referring to FIG. 92, the controller 200 may display a dimensional piano key screen 9210 by using the main area 1010 and the sub area 1020. When a user touches 9212 corresponding to piano key 9211 among the piano keys displayed on the sub area 1020, the controller 200 may output an audio signal corresponding to the touched piano key 9211 through the speaker 390 while displaying graphic effects as if the touched piano key 9211 displayed on the main area 1010 is rising up. This exemplary embodiment may also be applied in various games or music playing programs, but is not limited thereto.

Figure 93:
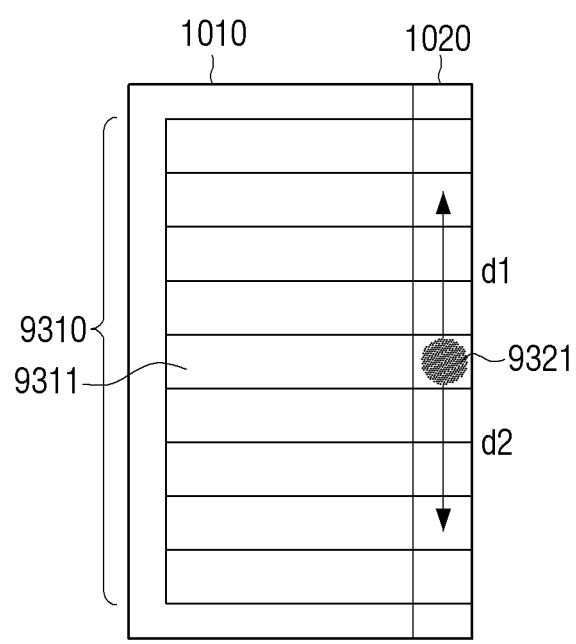

FIG. 93 is a diagram of an exemplary embodiment of highlighting portions on some screen of the main area by using the sub area. Referring to FIG. 93, when a user touches a point 9321 within the sub area 1020 while screen 9310 including a plurality of items is displayed on the main area 1010, an item 9311 corresponding to the touched point 9321 may be highlighted. A user may modify a highlighted item by dragging the touched point toward the d1 or d2 direction. This exemplary embodiment may also be applied in various games or presentation programs, but is not limited thereto.

Figure 94:
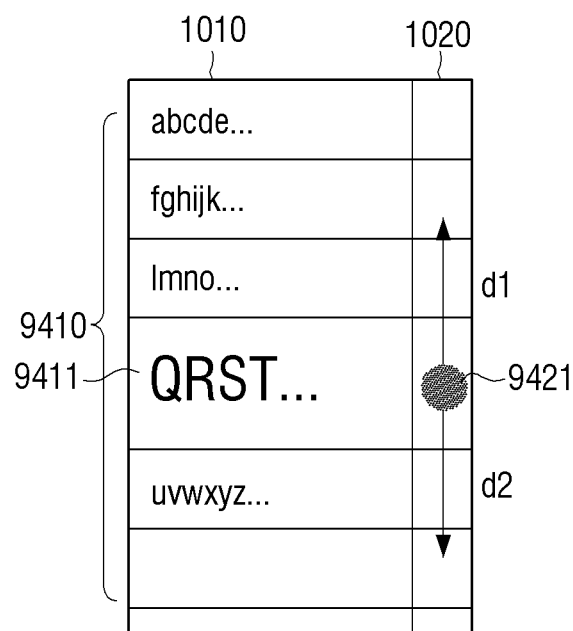

FIG. 94 is a diagram of an exemplary embodiment of expanding some screen on the main area by using the sub area. Referring to FIG. 94, when a user touches a point 9421 within the sub area 1020 while screen 9410 including a plurality of items is displayed on the main area 1010, an item 9411 corresponding to the touched point 9421 may be expanded and displayed. The user may modify an expanded and displayed item by dragging the touched point 9421 toward the d1 or d2 direction. Further, when the touching time becomes longer, the controller 200 may adjust the expansion ratio proportionally to the touching time. Thus, the controller 200 may expand the item 9411 to be bigger when the user touches longer, and display a link screen corresponding to the item 9411 on the main area 1010 when the time exceeds the initial time. This exemplary embodiment may also be applied in various games or presentation programs, but is not limited thereto.

Figure 95:
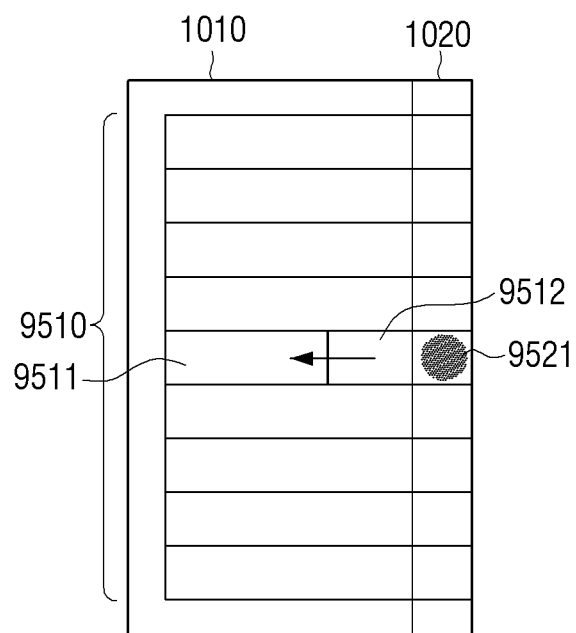

FIG. 95 is a diagram of an exemplary embodiment of modifying some items on the main area by using the sub area. Referring to FIG. 95, when a user touches a point 9521 within the sub area 1020 while screen 9510 including a plurality of items is displayed on the main area 1010, an item 9511 corresponding to the touched point 9521 may be modified. FIG. 95 illustrates that a line 9512 of the item 9511 among the boundary lines between the main area 1010 and the sub area 1020 is modified to be pushed up toward the main area 1010 direction. This exemplary embodiment may be used when a user needs to underline or hide a specific item within the screen 9510. This exemplary embodiment may also be applied in various games or presentation programs, but is not limited thereto.

Figure 96:
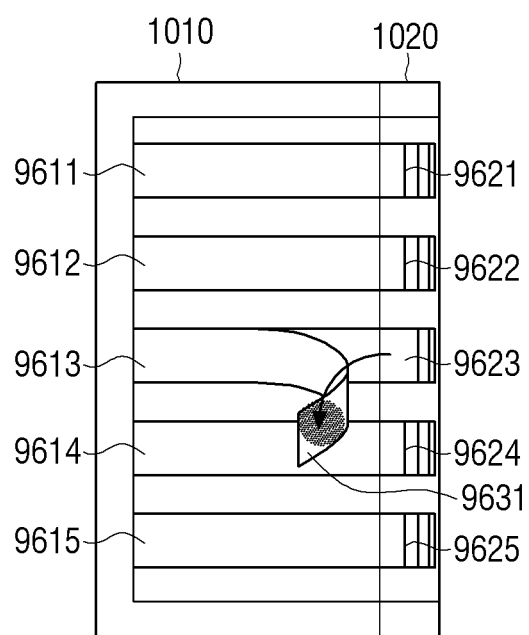

FIG. 96 illustrates an exemplary embodiment of displaying a sticker-type memo by using the main area and the sub area. Referring to FIG. 96, the main area 1010 of the user terminal device 1000 may display a plurality of different sticker-type memo papers 9611~9615, and the sub area 1020 may display objects 9621~9625 showing that a plurality of memories 9611~9615 are consecutively piled up. A user may select one object 9623 among the objects on the sub area 1020, and input a gesture 9631 dragging the selected objection 9623 toward the main area 1010 direction. The controller 200 may display a peel off effects as if corresponding memo paper 9613 is peeled off according to such gesture 9631. The controller 200 may move the peeled memo paper 9613 to another application screen according to following user gestures, and display it on a corresponding screen.

Meanwhile, when the user terminal device 1000 provides the two sub areas, a user may control operation of another sub area by touching one sub area.

Figure 97:
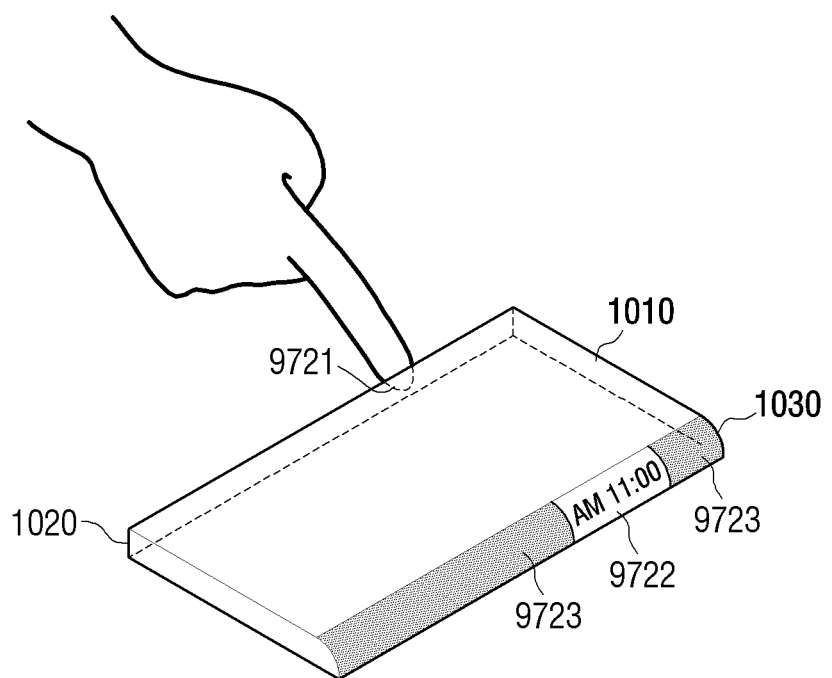

FIG. 97 is a diagram of operation of the user terminal device 1000 according to an exemplary embodiment of controlling another sub area by using one sub area. Referring to FIG. 97, the user terminal device 1000 includes the bended touch screen 100 constituted with the main area 1010, the first sub area 1020, and the second sub area 1030. When the user terminal device 1000 is in a locked situation or in a saving mode, the controller 200 may respectively turn off the main area 1010, the first sub area 1020, and the second sub area 1030, or reduce the brightness of these areas by more than a certain level. When a user touches a point 9721 within the first sub area 1020, only a point 9722 which is opposite or corresponding to the touched point 9721 may be partly lighted within the opposing second sub area 1030. FIG. 97 illustrates that only the part 9722 showing current time is lighted within the second sub area 1030 by the user touch, and the other part 9723 remains darkened. The controller 200 may display another point within the second sub area 1030 brightly according to the moving position, when the touched point of a user moves.

Figure 98:
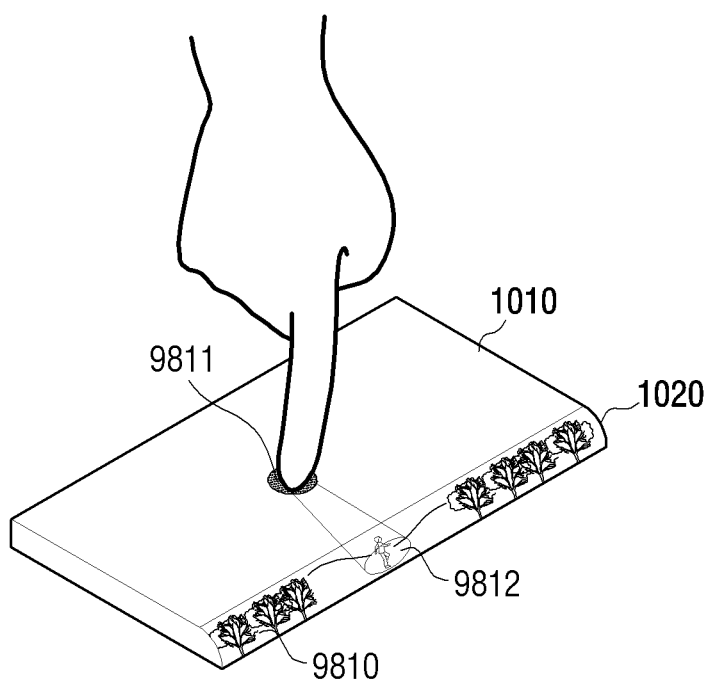

FIG. 98 is a diagram of an operation of the user terminal device 1000 according to an exemplary embodiment of controlling a display situation of the sub area by using the main area. Referring to FIG. 98, while the user terminal device 1000 is laid down on a surface, the controller 200 may display some contents 9810 on the first sub area 1020. The contents displayed on the first sub area 1020 may be 3D contents having dimensional feeling. In this situation, a user may touch the main area 1010. The controller 200 may display an effect 9812 as if lights or particles are coming down within the first sub area 1020 according to the point touched by the user.

For example, when the user touches the main area 1010 while the contents 9810 showing forest is displayed on the first sub area 1020, it may display a visual effect 9812 as if the sun is shining on a point corresponding to the touched point. The user may freely modify the touched point within the main area 1010, and the controller 200 may freely modify area where the sun is shining according to modifying the touched point. Thereby, each object within the contents 9810 can be viewed with dimensional feeling. Meanwhile, according to another exemplary embodiment, the user may edit the contents 9810 by executing an editing function so as to add such interaction effects. Further, the user may share the edited contents with another friend.

Figure 99:
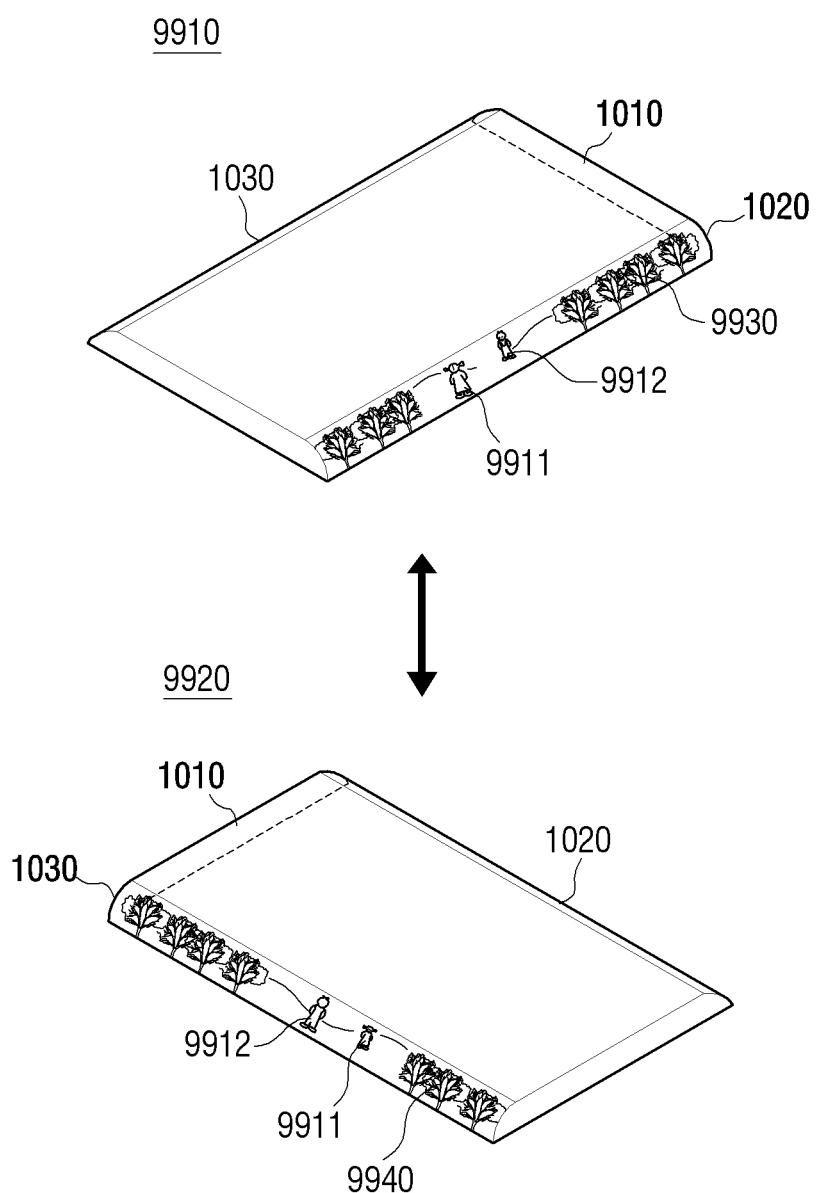

FIG. 99 is a diagram of operation of the user terminal device 1000 according to an exemplary embodiment of displaying the uniform contents by using a plurality of sub areas. Referring to FIG. 99, the user terminal device 1000 includes the bended touch screen 100 constituted with the main area 1010, the first sub area 1020, and the second sub area 1030. As illustrated in FIG. 99, when contents are reproducing while the user terminal device 1000 is laid down, the controller 200 may display contents screens respectively on the first area 1020 and the second sub area 1030. 9910 of FIG. 99 illustrates that a first contents screen 9930 is displayed on the first sub area 1020, and 9920 of FIG. 99 illustrates that a second contents screen 9940 is displayed on the second sub area 1030.

The first contents screen 9930 and the second contents screen 9940 may be screens facing the uniform contents from the contrary directions. For example, while the first contents screen 9930 may display that person 9912 is standing farther away compared to person 9911 (i.e., with respect to a user viewing the first contents screen 9930), the second contents screen 9940 may display that person 9911 is standing farther compared to person 9912. Thereby, according to the exemplary embodiment, contents can be viewed from different perspectives. Such screens according to the exemplary embodiment may be used, for example, in games for two persons or presentations.

Figure 100:
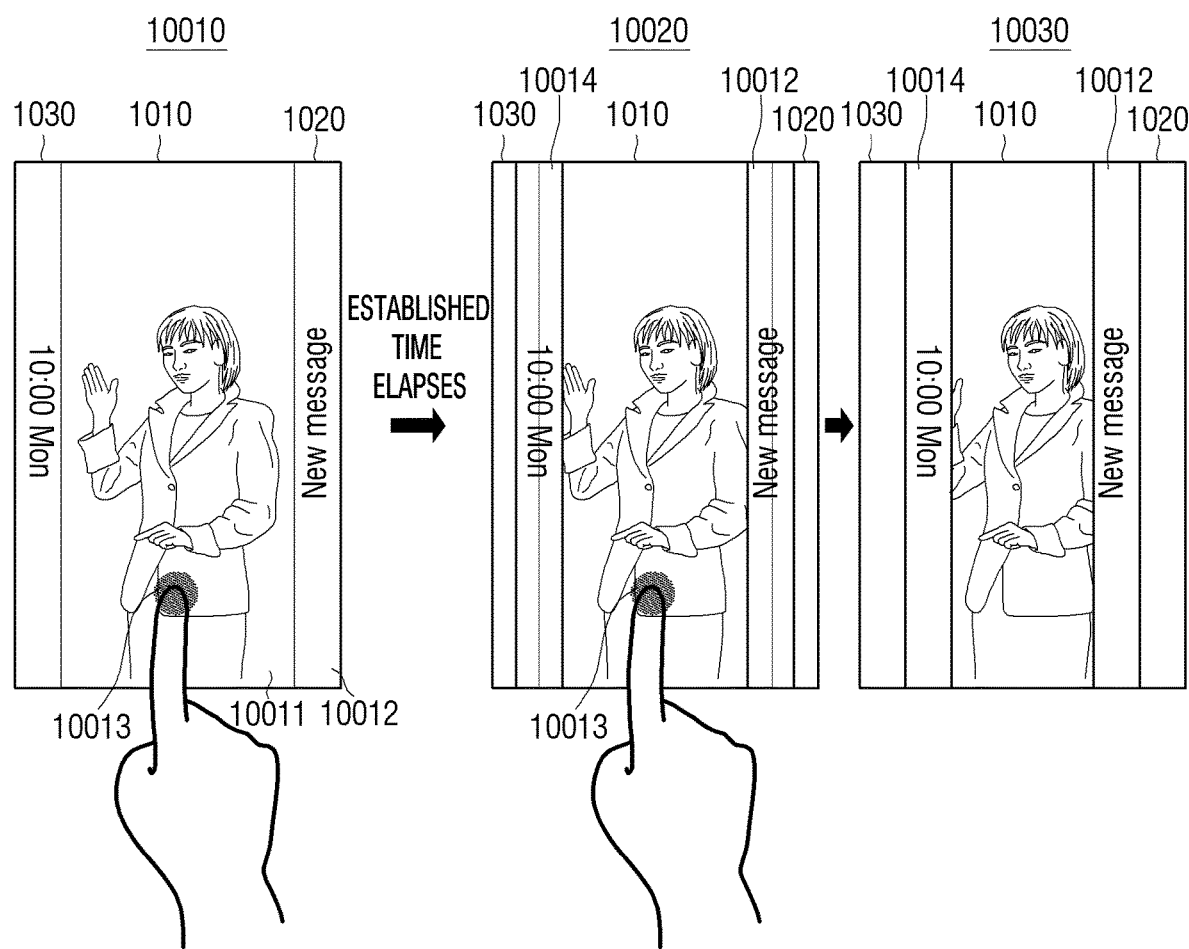

FIG. 100 is a diagram of an exemplary embodiment of confirming information displayed on the sub area by using the main area. Referring to 10010 of FIG. 100, the user terminal device 1000 includes the main area 1010, the first sub area 1020, and the second sub area 1030.

The controller 200 displays a plurality of screens 10011, 10012, 10014 respectively on the main area 1010, the first sub area 1020, and the second sub area 1030. When a user a touch 10013 for more than a preset time after touching the main area 1010, the controller 200 may display the screens 10012, 10014 displayed on the first and the second sub areas 1020, 1030 as if they are crawling up toward the main area 1010 direction, as illustrated in 10020 and 10030 of FIG. 100. According to the exemplary embodiment, even if the user does not view the sectioned side, the screens on the sub areas 1020, 1030 may be confirmed on the main area 1010.

The user terminal device 1000 may perform various operations according to the types of executing programs in response to user gestures inputted on the sub areas. For example, if the calendar program is executing when a user inputs touching on the sub area, a menu regarding certain information corresponding to the touched point may be displayed on the main area. The user may select various options such as sharing option, schedule registering option, and deleting option. Further, when the user inputs gestures touching and spreading the sub areas, the controller 200 may perform operation to expand certain information within the spread area.

As described above, according to the above various exemplary embodiments, a user may perform various interactions by using the main area and one or more sub areas. The following will explain interaction methods according to some of the exemplary embodiments by using flowcharts.

Figure 101:
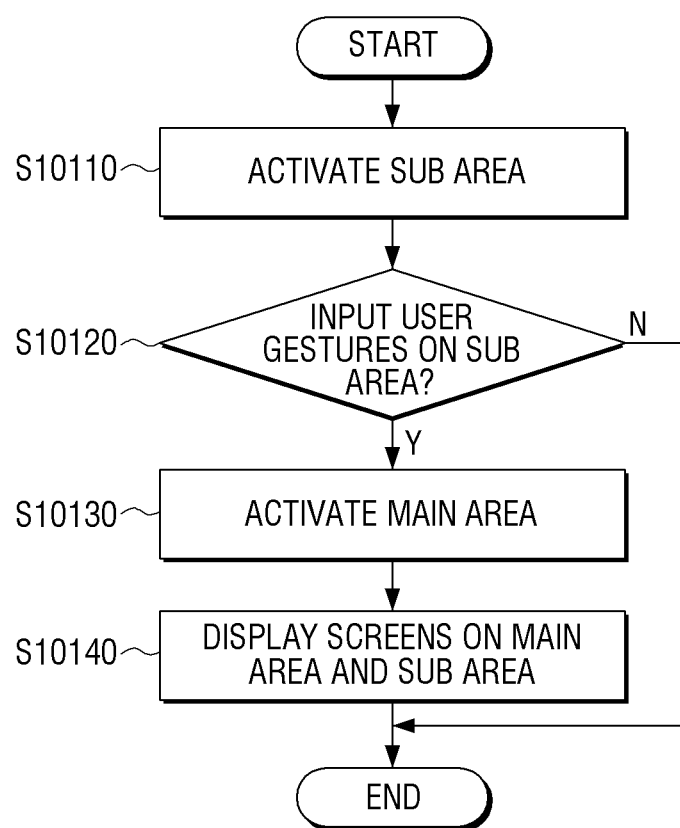
FIGS. 101 to 105 are flowcharts provided to explain display methods of interaction screens on the user terminal device according to various exemplary embodiments.

FIG. 101 is a flowchart explaining the interaction method according to an exemplary embodiment. Referring to FIG. 101, the user terminal device 1000 may activate only the sub areas among the main area and the sub areas at S10110. For example, when the user terminal device 1000 is laid down on a surface so that the main area is directed toward the surface, when the user terminal device 1000 is carried in a purse or in a pocket, when the amount of charge remaining in the battery is less than a certain level, when a specific application executes, or when a user inactivates the main area only, the user terminal device 1000 may activate one or more sub areas only.

When a user inputs preset user gestures regarding the sub areas at S10120, the user terminal device 1000 may activate the main area at S10130.

Therefore, the user terminal device 1000 may display various screens by using both of the activated main area and sub areas at S10140.

Meanwhile, according to another exemplary embodiment, when a preset first user gesture is inputted while the sub area is inactivated, the user terminal device 1000 may activate the sub area. When a preset second user gesture is inputted on the sub area or when the preset first user gesture is inputted again, the user terminal device 1000 may additionally activate the main area.

The interaction screens regarding these exemplary embodiments are explained in the above various exemplary embodiments, and will not be further described.

Figure 102:
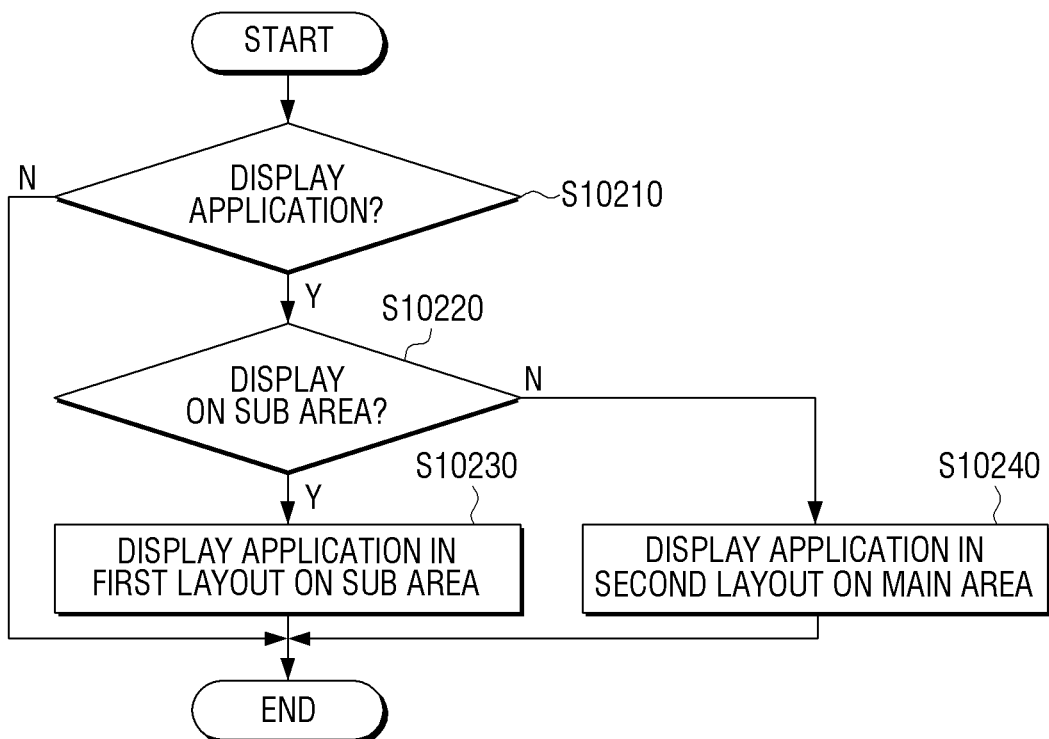

FIG. 102 is a flowchart explaining the interaction method according to another exemplary embodiment. Referring to FIG. 102, the user terminal device 1000 determines whether an event to display an application occurs or not at S10120. Herein, the event to display an application may be various events such as an event to receive messages or emails from external devices, an event to receive signals requesting displaying of a specific application from external devices, an event receiving an input user gesture requesting executing of a specific application and displaying the screen, an event in which a preset time period approaches, and an event generating an update version regarding an application stored in the user terminal device 1000.

When such events occur, the user terminal device 1000 determines whether the application should be displayed on the sub area or the main area at S10220. According to a result of the determining, if the application should be displayed on the sub area, the user terminal device 1000 displays the application in the first layout on the sub area at S10230. Displaying the application refers to displaying screens generated according to executing the application programs, as set forth the exemplary embodiments. For example, as illustrated in FIG. 15, when the user terminal device 1000 tilts by more than a certain angle toward a direction in which the sub area is directed at a user, the user terminal device 1000 may display the application on the sub area.

Meanwhile, if the application should be displayed on the main area, the user terminal device 1000 displays the application in the second layout on the main area at S10240. According to the above exemplary embodiments, if the user terminal device 1000 is gripped such that the user terminal device 1000 is in a vertical orientation, the user terminal device 1000 may reconstitute and display the application in the second layout different from the first layout.

Figure 103:
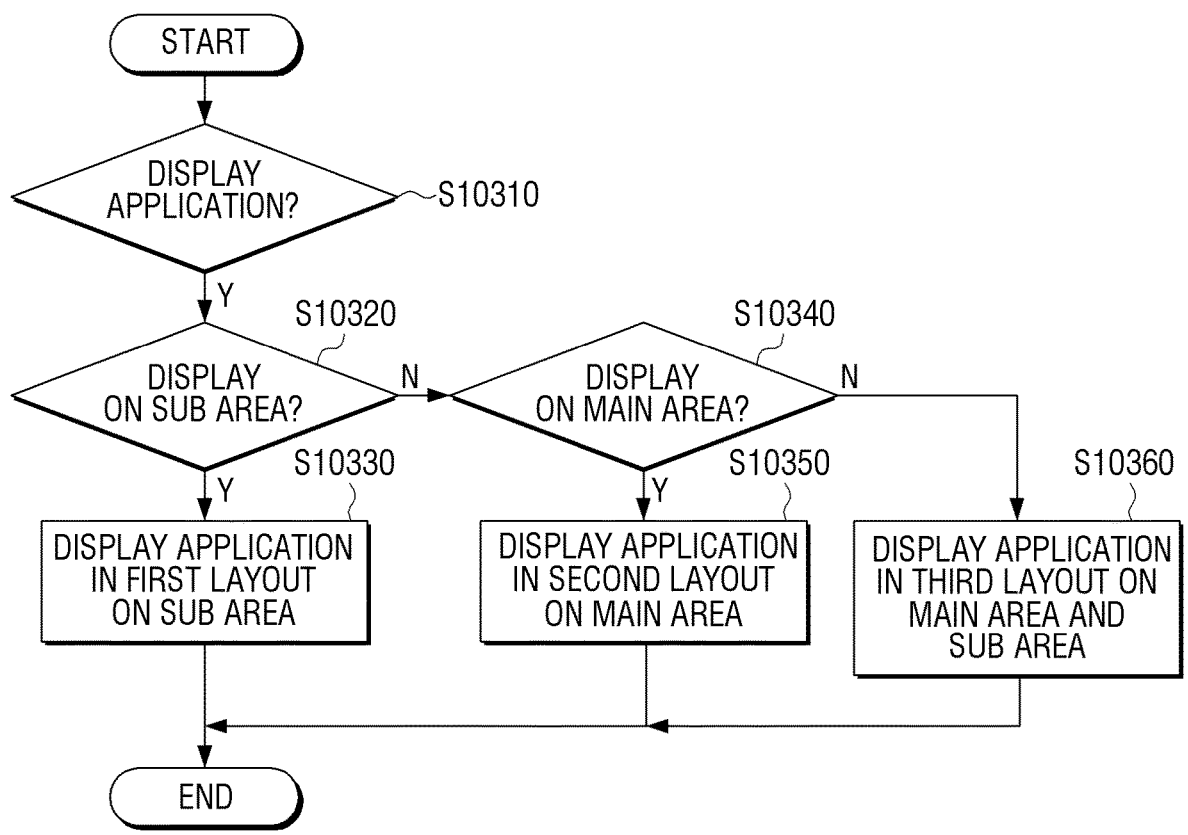

FIG. 103 is a flowchart explaining the interaction method according to another exemplary embodiment. Referring to FIG. 103, when event to display an application occurs at S10310, the user terminal device 1000 determines whether the application is to be displayed on the sub area, the main area or all of the main area and the sub area at S10320, S10340.

As a result of the determining, if the application should be displayed on the sub area, the user terminal device 1000 displays the application in the first layout on the sub area at S10330.

Further, if the application should be displayed on the main area, the user terminal device 1000 displays the application in the second layout on the main area at S10340.

Further, when the application should be displayed on all of the main area and the sub area, the user terminal device 1000 may display the application in the third layout by using all of the main area and the sub area at S10360.

The first, the second, and the third layouts are specifically explained in FIGS. 13 and 14 and will not be further described.

Figure 104:
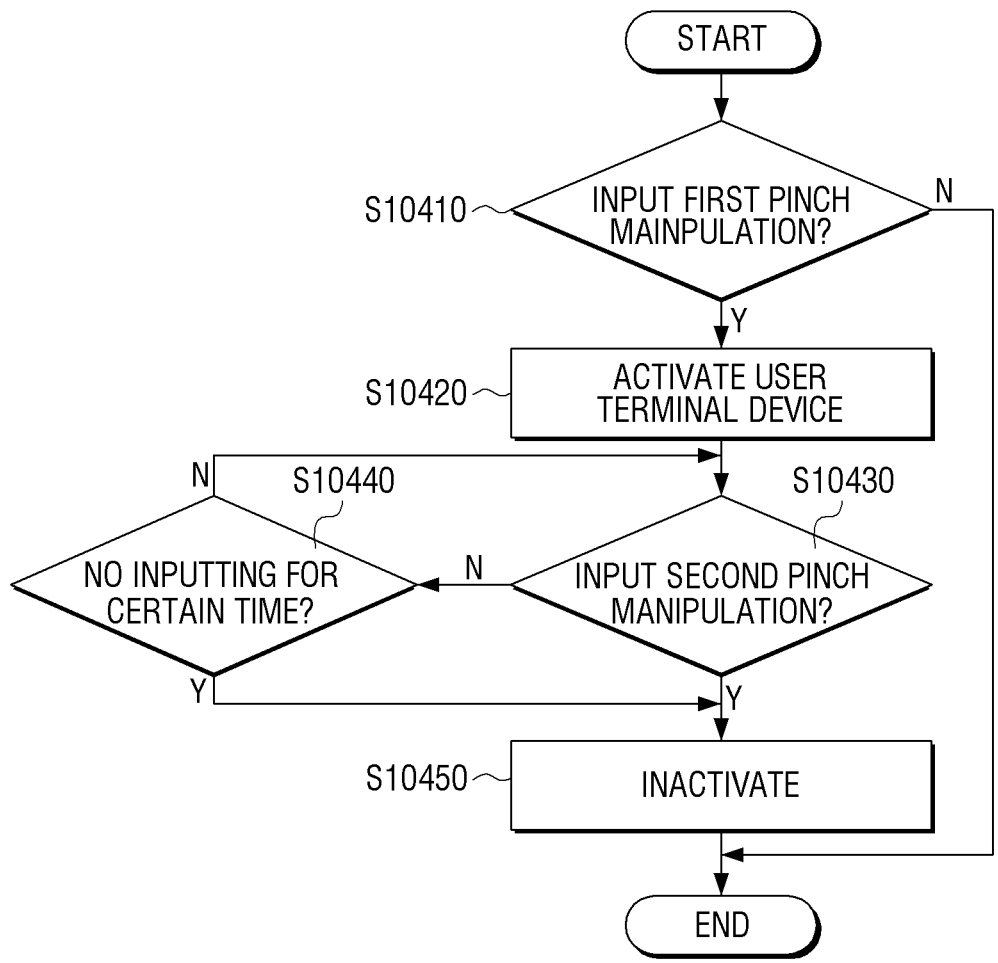

FIG. 104 is a flowchart explaining the interaction method according to another exemplary embodiment. Referring to FIG. 104, when the first pinch gesture is inputted while the user terminal device 1000 is inactivated at S10410, the user terminal device 1000 performs the unlocking to be activated at S10420. When the user terminal device 1000 is activated, the main area and the sub area are respectively turned on and various screens are displayed.

When the second pinch gesture is inputted at S10430, or when there is no inputting for a certain time at S10440, the user terminal device 1000 performs the locking to be inactivated at S10450. When being inactivated, the user terminal device 1000 may turn off both of the main area and the sub area or turn off the main area only.

The interaction screens according to the exemplary embodiment are specifically explained in FIGS. 78 and 79 and will not be further described.

Figure 105:
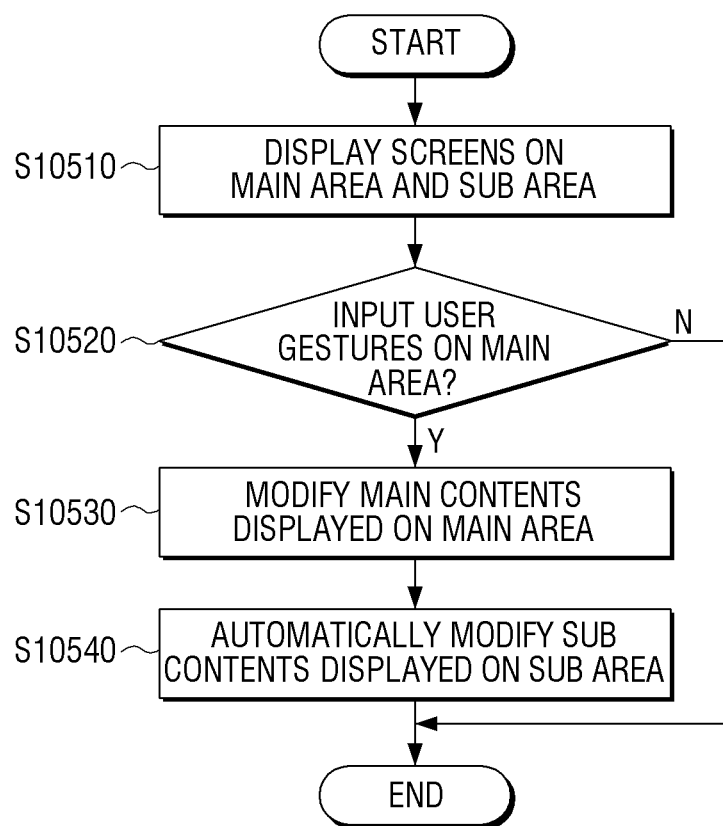

FIG. 105 is a flowchart explaining the interaction method according to another exemplary embodiment. Referring to FIG. 105, the user terminal device 1000 may display various screens by using the main area and the sub area at S10510. The types of screens that can be displayed by using the main area and the sub area are specifically explained in the above various exemplary embodiments and will not be further described.

When the user gestures are inputted on the main area at S10520, the user terminal device 1000 modifies the main contents displayed on the main area at S10530. Further, the user terminal device 1000 automatically modifies the sub contents displayed on the sub area by interlocking with modifying situation of the main contents at S10540.

Thereby, a user may perform interactions by comprehensively using the main area and the sub area.

Although FIG. 105 describes that display situation of the sub area is modified according to the user gestures inputted on the main area, contrary processes may be performed. For example, when user gestures are inputted on the sub area, the user terminal device 1000 may modify the contents displayed on the main area according to the user gestures.

The above described interactions may be performed in the various exemplary embodiments; however, specific flowcharts regarding each exemplary embodiment will not be illustrated and described.

Meanwhile, the constitution regarding the main area and one or more sub areas may be variously modified as described in FIGS. 2 to 10. Further, the above various exemplary embodiments may be executed in the user terminal device 1000 including various constitutions described in FIGS. 2 to 10.

As described above, the user terminal device 1000 may support various interactions. The above exemplary embodiments may be separately executed in each, or combined and executed according to necessity.

The interaction methods of the user terminal device 1000 or the screen display methods according to the above various exemplary embodiments may be stored in non-transitory readable recording medium. Such non-transitory readable recording medium may be loaded and used in various devices.

A non-transitory computer readable recording medium refers to a medium which store data semi-permanently and can be read by devices. For example, it may be a CD, DVD, hard disk, Blu-ray disk, USB, memory card, or ROM.

According to an exemplary embodiment, a non-transitory readable recording medium may be provided by storing and providing program codes to execute performing the unlocking to activate the user terminal device 1000 when the first pinch gesture is inputted on one or more area among the main area and the sub areas while the user terminal device 1000 is locked, and performing the locking to inactivate the user terminal device 1000 when the second pinch gesture is inputted on one or more area among the main area and the sub areas while the user terminal device 1000 is unlocked.

The foregoing exemplary embodiments and advantages are merely exemplary and are not to be construed as limiting the exemplary embodiments. The exemplary embodiments can be readily applied to other types of apparatuses. Also, the description of the exemplary embodiments is intended to be illustrative, and not to limit the scope of the inventive concept, as defined by the appended claims, and many alternatives, modifications, and variations will be apparent to those skilled in the art.

What is claimed is:

1. An electronic apparatus, comprising:
a touch display comprising:
    a first area; and
    a second area, the second area extending from the first area;
a memory storing instructions; and
at least one processor configured to execute the instructions to:
    in response to receiving a first touch input for touching a first position of the second area, control the touch display to display a visual element which is extended from the first position touched by the first touch input on the second area to the first area, wherein the displayed visual element is extended along a first portion of the first area corresponding to the first position, and
    in response to receiving a second touch input for touching a second position of the second area, control the touch display to display the visual element which is extended from the second position touched by the second touch input on the second area to the first area, wherein the displayed visual element is extended along a second portion of the first area, different from the first portion, corresponding to the second position.

2. The electronic apparatus as claimed in claim 1, wherein the visual element has a curved shape to be convex toward a direction in which the visual element is extended.

3. The electronic apparatus as claimed in claim 1, wherein the second area comprises a curved portion continuously extending from the first area.

4. A method for controlling an electronic apparatus comprising a touch display which comprises a first area and a second area, the second area extending from the first area, the method comprising:
- receiving a touch input for touching the second area; and
- displaying a visual element which is extended from a position touched by the touch input on the second area to the first area,
- wherein the displaying comprises:
    - in response to receiving a first touch input for touching a first position of the second area, control the touch display to display the visual element which is extended from the first position touched by the first touch input on the second area to the first area, wherein the displayed visual element is extended along a first portion of the first area corresponding to the first position, and
    - in response to receiving a second touch input for touching a second position of the second area, control the touch display to display the visual element which is extended from the second position touched by the second touch input on the second area to the first area, wherein the displayed visual element is extended along a second portion of the first area, different from the first portion, corresponding to the second position.

5. The method as claimed in claim 4, wherein the visual element has a curved shape to be convex toward a direction in which the visual element is extended.

6. The method as claimed in claim 4, wherein the second area comprises a curved portion continuously extending from the first area.

7. The electronic apparatus as claimed in claim 1, wherein:
- the first touch input is a touch-and-drag input for touching the first position and dragging to the first area; and
- the at least one processor is configured to execute the instructions to, based on the touch-and-drag input being maintained on the first area for a predetermined period of time, control the touch display to stop display of the visual element and to display another visual element on the second area.

8. The electronic apparatus as claimed in claim 7, wherein the other visual element has a larger size than the visual element.

9. The electronic apparatus as claimed in claim 7, wherein display of the other visual element is maintained on the screen after release of the first touch input.

10. The electronic apparatus as claimed in claim 1, wherein:
- the touch display comprises a third area extending from the first area on an opposite side of the second area; and
- the at least one processor is configured to execute the instructions to, in response to receiving a third touch input for touching the third area, control the touch display to display another visual element which is extended from a position touched by the third touch input on the third area to the first area.

* * * * *